United States Patent
Herzlinger et al.

(10) Patent No.: US 9,797,258 B2
(45) Date of Patent: Oct. 24, 2017

(54) TURBINE BUCKET INCLUDING COOLING PASSAGE WITH TURN

(71) Applicant: General Electric Company, Schenectady, NY (US)

(72) Inventors: Jason Douglas Herzlinger, Glenville, NY (US); Harish Bommanakatte, Bangalore (IN); Anthony Louis Giglio, Baton Rouge, LA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 875 days.

(21) Appl. No.: 14/061,158

(22) Filed: Oct. 23, 2013

(65) Prior Publication Data

US 2015/0110639 A1    Apr. 23, 2015

(51) Int. Cl.
*F01D 5/18* (2006.01)

(52) U.S. Cl.
CPC ............... *F01D 5/18* (2013.01); *F01D 5/187* (2013.01); *F05D 2250/185* (2013.01); *F05D 2250/74* (2013.01); *Y02T 50/671* (2013.01); *Y02T 50/673* (2013.01); *Y02T 50/676* (2013.01)

(58) Field of Classification Search
CPC . F01D 5/18; F01D 5/187; F01D 5/186; F01D 25/12; F05D 2250/74; F05D 2250/185; F05D 2260/221; F05D 2260/2212; Y02T 50/671; Y02T 50/673; Y02T 50/676
See application file for complete search history.

(56) References Cited

U.S. PATENT DOCUMENTS

| | | | |
|---|---|---|---|
| 1,828,409 A | 10/1931 | Densmore | |
| 1,955,929 A | 4/1934 | Mueller | |
| 2,714,499 A | 8/1955 | Warner | |
| 3,844,679 A | 10/1974 | Grondahl et al. | |
| 4,208,167 A | 6/1980 | Yasugahira et al. | |
| 4,302,153 A * | 11/1981 | Tubbs | F01D 5/18 416/96 R |
| 4,604,031 A * | 8/1986 | Moss | F01D 5/187 415/115 |

(Continued)

FOREIGN PATENT DOCUMENTS

EP    2479381 A1    7/2012

OTHER PUBLICATIONS

U.S. Appl. No. 14/060,996, Final Office Action 1 dated Mar. 4, 2016, 15 pages.

(Continued)

*Primary Examiner* — Craig Kim
*Assistant Examiner* — Wayne A Lambert
(74) *Attorney, Agent, or Firm* — Ernest G. Cusick; Hoffman Warnick LLC

(57) ABSTRACT

Turbine frequency tuning, fluid dynamic efficiency, and performance can be improved using a particular profile for a turn of a cooling passage in an airfoil. By blending aspects of baseline and bulb contours into a blended turn with a non-uniform profile, mechanical and/or thermal stress can be reduced in the turn and in an airfoil including the turn, particularly on an outflow side of the turn. Stresses on the airfoil can be reduced using a turn profile that is a blend of a baseline profile and a bulb profile and that can be described by the airfoil core profile.

17 Claims, 10 Drawing Sheets

(56) References Cited

U.S. PATENT DOCUMENTS

| | | |
|---|---|---|
| 4,627,480 A | 12/1986 | Lee |
| 4,682,935 A | 7/1987 | Martin |
| 5,073,086 A * | 12/1991 | Cooper ............... F01D 5/187 416/96 R |
| 5,088,892 A | 2/1992 | Weingold et al. |
| 5,282,721 A | 2/1994 | Kildea |
| 5,286,168 A | 2/1994 | Smith |
| 5,397,217 A * | 3/1995 | DeMarche ............ F01D 5/187 415/115 |
| 5,480,285 A | 1/1996 | Patel et al. |
| 5,503,527 A * | 4/1996 | Lee ..................... F01D 5/20 415/173.1 |
| 5,525,038 A | 6/1996 | Sharma et al. |
| 5,536,143 A * | 7/1996 | Jacala .................. F01D 5/187 416/96 R |
| 5,738,489 A | 4/1998 | Lee |
| 5,848,876 A | 12/1998 | Tomita |
| 5,873,695 A * | 2/1999 | Takeishi .............. F01D 5/187 415/115 |
| 5,924,843 A * | 7/1999 | Staub .................. F01D 5/187 415/115 |
| 5,980,209 A | 11/1999 | Barry et al. |
| 6,017,189 A | 1/2000 | Judet et al. |
| 6,019,579 A * | 2/2000 | Fukuno ............... F01D 5/187 415/115 |
| 6,072,829 A | 6/2000 | Dirr |
| 6,077,034 A * | 6/2000 | Tomita ................ F01D 5/08 415/110 |
| 6,079,948 A | 6/2000 | Sasaki et al. |
| 6,086,328 A | 7/2000 | Lee |
| 6,142,739 A | 11/2000 | Harvey |
| 6,190,130 B1 | 2/2001 | Fukue et al. |
| 6,241,467 B1 | 6/2001 | Zelesky et al. |
| 6,257,830 B1 * | 7/2001 | Matsuura ............ F01D 5/147 415/115 |
| 6,419,446 B1 | 7/2002 | Kvasnak et al. |
| 6,422,817 B1 | 7/2002 | Jacala |
| 6,464,462 B2 * | 10/2002 | Stathopoulos ........ B22C 9/103 164/369 |
| 6,474,947 B1 * | 11/2002 | Yuri .................... F01D 5/186 416/97 R |
| 6,491,493 B1 | 12/2002 | Watanabe et al. |
| 6,491,496 B2 | 12/2002 | Starkweather |
| 6,554,564 B1 | 4/2003 | Lord |
| 6,579,066 B1 | 6/2003 | Saito et al. |
| 6,595,750 B2 * | 7/2003 | Parneix ............... F01D 25/12 416/97 R |
| 6,672,829 B1 | 1/2004 | Cherry et al. |
| 6,722,851 B1 | 4/2004 | Brittingham et al. |
| 6,761,535 B1 | 7/2004 | McGrath et al. |
| 6,790,005 B2 | 9/2004 | Lee et al. |
| 6,799,948 B2 | 10/2004 | Ito et al. |
| 6,887,042 B2 | 5/2005 | Ito et al. |
| 6,939,102 B2 * | 9/2005 | Liang .................. F01D 5/188 415/115 |
| 6,957,949 B2 * | 10/2005 | Hyde ................... F01D 5/187 416/96 R |
| 6,966,756 B2 | 11/2005 | McGrath et al. |
| 6,969,232 B2 | 11/2005 | Zess et al. |
| 6,988,872 B2 * | 1/2006 | Soechting ............ F01D 5/186 415/115 |
| 7,029,235 B2 | 4/2006 | Liang |
| 7,048,509 B2 | 5/2006 | Tominaga et al. |
| 7,118,329 B2 | 10/2006 | Goodman |
| RE39,398 E * | 11/2006 | Danowski ............ B22C 9/103 416/229 A |
| 7,134,842 B2 | 11/2006 | Tam et al. |
| 7,220,100 B2 | 5/2007 | Lee et al. |
| 7,255,536 B2 | 8/2007 | Cunha et al. |
| 7,281,894 B2 | 10/2007 | Lee et al. |
| 7,290,986 B2 | 11/2007 | Stegemiller et al. |
| 7,300,247 B2 | 11/2007 | Nomura et al. |
| 7,309,212 B2 | 12/2007 | Itzel et al. |
| 7,377,746 B2 | 5/2008 | Brassfield et al. |
| 7,413,405 B2 * | 8/2008 | Busbey ............... F01D 5/187 416/500 |
| 7,416,391 B2 | 8/2008 | Veltre et al. |
| 7,431,561 B2 * | 10/2008 | Hooper ............... F01D 5/187 416/96 R |
| 7,431,562 B2 * | 10/2008 | Hooper ............... F01D 5/187 416/97 R |
| 7,476,086 B2 | 1/2009 | Wadia et al. |
| 7,513,738 B2 * | 4/2009 | Itzel ................... F01D 5/187 415/115 |
| 7,544,043 B2 | 6/2009 | Eastman et al. |
| 7,597,539 B1 | 10/2009 | Liang |
| 7,600,973 B2 * | 10/2009 | Tibbott ............... F01D 5/187 416/189 |
| 7,632,062 B2 | 12/2009 | Harvey et al. |
| 7,641,446 B2 | 1/2010 | Harvey |
| 7,674,093 B2 | 3/2010 | Lee et al. |
| 7,695,243 B2 * | 4/2010 | Lee .................... F01D 5/188 415/115 |
| 7,726,937 B2 | 6/2010 | Baumann et al. |
| 7,731,483 B2 | 6/2010 | DeLong et al. |
| 7,766,606 B2 | 8/2010 | Liang |
| 7,931,444 B2 | 4/2011 | Godsk et al. |
| 7,972,115 B2 | 7/2011 | Potier |
| 7,985,053 B2 | 7/2011 | Schott et al. |
| 7,997,875 B2 | 8/2011 | Nanukuttan et al. |
| 8,047,802 B2 | 11/2011 | Clemen |
| 8,052,395 B2 | 11/2011 | Tragesser |
| 8,092,178 B2 | 1/2012 | Marini et al. |
| 8,105,031 B2 | 1/2012 | Trindade et al. |
| 8,105,037 B2 | 1/2012 | Grover et al. |
| 8,133,030 B2 | 3/2012 | Grafitti et al. |
| 8,133,032 B2 | 3/2012 | Tibbott et al. |
| 8,147,188 B2 | 4/2012 | Reeves et al. |
| 8,172,533 B2 | 5/2012 | Pinero et al. |
| 8,347,947 B2 | 1/2013 | Dube et al. |
| 8,371,815 B2 | 2/2013 | Farrell |
| 8,414,265 B2 | 4/2013 | Willett, Jr. |
| 8,449,249 B2 | 5/2013 | Suchezky |
| 8,568,097 B1 | 10/2013 | Liang |
| 8,591,189 B2 | 11/2013 | Correia et al. |
| 8,602,740 B2 | 12/2013 | O'Hearn et al. |
| 8,647,066 B2 | 2/2014 | Guimbard et al. |
| 8,647,067 B2 | 2/2014 | Pandey et al. |
| 8,684,684 B2 | 4/2014 | Clements et al. |
| 8,720,207 B2 | 5/2014 | Gersbach et al. |
| 8,721,291 B2 | 5/2014 | Lee et al. |
| 8,777,572 B2 | 7/2014 | Cheong et al. |
| 8,821,111 B2 | 9/2014 | Gear et al. |
| 8,870,524 B1 | 10/2014 | Liang |
| 8,870,585 B2 | 10/2014 | Lee et al. |
| 8,967,959 B2 | 3/2015 | Stein et al. |
| 9,103,213 B2 | 8/2015 | Barr et al. |
| 9,188,017 B2 | 11/2015 | Xu |
| 2002/0141863 A1 | 10/2002 | Liu et al. |
| 2004/0062636 A1 | 4/2004 | Mazzola et al. |
| 2004/0081548 A1 | 4/2004 | Zess et al. |
| 2005/0281674 A1 * | 12/2005 | Liang .................. F01D 5/187 416/97 R |
| 2007/0009358 A1 * | 1/2007 | Kohli .................. F01D 5/187 416/97 R |
| 2007/0059173 A1 | 3/2007 | Lee et al. |
| 2007/0059182 A1 | 3/2007 | Stegemiller et al. |
| 2007/0104576 A1 * | 5/2007 | Cunha ................. B22C 9/04 416/97 R |
| 2007/0128033 A1 | 6/2007 | Lee et al. |
| 2007/0258810 A1 | 11/2007 | Aotsuka et al. |
| 2007/0258819 A1 | 11/2007 | Allen-Bradley et al. |
| 2008/0213098 A1 | 9/2008 | Neef et al. |
| 2008/0232968 A1 | 9/2008 | Nguyen |
| 2009/0003987 A1 | 1/2009 | Zausner et al. |
| 2009/0165988 A1 * | 7/2009 | Rockstroh ............ F01D 5/187 164/492 |
| 2010/0047065 A1 | 2/2010 | Sakamoto et al. |
| 2010/0143139 A1 | 6/2010 | Pandey et al. |
| 2010/0158696 A1 | 6/2010 | Pandey et al. |
| 2010/0189023 A1 | 7/2010 | Lindgren et al. |

(56) References Cited

U.S. PATENT DOCUMENTS

| | | |
|---|---|---|
| 2010/0196154 A1 | 8/2010 | Sakamoto et al. |
| 2010/0221122 A1 | 9/2010 | Klasing et al. |
| 2010/0278644 A1 | 11/2010 | Gersbach et al. |
| 2011/0044818 A1 | 2/2011 | Kuhne et al. |
| 2011/0058958 A1* | 3/2011 | Ireland .................... F01D 5/187 416/97 R |
| 2011/0243717 A1* | 10/2011 | Gleiner ................... F01D 5/187 415/177 |
| 2011/0255990 A1 | 10/2011 | Diamond et al. |
| 2012/0163993 A1 | 6/2012 | Levine et al. |
| 2012/0201688 A1 | 8/2012 | Mahle et al. |
| 2012/0328451 A1 | 12/2012 | Lomas et al. |
| 2013/0017095 A1 | 1/2013 | Lee et al. |
| 2013/0108424 A1 | 5/2013 | Stein et al. |
| 2013/0224040 A1 | 8/2013 | Straccia |
| 2014/0119942 A1 | 5/2014 | Lehmann et al. |
| 2014/0271225 A1 | 9/2014 | Herzlinger et al. |
| 2015/0110639 A1 | 4/2015 | Herzlinger et al. |
| 2015/0110640 A1 | 4/2015 | Herzlinger et al. |
| 2015/0110641 A1 | 4/2015 | Herzlinger et al. |

OTHER PUBLICATIONS

U.S. Appl. No. 14/061,221, Office Action 1 dated Mar. 14, 2016, 15 pages.
U.S. Appl. No. 14/061,193, Office Action 1 dated Mar. 16, 2016, 17 pages.
U.S. Appl. No. 14/061,363, Office Action 1 dated Mar. 28, 2016, 23 pages.
U.S. Appl. No. 14/061,221, Final Office Action 1 dated Jul. 11, 2016, 18 pages.
U.S. Appl. No. 14/061,107, Notice of Allowance dated Jul. 15, 2016, 26 pages.
Booth et al., "Rotor-Tip Leakage: Part 1—Basic Methodology", Journal of Engineering for Power, Transactions of the ASME, vol. 104, Jan. 1982, pp. 154-161.
U.S. Appl. No. 14/061,107, Office Action dated Apr. 5, 2016, 15 pages.
U.S. Appl. No. 14/061,146, Notice of Allowance dated Apr. 11, 2016, 24 pages.
U.S. Appl. No. 14/061,169, Office Action 1 dated Jul. 13, 2016, 40 pages.
U.S. Appl. No. 14/061,193, Notice of Allowance dated Sep. 27, 2016, 35 pages.
U.S. Appl. No. 14/061,169, Final Office Action 1 dated Dec. 8, 2016, 40 pages.
U.S. Appl. No. 14/061,221, Office Action 2 dated Oct. 27, 2016, 14 pages.
U.S. Appl. No. 14/061,363, Notice of Allowance dated Oct. 27, 2016, 18 pages.
U.S. Appl. No. 14/061,363, Final Office Action 1 dated Aug. 12, 2016, 37 pages.
U.S. Appl. No. 14/060,996, Notice of Allowance dated May 25, 2016, 17 pages.
U.S. Appl. No. 14/061,221, Notice of Allowance dated Feb. 8, 2017, 13 pages.
U.S. Appl. No. 14/061,169, Office Action 2 dated Apr. 20, 2017, 20 pages.

* cited by examiner

TURBINE BUCKET INCLUDING COOLING PASSAGE WITH TURN

BACKGROUND OF THE INVENTION

The subject matter disclosed herein relates to turbine components for aircraft and power generation applications, and, more specifically, to turbine buckets including a base, an airfoil portion having a profile, a core including a cooling passage in the airfoil and/or the base, and a turn for the cooling passage.

Some aircraft and/or power plant systems, for example certain jet aircraft, nuclear, simple cycle and combined cycle power plant systems, employ turbines in their design and operation. Some of these turbines include one or more stages of buckets which during operation are exposed to fluid flows. Each bucket can include a base supporting a respective airfoil (e.g., turbine blade, blade, etc.) configured to aerodynamically interact with and extract work from fluid flow (e.g., creating thrust, driving machinery, converting thermal energy to mechanical energy, etc.) as part of, for example, power generation. As a result of this interaction and conversion, the aerodynamic characteristics and losses of these airfoils have an impact on system and turbine operation, performance, thrust, efficiency, and power at each stage. In addition, the airfoils and other components exposed to high temperatures in turbines typically include some form of cooling to reduce thermal losses, enhance operation, and/or prolong component life.

BRIEF DESCRIPTION OF THE INVENTION

A first embodiment of the invention disclosed herein can include a turbine bucket core cooling circuit with a rib extending from a base of the bucket substantially radially into a casing of an airfoil, the casing including opposed pressure and suction sidewalls of the airfoil. An outflow portion of a cooling passage can extend substantially along a first side of the rib in a substantially chordwise plane in the casing, and an inflow portion of the cooling passage can extend substantially along a second side of the rib opposed to the first rib and substantially in the chordwise plane. A turn can connect the outflow portion to the inflow portion proximate an end of the airfoil, the end including at least one of a tip or a root of the airfoil. The turn can include a non-uniform contour and an inner wall that includes at least a portion of the rib. The non-uniform contour can include a variable radius of curvature $R_i$ of the inner wall in a plane transverse to the chordwise plane, and the radius of curvature $R_i$ of the inner wall on at least one of a pressure side of the turn or a suction side of the turn can have a first radius value $R_{tlow}$ at a first end of the turn. The radius of curvature $R_i$ of the inner wall can gradually change to a second radius value $R_{tmid}$ through first and second portions of the turn extending contiguously radially from the first end, can remain substantially constant in a third portion extending radially from the second portion, and can have at least one other radius value in another portion of the turn.

In addition, a second embodiment of the invention disclosed herein can be implemented as a turbine bucket having a base, an airfoil, and a core. The airfoil can include a root connected to the base, a tip radially opposed to the root, and a casing that has opposed pressure and suction sidewalls extending chordwise between opposed leading and trailing edges and spanwise between the root and the tip. The core can include a rib extending substantially radially from the base into the casing toward the tip of the airfoil. In addition, the core can include a cooling passage having an outflow portion and an inflow portion on opposed sides of the rib. Each of the outflow and inflow portions can extend between the root and the tip of the airfoil. The cooling passage can also include an inlet on a base end of the outflow portion arranged for fluid communication with a coolant source and a turn proximate an end of the airfoil in fluid communication with and connecting the outflow portion and the inflow portion proximate the airfoil tip. The turn can be one of a tipturn of the airfoil or a root turn of the airfoil and the end can be a respective one of the tip of the airfoil or the root of the airfoil. An inner wall of the turn can include a non-uniform contour and can bend around at least a portion of the rib. The non-uniform contour can include a variable radius of curvature $R_i$ of the inner wall in a plane transverse to the chordwise plane, and the radius of curvature $R_i$ of the inner wall on at least one of a pressure side of the turn or a suction side of the turn can have a first radius value $R_{tlow}$ at a first end of the turn. The radius of curvature $R_i$ of the inner wall can gradually change to a second radius value $R_{tmid}$ through first and second portions of the turn extending contiguously radially from the first end, can remain substantially constant in a third portion extending radially from the second portion, and can have at least one other radius value in another portion of the turn.

Further, a third embodiment of the invention disclosed herein can take the form of a gas turbine system including a compressor, a combustion system in fluid communication with the compressor, and a turbine in fluid communication with the combustion system. The turbine can include a stage with a plurality of substantially identical buckets arranged substantially circumferentially about and axis of rotation of the turbine. Each bucket can include a base, an airfoil, and a core. The airfoil can include a root connected to the base, a tip radially opposed to the root, and a casing that has opposed pressure and suction sidewalls extending chordwise between opposed leading and trailing edges and spanwise between the root and the tip. The core can include a rib extending substantially radially from the base into the casing toward the tip of the airfoil. In addition, the core can include a cooling passage having an outflow portion and an inflow portion on opposed sides of the rib. Each of the outflow and inflow portions can extend between the root and the tip of the airfoil. The cooling passage can also include an inlet on a base end of the outflow portion arranged for fluid communication with a coolant source and a turn proximate one of the tip or the root of the airfoil in fluid communication with and connecting the outflow portion and the inflow portion. The turn can include a non-uniform contour having a blend of a bulb contour and a baseline contour. An inner wall of the turn can bend around at least a portion of the rib, the non-uniform contour including a variable radius of curvature $R_i$ of the inner wall in a plane transverse to the chordwise plane. The radius of curvature of $R_i$ of the inner wall on at least one of a pressure side of the turn or a suction side of the turn can have a first radius value $R_{tlow}$ at a first end of the turn, can gradually change to a second radius value $R_{tmid}$ through first and second portions of the turn extending contiguously radially from the first end, can remain substantially constant in a third portion extending radially from the second portion, and can have at least one other radius value in another portion of the turn.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
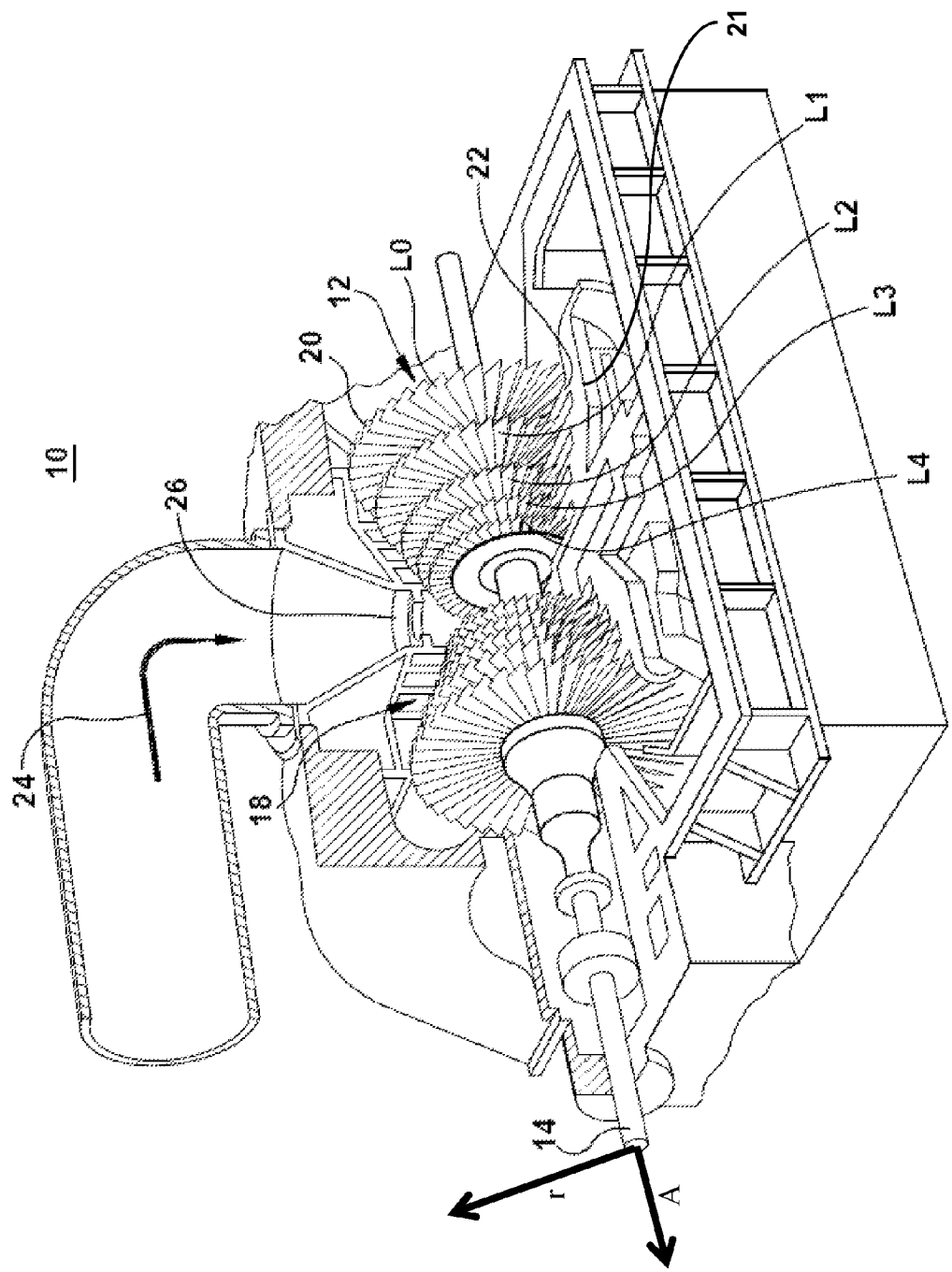
FIG. 1 shows a three-dimensional partial cut-away perspective view of a portion of a turbine according to an embodiment of the invention.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-10, like numbering may represent like elements. Redundant explanation of these elements has been omitted for clarity. Finally, it is understood that the components of FIGS. 1-10 and their accompanying descriptions may be applied to any embodiment described herein.

DETAILED DESCRIPTION OF THE INVENTION

Aspects of the invention provide for a turbine bucket including improved features, such as an airfoil including a particular profile and/or a cooling passage including a turn at at least one of a tip or a root of the airfoil (i.e., at least one of a tipturn or a root turn). To better meet system requirements and/or design goals, overall efficiency and airfoil loading capability can be improved by, for example, using an improved airfoil profile and/or cooling passage design according to embodiments of the invention disclosed herein. In addition, thermal and mechanical operating requirements for a given stage can be met, component lifetime can be improved, cost can be lowered, and/or any other suitable system requirement and/or design goal can be improved.

In addition, aspects of the invention include a turbine bucket including a base supporting an airfoil at a first end of the airfoil. The airfoil can have a profile that can enhance fluid flow over the airfoil and/or over the base. An airfoil core can include a cooling passage with outflow and inflow portions on opposed sides of substantially radial ribs and connected by a turn proximate a tip and/or root of the airfoil (i.e., a tipturn and/or a root turn). The profiles of the airfoil and/or core can be defined using multiple sets of two-dimensional coordinates, each set being provided for a respective section of the respective profile along the span of the airfoil and/or height of the bucket. A core profile can take into account coolant or cooling passages in the base and/or airfoil, which passages can include an improved turn that can reduce mechanical and/or thermal stresses in the airfoil and bucket as a whole.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along any radius r extending substantially perpendicular to a rotational or longitudinal axis A, also called an axis of rotation. Additionally, the terms "circumferential" and/or "circumferentially" refer to the relative position/direction of objects along a circumference which surrounds axis A but does not intersect axis A at any location. The Cartesian coordinate system used to define the shape of the serpentine core structure and/or a turn according to embodiments is defined further herein, and may operate independently from the axial, radial, etc., directional indicators.

Referring to the drawings, FIG. 1 shows a perspective partial cut-away illustration of a turbine 10, such as a gas or steam turbine. Turbine 10 can include a rotor 12 that with a rotating shaft 14 and a plurality of axially spaced rotor wheels 18. A plurality of dynamic blades or buckets 20 can be mechanically coupled to each rotor wheel 18, and can be arranged in a row that can extend circumferentially around a respective rotor wheel 18. So arranged, when a rotor wheel 18 rotates, its respective dynamic blades or buckets 20 can revolve about an axis of rotation of the respective rotor wheel. A nozzle 21 can support a plurality of stationary blades or nozzles 22 circumferentially around shaft 14 between adjacent rotor wheels 18 and/or rows of dynamic buckets 20. Blades or nozzles 22 can cooperate with dynamic blades or buckets 20 to form a stage of turbine 10 and to define a portion of a flow path through turbine 10. As shown, nozzle 21 can at least partially surround rotor 12 (shown in this cut-away view) and in embodiments can completely surround rotor 12.

While turbine 10 is shown in FIG. 1 as a dual-flow turbine 10 with an axially centered inlet mouth feeding two sets of turbine stages, various teachings disclosed herein can be applied to any suitable turbine, such as an axial turbine with a single primary direction of flow. For example, various teachings herein can be applied to an axial inlet gas turbine in which a combustion gas passes through an inlet at a first axial end, any stages of the turbine, and an outlet at a second axial end of the turbine, which enables the gas to performed mechanic work on the turbine.

In operation of the example turbine 10 shown in FIG. 1, gas 24 can enter an inlet 26 of turbine 10 and can flow and/or be directed through stationary blades or nozzles 22. Stationary blades or nozzles 22 can direct gas 24 against dynamic blades or buckets 20 so that gas 24 can pass around and/or over dynamic blades or buckets 20. As a result of aerodynamic interaction between dynamic blades or buckets 20 and gas 24, dynamic blades or buckets 20 can impart rotation to rotor wheel 18. In embodiments of the invention disclosed herein, turbine 10 can include multiple stages, which can each include a respective row of stationary blades or nozzles 22 in nozzle 21 and a respective row of dynamic blades or buckets 20 on a respective rotor wheel 18. It should be understood that, while there may be a plurality of rotor wheels 18, they can all be affixed to shaft 14 so as to rotate in unison, all dynamic blades or buckets 20 thus imparting rotation on shaft 14 in concert.

In the example shown in FIG. 1, turbine 10 can include five stages identified as a first stage L4, a second stage L3, a third stage L2, a fourth stage L1, and a fifth stage L0, which is also the last stage. Each stage has a respective radius, with first stage L4 having the smallest radius of the five stages and each subsequent stage having a larger radius, with fifth stage L0 having a largest radius of the five stages. While five stages are shown in FIG. 1, this simply a non-limiting example, and the teachings herein can be applied to turbines having more or fewer stages, including a turbine with a single stage. In addition, while the example shown in FIG. 1 is stationary, the teachings herein can be applied to any suitable turbine, including turbines used in aircraft engines, and may also be applied to compressors.

Figure 2:
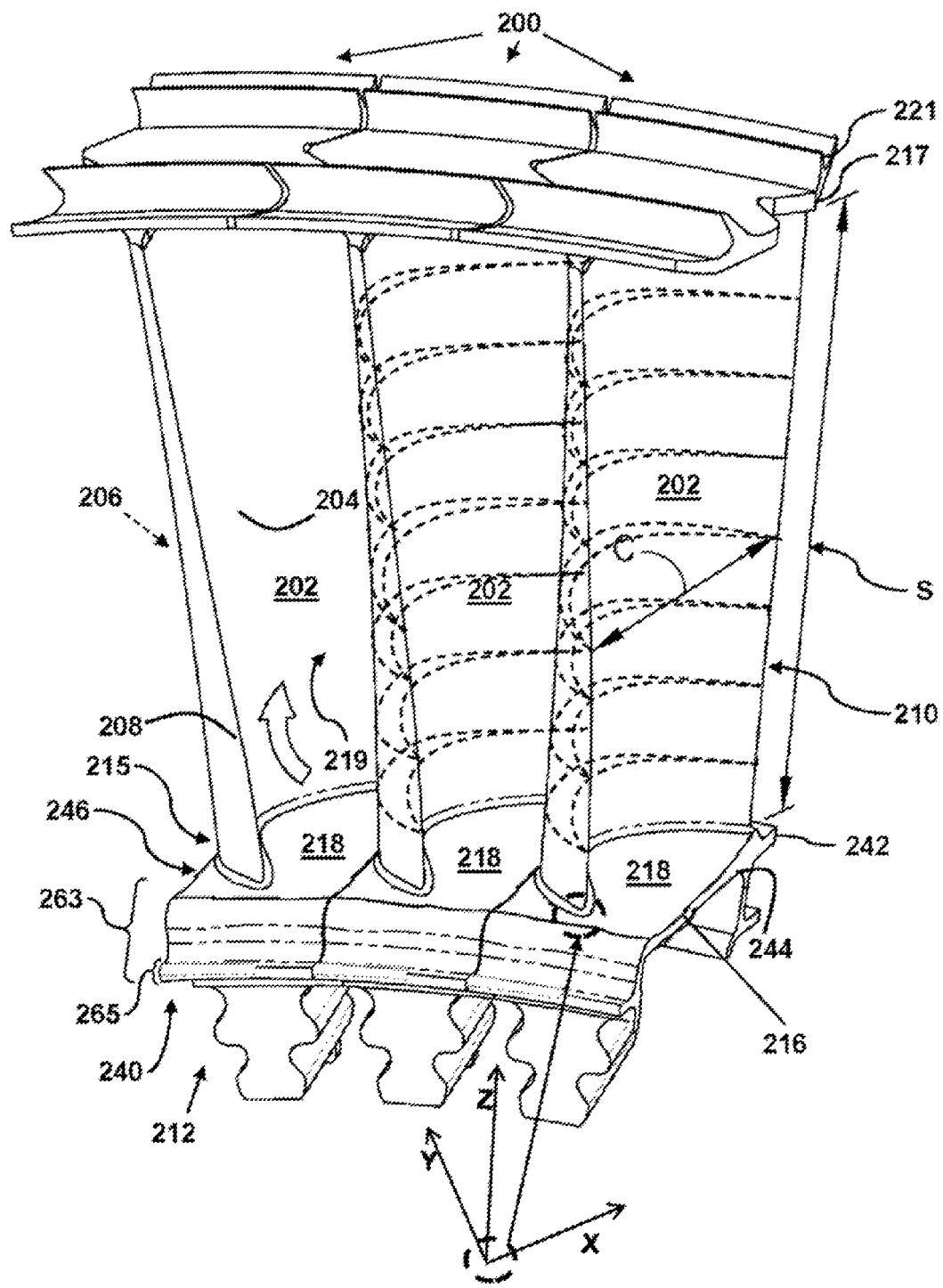
FIG. 2 shows a portion of a set of buckets according to embodiments of the invention disclosed herein.
Figure 3:
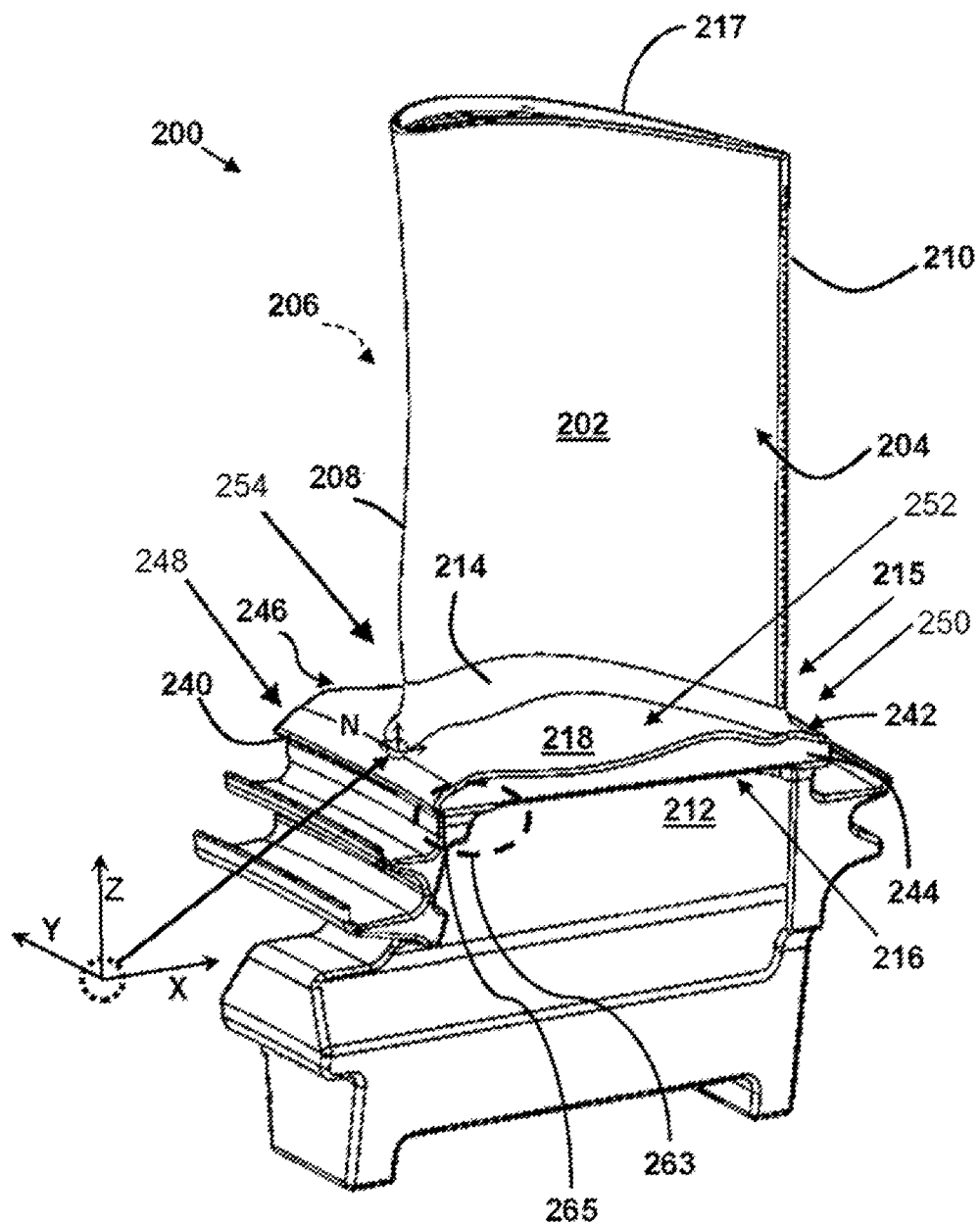
FIG. 3 shows a perspective view of a turbine bucket according to embodiments of the invention disclosed herein.

Each set of blades 20, 22 has a number of factors that can affect performance of turbine 10. For example, FIGS. 2 and 3 illustrate part of a set of circumferentially spaced-apart blades 200, which will be described as dynamic blades or buckets 20 of a rotor wheel 18, though aspects of the description can apply to sets of stationary blades or nozzles 22 depending on a particular implementation. Additional reference can be made to FIG. 4, which shows a single bucket 200 of embodiments in perspective. It is understood that bucket 200 can be configured to couple (mechanically couple via fasteners, welds, slot/grooves, contact, etc.) with a plurality of similar and/or distinct buckets (e.g., buckets 200 or other buckets) to form a set of buckets in a stage of the turbine. In addition, bucket 200 can be attached to a rotor wheel to form a set of buckets, which rotor wheel can be mounted on a shaft with fasteners, slots and grooves, welds, and/or other devices and/or techniques, and/or a hub of the rotor wheel can be integral with the shaft, and/or the hub can include a portion of the shaft that can be attached to other portions of the shaft via any suitable coupling.

Each bucket 200 can include an airfoil 202 with a pressure sidewall 204 and an opposed suction sidewall 206, as well as a leading edge 208 and a trailing edge 210. Each airfoil 202 can include a chord C between leading edge 208 and trailing edge 210 such that pressure and suction sidewalls 204, 206 can be said to extend in chord or chordwise between leading edge 208 and trailing edge 210. Airfoil 202 can be supported by a base 212, and a fillet 214 can connect a first end 215 of airfoil 202 to a first endwall 216, such as a radially inner endwall. Fillet 214 can include a weld or braze fillet, which can be formed via conventional MIG welding, TIG welding, brazing, etc., and can include a profile that can reduce fluid dynamic losses as a result of the presence of fillet 214. In embodiments, base 212, airfoil 202, and fillet 214 can be formed as a single component, such as by casting and/or machining and/or 3D printing and/or any other suitable technique now known or later developed and/or discovered.

As is known in the art, base 212 can be designed to fit into a mating slot in a hub of a rotor wheel and/or a turbine rotor shaft, such as shaft 14 of FIG. 1, and can engage and/or mate with adjacent base components of other buckets 200 if desired and/or suitable. In the case of a stationary blade or nozzle, base 212 can be designed to fit into a slot or other mounting feature in a nozzle of a turbine, such as nozzle 21 of FIG. 1. In embodiments, because base 212 of dynamic blade or bucket 200 can have a relatively large mass, base 212 can be designed to be located radially inboard of airfoil 202 to reduce forces and stresses arising from revolution of bucket 200 about an axis of rotation during rotation of a respective rotor wheel and/or turbine shaft. Should appropriate materials and/or techniques be developed, base 212 and/or endwall 216 could instead be designed to be radially outward of airfoil 202. In addition, in embodiments in the case of a stationary blade or nozzle, the corresponding base can be radially outward of the corresponding airfoil.

Airfoil 202 of dynamic blade or bucket 200 can extend radially from endwall 216 and can further have a span S between first end 215 and a second end 217 of airfoil 202. Pressure and suction sidewalls 204, 206 can be said to extend in span or spanwise between first and second ends 215, 217 of airfoil 202. That is, each bucket 200 can include an airfoil 202 having opposed pressure and suction sidewalls 204, 206 extending in chord or chordwise between opposed leading and trailing edges 208, 210 and extending in span or spanwise between opposed first and second ends 215, 217 of airfoil 202.

First endwall 216 can include a first contour 218 in embodiments to alter flow patterns in a passage 219 formed between each pair of airfoils 202 and endwall 216 if so desired and/or appropriate. In addition, endwall 216 can include a nominal surface N, which need not be an actual, physical surface, but that can be used as a frame of reference. While any surface can be employed, in embodiments, referential or nominal surface N can be substantially cylindrical and located at any suitable known location. For example, nominal surface N can be located at a known radius of curvature, such as a radial distance from an axis of rotation of turbine 10 and/or where a surface of an uncontoured endwall ordinarily would be.

With particular reference to FIG. 3, each passage 219 between each pair of airfoils 202 can be regarded as bounded by pressure sidewall 204 of a first airfoil 202, suction sidewall 206 of a second airfoil 202, and portions of first endwall 216 of each of the first and second buckets 200. In embodiments, second end 217 of each airfoil 202 can end in proximity to a second endwall 221, such as a radially outer endwall or a shroud, and portions of adjacent second endwalls 221 can act as an additional boundary of passage 219. Where airfoil 202 is part of a stationary blade or nozzle, second end 217 can be connected to second endwall 221. In any case, second endwall 221 can include a second contour if desired and/or appropriate, which can be the same as first contour 218 of first endwall 216, though in embodiments can differ from first contour 218, particularly since flow at second endwall 221 can differ significantly from flow at first endwall 216.

Figure 4:
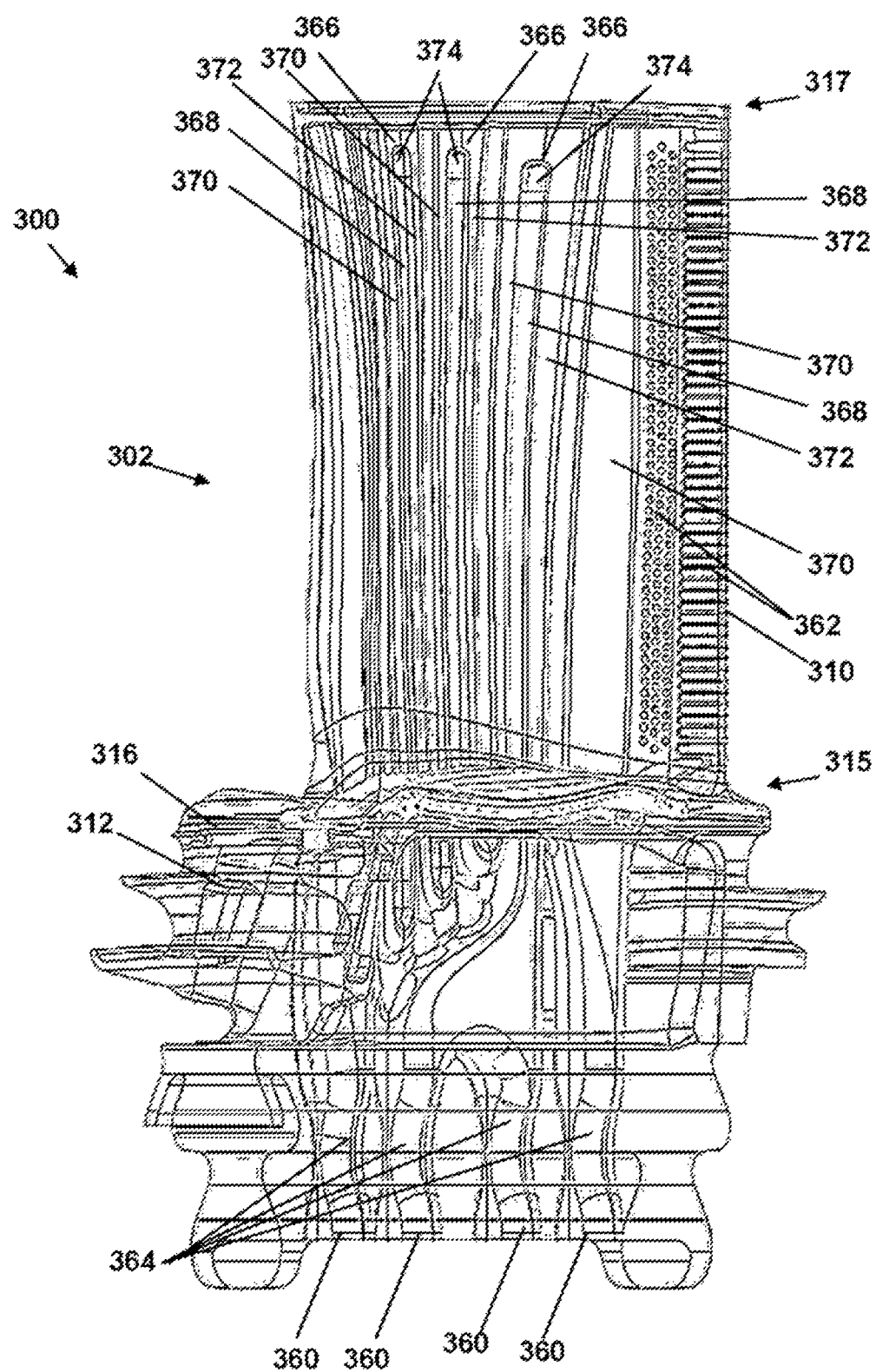
FIG. 4 shows a side phantom view of a turbine bucket including a cooling passage according to embodiments of the invention disclosed herein.

As can be seen in FIGS. 3 and 4, endwall 216 can extend along base 212 in a circumferential direction and/or a longitudinal direction, a radial distance to a surface of endwall 216 varying within contour 218. Base 212 can include opposed endwall leading and trailing edges 240, 242 that can be at and/or upstream of airfoil leading edge 208 and at and/or downstream of airfoil trailing edge 210, respectively. Endwall leading and trailing edges 240, 242 can be opposed, for example, in an axial or longitudinal direction. In addition, base 212 can include circumferentially opposed endwall pressure and suction splitlines 244, 246. It can also be useful to refer to endwall leading and trailing edge regions 248, 250 extending from endwall leading and trailing edges 240, 242, respectively, toward each other in a longitudinal direction and to about halfway there between. Further, airfoil 202 can be construed as dividing endwall 216 into pressure and suction side regions 252, 254 extending from pressure and suction sidewalls 204, 206 toward edges 240, 242, 244, 246 of endwall 216.

In embodiments, endwall contour 218 can include a bullnose profile 263 of endwall leading edge 240. For example, endwall contour 218 can descend from nominal surface N to a lip 265. Lip 265 in embodiments can have a curved profile, such as a semi-cylindrical profile, as viewed along the circumferential direction. Where endwall contour 218 varies along endwall leading edge 240, bullnose profile 263 can also vary, though lip 265 can be substantially consistent. Using such a bullnose profile 263 in embodiments can further enhance flow over endwall 216 and/or airfoil 202 and/or through flow passage 219.

In embodiments, a bucket can include a core in which reinforcing ribs can strengthen the respective airfoil, act as an inner wall of a cooling passage in the respective airfoil, and/or provide stress relief to a cooling passage and/or other parts of the respective airfoil and/or bucket. For example, with reference to FIG. 4, a bucket 300, similar to bucket 200 of FIGS. 2 and 3, can include a base 312 supporting an airfoil 302 extending from an endwall 316 that includes a top surface of base 312. Airfoil 302 can include opposed pressure and suction sidewalls (pressure sidewall in phantom to show interior of airfoil 302, suction sidewall visible as back wall of interior), as well as a root 315 and a tip 317. One or more coolant inlets 360 can be arranged at a bottom surface of base 312, and one or more coolant outlets 362 can be arranged in airfoil 302, such as at the trailing edge 310 and/or suction sidewall (not shown) and/or other locations as may be suitable and/or desired, and/or in base 312. At least one cooling passage 364 can extend from a coolant inlet 360, through base 312 to airfoil 302, as will be described below.

Figure 5:
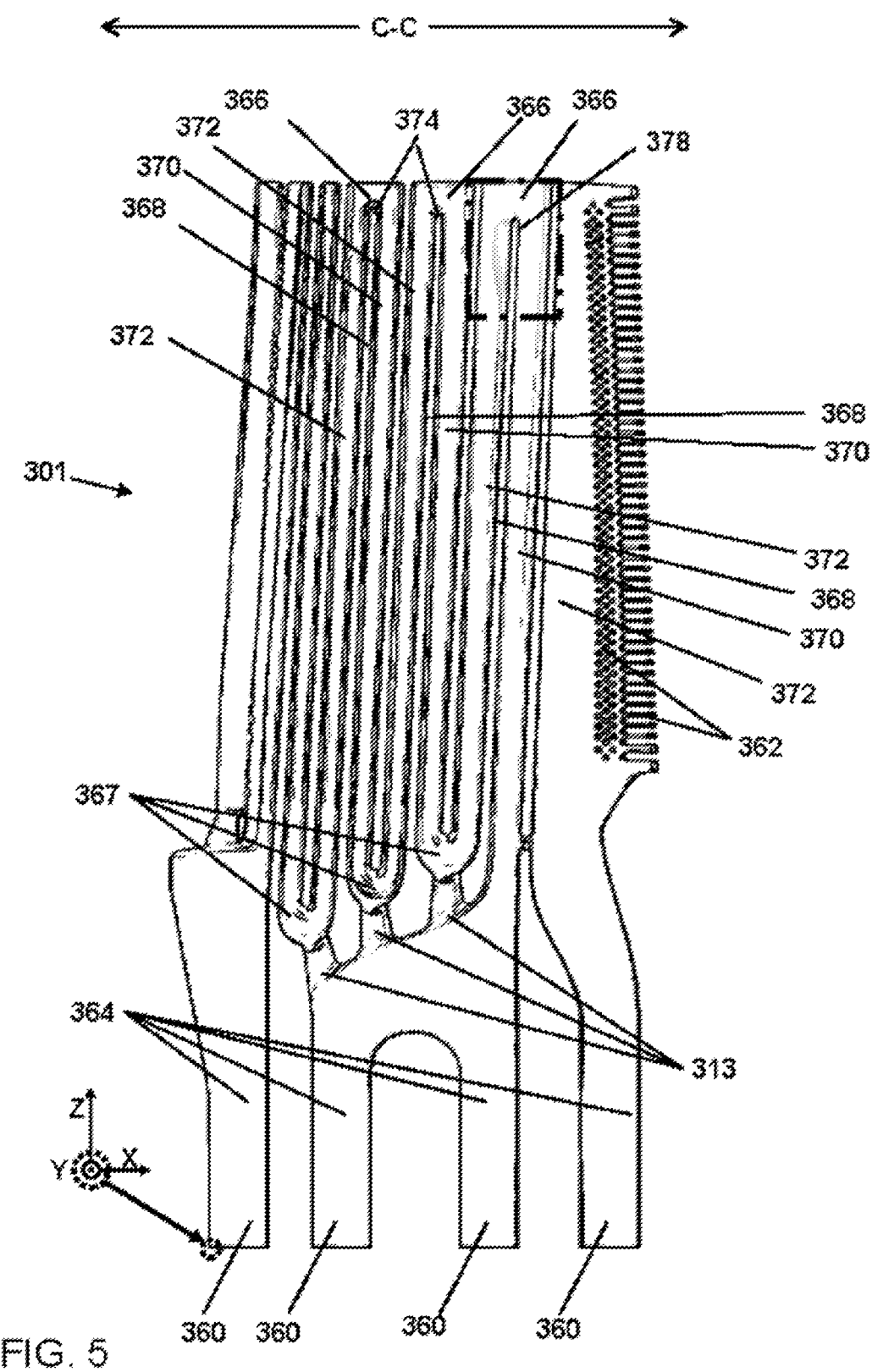
FIG. 5 shows a perspective view of an airfoil core of the turbine bucket of FIG. 7 according to various embodiments of the invention.
Figure 6:
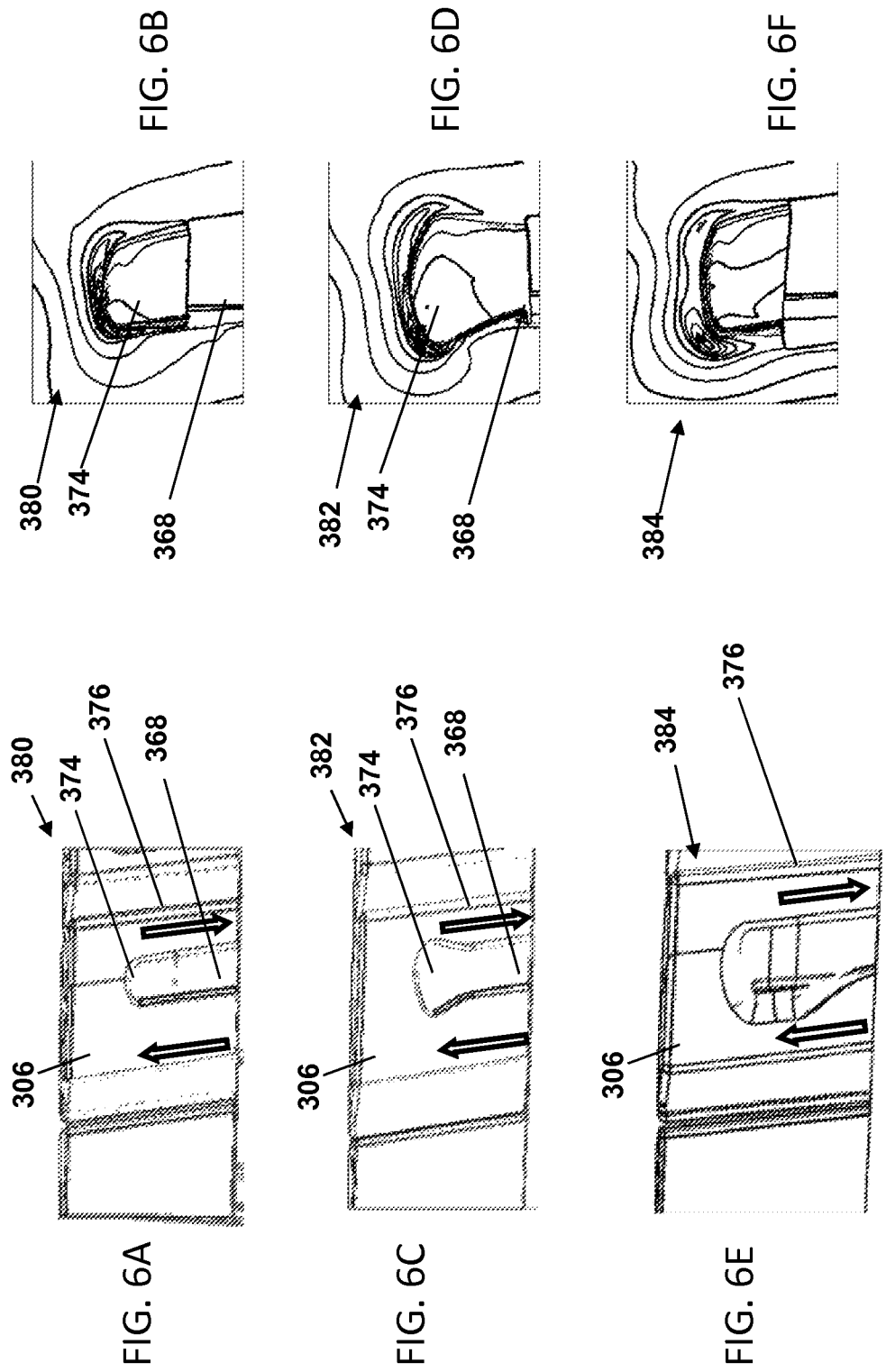
FIGS. 6A-6F show schematic isometric views of turns with which embodiments of the invention disclosed herein can be used.

In embodiments, at least one coolant inlet 360 can be in fluid communication with at least one cooling passage 364 extending to airfoil 302. Within airfoil 302, with additional reference to FIG. 5, at least one cooling passage 364 can include and/or be in fluid communication with an airfoil core structure 301. In FIG. 5, as well as in FIGS. 6A, 6C, 6E, and 7-8D, a body shown can be an outline of cavities formed within airfoil 302 such that what appear to be outer surfaces of core 301 or portions thereof can actually be walls of the cavities the body represents or boundaries between the cavities and the solid material of bucket 300 and/or airfoil 302. To aid conceptually, one can instead construe the representation of core 301 or a portion thereof as a form to be included in casting bucket 300 and/or airfoil 302 and later removed to leave the cavity(ies) that form core 301. It should be noted that casting is only one of many ways in which bucket 300, airfoil 302, and/or core 301 can be made and/or formed. An alternative conceptualization of core 301 can include its formation with thin sheets of metal defining its inner and outer boundaries.

In airfoil core structure 301, as seen in FIG. 5, at least one cooling passage 364 can take the form of a serpentine cooling passage in which a tipturn 366 can connect a radially outbound or outflow portion 370 to a radially inbound or inflow portions 372 extending along either side of a reinforcing rib 368. In addition, a root turn 367 can connect radially inner ends of outflow and inflow portions 370, 372, and a support member chute 313 can support each root turn 367. Support member chute 313 in embodiments is blocked such that coolant does not flow therethrough. A reinforcing rib 368 can extend between each pair outflow and inflow portions 370, 372 and can include a tip 374 in tipturn 366. In embodiments a surface of rib 368 can include and/or act as a wall of cooling passage 364, such as an outer wall 376 and/or an inner wall 378.

In a serpentine form of cooling passage 364, flow can progress out a first outflow portion 370, through a tipturn 366, in through inflow portion 372, through a root turn 367, out another outflow portion 370, through another tipturn 366, in through another inflow portion 372, and so forth, eventually exiting through one or more outlets 362. It should be noted that additional outlets can be formed at any desired and/or suitable locations along one or more portions of cooling passage 364, such as at one or more tipturns 366 and/or in an outflow portion 370 at a leading edge of the airfoil in which core 301 is included.

Outflow and inflow portions 370, 372 can be contiguous and substantially overlapping in a chordwise direction in embodiments. By at least partially overlapping in the chordwise direction, cooling passage 364 can have increased surface area exposure within airfoil core structure 301, which can enhance heat transfer. As described herein, outflow and inflow portions 370, 372 can be formed of one or more substantially unitary pieces of material, such as a metal, can be formed as a substantially unitary structure, and/or can be integrally formed, such as by integral casting, forging, 3D printing, machining, milling, and/or any other suitable technique now known or later developed. Examples of metals that can be used to form outflow and inflow portions 370, 372 include steel, aluminum, and/or alloys of those metals, which can include other elements as known in the art. In various embodiments, outflow and inflow portions 370, 372 can be formed from separate passage members bonded together to substantially eliminate seams or discontinuities between these separate members. In some particular cases, these separate members can be welded and/or brazed together. In other embodiments, as is known in the art, a form can be made from a sacrificial material that can be placed in a mold for bucket 300 and/or 302 during casting of bucket 300 and/or airfoil 302. Such a sacrificial material can be selected to withstand the conditions associated with casting, but can later be removed to leave the cavities that form core 301 in the otherwise substantially solid bucket 300 and/or airfoil 302.

It is understood that the term "circumferentially overlapping" can refer to two structures (or the same structure) that can be intersected by the same circumferentially extending line. That is, in the case of outflow and inflow portions 370, 372, tipturns 366, and root turns 367, at several locations, a line extending in a chordwise direction (line C-C of FIG. 5) can intersect three distinct cooling passage portions 370, 372 in cooling passage 364. While such a serpentine passage can provide enhanced cooling of airfoil 302, it can experience significant stresses resulting from mechanical and thermal loads during operation. By modifying a tipturn 366 according to embodiments as described below, such stresses can be reduced. The teachings of embodiments of the invention disclosed herein are described below mostly in the context of a tipturn to simplify description, but it should be recognized that embodiments can also be applied to a root turn, and so embodiments can be referred to as a turn that is one of a tipturn or a root turn, and embodiments can be applied to one or more tipturns and/or one or more root turns in a given cooling passage 364 if desired and/or appropriate.

FIG. 6A shows an isometric view of a suction side 306 of a portion of a cooling passage that can be included in a typical bucket, which cooling passage can include a baseline tipturn 380. Outer wall 376 can have a substantially rectangular cross section and inner wall 378, which can include tip 374 of rib 368, can have a substantially circular profile with a baseline radius of curvature $R_0$. FIG. 6B depicts mechanical and/or thermal stress levels in tipturn 380 using stress contours or stress contour lines along which mechanical and/or thermal stress is at substantially a same level; the closer together stress contour lines are shown, the larger a gradient of stress. Thus, as illustrated in FIG. 6B, a typical tipturn arrangement can result in substantial stress, particularly on the outflow side of tipturn 380. For example, at the outflow side of tip 374 of rib 368, stress contours are densely packed, indicating a steep stress gradient. An alternative configuration that has been used to alleviate stresses and/or enhance flow and/or cooling efficiency has been to use a so-called "bulb" profile, shown in bulb turn 382 of FIG. 6C. While a bulb profile alleviates stress on the outflow side of tip 374, the stresses can still be significant, as illustrated in FIG. 6D, which shows a stress contour map of the bulb profile and in which, while not as dense as in FIG. 6B, the stress contours still indicate a steep stress gradient along the outflow side of tip 374. Similar stress gradients are experienced on the pressure side, such as at an outflow side of tip 374 of each of baseline and bulb tipturns 380, 382. Further, similar stress gradients are experienced on one or both of a pressure side and/or a suction side of one or more root turns 367.

To further reduce mechanical and/or thermal stresses in tipturn 366, embodiments of the invention disclosed herein can use a blended, non-uniform contour or profile, as shown in FIG. 6E, which can be applied not only on suction side 306, but also on pressure side 304 of tipturn 384, on only one of or on both of pressure and suction sides 304, 306. More specifically, embodiments blend the bulb of FIG. 6C with the typical or baseline contour or profile of FIG. 6A to form a non-uniform contour that can impose various shapes and/or radii of curvature on inner wall 388 in a transverse plane, such as in a substantially circumferential plane, and/or in a chordwise plane, which can yield lower stress than either the bulb contour or the baseline contour. For example, as can be seen in a respective stress contour map in FIG. 6F, stress contour lines on the outflow side of the rib indicate a reduction in stress gradient as compared to the same effective location in the bulb profile or in the baseline profile. Similar alleviation of stresses can be achieved on the pressure side non-uniform or blended tipturn 384, and/or a pressure side or a suction side of a root turn 367. Thus, embodiments can be referred to as a turn that is one of a tipturn proximate a tip of the airfoil or a root turn proximate a root of the airfoil.

Figure 7:
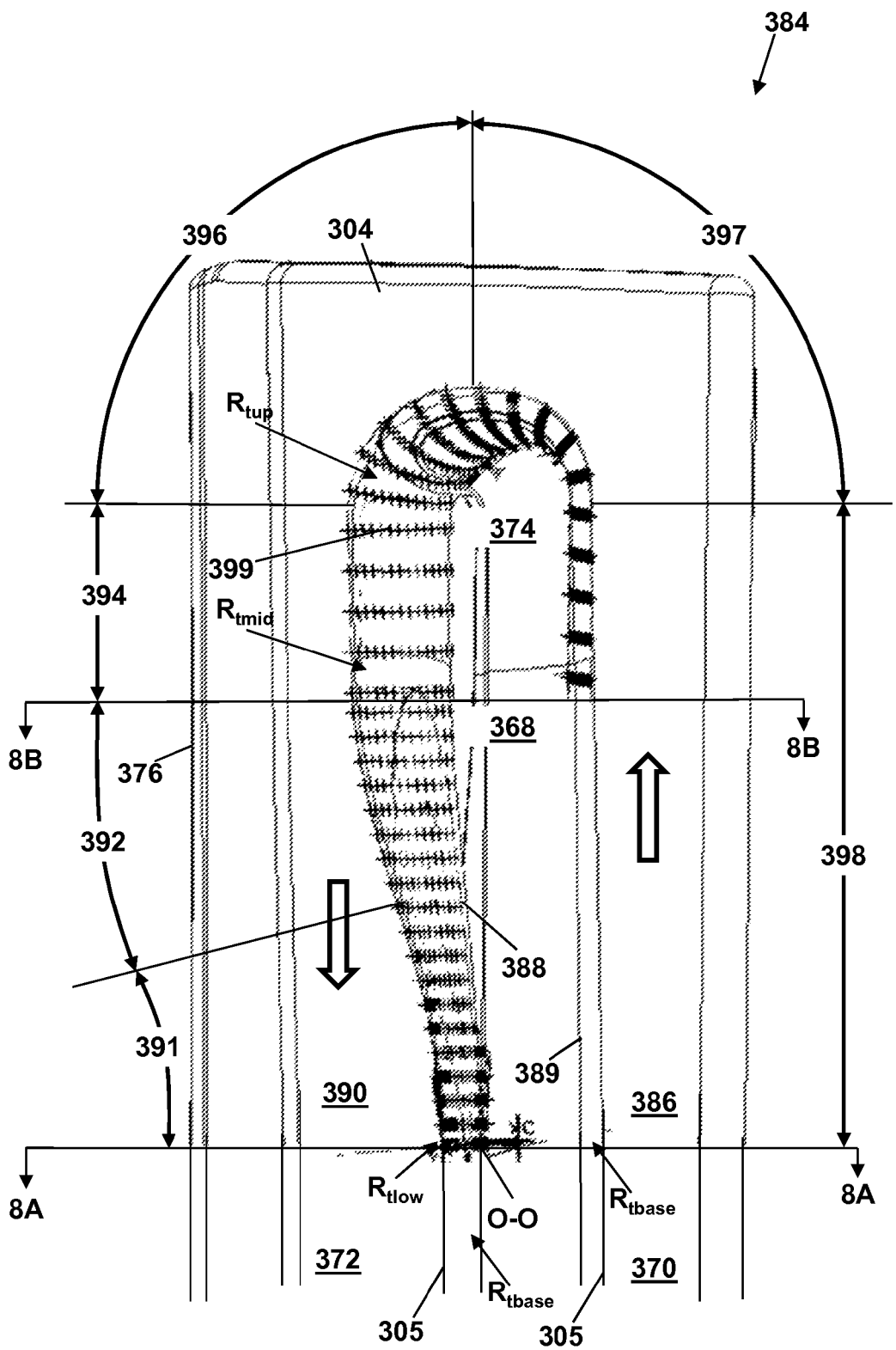
FIG. 7 shows an enlarged schematic isometric view of the turn of FIGS. 6E and 6F employing aspects of the invention disclosed herein.

With additional reference to FIG. 7, which shows an isometric view of pressure side 304 of tipturn 384, a first half of blended tipturn 384 can include an entry 386 connected to an outflow portion 370 substantially similar to that of baseline tipturn 380. Inner wall 388 can be substantially straight in a substantially radial direction from entry 386 until it begins to bend around an end, such as tip 374 or root (not numbered) of rib 368. Inner wall 388 can continue around tip 374 into the other half of tipturn 384, in which the non-uniform contour is particularly visible in the example shown in FIG. 7. As can be seen, inner wall 388 undergoes several changes between tip 374 and exit 390. In embodiments in which a non-uniform contour in accordance with embodiments of the invention is applied to suction side 306 as well as or instead of pressure side 304, a first half of blended tipturn 384 for suction side 306 can include exit 390 connected to inflow portion 372, and inner wall 388 can be substantially straight until it begins to bend around tip 374 of rib 368. Inner wall can continue around tip 374 into the other half of tipturn 384, in which the non-uniform contour is particularly evident, and continuing to entry 386 connected to outflow portion 370.

For purposes of description, and with regard to pressure side 304 of tipturn 384, exit 390 can be referred to as a first end substantially at line 8A-8A in inflow portion 372, and entry 386 can be referred to as a second end substantially at line 8A-8A in outflow portion 370. As can be seen, an inner border 305 of the wall of pressure side 304, here a junction with inner wall 388, can begin to curve toward outer wall 376, can inflect and curve away from outer wall 376, can then be substantially parallel to outer wall 376, and can then enter the bend around tip 374. Through the bend, a sidewall 389 (FIGS. 8A-8D, described in more detail below) can grow and extend between the wall of pressure side 304 and inner wall 388 so that inner border 305 can become a junction with sidewall 389 (FIGS. 8A-8D, described in more detail below), which can straighten after the bend around tip 374 is complete.

Similarly, where the non-uniform contour of embodiments is applied to suction side 304 of tipturn 384, entry 386 can be referred to as a first end substantially at line 8A-8A in outflow portion 370, and exit 390 can be referred to as a second end substantially at line 8A-8A in inflow portion 372. While not specifically shown, an inner border 305 of the wall of pressure side 304 can be a junction with inner wall 388 from entry 386, can begin to curve toward outer wall 376, can inflect and curve away from outer wall 376, can then be substantially parallel to outer wall 376, and can then enter the bend around tip 374, much as is shown with regard to pressure side 304 in FIG. 7. Through the bend, as with pressure side 304, a sidewall 389' (FIGS. 8A-8D, described in more detail below) can grow and extend between the wall of pressure side 304 and inner wall 388 so that inner border 305 can become a junction with sidewall 389' (FIGS. 8A-8D, described in more detail below), which can straighten after the bend around tip 374 is complete.

It should be noted that one or more root turn 367 can employ embodiments, and any root turn 367 can include a non-uniform contour according to embodiments on one or both of a respective pressure and/or suction side. Thus, these same descriptions and behaviors with regard to the non-uniform contour of a turn according to embodiments as disclosed herein apply where embodiments are implemented in a root turn 367.

The variation in border 305 is partly a result of a variation of a radius of curvature $R_i$ of inner wall 388 in a plane transverse to a radius of bucket 300. The various portions of border 305 described above can be used to define portions of tipturn 384 and to describe the variations in inner wall 388. For example, a first portion 391 can extend from exit at substantially line 8A-8A to an inflection point of border 305, and a second portion 392 can extend from the inflection point of border 305 to a point at which border 305 straightens. The straight portion of border 305 can define a third portion 394, and a first half of the bend around tip 374 can be a fourth portion 396. The second half of the bend can be a baseline portion 397, which can connect to an end portion 398 that can be substantially straight and extend to entry 370. It should be remembered that any of these sections, while described with regard to pressure side 304 in FIG. 7, can apply to suction side 306, and can further apply to a pressure side and/or suction side of any root turn 367 in which aspects of the invention may be applied.

In first portion 391, border 305 can bend from exit 390 to second portion 392 with a first portion radius of curvature in $R_1$ in a chordwise plane, and in second portion 392 border 305 can have a second portion radius of curvature $R_2$. In third portion 394, border 305 can be substantially straight and so will have a substantially infinite radius of curvature.

In fourth portion 396, border 305 can have a fourth portion radius of curvature $R_4$ at a junction of third and fourth portions 394, 396 and change gradually to a baseline radius of curvature $R_0$ at a junction between fourth portion 396 and baseline portion 397. Border 305 can have a substantially constant baseline radius of curvature $R_0$ through baseline portion 397, and then in end portion 398 will have a substantially infinite radius of curvature since it straightens. While first and second portion radii of curvature $R_1$, $R_2$ are described as being constant, it should be understood that one or both could be variable if desired and/or suitable within the scope of embodiments. Baseline portion 397 can be formed substantially in accordance with a baseline contour as is known in the art, though embodiments can employ other contours and/or profiles as will be described below. In embodiments, first, second, and fourth portion radii of curvature $R_1$, $R_3$, $R_4$, can be selected to alleviate stresses in blended turn 384, or can result from selection of inner wall 388 variations selected to alleviate stresses, by blending baseline and bulb profiles as described above. The particular values of the radii can vary depending on expected operating conditions, height of the tipturn and/or airfoil, thickness of the core and/or tipturn and/or airfoil, and other factors. A particular set of radii for an embodiment of the invention disclosed herein, as another example, can found from the listing of coordinates in TABLE I that will be described below.

It should be noted that FIGS. 6A-6F show a suction side 306 of tipturn 384, while FIG. 7 shows pressure side 304 of tipturn 384, and that pressure side 304 can substantially mirror the portion shown as will be explained below, particularly as seen in FIGS. 8A-8D. Thus, pressure side first, second, third, and fourth portions 391, 392, 394, 396 as seen in FIG. 7 can roughly overlie respective suction side end and baseline portions, and pressure side baseline and end portions 397, 398 can roughly overlie suction side fourth, third, second, and first sections. This can be seen in FIGS. 8A-8D, described in more detail below, and, as indicated above, inner wall 388 in embodiments can have a curved profile and/or variable radius of curvature in a plane transverse to a radius of bucket 300 and/or to a direction of flow through tipturn 384, such as in a substantially circumferential plane, and/or as viewed along a direction of flow through blended turn 384, and that can vary through tipturn 384.

Figures 8B, 8D:
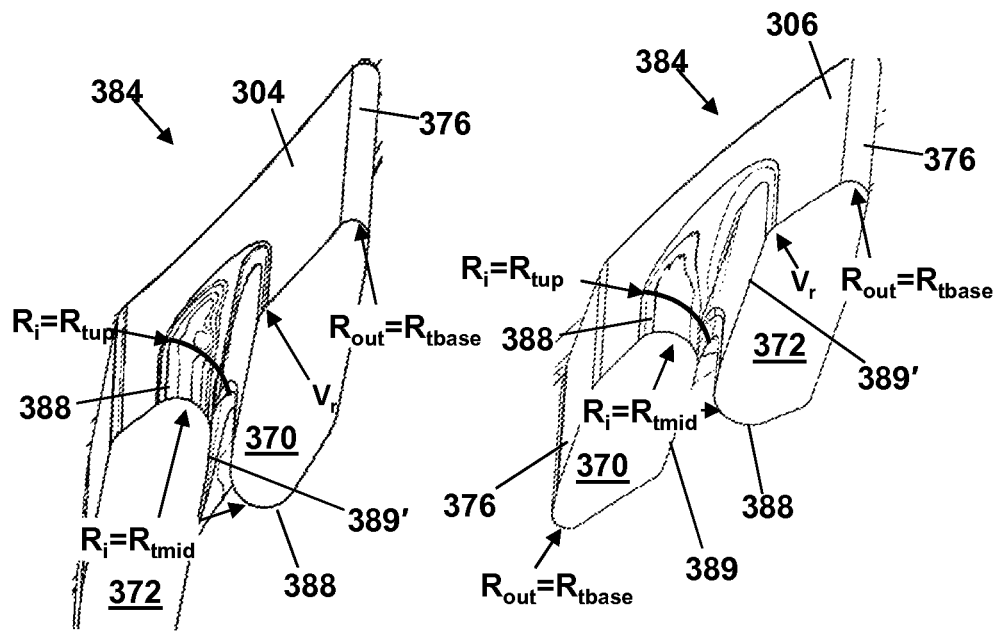
FIGS. 8A-8D show schematic isometric views of a turn according to embodiments of the invention disclosed herein and including cross sections along lines from FIG. 7.
Figures 8A, 8C:
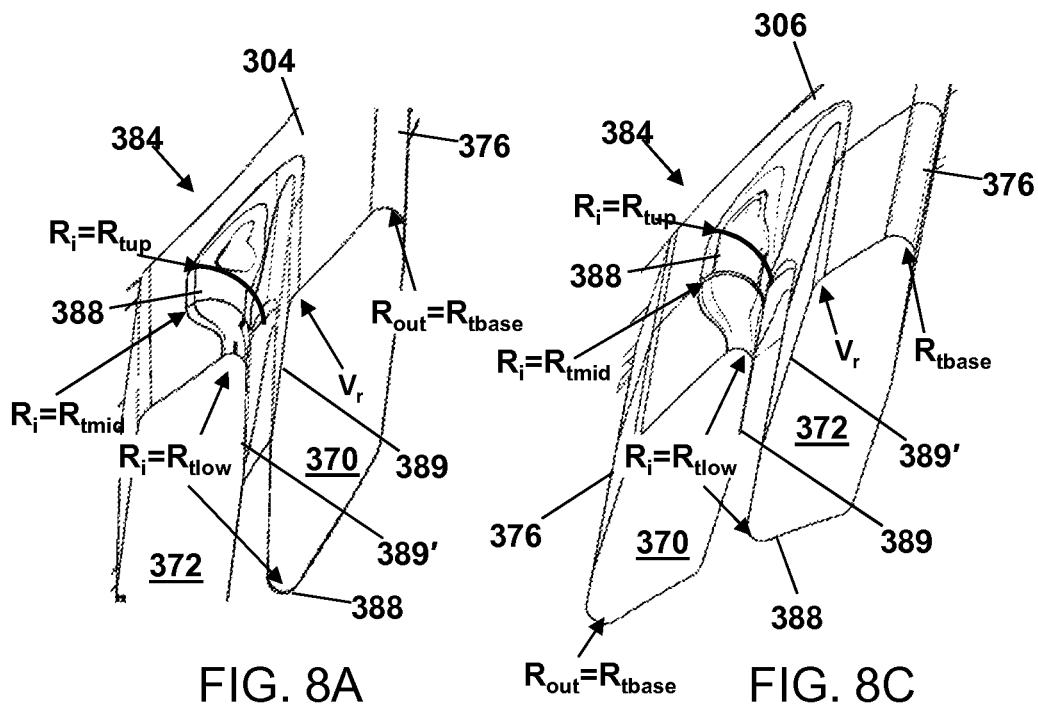

To add to the illustration provided by FIG. 7, FIGS. 8A and 8B show schematic isometric views of pressure side 304 of an example of a tipturn 384 including cross sections taken from lines 8A-8A and 8B-8B in FIG. 7, while FIGS. 8C and 8D show schematic isometric views of a suction side 306 of the same example tipturn 384 including cross sections also taken from lines 8A-8A and 8B-8B in FIG. 7. Thus, FIGS. 8A and 8C show the cross section of the ends of tipturn 384, and FIGS. 8B and 8D show the cross section at the junction between second and third portions 392, 394.

As can be seen in FIGS. 8A-8D, a radius of curvature $R_{out}$ of outer wall 376 can have a baseline radius value $R_{tbase}$ that can be used for the bulk of straight portions of outflow and inflow portions 370, 372, and a radius of curvature $R_i$ of inner wall 388 can have a first radius value $R_{tlow}$ that can begin to change gradually where inflow and outflow portions 373, 370 meet exit 390 and entry 386, such as, for example, at line 8A-8A of FIG. 7. It should be noted that baseline radius value $R_{tbase}$ can also be used for inner wall 388 along radially (along a radius of bucket 300) straight portions of outflow and inflow portions 370, 372, and that in such cases, first radius value $R_{tlow}$ can be equal to baseline radius value $R_{tbase}$.

With reference to FIG. 7, noting that additional insight can be had with reference to FIGS. 8A-8D, inner wall 388 can change gradually through first portion 391 and second portion 392 to blend into third portion 394, radius of curvature $R_i$ of inner wall 388 changing gradually from first radius value $R_{tlow}$ at first end or exit 390 to a second radius value $R_{tmid}$ at the junction of second and third portions 392, 394 (FIG. 7). The changes in border 305 described above can result from a conservation of material, in that as inner wall 388 undergoes changes in its radius of curvature $R_i$, the finite amount of material available to maintain a desired frontal area must be redistributed. Where second radius value $R_{tmid}$ is larger than first radius value $R_{tlow}$, an innermost portion of inner wall 388 can be closer to outer wall 376 than at first end or exit 390, and tip 374 of rib 368 can be wider.

In embodiments, radius of curvature $R_i$ of inner wall 388 can have second radius value $R_{tmid}$ substantially throughout third portion 396 until tipturn 384 begins to bend around tip 374 of rib 368 (FIG. 7, shown indirectly in FIGS. 8A-8D as the cavity along which inner wall 388 runs and around which inner wall 388 bends) and/or at the junction of third and fourth portions 394, 396 (FIG. 7). In fourth portion 396, radius of curvature $R_i$ of inner wall 388 can have a third radius value $R_{tup}$ at or near the junction of third and fourth portions 394, 396 (FIG. 7). In embodiments, third radius value $R_{tup}$ can be a maximum value, and/or radius of curvature $R$ of inner wall 388 can change gradually to merge with baseline portion 397. In other embodiments, third radius value $R_{tup}$ can be maintained through substantially all of fourth portion 396.

It should be noted that a relatively sudden change in radius of curvature $R_i$ of inner wall 388 can be made in embodiments, such as in the form of a kink, and to accommodate this change without undesired losses, radius of curvature $R_i$ of inner wall 388 can have a variable value between an end of third portion 394 and a point at which third radius value $R_{tup}$ can be established. Whether established at the end of third portion 394 or beyond in fourth portion 396, third radius value $R_{tup}$ can be maintained substantially throughout fourth portion 396, from a point at which third radius value $R_{tup}$ is established to at least the end of fourth portion 396. In embodiments, third radius value $R_{tup}$ can be maintained through baseline portion 397, but an orientation of inner wall 388 can gradually change through the bend from the orientation seen in inflow portion 372 of FIG. 8B to that seen in outflow portion 370 of FIG. 8B, or vice versa Inner wall 388 in pressure side baseline portion is also in suction side fourth portion, as can be seen. Thus, pressure side fourth portion 396 joins suction side fourth portion in embodiments in which similar contours and/or variations and/or profiles are imposed on both pressure and suction sides 304, 306. To further illustrate the substantial mirroring of pressure and suction sides of tipturn 384 in embodiments, FIGS. 8C and 8D show that inner wall 388 can have substantially the same transverse radii and transitions on the suction side of tipturn 384.

More specifically, in embodiments, the pressure side of tipturn 384 can have first, second, third, and fourth contiguous portions 391, 392, 394, 396 extending from a first end of tipturn 384, such as exit 390, toward tip 374 of rib 368 and can be in substantially one half of tipturn 384. A baseline portion 397 and an end portion 398 can also extend contiguously from an end of fourth portion 396 to a second end of tipturn 384, such as entry 386, and can be substantially in another half of tipturn 384. Where embodiments a implemented on suction side 306 of tipturn 384, suction side 306 can have corresponding first, second, third, and fourth portions, as well as baseline and end portions where so desired and/or appropriate, but at opposite locations, such that entry 386 can be the first end of suction side 306, and exit 390 can be the second end of suction side 306. Further, where embodiments are implemented in both pressure side 304 and suction side 306, pressure side first, second, third, and fourth portions 391, 392, 394, 396 can be substantially aligned with and spaced apart from suction side end and baseline sections, and pressure side baseline and end portions 397, 398 can be substantially aligned with and spaced apart from suction side fourth, third, second, and first portions. The fourth regions of both sides can meet and blend in the bend around tip 374, such as by having fourth portion inner walls 388 maintaining and/or changing gradually to third radius value $R_{tup}$ at a junction therebetween. Further, mirroring can be employed such that both pressure and suction side inner walls 388 can have a substantially equal radius of curvature in a plane transverse to a direction of flow, and/or transverse to a radius of bucket 300, at any point through tipturn 384, though different radius values can be employed on pressure and suction sides 304, 306 if desired and/or appropriate. Again, any of the teachings of embodiments can also be applied to one or more root turns 367, and to one or both of a pressure side or a suction side thereof.

As can also be seen in FIGS. 6A-8D, and as mentioned above, the wall of pressure side 304 can directly intersect inner wall 388 through first, second, and third portions, but as the orientation of inner wall 388 changes, a sidewall 389 can grow therebetween. A rounded vertex $V_r$ can be included between the wall of pressure side 304 and sidewall 389, such as through the remainder of inflow portion 372. The wall of suction side 306 can undergo a similar transition, such that a sidewall 389' between the wall of suction side 306 can shrink while sidewall 389 grows, though not necessarily by a same amount. In embodiments, inner wall 388 at any point radially outward of line 8A-8A in FIG. 7 can have substantially identical radii of curvature on the pressure side of tipturn 384 and on the suction side of tipturn 384 in a plane substantially transverse to a radius of bucket 300. In embodiments, the radii of curvature of inner wall 388 can be proportional to baseline radius of curvature $R_{tbase}$. In the example shown, $R_{tlow}$ can be substantially equal to $R_{tbase}$, $R_{tmid}$ can be from about $1.3*R_{tbase}$ to about $1.7*R_{tbase}$, such as about $1.5*R_{tbase}$, and $R_{tup}$ can be from about $2.2*R_{tbase}$ to about $2.8*R_{tbase}$, such as about $2.5*R_{tbase}$, though it should be apparent that other proportions can be used as may be desired and/or suitable. A particular set of radii for an embodiment of the invention disclosed herein, as another example, can found from the listing of coordinates in TABLE I that will be described below.

Again, while symmetry has been shown in the examples of FIGS. 5-8D, it should be understood that embodiments can be implemented using the particular tipturn profile on only one of the pressure side or the suction side. Further, while embodiments have been described in terms of a tipturn, it should be clear that embodiments can be implemented in root turns on one or both of a pressure side and a suction side of such a root turn. For example, one or more of root turns 367 of FIG. 5 could employ a profile according to embodiments of the invention disclosed herein.

A particular implementation of tipturn 384 according to embodiments of the invention can include a nominal profile described and/or defined by the set of coordinate values shown in TABLE I below. Such a nominal profile describes a tipturn at room temperature and without coatings, and so tolerance values can be added to the coordinate values, such as to account for thermal changes and/or coating thicknesses, such as +0.005 non-dimensionally, and the tipturn can be scaled up or down geometrically using a scaling factor and/or by using a larger or smaller desired height or span. The values in TABLE I are based on a Cartesian coordinate system of X, Y, and Z values having an origin O-O shown in FIG. 7. Z values represent points at which sections of inner wall 388 are described and/or defined by respective X and Y values, as illustrated by examples of section lines or point clusters 399 in FIG. 7, which are not necessarily the particular sections used to generate the values in TABLE I.

The values in TABLE I have been expressed in non-dimensionalized form representing normalized distances in values that can range from −1 to 1, but it should be apparent that any or all of the coordinate values could instead be expressed in distance units so long as the proportions are maintained. TABLE I includes the heading, "Non-Dimensionalized (X Y Z/Span)," span here referring to a height of a turn, such as tipturn 384 and/or as applied to a root turn 367, and so in a desired height of tipturn 384 and/or root turn 367 can be used to convert a coordinate value of TABLE I to a respective coordinate value in units of distance, such as inches or meters. In other words, the non-dimensional values given in TABLE I can be multiplied by a desired height of tipturn 384 and/or root turn 367, such as, for example, a desired span of between about 0.2 inches and about 2 inches, such as between about 0.7 inches and about 1.5 inches, to obtain coordinate values in units of distance. By connecting the X and Y values with smooth continuing arcs, each profile cross section at each distance Z can be fixed, and the inner wall/tipturn/root turn profiles of the various surface locations between the distances Z can be determined by smoothly connecting adjacent profile sections to one another, thus forming the inner wall/tipturn/root turn profile.

In addition, core 301 can be described and/or defined using a set of coordinates that describe and/or define a nominal profile for a particular implementation of airfoil core 301, which can include cooling passage 364 and tipturn 384 and/or root turn 367 according to embodiments of the invention disclosed herein. Such a nominal profile describes a core at room temperature and without coatings, and so tolerance values can be added to the coordinate values, such as to account for thermal changes and/or coating thicknesses, such as +0.005 non-dimensionally, and the core can be scaled up or down geometrically using a scaling factor and/or by using a larger or smaller desired height or span. As above, a Cartesian coordinate system of X, Y, and Z values can be used to define a nominal profile of core 301, such as the values listed in TABLE II, below. With the origin at a bottom of a most forward or upstream or leading edge inlet 360 as indicated in FIG. 5, the X axis can extend along a chord of airfoil 202 and/or of core 301 and/or substantially parallel to line C-C, and such that the Y axis can lie orthogonal to the X axis oriented into FIG. 5 substantially in a circumferential direction, and the Z axis can then extend substantially radially away from the intersection of the X and Y axes. Any other suitable orientation of the axes relative to airfoil 202 can be used so long as such orientation is taken into account in the resulting coordinate values. In embodiments, the coordinate system that defines the profile can be based on its own geometry and thus can be used to produce an airfoil with the described profile regardless of its location.

In similar fashion to the values of TABLE I, the X, Y, and Z coordinate values in TABLE II have been expressed in non-dimensionalized form representing normalized distances in values that can range from −1 to 1, but it should be apparent that any or all of the coordinate values could instead be expressed in distance units so long as the proportions are maintained. TABLE I includes the heading, "Non-Dimensionalized (X Y Z/Span)," and in embodiments a desired span can be used to convert a coordinate value of TABLE I to a respective coordinate value in units of distance, such as inches or meters. In other words, the non-dimensional values given in TABLE I can be multiplied by a desired span of bucket 200, 300, airfoil 202, 302 or core 301 such as, for example, a desired span of between about 7 inches and about 15 inches, such as between about 10 inches and about 12 inches, to obtain coordinate values in units of distance, such as inches or meters. By connecting the X and Y values with smooth continuing arcs, each profile cross section at each distance Z can be fixed, and the core profiles of the various surface locations between the distances Z can be determined by smoothly connecting adjacent profile sections to one another, thus forming the core profile.

Figure 9:
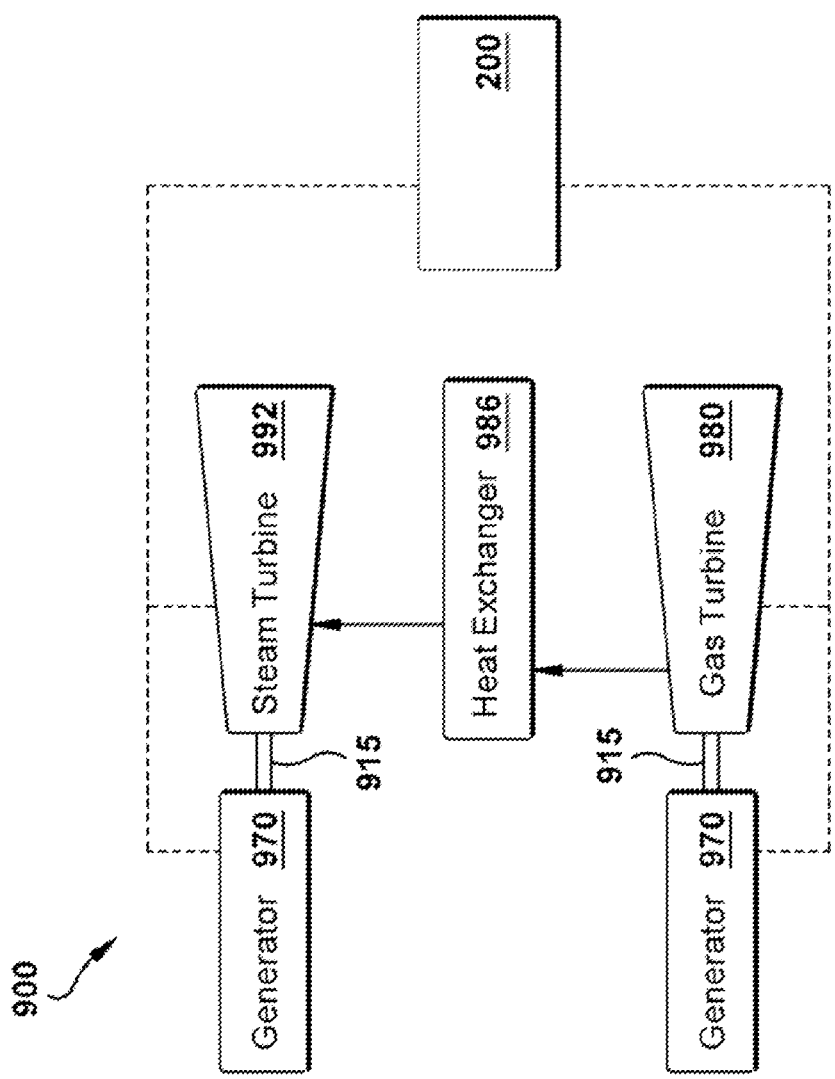
FIG. 9 shows a schematic block diagram illustrating portions of a combined cycle power plant system in which embodiments of the invention disclosed herein can be used.
Figure 10:
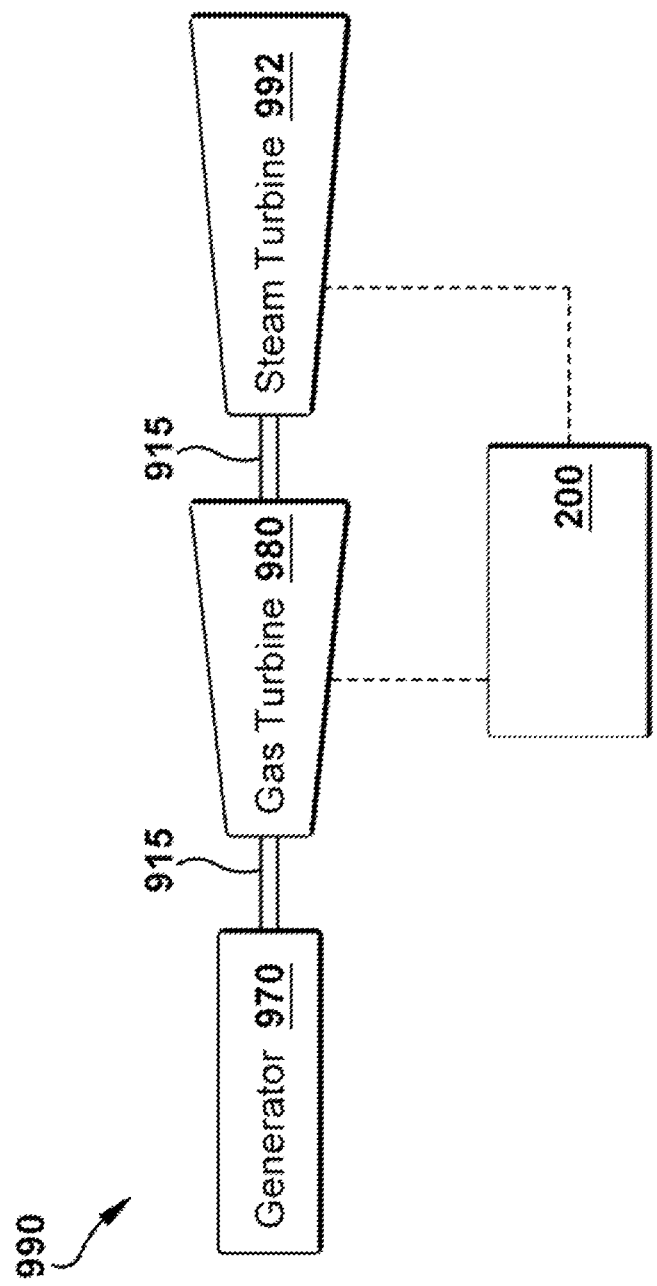
FIG. 10 shows a schematic block diagram illustrating portions of a single-shaft combined cycle power plant system in which embodiments of the invention disclosed herein can be used.

Turning to FIG. 9, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 9 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include one or more buckets 200 as shown and described with reference to FIGS. 2-4 and/or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 10, a single shaft combined cycle power plant 990 may include a single generator 970 coupled to both gas turbine 980 and steam turbine 992 via a single shaft 915. Steam turbine 992 and/or gas turbine 980 may include one or more buckets 200 shown and described with reference to FIGS. 2-4 and/or other embodiments described herein.

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from the increased reduced tip leakage and increased efficiency of the apparatus and devices described herein.

TABLE I

| | Non-Dimensionalized (X Y Z/Span) | | |
|---|---|---|---|
| N | X | Y | Z |
| 1 | 0.00000 | 0.00000 | 0.00000 |
| 2 | 0.00308 | −0.00250 | 0.00000 |
| 3 | 0.00642 | −0.00467 | 0.00000 |
| 4 | 0.01000 | −0.00633 | 0.00000 |
| 5 | 0.01375 | −0.00767 | 0.00000 |
| 6 | 0.01767 | −0.00850 | 0.00000 |
| 7 | 0.02158 | −0.00892 | 0.00000 |
| 8 | 0.02558 | −0.00883 | 0.00000 |
| 9 | 0.02950 | −0.00833 | 0.00000 |
| 10 | 0.03333 | −0.00733 | 0.00000 |
| 11 | 0.03700 | −0.00583 | 0.00000 |
| 12 | 0.04050 | −0.00392 | 0.00000 |
| 13 | 0.04367 | −0.00158 | 0.00000 |
| 14 | 0.04658 | 0.00117 | 0.00000 |
| 15 | 0.04917 | 0.00417 | 0.00000 |
| 16 | 0.05142 | 0.00742 | 0.00000 |
| 17 | 0.05325 | 0.01100 | 0.00000 |
| 18 | 0.05458 | 0.01467 | 0.00000 |
| 19 | 0.05558 | 0.01858 | 0.00000 |
| 20 | 0.05600 | 0.02250 | 0.00000 |
| 21 | 0.13517 | 0.46017 | 0.00000 |
| 22 | 0.13575 | 0.46525 | 0.00000 |
| 23 | 0.13692 | 0.47025 | 0.00000 |
| 24 | 0.13875 | 0.47500 | 0.00000 |
| 25 | 0.14117 | 0.47950 | 0.00000 |
| 26 | 0.14417 | 0.48358 | 0.00000 |
| 27 | 0.14767 | 0.48725 | 0.00000 |
| 28 | 0.15167 | 0.49042 | 0.00000 |
| 29 | 0.15608 | 0.49300 | 0.00000 |
| 30 | 0.16083 | 0.49492 | 0.00000 |
| 31 | 0.16583 | 0.49608 | 0.00000 |
| 32 | 0.17092 | 0.49642 | 0.00000 |
| 33 | 0.17600 | 0.49608 | 0.00000 |
| 34 | 0.18100 | 0.49508 | 0.00000 |
| 35 | 0.18575 | 0.49333 | 0.00000 |
| 36 | 0.19025 | 0.49092 | 0.00000 |
| 37 | 0.19442 | 0.48792 | 0.00000 |
| 38 | 0.19808 | 0.48442 | 0.00000 |
| 39 | 0.20133 | 0.48042 | 0.00000 |
| 40 | 0.20408 | 0.47617 | 0.00000 |
| 41 | 0.13575 | 0.45050 | 0.02200 |
| 42 | 0.20733 | 0.46667 | 0.02275 |
| 43 | 0.13617 | 0.45442 | 0.02283 |
| 44 | 0.20525 | 0.46992 | 0.02358 |
| 45 | 0.13717 | 0.45850 | 0.02367 |
| 46 | 0.20258 | 0.47325 | 0.02442 |
| 47 | 0.13867 | 0.46275 | 0.02458 |
| 48 | 0.03842 | −0.00758 | 0.02475 |
| 49 | 0.04233 | −0.00533 | 0.02475 |
| 50 | 0.04583 | −0.00267 | 0.02475 |
| 51 | 0.03425 | −0.00925 | 0.02483 |
| 52 | 0.04883 | 0.00033 | 0.02483 |
| 53 | 0.05142 | 0.00358 | 0.02492 |
| 54 | 0.03000 | −0.01033 | 0.02500 |
| 55 | 0.05350 | 0.00700 | 0.02508 |
| 56 | 0.02558 | −0.01083 | 0.02517 |
| 57 | 0.05508 | 0.01050 | 0.02525 |
| 58 | 0.19933 | 0.47642 | 0.02525 |
| 59 | 0.02133 | −0.01075 | 0.02533 |
| 60 | 0.14092 | 0.46708 | 0.02542 |
| 61 | 0.05625 | 0.01400 | 0.02550 |
| 62 | 0.01717 | −0.01017 | 0.02558 |
| 63 | 0.05692 | 0.01742 | 0.02567 |
| 64 | 0.01333 | −0.00908 | 0.02583 |
| 65 | 0.05725 | 0.02067 | 0.02592 |
| 66 | 0.19550 | 0.47942 | 0.02608 |
| 67 | 0.00975 | −0.00767 | 0.02617 |
| 68 | 0.14383 | 0.47133 | 0.02625 |
| 69 | 0.00658 | −0.00592 | 0.02642 |
| 70 | 0.00367 | −0.00400 | 0.02675 |
| 71 | 0.19100 | 0.48200 | 0.02683 |
| 72 | 0.00125 | −0.00183 | 0.02700 |
| 73 | 0.14758 | 0.47533 | 0.02700 |
| 74 | 0.18592 | 0.48400 | 0.02742 |
| 75 | 0.15200 | 0.47892 | 0.02767 |
| 76 | 0.18042 | 0.48533 | 0.02800 |

TABLE I-continued

Non-Dimensionalized (X Y Z/Span)

| N | X | Y | Z |
|---|---|---|---|
| 77 | 0.15708 | 0.48183 | 0.02808 |
| 78 | 0.17450 | 0.48583 | 0.02833 |
| 79 | 0.16267 | 0.48408 | 0.02842 |
| 80 | 0.16850 | 0.48542 | 0.02842 |
| 81 | 0.13650 | 0.43533 | 0.05342 |
| 82 | 0.13700 | 0.43950 | 0.05433 |
| 83 | 0.21250 | 0.45233 | 0.05433 |
| 84 | 0.21025 | 0.45583 | 0.05517 |
| 85 | 0.03975 | −0.00933 | 0.05525 |
| 86 | 0.04367 | −0.00717 | 0.05525 |
| 87 | 0.04717 | −0.00450 | 0.05525 |
| 88 | 0.13800 | 0.44383 | 0.05525 |
| 89 | 0.03550 | −0.01100 | 0.05533 |
| 90 | 0.05025 | −0.00142 | 0.05533 |
| 91 | 0.05292 | 0.00192 | 0.05542 |
| 92 | 0.03117 | −0.01217 | 0.05550 |
| 93 | 0.05500 | 0.00533 | 0.05558 |
| 94 | 0.02675 | −0.01267 | 0.05567 |
| 95 | 0.05658 | 0.00892 | 0.05575 |
| 96 | 0.02242 | −0.01258 | 0.05583 |
| 97 | 0.05775 | 0.01242 | 0.05592 |
| 98 | 0.01825 | −0.01192 | 0.05608 |
| 99 | 0.20750 | 0.45933 | 0.05608 |
| 100 | 0.05850 | 0.01583 | 0.05617 |
| 101 | 0.13967 | 0.44842 | 0.05625 |
| 102 | 0.01433 | −0.01092 | 0.05633 |
| 103 | 0.05883 | 0.01917 | 0.05642 |
| 104 | 0.01075 | −0.00942 | 0.05667 |
| 105 | 0.00750 | −0.00767 | 0.05692 |
| 106 | 0.20408 | 0.46275 | 0.05692 |
| 107 | 0.14200 | 0.45300 | 0.05717 |
| 108 | 0.00458 | −0.00567 | 0.05725 |
| 109 | 0.00208 | −0.00350 | 0.05750 |
| 110 | 0.19992 | 0.46592 | 0.05783 |
| 111 | 0.14517 | 0.45750 | 0.05808 |
| 112 | 0.19517 | 0.46867 | 0.05858 |
| 113 | 0.14908 | 0.46167 | 0.05883 |
| 114 | 0.18983 | 0.47083 | 0.05934 |
| 115 | 0.15375 | 0.46550 | 0.05950 |
| 116 | 0.18392 | 0.47225 | 0.05983 |
| 117 | 0.15917 | 0.46858 | 0.06000 |
| 118 | 0.17775 | 0.47275 | 0.06017 |
| 119 | 0.16508 | 0.47092 | 0.06033 |
| 120 | 0.17133 | 0.47233 | 0.06033 |
| 121 | 0.13725 | 0.41900 | 0.08467 |
| 122 | 0.21817 | 0.43692 | 0.08558 |
| 123 | 0.13775 | 0.42342 | 0.08567 |
| 124 | 0.04067 | −0.01008 | 0.08583 |
| 125 | 0.04467 | −0.00783 | 0.08583 |
| 126 | 0.04842 | −0.00500 | 0.08583 |
| 127 | 0.05158 | −0.00192 | 0.08592 |
| 128 | 0.03625 | −0.01183 | 0.08600 |
| 129 | 0.03175 | −0.01292 | 0.08608 |
| 130 | 0.05433 | 0.00158 | 0.08608 |
| 131 | 0.02717 | −0.01342 | 0.08625 |
| 132 | 0.05650 | 0.00517 | 0.08625 |
| 133 | 0.05817 | 0.00883 | 0.08642 |
| 134 | 0.02267 | −0.01333 | 0.08650 |
| 135 | 0.21583 | 0.44067 | 0.08650 |
| 136 | 0.05933 | 0.01242 | 0.08658 |
| 137 | 0.13883 | 0.42808 | 0.08667 |
| 138 | 0.01842 | −0.01275 | 0.08675 |
| 139 | 0.06008 | 0.01600 | 0.08683 |
| 140 | 0.01433 | −0.01158 | 0.08700 |
| 141 | 0.06042 | 0.01942 | 0.08708 |
| 142 | 0.01067 | −0.01008 | 0.08733 |
| 143 | 0.21283 | 0.44442 | 0.08750 |
| 144 | 0.00725 | −0.00825 | 0.08758 |
| 145 | 0.14058 | 0.43292 | 0.08767 |
| 146 | 0.00433 | −0.00617 | 0.08792 |
| 147 | 0.00175 | −0.00392 | 0.08817 |
| 148 | 0.20925 | 0.44808 | 0.08842 |
| 149 | 0.14308 | 0.43775 | 0.08867 |
| 150 | 0.20483 | 0.45142 | 0.08933 |
| 151 | 0.14642 | 0.44258 | 0.08958 |
| 152 | 0.19983 | 0.45433 | 0.09025 |
| 153 | 0.15067 | 0.44708 | 0.09050 |
| 154 | 0.19408 | 0.45667 | 0.09092 |
| 155 | 0.15567 | 0.45108 | 0.09117 |
| 156 | 0.18783 | 0.45825 | 0.09150 |
| 157 | 0.16142 | 0.45442 | 0.09175 |
| 158 | 0.18117 | 0.45883 | 0.09192 |
| 159 | 0.16775 | 0.45692 | 0.09200 |
| 160 | 0.17442 | 0.45842 | 0.09208 |
| 161 | 0.13792 | 0.40167 | 0.11575 |
| 162 | 0.04550 | −0.00742 | 0.11658 |
| 163 | 0.04942 | −0.00450 | 0.11658 |
| 164 | 0.04125 | −0.00983 | 0.11667 |
| 165 | 0.05283 | −0.00117 | 0.11667 |
| 166 | 0.22425 | 0.42058 | 0.11667 |
| 167 | 0.03667 | −0.01167 | 0.11675 |
| 168 | 0.13850 | 0.40642 | 0.11675 |
| 169 | 0.03183 | −0.01283 | 0.11683 |
| 170 | 0.05567 | 0.00250 | 0.11683 |
| 171 | 0.05800 | 0.00625 | 0.11700 |
| 172 | 0.02708 | −0.01333 | 0.11708 |
| 173 | 0.05975 | 0.01008 | 0.11717 |
| 174 | 0.02233 | −0.01325 | 0.11733 |
| 175 | 0.06100 | 0.01400 | 0.11742 |
| 176 | 0.01775 | −0.01258 | 0.11758 |
| 177 | 0.06175 | 0.01767 | 0.11767 |
| 178 | 0.22175 | 0.42467 | 0.11767 |
| 179 | 0.01350 | −0.01142 | 0.11783 |
| 180 | 0.06217 | 0.02133 | 0.11783 |
| 181 | 0.13967 | 0.41133 | 0.11783 |
| 182 | 0.00958 | −0.00975 | 0.11817 |
| 183 | 0.00600 | −0.00783 | 0.11850 |
| 184 | 0.00292 | −0.00567 | 0.11875 |
| 185 | 0.21867 | 0.42867 | 0.11875 |
| 186 | 0.14150 | 0.41650 | 0.11892 |
| 187 | 0.00017 | −0.00325 | 0.11908 |
| 188 | 0.21475 | 0.43258 | 0.11975 |
| 189 | 0.14417 | 0.42167 | 0.12000 |
| 190 | 0.21017 | 0.43617 | 0.12075 |
| 191 | 0.14775 | 0.42683 | 0.12100 |
| 192 | 0.20475 | 0.43933 | 0.12167 |
| 193 | 0.15225 | 0.43158 | 0.12192 |
| 194 | 0.19867 | 0.44183 | 0.12242 |
| 195 | 0.15758 | 0.43592 | 0.12267 |
| 196 | 0.19192 | 0.44342 | 0.12308 |
| 197 | 0.16375 | 0.43950 | 0.12325 |
| 198 | 0.18483 | 0.44408 | 0.12350 |
| 199 | 0.17050 | 0.44208 | 0.12358 |
| 200 | 0.17767 | 0.44367 | 0.12367 |
| 201 | 0.13858 | 0.38350 | 0.14667 |
| 202 | 0.04158 | −0.00867 | 0.14750 |
| 203 | 0.04617 | −0.00608 | 0.14750 |
| 204 | 0.05033 | −0.00300 | 0.14750 |
| 205 | 0.03667 | −0.01058 | 0.14758 |
| 206 | 0.05392 | 0.00058 | 0.14758 |
| 207 | 0.23075 | 0.40358 | 0.14758 |
| 208 | 0.03150 | −0.01192 | 0.14775 |
| 209 | 0.05700 | 0.00450 | 0.14775 |
| 210 | 0.13917 | 0.38850 | 0.14775 |
| 211 | 0.05942 | 0.00850 | 0.14792 |
| 212 | 0.02633 | −0.01242 | 0.14800 |
| 213 | 0.06133 | 0.01267 | 0.14808 |
| 214 | 0.02125 | −0.01233 | 0.14825 |
| 215 | 0.06267 | 0.01675 | 0.14833 |
| 216 | 0.01642 | −0.01158 | 0.14850 |
| 217 | 0.06350 | 0.02075 | 0.14858 |
| 218 | 0.22808 | 0.40783 | 0.14867 |
| 219 | 0.01183 | −0.01033 | 0.14883 |
| 220 | 0.06392 | 0.02458 | 0.14883 |
| 221 | 0.14042 | 0.39383 | 0.14892 |
| 222 | 0.00767 | −0.00858 | 0.14917 |
| 223 | 0.00383 | −0.00650 | 0.14950 |
| 224 | 0.00050 | −0.00417 | 0.14983 |
| 225 | 0.22475 | 0.41217 | 0.14983 |
| 226 | 0.14233 | 0.39933 | 0.15008 |
| 227 | −0.00242 | −0.00167 | 0.15017 |
| 228 | 0.22067 | 0.41633 | 0.15092 |

TABLE I-continued

Non-Dimensionalized (X Y Z/Span)

| N | X | Y | Z |
|---|---|---|---|
| 229 | 0.14525 | 0.40492 | 0.15125 |
| 230 | 0.21567 | 0.42017 | 0.15200 |
| 231 | 0.14900 | 0.41033 | 0.15233 |
| 232 | 0.20992 | 0.42358 | 0.15292 |
| 233 | 0.15383 | 0.41550 | 0.15325 |
| 234 | 0.20342 | 0.42625 | 0.15383 |
| 235 | 0.15958 | 0.42008 | 0.15408 |
| 236 | 0.19633 | 0.42800 | 0.15450 |
| 237 | 0.16617 | 0.42383 | 0.15467 |
| 238 | 0.18875 | 0.42875 | 0.15492 |
| 239 | 0.17333 | 0.42667 | 0.15508 |
| 240 | 0.18100 | 0.42833 | 0.15517 |
| 241 | 0.13917 | 0.36475 | 0.17742 |
| 242 | 0.23742 | 0.38583 | 0.17842 |
| 243 | 0.04167 | −0.00683 | 0.17850 |
| 244 | 0.04658 | −0.00400 | 0.17850 |
| 245 | 0.05108 | −0.00067 | 0.17850 |
| 246 | 0.05500 | 0.00317 | 0.17858 |
| 247 | 0.13975 | 0.37008 | 0.17858 |
| 248 | 0.03633 | −0.00892 | 0.17867 |
| 249 | 0.05825 | 0.00733 | 0.17875 |
| 250 | 0.03083 | −0.01025 | 0.17883 |
| 251 | 0.06092 | 0.01175 | 0.17892 |
| 252 | 0.02525 | −0.01083 | 0.17900 |
| 253 | 0.06300 | 0.01617 | 0.17917 |
| 254 | 0.01975 | −0.01075 | 0.17925 |
| 255 | 0.06442 | 0.02067 | 0.17942 |
| 256 | 0.01450 | −0.00992 | 0.17958 |
| 257 | 0.23467 | 0.39050 | 0.17958 |
| 258 | 0.06533 | 0.02500 | 0.17967 |
| 259 | 0.14108 | 0.37575 | 0.17983 |
| 260 | 0.00958 | −0.00858 | 0.17992 |
| 261 | 0.06575 | 0.02908 | 0.17992 |
| 262 | 0.00508 | −0.00667 | 0.18025 |
| 263 | 0.00100 | −0.00442 | 0.18067 |
| 264 | 0.23108 | 0.39508 | 0.18075 |
| 265 | −0.00267 | −0.00192 | 0.18100 |
| 266 | 0.14317 | 0.38158 | 0.18108 |
| 267 | −0.00575 | 0.00083 | 0.18133 |
| 268 | 0.22675 | 0.39950 | 0.18200 |
| 269 | 0.14625 | 0.38750 | 0.18233 |
| 270 | 0.22150 | 0.40367 | 0.18308 |
| 271 | 0.15033 | 0.39333 | 0.18350 |
| 272 | 0.21533 | 0.40733 | 0.18417 |
| 273 | 0.15542 | 0.39883 | 0.18450 |
| 274 | 0.20842 | 0.41017 | 0.18508 |
| 275 | 0.16158 | 0.40367 | 0.18542 |
| 276 | 0.20083 | 0.41208 | 0.18583 |
| 277 | 0.16858 | 0.40775 | 0.18608 |
| 278 | 0.19275 | 0.41292 | 0.18633 |
| 279 | 0.17633 | 0.41067 | 0.18642 |
| 280 | 0.18450 | 0.41242 | 0.18650 |
| 281 | 0.13967 | 0.34550 | 0.20817 |
| 282 | 0.24433 | 0.36775 | 0.20917 |
| 283 | 0.14033 | 0.35117 | 0.20942 |
| 284 | 0.04692 | −0.00133 | 0.20958 |
| 285 | 0.05175 | 0.00233 | 0.20958 |
| 286 | 0.04150 | −0.00433 | 0.20967 |
| 287 | 0.03575 | −0.00658 | 0.20975 |
| 288 | 0.05600 | 0.00650 | 0.20975 |
| 289 | 0.05958 | 0.01100 | 0.20983 |
| 290 | 0.02975 | −0.00808 | 0.20992 |
| 291 | 0.06242 | 0.01575 | 0.21008 |
| 292 | 0.02375 | −0.00875 | 0.21017 |
| 293 | 0.06467 | 0.02058 | 0.21033 |
| 294 | 0.24142 | 0.37267 | 0.21042 |
| 295 | 0.01783 | −0.00858 | 0.21050 |
| 296 | 0.06625 | 0.02542 | 0.21058 |
| 297 | 0.14175 | 0.35717 | 0.21075 |
| 298 | 0.01208 | −0.00775 | 0.21083 |
| 299 | 0.06717 | 0.03008 | 0.21092 |
| 300 | 0.00675 | −0.00625 | 0.21117 |
| 301 | 0.06767 | 0.03450 | 0.21117 |
| 302 | 0.00192 | −0.00425 | 0.21150 |
| 303 | 0.23767 | 0.37758 | 0.21167 |
| 304 | −0.00250 | −0.00175 | 0.21192 |
| 305 | 0.14400 | 0.36342 | 0.21208 |
| 306 | −0.00642 | 0.00092 | 0.21233 |
| 307 | −0.00983 | 0.00392 | 0.21267 |
| 308 | 0.23300 | 0.38233 | 0.21292 |
| 309 | 0.14725 | 0.36967 | 0.21342 |
| 310 | 0.22742 | 0.38675 | 0.21417 |
| 311 | 0.15158 | 0.37592 | 0.21458 |
| 312 | 0.22092 | 0.39067 | 0.21533 |
| 313 | 0.15708 | 0.38175 | 0.21575 |
| 314 | 0.21350 | 0.39375 | 0.21633 |
| 315 | 0.16358 | 0.38692 | 0.21667 |
| 316 | 0.20542 | 0.39583 | 0.21708 |
| 317 | 0.17108 | 0.39117 | 0.21733 |
| 318 | 0.19683 | 0.39667 | 0.21767 |
| 319 | 0.17933 | 0.39433 | 0.21775 |
| 320 | 0.18800 | 0.39617 | 0.21783 |
| 321 | 0.14025 | 0.32592 | 0.23883 |
| 322 | 0.25133 | 0.34942 | 0.23992 |
| 323 | 0.14092 | 0.33200 | 0.24017 |
| 324 | 0.04125 | −0.00150 | 0.24083 |
| 325 | 0.04708 | 0.00183 | 0.24083 |
| 326 | 0.05233 | 0.00575 | 0.24083 |
| 327 | 0.05692 | 0.01025 | 0.24092 |
| 328 | 0.03500 | −0.00392 | 0.24100 |
| 329 | 0.06083 | 0.01517 | 0.24108 |
| 330 | 0.02850 | −0.00550 | 0.24117 |
| 331 | 0.24817 | 0.35458 | 0.24125 |
| 332 | 0.06392 | 0.02033 | 0.24133 |
| 333 | 0.02200 | −0.00625 | 0.24142 |
| 334 | 0.06633 | 0.02558 | 0.24158 |
| 335 | 0.14242 | 0.33833 | 0.24158 |
| 336 | 0.01558 | −0.00608 | 0.24175 |
| 337 | 0.06800 | 0.03075 | 0.24192 |
| 338 | 0.00942 | −0.00517 | 0.24208 |
| 339 | 0.06908 | 0.03583 | 0.24217 |
| 340 | 0.00358 | −0.00350 | 0.24250 |
| 341 | 0.06958 | 0.04067 | 0.24250 |
| 342 | 0.24425 | 0.35983 | 0.24258 |
| 343 | −0.00175 | −0.00133 | 0.24292 |
| 344 | 0.14483 | 0.34492 | 0.24300 |
| 345 | −0.00650 | 0.00133 | 0.24333 |
| 346 | −0.01075 | 0.00433 | 0.24375 |
| 347 | 0.23933 | 0.36492 | 0.24392 |
| 348 | −0.01442 | 0.00750 | 0.24417 |
| 349 | 0.14833 | 0.35167 | 0.24442 |
| 350 | 0.23342 | 0.36958 | 0.24525 |
| 351 | 0.15292 | 0.35825 | 0.24575 |
| 352 | 0.22650 | 0.37375 | 0.24642 |
| 353 | 0.15867 | 0.36442 | 0.24692 |
| 354 | 0.21875 | 0.37708 | 0.24750 |
| 355 | 0.16567 | 0.36992 | 0.24792 |
| 356 | 0.21008 | 0.37933 | 0.24833 |
| 357 | 0.17358 | 0.37442 | 0.24867 |
| 358 | 0.20100 | 0.38025 | 0.24892 |
| 359 | 0.18242 | 0.37783 | 0.24908 |
| 360 | 0.19158 | 0.37975 | 0.24917 |
| 361 | 0.14075 | 0.30633 | 0.26950 |
| 362 | 0.25825 | 0.33092 | 0.27058 |
| 363 | 0.14150 | 0.31267 | 0.27100 |
| 364 | 0.25500 | 0.33642 | 0.27200 |
| 365 | 0.04717 | 0.00525 | 0.27208 |
| 366 | 0.04092 | 0.00175 | 0.27217 |
| 367 | 0.05292 | 0.00950 | 0.27217 |
| 368 | 0.03417 | −0.00092 | 0.27225 |
| 369 | 0.05792 | 0.01442 | 0.27225 |
| 370 | 0.06208 | 0.01967 | 0.27242 |
| 371 | 0.14308 | 0.31942 | 0.27242 |
| 372 | 0.02717 | −0.00267 | 0.27250 |
| 373 | 0.06550 | 0.02525 | 0.27267 |
| 374 | 0.02008 | −0.00342 | 0.27275 |
| 375 | 0.06808 | 0.03092 | 0.27292 |
| 376 | 0.01308 | −0.00333 | 0.27308 |
| 377 | 0.06983 | 0.03658 | 0.27325 |
| 378 | 0.25083 | 0.34200 | 0.27342 |
| 379 | 0.00642 | −0.00225 | 0.27350 |
| 380 | 0.07100 | 0.04208 | 0.27358 |

TABLE I-continued

Non-Dimensionalized (X Y Z/Span)

| N | X | Y | Z |
|---|---|---|---|
| 381 | 0.00017 | −0.00050 | 0.27392 |
| 382 | 0.07158 | 0.04733 | 0.27400 |
| 383 | 0.14567 | 0.32642 | 0.27400 |
| 384 | −0.00558 | 0.00183 | 0.27433 |
| 385 | −0.01075 | 0.00475 | 0.27483 |
| 386 | 0.24567 | 0.34733 | 0.27492 |
| 387 | −0.01533 | 0.00792 | 0.27525 |
| 388 | 0.14933 | 0.33350 | 0.27542 |
| 389 | −0.01933 | 0.01142 | 0.27575 |
| 390 | 0.23942 | 0.35233 | 0.27625 |
| 391 | 0.15417 | 0.34042 | 0.27683 |
| 392 | 0.23217 | 0.35675 | 0.27758 |
| 393 | 0.16033 | 0.34700 | 0.27808 |
| 394 | 0.22392 | 0.36025 | 0.27875 |
| 395 | 0.16767 | 0.35283 | 0.27917 |
| 396 | 0.21475 | 0.36267 | 0.27958 |
| 397 | 0.17617 | 0.35767 | 0.27992 |
| 398 | 0.20508 | 0.36367 | 0.28025 |
| 399 | 0.18542 | 0.36117 | 0.28042 |
| 400 | 0.19517 | 0.36317 | 0.28050 |
| 401 | 0.14133 | 0.28683 | 0.30033 |
| 402 | 0.26508 | 0.31250 | 0.30142 |
| 403 | 0.14208 | 0.29350 | 0.30183 |
| 404 | 0.26175 | 0.31833 | 0.30283 |
| 405 | 0.14375 | 0.30058 | 0.30333 |
| 406 | 0.04050 | 0.00500 | 0.30350 |
| 407 | 0.04725 | 0.00883 | 0.30350 |
| 408 | 0.05342 | 0.01342 | 0.30350 |
| 409 | 0.03325 | 0.00217 | 0.30367 |
| 410 | 0.05883 | 0.01867 | 0.30367 |
| 411 | 0.06333 | 0.02442 | 0.30383 |
| 412 | 0.02567 | 0.00025 | 0.30392 |
| 413 | 0.06700 | 0.03042 | 0.30408 |
| 414 | 0.01800 | −0.00050 | 0.30417 |
| 415 | 0.06975 | 0.03650 | 0.30442 |
| 416 | 0.25733 | 0.32417 | 0.30442 |
| 417 | 0.01050 | −0.00033 | 0.30458 |
| 418 | 0.07175 | 0.04258 | 0.30475 |
| 419 | 0.00333 | 0.00075 | 0.30500 |
| 420 | 0.14642 | 0.30800 | 0.30500 |
| 421 | 0.07300 | 0.04850 | 0.30517 |
| 422 | −0.00342 | 0.00258 | 0.30542 |
| 423 | 0.07358 | 0.05417 | 0.30550 |
| 424 | −0.00958 | 0.00517 | 0.30592 |
| 425 | 0.25192 | 0.32983 | 0.30592 |
| 426 | −0.01517 | 0.00825 | 0.30642 |
| 427 | 0.15033 | 0.31542 | 0.30650 |
| 428 | −0.02017 | 0.01175 | 0.30692 |
| 429 | −0.02442 | 0.01550 | 0.30742 |
| 430 | 0.24542 | 0.33517 | 0.30742 |
| 431 | 0.15550 | 0.32275 | 0.30800 |
| 432 | 0.23775 | 0.33983 | 0.30875 |
| 433 | 0.16192 | 0.32967 | 0.30933 |
| 434 | 0.22900 | 0.34358 | 0.30992 |
| 435 | 0.16975 | 0.33583 | 0.31050 |
| 436 | 0.21942 | 0.34608 | 0.31092 |
| 437 | 0.17867 | 0.34083 | 0.31125 |
| 438 | 0.20925 | 0.34717 | 0.31158 |
| 439 | 0.18842 | 0.34458 | 0.31175 |
| 440 | 0.19875 | 0.34667 | 0.31183 |
| 441 | 0.14183 | 0.26758 | 0.33117 |
| 442 | 0.27183 | 0.29433 | 0.33225 |
| 443 | 0.14267 | 0.27467 | 0.33275 |
| 444 | 0.26825 | 0.30042 | 0.33383 |
| 445 | 0.14442 | 0.28208 | 0.33442 |
| 446 | 0.04008 | 0.00833 | 0.33500 |
| 447 | 0.04733 | 0.01242 | 0.33500 |
| 448 | 0.05400 | 0.01733 | 0.33500 |
| 449 | 0.03225 | 0.00525 | 0.33517 |
| 450 | 0.05975 | 0.02300 | 0.33517 |
| 451 | 0.06458 | 0.02917 | 0.33533 |
| 452 | 0.02417 | 0.00325 | 0.33542 |
| 453 | 0.26367 | 0.30658 | 0.33542 |
| 454 | 0.06850 | 0.03558 | 0.33567 |
| 455 | 0.01600 | 0.00242 | 0.33575 |
| 456 | 0.07150 | 0.04208 | 0.33600 |
| 457 | 0.00792 | 0.00258 | 0.33608 |
| 458 | 0.14725 | 0.28983 | 0.33608 |
| 459 | 0.07358 | 0.04867 | 0.33633 |
| 460 | 0.00025 | 0.00375 | 0.33658 |
| 461 | 0.07492 | 0.05500 | 0.33675 |
| 462 | 0.25800 | 0.31258 | 0.33700 |
| 463 | −0.00700 | 0.00575 | 0.33708 |
| 464 | 0.07558 | 0.06108 | 0.33717 |
| 465 | −0.01367 | 0.00850 | 0.33758 |
| 466 | 0.15133 | 0.29767 | 0.33767 |
| 467 | −0.01967 | 0.01183 | 0.33808 |
| 468 | −0.02492 | 0.01558 | 0.33858 |
| 469 | 0.25117 | 0.31817 | 0.33858 |
| 470 | −0.02958 | 0.01958 | 0.33908 |
| 471 | 0.15675 | 0.30533 | 0.33925 |
| 472 | 0.24317 | 0.32308 | 0.34000 |
| 473 | 0.16358 | 0.31258 | 0.34067 |
| 474 | 0.23400 | 0.32708 | 0.34125 |
| 475 | 0.17175 | 0.31900 | 0.34183 |
| 476 | 0.22392 | 0.32975 | 0.34225 |
| 477 | 0.18108 | 0.32433 | 0.34267 |
| 478 | 0.21325 | 0.33092 | 0.34292 |
| 479 | 0.19142 | 0.32817 | 0.34317 |
| 480 | 0.20225 | 0.33042 | 0.34325 |
| 481 | 0.14250 | 0.24892 | 0.36217 |
| 482 | 0.27817 | 0.27658 | 0.36325 |
| 483 | 0.14333 | 0.25633 | 0.36383 |
| 484 | 0.27450 | 0.28300 | 0.36483 |
| 485 | 0.14517 | 0.26408 | 0.36558 |
| 486 | 0.03967 | 0.01150 | 0.36650 |
| 487 | 0.04750 | 0.01583 | 0.36650 |
| 488 | 0.05450 | 0.02117 | 0.36650 |
| 489 | 0.26975 | 0.28942 | 0.36650 |
| 490 | 0.03142 | 0.00825 | 0.36667 |
| 491 | 0.06067 | 0.02717 | 0.36667 |
| 492 | 0.02275 | 0.00608 | 0.36692 |
| 493 | 0.06583 | 0.03367 | 0.36692 |
| 494 | 0.07000 | 0.04050 | 0.36717 |
| 495 | 0.01400 | 0.00517 | 0.36725 |
| 496 | 0.14808 | 0.27217 | 0.36725 |
| 497 | 0.07317 | 0.04750 | 0.36758 |
| 498 | 0.00542 | 0.00533 | 0.36767 |
| 499 | 0.07542 | 0.05450 | 0.36800 |
| 500 | −0.00283 | 0.00658 | 0.36817 |
| 501 | 0.26383 | 0.29575 | 0.36817 |
| 502 | 0.07683 | 0.06125 | 0.36842 |
| 503 | −0.01050 | 0.00875 | 0.36867 |
| 504 | 0.07750 | 0.06775 | 0.36883 |
| 505 | 0.15233 | 0.28033 | 0.36900 |
| 506 | −0.01758 | 0.01175 | 0.36925 |
| 507 | −0.02400 | 0.01525 | 0.36975 |
| 508 | 0.25667 | 0.30158 | 0.36983 |
| 509 | −0.02958 | 0.01925 | 0.37033 |
| 510 | 0.15800 | 0.28842 | 0.37058 |
| 511 | −0.03450 | 0.02350 | 0.37092 |
| 512 | 0.24833 | 0.30675 | 0.37133 |
| 513 | 0.16517 | 0.29592 | 0.37208 |
| 514 | 0.23883 | 0.31092 | 0.37267 |
| 515 | 0.17367 | 0.30267 | 0.37325 |
| 516 | 0.22825 | 0.31375 | 0.37375 |
| 517 | 0.18350 | 0.30817 | 0.37417 |
| 518 | 0.21708 | 0.31500 | 0.37442 |
| 519 | 0.19425 | 0.31225 | 0.37467 |
| 520 | 0.20558 | 0.31450 | 0.37475 |
| 521 | 0.14317 | 0.23108 | 0.39342 |
| 522 | 0.28417 | 0.25958 | 0.39442 |
| 523 | 0.14400 | 0.23867 | 0.39508 |
| 524 | 0.28033 | 0.26625 | 0.39608 |
| 525 | 0.14592 | 0.24675 | 0.39692 |
| 526 | 0.27550 | 0.27300 | 0.39783 |
| 527 | 0.03942 | 0.01442 | 0.39800 |
| 528 | 0.04767 | 0.01900 | 0.39800 |
| 529 | 0.05508 | 0.02458 | 0.39800 |
| 530 | 0.03058 | 0.01092 | 0.39817 |
| 531 | 0.06158 | 0.03092 | 0.39817 |
| 532 | 0.02142 | 0.00867 | 0.39842 |

TABLE I-continued

Non-Dimensionalized (X Y Z/Span)

| N | X | Y | Z |
|---|---|---|---|
| 533 | 0.06708 | 0.03783 | 0.39842 |
| 534 | 0.14900 | 0.25517 | 0.39867 |
| 535 | 0.07150 | 0.04508 | 0.39875 |
| 536 | 0.01217 | 0.00767 | 0.39883 |
| 537 | 0.07483 | 0.05250 | 0.39917 |
| 538 | 0.00308 | 0.00792 | 0.39925 |
| 539 | 0.07725 | 0.05983 | 0.39958 |
| 540 | 0.26933 | 0.27950 | 0.39958 |
| 541 | −0.00558 | 0.00925 | 0.39975 |
| 542 | 0.07875 | 0.06700 | 0.40008 |
| 543 | −0.01375 | 0.01150 | 0.40033 |
| 544 | 0.15342 | 0.26367 | 0.40042 |
| 545 | 0.07950 | 0.07392 | 0.40050 |
| 546 | −0.02125 | 0.01467 | 0.40092 |
| 547 | 0.26192 | 0.28567 | 0.40125 |
| 548 | −0.02800 | 0.01842 | 0.40150 |
| 549 | −0.03400 | 0.02258 | 0.40208 |
| 550 | 0.15933 | 0.27208 | 0.40217 |
| 551 | −0.03925 | 0.02717 | 0.40267 |
| 552 | 0.25325 | 0.29108 | 0.40283 |
| 553 | 0.16675 | 0.27992 | 0.40367 |
| 554 | 0.24333 | 0.29542 | 0.40417 |
| 555 | 0.17558 | 0.28692 | 0.40492 |
| 556 | 0.23242 | 0.29842 | 0.40533 |
| 557 | 0.18583 | 0.29267 | 0.40583 |
| 558 | 0.22075 | 0.29967 | 0.40608 |
| 559 | 0.19700 | 0.29683 | 0.40633 |
| 560 | 0.20883 | 0.29917 | 0.40642 |
| 561 | 0.14383 | 0.21417 | 0.42483 |
| 562 | 0.28975 | 0.24350 | 0.42583 |
| 563 | 0.14475 | 0.22208 | 0.42658 |
| 564 | 0.28583 | 0.25042 | 0.42758 |
| 565 | 0.14675 | 0.23042 | 0.42842 |
| 566 | 0.28075 | 0.25733 | 0.42933 |
| 567 | 0.04792 | 0.02167 | 0.42942 |
| 568 | 0.03925 | 0.01683 | 0.42950 |
| 569 | 0.05575 | 0.02750 | 0.42950 |
| 570 | 0.03000 | 0.01317 | 0.42967 |
| 571 | 0.06258 | 0.03417 | 0.42967 |
| 572 | 0.02033 | 0.01083 | 0.42992 |
| 573 | 0.06833 | 0.04150 | 0.43000 |
| 574 | 0.14992 | 0.23917 | 0.43025 |
| 575 | 0.01058 | 0.00975 | 0.43033 |
| 576 | 0.07300 | 0.04908 | 0.43033 |
| 577 | 0.00108 | 0.01000 | 0.43075 |
| 578 | 0.07658 | 0.05692 | 0.43075 |
| 579 | 0.07908 | 0.06467 | 0.43117 |
| 580 | 0.27442 | 0.26417 | 0.43117 |
| 581 | −0.00808 | 0.01142 | 0.43133 |
| 582 | 0.08067 | 0.07217 | 0.43167 |
| 583 | −0.01675 | 0.01383 | 0.43192 |
| 584 | 0.15450 | 0.24792 | 0.43208 |
| 585 | 0.08142 | 0.07942 | 0.43217 |
| 586 | −0.02458 | 0.01708 | 0.43250 |
| 587 | 0.26683 | 0.27050 | 0.43292 |
| 588 | −0.03167 | 0.02108 | 0.43317 |
| 589 | −0.03800 | 0.02550 | 0.43375 |
| 590 | 0.16058 | 0.25658 | 0.43383 |
| 591 | −0.04342 | 0.03025 | 0.43433 |
| 592 | 0.25783 | 0.27608 | 0.43450 |
| 593 | 0.16825 | 0.26467 | 0.43542 |
| 594 | 0.24758 | 0.28058 | 0.43592 |
| 595 | 0.17750 | 0.27192 | 0.43667 |
| 596 | 0.23625 | 0.28375 | 0.43708 |
| 597 | 0.18800 | 0.27783 | 0.43758 |
| 598 | 0.22425 | 0.28517 | 0.43783 |
| 599 | 0.19967 | 0.28217 | 0.43817 |
| 600 | 0.21183 | 0.28467 | 0.43825 |
| 601 | 0.14467 | 0.19850 | 0.45658 |
| 602 | 0.29475 | 0.22842 | 0.45750 |
| 603 | 0.14558 | 0.20667 | 0.45833 |
| 604 | 0.29067 | 0.23558 | 0.45925 |
| 605 | 0.14758 | 0.21525 | 0.46025 |
| 606 | 0.04825 | 0.02367 | 0.46083 |
| 607 | 0.03925 | 0.01867 | 0.46092 |
| 608 | 0.05650 | 0.02975 | 0.46092 |
| 609 | 0.02958 | 0.01483 | 0.46108 |
| 610 | 0.28550 | 0.24275 | 0.46108 |
| 611 | 0.06358 | 0.03675 | 0.46117 |
| 612 | 0.01950 | 0.01233 | 0.46133 |
| 613 | 0.06967 | 0.04433 | 0.46142 |
| 614 | 0.00933 | 0.01133 | 0.46175 |
| 615 | 0.07450 | 0.05233 | 0.46183 |
| 616 | 0.15092 | 0.22417 | 0.46217 |
| 617 | −0.00067 | 0.01158 | 0.46225 |
| 618 | 0.07817 | 0.06042 | 0.46225 |
| 619 | −0.01017 | 0.01300 | 0.46275 |
| 620 | 0.08083 | 0.06850 | 0.46275 |
| 621 | 0.27900 | 0.24975 | 0.46292 |
| 622 | 0.08250 | 0.07642 | 0.46325 |
| 623 | −0.01917 | 0.01558 | 0.46342 |
| 624 | 0.08325 | 0.08392 | 0.46383 |
| 625 | 0.15558 | 0.23325 | 0.46400 |
| 626 | −0.02742 | 0.01900 | 0.46408 |
| 627 | −0.03475 | 0.02317 | 0.46475 |
| 628 | 0.27117 | 0.25633 | 0.46475 |
| 629 | −0.04133 | 0.02783 | 0.46533 |
| 630 | 0.16183 | 0.24217 | 0.46575 |
| 631 | −0.04700 | 0.03283 | 0.46600 |
| 632 | 0.26200 | 0.26208 | 0.46642 |
| 633 | 0.16975 | 0.25050 | 0.46733 |
| 634 | 0.25142 | 0.26675 | 0.46783 |
| 635 | 0.17925 | 0.25792 | 0.46867 |
| 636 | 0.23983 | 0.27000 | 0.46908 |
| 637 | 0.19017 | 0.26400 | 0.46967 |
| 638 | 0.22742 | 0.27150 | 0.46983 |
| 639 | 0.20208 | 0.26842 | 0.47017 |
| 640 | 0.21467 | 0.27100 | 0.47025 |
| 641 | 0.14550 | 0.18425 | 0.48858 |
| 642 | 0.29908 | 0.21475 | 0.48950 |
| 643 | 0.14650 | 0.19258 | 0.49042 |
| 644 | 0.29492 | 0.22208 | 0.49125 |
| 645 | 0.04883 | 0.02492 | 0.49217 |
| 646 | 0.03942 | 0.01967 | 0.49225 |
| 647 | 0.05733 | 0.03125 | 0.49225 |
| 648 | 0.14858 | 0.20142 | 0.49233 |
| 649 | 0.02942 | 0.01575 | 0.49242 |
| 650 | 0.06475 | 0.03850 | 0.49250 |
| 651 | 0.01900 | 0.01325 | 0.49267 |
| 652 | 0.07092 | 0.04633 | 0.49283 |
| 653 | 0.00850 | 0.01217 | 0.49308 |
| 654 | 0.28967 | 0.22942 | 0.49317 |
| 655 | 0.07600 | 0.05458 | 0.49325 |
| 656 | −0.00183 | 0.01242 | 0.49358 |
| 657 | 0.07983 | 0.06300 | 0.49375 |
| 658 | −0.01175 | 0.01400 | 0.49417 |
| 659 | 0.08250 | 0.07133 | 0.49425 |
| 660 | 0.15192 | 0.21050 | 0.49425 |
| 661 | −0.02100 | 0.01658 | 0.49483 |
| 662 | 0.08425 | 0.07950 | 0.49483 |
| 663 | 0.28308 | 0.23658 | 0.49500 |
| 664 | 0.08508 | 0.08725 | 0.49533 |
| 665 | −0.02950 | 0.02017 | 0.49550 |
| 666 | −0.03717 | 0.02450 | 0.49617 |
| 667 | 0.15675 | 0.21983 | 0.49617 |
| 668 | 0.27508 | 0.24325 | 0.49683 |
| 669 | −0.04392 | 0.02933 | 0.49692 |
| 670 | −0.04983 | 0.03450 | 0.49758 |
| 671 | 0.16317 | 0.22892 | 0.49800 |
| 672 | 0.26558 | 0.24925 | 0.49858 |
| 673 | 0.17125 | 0.23750 | 0.49958 |
| 674 | 0.25483 | 0.25408 | 0.50008 |
| 675 | 0.18100 | 0.24508 | 0.50092 |
| 676 | 0.24292 | 0.25733 | 0.50125 |
| 677 | 0.19208 | 0.25133 | 0.50192 |
| 678 | 0.23025 | 0.25892 | 0.50208 |
| 679 | 0.20433 | 0.25583 | 0.50242 |
| 680 | 0.21725 | 0.25842 | 0.50250 |
| 681 | 0.14650 | 0.17175 | 0.52100 |
| 682 | 0.30267 | 0.20258 | 0.52175 |
| 683 | 0.14750 | 0.18017 | 0.52283 |
| 684 | 0.03992 | 0.01992 | 0.52342 |

TABLE I-continued

Non-Dimensionalized (X Y Z/Span)

| N | X | Y | Z |
|---|---|---|---|
| 685 | 0.04958 | 0.02525 | 0.52342 |
| 686 | 0.05825 | 0.03175 | 0.52350 |
| 687 | 0.02958 | 0.01583 | 0.52358 |
| 688 | 0.29850 | 0.21000 | 0.52358 |
| 689 | 0.06583 | 0.03908 | 0.52375 |
| 690 | 0.01892 | 0.01325 | 0.52392 |
| 691 | 0.07225 | 0.04717 | 0.52408 |
| 692 | 0.00808 | 0.01217 | 0.52433 |
| 693 | 0.07742 | 0.05567 | 0.52458 |
| 694 | 0.14958 | 0.18908 | 0.52475 |
| 695 | −0.00250 | 0.01250 | 0.52483 |
| 696 | 0.08142 | 0.06425 | 0.52508 |
| 697 | −0.01267 | 0.01408 | 0.52542 |
| 698 | 0.29317 | 0.21750 | 0.52550 |
| 699 | 0.08417 | 0.07283 | 0.52558 |
| 700 | −0.02217 | 0.01683 | 0.52608 |
| 701 | 0.08592 | 0.08117 | 0.52617 |
| 702 | 0.15300 | 0.19842 | 0.52667 |
| 703 | −0.03092 | 0.02050 | 0.52683 |
| 704 | 0.08675 | 0.08917 | 0.52683 |
| 705 | 0.28642 | 0.22475 | 0.52742 |
| 706 | −0.03875 | 0.02492 | 0.52750 |
| 707 | −0.04567 | 0.02992 | 0.52825 |
| 708 | 0.15792 | 0.20783 | 0.52867 |
| 709 | −0.05167 | 0.03525 | 0.52900 |
| 710 | 0.27825 | 0.23167 | 0.52925 |
| 711 | 0.16442 | 0.21708 | 0.53042 |
| 712 | 0.26867 | 0.23767 | 0.53100 |
| 713 | 0.17267 | 0.22583 | 0.53208 |
| 714 | 0.25775 | 0.24258 | 0.53250 |
| 715 | 0.18258 | 0.23358 | 0.53342 |
| 716 | 0.24567 | 0.24600 | 0.53375 |
| 717 | 0.19392 | 0.23992 | 0.53442 |
| 718 | 0.23275 | 0.24758 | 0.53467 |
| 719 | 0.20633 | 0.24450 | 0.53500 |
| 720 | 0.21950 | 0.24708 | 0.53500 |
| 721 | 0.14767 | 0.16108 | 0.55375 |
| 722 | 0.04067 | 0.01900 | 0.55450 |
| 723 | 0.05050 | 0.02442 | 0.55450 |
| 724 | 0.30542 | 0.19208 | 0.55450 |
| 725 | 0.05933 | 0.03100 | 0.55458 |
| 726 | 0.03017 | 0.01492 | 0.55467 |
| 727 | 0.06708 | 0.03858 | 0.55483 |
| 728 | 0.01925 | 0.01233 | 0.55492 |
| 729 | 0.07367 | 0.04675 | 0.55525 |
| 730 | 0.00833 | 0.01125 | 0.55533 |
| 731 | 0.14867 | 0.16958 | 0.55558 |
| 732 | 0.07892 | 0.05533 | 0.55575 |
| 733 | −0.00250 | 0.01158 | 0.55592 |
| 734 | 0.08292 | 0.06408 | 0.55625 |
| 735 | 0.30125 | 0.19958 | 0.55633 |
| 736 | −0.01283 | 0.01317 | 0.55650 |
| 737 | 0.08575 | 0.07283 | 0.55683 |
| 738 | −0.02250 | 0.01600 | 0.55725 |
| 739 | 0.08758 | 0.08133 | 0.55750 |
| 740 | 0.15075 | 0.17867 | 0.55750 |
| 741 | −0.03133 | 0.01975 | 0.55792 |
| 742 | 0.08842 | 0.08942 | 0.55808 |
| 743 | 0.29583 | 0.20717 | 0.55825 |
| 744 | −0.03933 | 0.02433 | 0.55867 |
| 745 | −0.04633 | 0.02942 | 0.55942 |
| 746 | 0.15417 | 0.18800 | 0.55950 |
| 747 | −0.05242 | 0.03483 | 0.56017 |
| 748 | 0.28900 | 0.21458 | 0.56017 |
| 749 | 0.15917 | 0.19758 | 0.56142 |
| 750 | 0.28083 | 0.22150 | 0.56200 |
| 751 | 0.16575 | 0.20692 | 0.56325 |
| 752 | 0.27117 | 0.22767 | 0.56375 |
| 753 | 0.17408 | 0.21575 | 0.56492 |
| 754 | 0.26008 | 0.23267 | 0.56533 |
| 755 | 0.18408 | 0.22350 | 0.56625 |
| 756 | 0.24783 | 0.23608 | 0.56658 |
| 757 | 0.19558 | 0.22992 | 0.56725 |
| 758 | 0.23483 | 0.23767 | 0.56742 |
| 759 | 0.20817 | 0.23458 | 0.56783 |
| 760 | 0.22142 | 0.23717 | 0.56783 |
| 761 | 0.17725 | −0.22708 | 0.57267 |
| 762 | 0.17567 | −0.22500 | 0.57308 |
| 763 | 0.17408 | −0.22283 | 0.57350 |
| 764 | 0.17267 | −0.22058 | 0.57392 |
| 765 | 0.17125 | −0.21833 | 0.57442 |
| 766 | 0.16992 | −0.21600 | 0.57483 |
| 767 | 0.16867 | −0.21367 | 0.57525 |
| 768 | 0.16750 | −0.21133 | 0.57567 |
| 769 | 0.16642 | −0.20883 | 0.57617 |
| 770 | 0.16542 | −0.20642 | 0.57658 |
| 771 | 0.16450 | −0.20392 | 0.57708 |
| 772 | 0.16358 | −0.20142 | 0.57750 |
| 773 | 0.16283 | −0.19883 | 0.57792 |
| 774 | 0.16217 | −0.19625 | 0.57842 |
| 775 | 0.16158 | −0.19367 | 0.57883 |
| 776 | 0.16108 | −0.19108 | 0.57925 |
| 777 | 0.04092 | 0.01717 | 0.57950 |
| 778 | 0.04983 | 0.02192 | 0.57950 |
| 779 | 0.05808 | 0.02767 | 0.57958 |
| 780 | 0.03158 | 0.01358 | 0.57967 |
| 781 | 0.16067 | −0.18842 | 0.57975 |
| 782 | 0.06558 | 0.03442 | 0.57983 |
| 783 | 0.02183 | 0.01108 | 0.57992 |
| 784 | 0.07225 | 0.04192 | 0.58017 |
| 785 | 0.16033 | −0.18583 | 0.58017 |
| 786 | 0.01183 | 0.00983 | 0.58025 |
| 787 | 0.07792 | 0.05025 | 0.58058 |
| 788 | 0.16008 | −0.18317 | 0.58058 |
| 789 | 0.00175 | 0.00975 | 0.58075 |
| 790 | 0.15992 | −0.18050 | 0.58100 |
| 791 | 0.08258 | 0.05917 | 0.58117 |
| 792 | −0.00825 | 0.01092 | 0.58133 |
| 793 | 0.08608 | 0.06858 | 0.58175 |
| 794 | −0.01800 | 0.01325 | 0.58200 |
| 795 | 0.08850 | 0.07833 | 0.58250 |
| 796 | −0.02742 | 0.01667 | 0.58275 |
| 797 | 0.08967 | 0.08833 | 0.58333 |
| 798 | −0.03633 | 0.02133 | 0.58358 |
| 799 | −0.04458 | 0.02692 | 0.58450 |
| 800 | −0.05217 | 0.03358 | 0.58542 |
| 801 | 0.14883 | 0.15250 | 0.58692 |
| 802 | 0.30725 | 0.18358 | 0.58750 |
| 803 | 0.14992 | 0.16108 | 0.58883 |
| 804 | 0.07167 | 0.59475 | 0.58917 |
| 805 | 0.30300 | 0.19117 | 0.58942 |
| 806 | 0.07150 | 0.59742 | 0.58975 |
| 807 | 0.07125 | 0.60017 | 0.59033 |
| 808 | 0.15200 | 0.17017 | 0.59075 |
| 809 | 0.07092 | 0.60283 | 0.59083 |
| 810 | 0.29758 | 0.19875 | 0.59133 |
| 811 | 0.07058 | 0.60550 | 0.59142 |
| 812 | 0.07008 | 0.60817 | 0.59200 |
| 813 | 0.06958 | 0.61083 | 0.59258 |
| 814 | 0.15550 | 0.17958 | 0.59275 |
| 815 | 0.06892 | 0.61350 | 0.59317 |
| 816 | 0.29083 | 0.20617 | 0.59325 |
| 817 | 0.06825 | 0.61617 | 0.59375 |
| 818 | 0.06750 | 0.61875 | 0.59433 |
| 819 | 0.16042 | 0.18917 | 0.59467 |
| 820 | 0.06667 | 0.62133 | 0.59492 |
| 821 | 0.28258 | 0.21317 | 0.59517 |
| 822 | 0.06575 | 0.62392 | 0.59542 |
| 823 | 0.06475 | 0.62650 | 0.59600 |
| 824 | 0.06367 | 0.62900 | 0.59658 |
| 825 | 0.16708 | 0.19858 | 0.59658 |
| 826 | 0.27292 | 0.21933 | 0.59692 |
| 827 | 0.06250 | 0.63150 | 0.59717 |
| 828 | 0.06133 | 0.63392 | 0.59775 |
| 829 | 0.17542 | 0.20742 | 0.59817 |
| 830 | 0.06008 | 0.63633 | 0.59825 |
| 831 | 0.26183 | 0.22433 | 0.59850 |
| 832 | 0.05875 | 0.63867 | 0.59883 |
| 833 | 0.05733 | 0.64100 | 0.59933 |
| 834 | 0.18550 | 0.21525 | 0.59958 |
| 835 | 0.24950 | 0.22783 | 0.59975 |
| 836 | 0.05592 | 0.64325 | 0.59992 |

TABLE I-continued

Non-Dimensionalized (X Y Z/Span)

| N | X | Y | Z |
|---|---|---|---|
| 837 | 0.19700 | 0.22167 | 0.60050 |
| 838 | 0.23642 | 0.22942 | 0.60067 |
| 839 | 0.20967 | 0.22633 | 0.60108 |
| 840 | 0.22300 | 0.22892 | 0.60108 |
| 841 | 0.17992 | −0.23542 | 0.62492 |
| 842 | 0.17833 | −0.23333 | 0.62533 |
| 843 | 0.15050 | 0.14383 | 0.62558 |
| 844 | 0.30892 | 0.17483 | 0.62575 |
| 845 | 0.17683 | −0.23117 | 0.62583 |
| 846 | 0.17542 | −0.22900 | 0.62633 |
| 847 | 0.17400 | −0.22675 | 0.62675 |
| 848 | 0.17275 | −0.22450 | 0.62725 |
| 849 | 0.15150 | 0.15242 | 0.62750 |
| 850 | 0.30467 | 0.18242 | 0.62767 |
| 851 | 0.17150 | −0.22217 | 0.62775 |
| 852 | 0.07358 | 0.58667 | 0.62800 |
| 853 | 0.17033 | −0.21975 | 0.62817 |
| 854 | 0.07350 | 0.58933 | 0.62858 |
| 855 | 0.16925 | −0.21742 | 0.62867 |
| 856 | 0.07325 | 0.59200 | 0.62908 |
| 857 | 0.16825 | −0.21492 | 0.62917 |
| 858 | 0.15367 | 0.16150 | 0.62950 |
| 859 | 0.07292 | 0.59467 | 0.62967 |
| 860 | 0.16733 | −0.21250 | 0.62967 |
| 861 | 0.29925 | 0.19000 | 0.62967 |
| 862 | 0.16650 | −0.21000 | 0.63008 |
| 863 | 0.07258 | 0.59742 | 0.63025 |
| 864 | 0.16575 | −0.20750 | 0.63058 |
| 865 | 0.04325 | 0.01242 | 0.63075 |
| 866 | 0.05217 | 0.01717 | 0.63075 |
| 867 | 0.03383 | 0.00883 | 0.63083 |
| 868 | 0.06050 | 0.02292 | 0.63083 |
| 869 | 0.07208 | 0.60008 | 0.63083 |
| 870 | 0.06800 | 0.02967 | 0.63108 |
| 871 | 0.16508 | −0.20492 | 0.63108 |
| 872 | 0.02400 | 0.00642 | 0.63117 |
| 873 | 0.07158 | 0.60267 | 0.63142 |
| 874 | 0.01400 | 0.00517 | 0.63150 |
| 875 | 0.07467 | 0.03717 | 0.63150 |
| 876 | 0.15717 | 0.17092 | 0.63150 |
| 877 | 0.16450 | −0.20233 | 0.63158 |
| 878 | 0.29250 | 0.19742 | 0.63167 |
| 879 | 0.00392 | 0.00508 | 0.63200 |
| 880 | 0.07092 | 0.60533 | 0.63200 |
| 881 | 0.08042 | 0.04550 | 0.63200 |
| 882 | 0.16400 | −0.19983 | 0.63200 |
| 883 | 0.16358 | −0.19717 | 0.63250 |
| 884 | 0.07025 | 0.60800 | 0.63258 |
| 885 | 0.08508 | 0.05442 | 0.63258 |
| 886 | −0.00608 | 0.00633 | 0.63267 |
| 887 | 0.16325 | −0.19458 | 0.63300 |
| 888 | 0.06950 | 0.61058 | 0.63317 |
| 889 | 0.08867 | 0.06392 | 0.63325 |
| 890 | −0.01592 | 0.00867 | 0.63333 |
| 891 | 0.16217 | 0.18050 | 0.63342 |
| 892 | 0.16300 | −0.19200 | 0.63342 |
| 893 | 0.28425 | 0.20433 | 0.63358 |
| 894 | 0.06867 | 0.61317 | 0.63375 |
| 895 | 0.16283 | −0.18933 | 0.63392 |
| 896 | 0.09100 | 0.07367 | 0.63408 |
| 897 | −0.02533 | 0.01225 | 0.63417 |
| 898 | 0.06775 | 0.61575 | 0.63433 |
| 899 | 0.06675 | 0.61825 | 0.63492 |
| 900 | 0.09217 | 0.08367 | 0.63492 |
| 901 | −0.03425 | 0.01692 | 0.63508 |
| 902 | 0.16883 | 0.18983 | 0.63533 |
| 903 | 0.27458 | 0.21050 | 0.63542 |
| 904 | 0.06567 | 0.62075 | 0.63550 |
| 905 | −0.04250 | 0.02267 | 0.63600 |
| 906 | 0.06458 | 0.62325 | 0.63608 |
| 907 | 0.06342 | 0.62567 | 0.63667 |
| 908 | −0.05008 | 0.02933 | 0.63700 |
| 909 | 0.17717 | 0.19867 | 0.63700 |
| 910 | 0.26350 | 0.21550 | 0.63708 |
| 911 | 0.06217 | 0.62808 | 0.63725 |
| 912 | 0.06083 | 0.63042 | 0.63783 |
| 913 | 0.05942 | 0.63275 | 0.63833 |
| 914 | 0.18725 | 0.20650 | 0.63833 |
| 915 | 0.25125 | 0.21900 | 0.63842 |
| 916 | 0.05800 | 0.63500 | 0.63892 |
| 917 | 0.19875 | 0.21292 | 0.63925 |
| 918 | 0.23817 | 0.22058 | 0.63933 |
| 919 | 0.21142 | 0.21750 | 0.63983 |
| 920 | 0.22467 | 0.22008 | 0.63983 |
| 921 | 0.15225 | 0.13483 | 0.66550 |
| 922 | 0.31067 | 0.16558 | 0.66550 |
| 923 | 0.07567 | 0.57850 | 0.66683 |
| 924 | 0.07550 | 0.58117 | 0.66742 |
| 925 | 0.15333 | 0.14333 | 0.66742 |
| 926 | 0.30650 | 0.17317 | 0.66742 |
| 927 | 0.07525 | 0.58383 | 0.66800 |
| 928 | 0.07500 | 0.58650 | 0.66858 |
| 929 | 0.07458 | 0.58917 | 0.66917 |
| 930 | 0.15550 | 0.15242 | 0.66942 |
| 931 | 0.30108 | 0.18075 | 0.66942 |
| 932 | 0.07417 | 0.59183 | 0.66975 |
| 933 | 0.07358 | 0.59450 | 0.67033 |
| 934 | 0.07300 | 0.59708 | 0.67092 |
| 935 | 0.15900 | 0.16183 | 0.67142 |
| 936 | 0.29433 | 0.18817 | 0.67142 |
| 937 | 0.07233 | 0.59975 | 0.67150 |
| 938 | 0.07158 | 0.60233 | 0.67208 |
| 939 | 0.07075 | 0.60492 | 0.67267 |
| 940 | 0.06983 | 0.60750 | 0.67325 |
| 941 | 0.16400 | 0.17142 | 0.67333 |
| 942 | 0.28608 | 0.19517 | 0.67342 |
| 943 | 0.06883 | 0.61000 | 0.67383 |
| 944 | 0.06783 | 0.61250 | 0.67442 |
| 945 | 0.06667 | 0.61492 | 0.67500 |
| 946 | 0.17067 | 0.18075 | 0.67525 |
| 947 | 0.27642 | 0.20133 | 0.67525 |
| 948 | 0.06550 | 0.61742 | 0.67558 |
| 949 | 0.06425 | 0.61975 | 0.67608 |
| 950 | 0.06300 | 0.62208 | 0.67667 |
| 951 | 0.17900 | 0.18950 | 0.67692 |
| 952 | 0.26533 | 0.20633 | 0.67692 |
| 953 | 0.18283 | −0.24442 | 0.67708 |
| 954 | 0.06158 | 0.62442 | 0.67725 |
| 955 | 0.18133 | −0.24233 | 0.67750 |
| 956 | 0.06017 | 0.62667 | 0.67775 |
| 957 | 0.17983 | −0.24017 | 0.67800 |
| 958 | 0.18908 | 0.19733 | 0.67825 |
| 959 | 0.25308 | 0.20983 | 0.67825 |
| 960 | 0.17842 | −0.23800 | 0.67850 |
| 961 | 0.17700 | −0.23575 | 0.67900 |
| 962 | 0.20058 | 0.20375 | 0.67917 |
| 963 | 0.24000 | 0.21142 | 0.67917 |
| 964 | 0.17575 | −0.23350 | 0.67950 |
| 965 | 0.21325 | 0.20833 | 0.67967 |
| 966 | 0.22658 | 0.21100 | 0.67967 |
| 967 | 0.17458 | −0.23125 | 0.67992 |
| 968 | 0.17342 | −0.22892 | 0.68042 |
| 969 | 0.17233 | −0.22650 | 0.68092 |
| 970 | 0.17142 | −0.22408 | 0.68142 |
| 971 | 0.17050 | −0.22167 | 0.68192 |
| 972 | 0.04558 | 0.00742 | 0.68225 |
| 973 | 0.05458 | 0.01208 | 0.68225 |
| 974 | 0.03617 | 0.00383 | 0.68242 |
| 975 | 0.06292 | 0.01783 | 0.68242 |
| 976 | 0.16967 | −0.21925 | 0.68242 |
| 977 | 0.02625 | 0.00142 | 0.68267 |
| 978 | 0.07050 | 0.02458 | 0.68275 |
| 979 | 0.16892 | −0.21675 | 0.68292 |
| 980 | 0.01625 | 0.00017 | 0.68300 |
| 981 | 0.07725 | 0.03217 | 0.68308 |
| 982 | 0.16825 | −0.21425 | 0.68342 |
| 983 | 0.00608 | 0.00017 | 0.68350 |
| 984 | 0.08300 | 0.04050 | 0.68367 |
| 985 | 0.16767 | −0.21167 | 0.68392 |
| 986 | −0.00392 | 0.00142 | 0.68417 |
| 987 | 0.08767 | 0.04942 | 0.68433 |
| 988 | 0.16725 | −0.20917 | 0.68442 |

TABLE I-continued

Non-Dimensionalized (X Y Z/Span)

| N | X | Y | Z |
|---|---|---|---|
| 989 | −0.01375 | 0.00392 | 0.68492 |
| 990 | 0.16683 | −0.20658 | 0.68492 |
| 991 | 0.09125 | 0.05892 | 0.68508 |
| 992 | 0.16650 | −0.20400 | 0.68542 |
| 993 | −0.02317 | 0.00750 | 0.68575 |
| 994 | 0.09367 | 0.06875 | 0.68592 |
| 995 | 0.16625 | −0.20142 | 0.68592 |
| 996 | 0.16608 | −0.19883 | 0.68633 |
| 997 | −0.03208 | 0.01225 | 0.68658 |
| 998 | 0.09483 | 0.07875 | 0.68683 |
| 999 | −0.04042 | 0.01800 | 0.68758 |
| 1000 | −0.04792 | 0.02475 | 0.68867 |
| 1001 | 0.07775 | 0.57033 | 0.70575 |
| 1002 | 0.07758 | 0.57300 | 0.70633 |
| 1003 | 0.07733 | 0.57567 | 0.70692 |
| 1004 | 0.15408 | 0.12542 | 0.70692 |
| 1005 | 0.31258 | 0.15608 | 0.70700 |
| 1006 | 0.07700 | 0.57833 | 0.70750 |
| 1007 | 0.07667 | 0.58100 | 0.70808 |
| 1008 | 0.07617 | 0.58358 | 0.70867 |
| 1009 | 0.15517 | 0.13400 | 0.70883 |
| 1010 | 0.30842 | 0.16358 | 0.70892 |
| 1011 | 0.07567 | 0.58625 | 0.70925 |
| 1012 | 0.07508 | 0.58883 | 0.70975 |
| 1013 | 0.07442 | 0.59150 | 0.71033 |
| 1014 | 0.15733 | 0.14308 | 0.71075 |
| 1015 | 0.30300 | 0.17125 | 0.71083 |
| 1016 | 0.07367 | 0.59408 | 0.71092 |
| 1017 | 0.07283 | 0.59667 | 0.71150 |
| 1018 | 0.07192 | 0.59917 | 0.71208 |
| 1019 | 0.07100 | 0.60167 | 0.71267 |
| 1020 | 0.16083 | 0.15250 | 0.71275 |
| 1021 | 0.29625 | 0.17867 | 0.71283 |
| 1022 | 0.06992 | 0.60417 | 0.71325 |
| 1023 | 0.06883 | 0.60667 | 0.71383 |
| 1024 | 0.06767 | 0.60908 | 0.71442 |
| 1025 | 0.16583 | 0.16200 | 0.71467 |
| 1026 | 0.28800 | 0.18567 | 0.71475 |
| 1027 | 0.06642 | 0.61142 | 0.71500 |
| 1028 | 0.06508 | 0.61375 | 0.71550 |
| 1029 | 0.06375 | 0.61608 | 0.71608 |
| 1030 | 0.17250 | 0.17142 | 0.71650 |
| 1031 | 0.06233 | 0.61833 | 0.71658 |
| 1032 | 0.27833 | 0.19183 | 0.71658 |
| 1033 | 0.18092 | 0.18017 | 0.71808 |
| 1034 | 0.26725 | 0.19683 | 0.71817 |
| 1035 | 0.19100 | 0.18800 | 0.71942 |
| 1036 | 0.25500 | 0.20033 | 0.71950 |
| 1037 | 0.20250 | 0.19433 | 0.72042 |
| 1038 | 0.24192 | 0.20200 | 0.72042 |
| 1039 | 0.21517 | 0.19900 | 0.72092 |
| 1040 | 0.22850 | 0.20158 | 0.72092 |
| 1041 | 0.18575 | −0.25350 | 0.72917 |
| 1042 | 0.18417 | −0.25142 | 0.72967 |
| 1043 | 0.18275 | −0.24933 | 0.73008 |
| 1044 | 0.18133 | −0.24717 | 0.73058 |
| 1045 | 0.18000 | −0.24500 | 0.73108 |
| 1046 | 0.17875 | −0.24275 | 0.73150 |
| 1047 | 0.17758 | −0.24050 | 0.73200 |
| 1048 | 0.17642 | −0.23817 | 0.73250 |
| 1049 | 0.17542 | −0.23583 | 0.73292 |
| 1050 | 0.17450 | −0.23342 | 0.73342 |
| 1051 | 0.17358 | −0.23108 | 0.73392 |
| 1052 | 0.04792 | 0.00217 | 0.73408 |
| 1053 | 0.05692 | 0.00683 | 0.73408 |
| 1054 | 0.03842 | −0.00142 | 0.73417 |
| 1055 | 0.06533 | 0.01267 | 0.73425 |
| 1056 | 0.02850 | −0.00375 | 0.73442 |
| 1057 | 0.17275 | −0.22858 | 0.73442 |
| 1058 | 0.07300 | 0.01933 | 0.73458 |
| 1059 | 0.01842 | −0.00492 | 0.73475 |
| 1060 | 0.17208 | −0.22617 | 0.73492 |
| 1061 | 0.07975 | 0.02700 | 0.73500 |
| 1062 | 0.00825 | −0.00492 | 0.73525 |
| 1063 | 0.17142 | −0.22367 | 0.73533 |
| 1064 | 0.08550 | 0.03533 | 0.73558 |
| 1065 | −0.00183 | −0.00358 | 0.73583 |
| 1066 | 0.17083 | −0.22117 | 0.73583 |
| 1067 | 0.09025 | 0.04433 | 0.73625 |
| 1068 | 0.17033 | −0.21867 | 0.73633 |
| 1069 | −0.01167 | −0.00108 | 0.73658 |
| 1070 | 0.16992 | −0.21617 | 0.73683 |
| 1071 | 0.09375 | 0.05383 | 0.73700 |
| 1072 | 0.16958 | −0.21358 | 0.73725 |
| 1073 | −0.02108 | 0.00258 | 0.73733 |
| 1074 | 0.16933 | −0.21108 | 0.73775 |
| 1075 | 0.09617 | 0.06367 | 0.73792 |
| 1076 | 0.16917 | −0.20850 | 0.73817 |
| 1077 | −0.03008 | 0.00742 | 0.73825 |
| 1078 | 0.09733 | 0.07375 | 0.73883 |
| 1079 | −0.03833 | 0.01325 | 0.73925 |
| 1080 | −0.04575 | 0.02008 | 0.74025 |
| 1081 | 0.07975 | 0.56225 | 0.74475 |
| 1082 | 0.07958 | 0.56483 | 0.74533 |
| 1083 | 0.07933 | 0.56750 | 0.74583 |
| 1084 | 0.07908 | 0.57017 | 0.74642 |
| 1085 | 0.07867 | 0.57283 | 0.74700 |
| 1086 | 0.07825 | 0.57542 | 0.74758 |
| 1087 | 0.15575 | 0.11650 | 0.74783 |
| 1088 | 0.07767 | 0.57808 | 0.74817 |
| 1089 | 0.31425 | 0.14692 | 0.74833 |
| 1090 | 0.07708 | 0.58067 | 0.74867 |
| 1091 | 0.07642 | 0.58325 | 0.74925 |
| 1092 | 0.15683 | 0.12508 | 0.74967 |
| 1093 | 0.07567 | 0.58583 | 0.74983 |
| 1094 | 0.31008 | 0.15450 | 0.75017 |
| 1095 | 0.07483 | 0.58842 | 0.75042 |
| 1096 | 0.07400 | 0.59100 | 0.75100 |
| 1097 | 0.15900 | 0.13417 | 0.75150 |
| 1098 | 0.07300 | 0.59350 | 0.75158 |
| 1099 | 0.30467 | 0.16208 | 0.75200 |
| 1100 | 0.07200 | 0.59592 | 0.75208 |
| 1101 | 0.07092 | 0.59842 | 0.75267 |
| 1102 | 0.06975 | 0.60083 | 0.75325 |
| 1103 | 0.16250 | 0.14358 | 0.75333 |
| 1104 | 0.06850 | 0.60317 | 0.75383 |
| 1105 | 0.29792 | 0.16958 | 0.75383 |
| 1106 | 0.06725 | 0.60550 | 0.75433 |
| 1107 | 0.06583 | 0.60783 | 0.75492 |
| 1108 | 0.16750 | 0.15317 | 0.75525 |
| 1109 | 0.06450 | 0.61008 | 0.75542 |
| 1110 | 0.28975 | 0.17658 | 0.75558 |
| 1111 | 0.17417 | 0.16250 | 0.75692 |
| 1112 | 0.28000 | 0.18283 | 0.75733 |
| 1113 | 0.18258 | 0.17133 | 0.75850 |
| 1114 | 0.26900 | 0.18792 | 0.75883 |
| 1115 | 0.19267 | 0.17917 | 0.75983 |
| 1116 | 0.25675 | 0.19142 | 0.76000 |
| 1117 | 0.20417 | 0.18550 | 0.76075 |
| 1118 | 0.24367 | 0.19308 | 0.76083 |
| 1119 | 0.21683 | 0.19017 | 0.76125 |
| 1120 | 0.23017 | 0.19267 | 0.76125 |
| 1121 | 0.18817 | −0.26242 | 0.78142 |
| 1122 | 0.18667 | −0.26033 | 0.78192 |
| 1123 | 0.18525 | −0.25825 | 0.78233 |
| 1124 | 0.18392 | −0.25617 | 0.78275 |
| 1125 | 0.18258 | −0.25400 | 0.78325 |
| 1126 | 0.18133 | −0.25175 | 0.78367 |
| 1127 | 0.08167 | 0.55425 | 0.78383 |
| 1128 | 0.18017 | −0.24950 | 0.78417 |
| 1129 | 0.08150 | 0.55683 | 0.78433 |
| 1130 | 0.17908 | −0.24725 | 0.78458 |
| 1131 | 0.08133 | 0.55950 | 0.78492 |
| 1132 | 0.17808 | −0.24492 | 0.78508 |
| 1133 | 0.08100 | 0.56217 | 0.78542 |
| 1134 | 0.17717 | −0.24258 | 0.78558 |
| 1135 | 0.05000 | −0.00300 | 0.78600 |
| 1136 | 0.08067 | 0.56475 | 0.78600 |
| 1137 | 0.17625 | −0.24017 | 0.78600 |
| 1138 | 0.04042 | −0.00650 | 0.78608 |
| 1139 | 0.05908 | 0.00175 | 0.78608 |
| 1140 | 0.03050 | −0.00892 | 0.78625 |

TABLE I-continued

Non-Dimensionalized (X Y Z/Span)

| N | X | Y | Z |
|---|---|---|---|
| 1141 | 0.06750 | 0.00750 | 0.78625 |
| 1142 | 0.17550 | −0.23775 | 0.78650 |
| 1143 | 0.02033 | −0.01000 | 0.78658 |
| 1144 | 0.07517 | 0.01425 | 0.78658 |
| 1145 | 0.08017 | 0.56742 | 0.78658 |
| 1146 | 0.17475 | −0.23533 | 0.78692 |
| 1147 | 0.01017 | −0.00992 | 0.78700 |
| 1148 | 0.07967 | 0.57000 | 0.78708 |
| 1149 | 0.08192 | 0.02183 | 0.78708 |
| 1150 | 0.17417 | −0.23292 | 0.78742 |
| 1151 | 0.00000 | −0.00858 | 0.78758 |
| 1152 | 0.07908 | 0.57267 | 0.78767 |
| 1153 | 0.08775 | 0.03025 | 0.78767 |
| 1154 | 0.17358 | −0.23042 | 0.78792 |
| 1155 | 0.07842 | 0.57525 | 0.78825 |
| 1156 | −0.00983 | −0.00600 | 0.78833 |
| 1157 | 0.09250 | 0.03925 | 0.78833 |
| 1158 | 0.17308 | −0.22792 | 0.78833 |
| 1159 | 0.07767 | 0.57775 | 0.78875 |
| 1160 | 0.17267 | −0.22542 | 0.78883 |
| 1161 | −0.01933 | −0.00225 | 0.78908 |
| 1162 | 0.09608 | 0.04875 | 0.78908 |
| 1163 | 0.17233 | −0.22292 | 0.78925 |
| 1164 | 0.07683 | 0.58033 | 0.78933 |
| 1165 | 0.17208 | −0.22042 | 0.78975 |
| 1166 | 0.07600 | 0.58283 | 0.78992 |
| 1167 | −0.02825 | 0.00267 | 0.79000 |
| 1168 | 0.09850 | 0.05867 | 0.79000 |
| 1169 | 0.17192 | −0.21792 | 0.79017 |
| 1170 | 0.07500 | 0.58533 | 0.79042 |
| 1171 | −0.03650 | 0.00858 | 0.79092 |
| 1172 | 0.09967 | 0.06875 | 0.79092 |
| 1173 | 0.07400 | 0.58783 | 0.79100 |
| 1174 | 0.07292 | 0.59025 | 0.79150 |
| 1175 | −0.04392 | 0.01550 | 0.79192 |
| 1176 | 0.07175 | 0.59267 | 0.79208 |
| 1177 | 0.07050 | 0.59508 | 0.79258 |
| 1178 | 0.06925 | 0.59742 | 0.79317 |
| 1179 | 0.06792 | 0.59967 | 0.79367 |
| 1180 | 0.06650 | 0.60192 | 0.79417 |
| 1181 | 0.15758 | 0.10583 | 0.79958 |
| 1182 | 0.15858 | 0.11450 | 0.80100 |
| 1183 | 0.31608 | 0.13583 | 0.80208 |
| 1184 | 0.16075 | 0.12367 | 0.80250 |
| 1185 | 0.31192 | 0.14350 | 0.80342 |
| 1186 | 0.16425 | 0.13317 | 0.80400 |
| 1187 | 0.30658 | 0.15125 | 0.80475 |
| 1188 | 0.16925 | 0.14275 | 0.80550 |
| 1189 | 0.29975 | 0.15883 | 0.80608 |
| 1190 | 0.17592 | 0.15225 | 0.80692 |
| 1191 | 0.29158 | 0.16592 | 0.80742 |
| 1192 | 0.18433 | 0.16108 | 0.80825 |
| 1193 | 0.28183 | 0.17225 | 0.80858 |
| 1194 | 0.19433 | 0.16892 | 0.80942 |
| 1195 | 0.27075 | 0.17742 | 0.80958 |
| 1196 | 0.20592 | 0.17533 | 0.81025 |
| 1197 | 0.25850 | 0.18108 | 0.81042 |
| 1198 | 0.21858 | 0.17992 | 0.81083 |
| 1199 | 0.24542 | 0.18283 | 0.81092 |
| 1200 | 0.23192 | 0.18242 | 0.81108 |
| 1201 | 0.06925 | 0.00092 | 0.81900 |
| 1202 | 0.06083 | −0.00467 | 0.81917 |
| 1203 | 0.07700 | 0.00742 | 0.81917 |
| 1204 | 0.05183 | −0.00925 | 0.81975 |
| 1205 | 0.08392 | 0.01475 | 0.81983 |
| 1206 | 0.04242 | −0.01275 | 0.82067 |
| 1207 | 0.08992 | 0.02275 | 0.82083 |
| 1208 | 0.03267 | −0.01508 | 0.82200 |
| 1209 | 0.09500 | 0.03142 | 0.82217 |
| 1210 | 0.08342 | 0.54650 | 0.82317 |
| 1211 | 0.08325 | 0.54917 | 0.82367 |
| 1212 | 0.02275 | −0.01625 | 0.82375 |
| 1213 | 0.09892 | 0.04058 | 0.82392 |
| 1214 | 0.08308 | 0.55175 | 0.82417 |
| 1215 | 0.08275 | 0.55442 | 0.82467 |
| 1216 | 0.08242 | 0.55708 | 0.82517 |
| 1217 | 0.08192 | 0.55967 | 0.82567 |
| 1218 | 0.01283 | −0.01625 | 0.82575 |
| 1219 | 0.10175 | 0.05008 | 0.82592 |
| 1220 | 0.08142 | 0.56225 | 0.82625 |
| 1221 | 0.08083 | 0.56492 | 0.82675 |
| 1222 | 0.08017 | 0.56750 | 0.82725 |
| 1223 | 0.07942 | 0.57000 | 0.82775 |
| 1224 | 0.00308 | −0.01508 | 0.82808 |
| 1225 | 0.07858 | 0.57258 | 0.82825 |
| 1226 | 0.10342 | 0.05975 | 0.82825 |
| 1227 | 0.07775 | 0.57508 | 0.82883 |
| 1228 | 0.07675 | 0.57758 | 0.82933 |
| 1229 | 0.07575 | 0.58008 | 0.82983 |
| 1230 | 0.07467 | 0.58250 | 0.83033 |
| 1231 | −0.00642 | −0.01275 | 0.83067 |
| 1232 | 0.07358 | 0.58492 | 0.83083 |
| 1233 | 0.07233 | 0.58725 | 0.83133 |
| 1234 | 0.17233 | −0.22467 | 0.83167 |
| 1235 | 0.17258 | −0.22708 | 0.83175 |
| 1236 | 0.07108 | 0.58958 | 0.83183 |
| 1237 | 0.17283 | −0.22950 | 0.83183 |
| 1238 | 0.17317 | −0.23200 | 0.83192 |
| 1239 | 0.17358 | −0.23442 | 0.83200 |
| 1240 | 0.17408 | −0.23683 | 0.83208 |
| 1241 | 0.17467 | −0.23925 | 0.83217 |
| 1242 | 0.17533 | −0.24158 | 0.83225 |
| 1243 | 0.06975 | 0.59192 | 0.83233 |
| 1244 | 0.17600 | −0.24392 | 0.83242 |
| 1245 | 0.17675 | −0.24625 | 0.83250 |
| 1246 | 0.17758 | −0.24858 | 0.83258 |
| 1247 | 0.06833 | 0.59417 | 0.83275 |
| 1248 | 0.17850 | −0.25092 | 0.83275 |
| 1249 | 0.17950 | −0.25317 | 0.83283 |
| 1250 | 0.18050 | −0.25533 | 0.83300 |
| 1251 | 0.18167 | −0.25758 | 0.83317 |
| 1252 | 0.18283 | −0.25975 | 0.83333 |
| 1253 | −0.01542 | −0.00933 | 0.83342 |
| 1254 | 0.18408 | −0.26183 | 0.83342 |
| 1255 | 0.18533 | −0.26392 | 0.83358 |
| 1256 | 0.18667 | −0.26600 | 0.83375 |
| 1257 | 0.18808 | −0.26800 | 0.83392 |
| 1258 | −0.02400 | −0.00475 | 0.83642 |
| 1259 | −0.03183 | 0.00083 | 0.83958 |
| 1260 | 0.08033 | −0.00608 | 0.84250 |
| 1261 | −0.03883 | 0.00725 | 0.84275 |
| 1262 | 0.07258 | −0.01200 | 0.84275 |
| 1263 | 0.08750 | 0.00050 | 0.84292 |
| 1264 | 0.06442 | −0.01708 | 0.84367 |
| 1265 | 0.09400 | 0.00767 | 0.84408 |
| 1266 | 0.05575 | −0.02133 | 0.84525 |
| 1267 | 0.09975 | 0.01533 | 0.84583 |
| 1268 | 0.04692 | −0.02467 | 0.84742 |
| 1269 | 0.10458 | 0.02342 | 0.84825 |
| 1270 | 0.03792 | −0.02708 | 0.85033 |
| 1271 | 0.10850 | 0.03175 | 0.85133 |
| 1272 | 0.02892 | −0.02858 | 0.85375 |
| 1273 | 0.11150 | 0.04033 | 0.85492 |
| 1274 | 0.02008 | −0.02900 | 0.85767 |
| 1275 | 0.08575 | 0.53758 | 0.85942 |
| 1276 | 0.09033 | −0.02175 | 0.85975 |
| 1277 | 0.09708 | −0.01592 | 0.86008 |
| 1278 | 0.16533 | −0.21467 | 0.86017 |
| 1279 | 0.08325 | −0.02717 | 0.86025 |
| 1280 | 0.08567 | 0.54017 | 0.86025 |
| 1281 | 0.08550 | 0.54275 | 0.86108 |
| 1282 | 0.10350 | −0.00975 | 0.86117 |
| 1283 | 0.16517 | −0.21717 | 0.86125 |
| 1284 | 0.07592 | −0.03208 | 0.86158 |
| 1285 | 0.08517 | 0.54525 | 0.86192 |
| 1286 | 0.01142 | −0.02842 | 0.86208 |
| 1287 | 0.16508 | −0.21958 | 0.86233 |
| 1288 | 0.08483 | 0.54783 | 0.86275 |
| 1289 | 0.10933 | −0.00333 | 0.86300 |
| 1290 | 0.16517 | −0.22200 | 0.86342 |
| 1291 | 0.06842 | −0.03642 | 0.86358 |
| 1292 | 0.08450 | 0.55042 | 0.86358 |

TABLE I-continued

Non-Dimensionalized (X Y Z/Span)

| N | X | Y | Z |
|---|---|---|---|
| 1293 | 0.08400 | 0.55300 | 0.86442 |
| 1294 | 0.16525 | −0.22442 | 0.86458 |
| 1295 | 0.08342 | 0.55550 | 0.86533 |
| 1296 | 0.11467 | 0.00342 | 0.86567 |
| 1297 | 0.16542 | −0.22683 | 0.86575 |
| 1298 | 0.08283 | 0.55808 | 0.86617 |
| 1299 | 0.06083 | −0.04025 | 0.86642 |
| 1300 | 0.16567 | −0.22917 | 0.86692 |
| 1301 | 0.00308 | −0.02692 | 0.86700 |
| 1302 | 0.08208 | 0.56058 | 0.86700 |
| 1303 | 0.08133 | 0.56308 | 0.86792 |
| 1304 | 0.16600 | −0.23150 | 0.86817 |
| 1305 | 0.08050 | 0.56550 | 0.86875 |
| 1306 | 0.11942 | 0.01017 | 0.86900 |
| 1307 | 0.16642 | −0.23383 | 0.86933 |
| 1308 | 0.07958 | 0.56792 | 0.86967 |
| 1309 | 0.05325 | −0.04342 | 0.86992 |
| 1310 | 0.17917 | 0.20408 | 0.87008 |
| 1311 | 0.07858 | 0.57033 | 0.87050 |
| 1312 | 0.18808 | 0.20858 | 0.87050 |
| 1313 | 0.16692 | −0.23617 | 0.87058 |
| 1314 | 0.17083 | 0.19925 | 0.87067 |
| 1315 | 0.07750 | 0.57275 | 0.87142 |
| 1316 | 0.16750 | −0.23842 | 0.87192 |
| 1317 | 0.19742 | 0.21250 | 0.87200 |
| 1318 | −0.00467 | −0.02433 | 0.87217 |
| 1319 | 0.16317 | 0.19425 | 0.87217 |
| 1320 | 0.07642 | 0.57508 | 0.87225 |
| 1321 | 0.10775 | −0.04283 | 0.87283 |
| 1322 | 0.07525 | 0.57733 | 0.87308 |
| 1323 | 0.11375 | −0.03783 | 0.87308 |
| 1324 | 0.16817 | −0.24067 | 0.87317 |
| 1325 | 0.10158 | −0.04767 | 0.87325 |
| 1326 | 0.07400 | 0.57958 | 0.87392 |
| 1327 | 0.11958 | −0.03267 | 0.87408 |
| 1328 | 0.04575 | −0.04592 | 0.87417 |
| 1329 | 0.15625 | 0.18908 | 0.87433 |
| 1330 | 0.09533 | −0.05225 | 0.87442 |
| 1331 | 0.16892 | −0.24283 | 0.87450 |
| 1332 | 0.20700 | 0.21583 | 0.87458 |
| 1333 | 0.07267 | 0.58183 | 0.87483 |
| 1334 | 0.07125 | 0.58400 | 0.87567 |
| 1335 | 0.12508 | −0.02733 | 0.87575 |
| 1336 | 0.16967 | −0.24500 | 0.87583 |
| 1337 | 0.08908 | −0.05658 | 0.87625 |
| 1338 | 0.15025 | 0.18392 | 0.87708 |
| 1339 | 0.17058 | −0.24717 | 0.87717 |
| 1340 | 0.15350 | −0.18733 | 0.87733 |
| 1341 | −0.01192 | −0.02083 | 0.87767 |
| 1342 | 0.21658 | 0.21842 | 0.87825 |
| 1343 | 0.17158 | −0.24925 | 0.87850 |
| 1344 | 0.08283 | −0.06067 | 0.87875 |
| 1345 | 0.03850 | −0.04767 | 0.87900 |
| 1346 | 0.15242 | −0.18992 | 0.87917 |
| 1347 | 0.17258 | −0.25133 | 0.87983 |
| 1348 | 0.12992 | −0.06833 | 0.87992 |
| 1349 | 0.12467 | −0.07250 | 0.88017 |
| 1350 | 0.14492 | 0.17883 | 0.88033 |
| 1351 | 0.11950 | −0.07658 | 0.88092 |
| 1352 | 0.15150 | −0.19250 | 0.88108 |
| 1353 | 0.17367 | −0.25333 | 0.88125 |
| 1354 | 0.07667 | −0.06433 | 0.88183 |
| 1355 | 0.11433 | −0.08058 | 0.88217 |
| 1356 | 0.13558 | −0.11008 | 0.88258 |
| 1357 | 0.17483 | −0.25525 | 0.88258 |
| 1358 | 0.14350 | −0.15067 | 0.88267 |
| 1359 | 0.22600 | 0.22008 | 0.88300 |
| 1360 | 0.15067 | −0.19508 | 0.88308 |
| 1361 | −0.01850 | −0.01650 | 0.88333 |
| 1362 | 0.10925 | −0.08450 | 0.88400 |
| 1363 | 0.17608 | −0.25717 | 0.88400 |
| 1364 | 0.13158 | −0.11350 | 0.88417 |
| 1365 | 0.03142 | −0.04875 | 0.88442 |
| 1366 | 0.14100 | −0.15358 | 0.88475 |
| 1367 | 0.14992 | −0.19758 | 0.88517 |
| 1368 | 0.07058 | −0.06767 | 0.88558 |
| 1369 | 0.12767 | −0.11683 | 0.88608 |
| 1370 | 0.10425 | −0.08825 | 0.88633 |
| 1371 | 0.13867 | −0.15650 | 0.88708 |
| 1372 | 0.14933 | −0.20008 | 0.88733 |
| 1373 | 0.09192 | 0.51992 | 0.88808 |
| 1374 | 0.12392 | −0.12017 | 0.88833 |
| 1375 | 0.23492 | 0.22092 | 0.88858 |
| 1376 | −0.02433 | −0.01133 | 0.88917 |
| 1377 | 0.09933 | −0.09175 | 0.88917 |
| 1378 | 0.13642 | −0.15933 | 0.88950 |
| 1379 | 0.14883 | −0.20258 | 0.88950 |
| 1380 | 0.09208 | 0.52233 | 0.88958 |
| 1381 | 0.06475 | −0.07058 | 0.88992 |
| 1382 | 0.02475 | −0.04908 | 0.89033 |
| 1383 | 0.12033 | −0.12342 | 0.89092 |
| 1384 | 0.09217 | 0.52483 | 0.89117 |
| 1385 | 0.14842 | −0.20500 | 0.89175 |
| 1386 | 0.13433 | −0.16217 | 0.89217 |
| 1387 | 0.09467 | −0.09517 | 0.89242 |
| 1388 | 0.09217 | 0.52725 | 0.89267 |
| 1389 | 0.11683 | −0.12658 | 0.89383 |
| 1390 | 0.14817 | −0.20742 | 0.89408 |
| 1391 | 0.09200 | 0.52967 | 0.89425 |
| 1392 | 0.05917 | −0.07308 | 0.89483 |
| 1393 | 0.13242 | −0.16492 | 0.89500 |
| 1394 | 0.24317 | 0.22092 | 0.89500 |
| 1395 | 0.09183 | 0.53208 | 0.89583 |
| 1396 | 0.09008 | −0.09833 | 0.89617 |
| 1397 | 0.14800 | −0.20975 | 0.89650 |
| 1398 | 0.01850 | −0.04867 | 0.89667 |
| 1399 | 0.11358 | −0.12958 | 0.89700 |
| 1400 | 0.09158 | 0.53450 | 0.89742 |
| 1401 | 0.13067 | −0.16758 | 0.89792 |
| 1402 | 0.14800 | −0.21208 | 0.89892 |
| 1403 | 0.09125 | 0.53683 | 0.89900 |
| 1404 | 0.05383 | −0.07508 | 0.90025 |
| 1405 | 0.08583 | −0.10125 | 0.90025 |
| 1406 | 0.11050 | −0.13250 | 0.90042 |
| 1407 | 0.09075 | 0.53925 | 0.90067 |
| 1408 | 0.12908 | −0.17017 | 0.90108 |
| 1409 | 0.14808 | −0.21433 | 0.90142 |
| 1410 | 0.25067 | 0.22000 | 0.90200 |
| 1411 | 0.09025 | 0.54158 | 0.90233 |
| 1412 | 0.01275 | −0.04758 | 0.90342 |
| 1413 | 0.08967 | 0.54392 | 0.90392 |
| 1414 | 0.14825 | −0.21650 | 0.90392 |
| 1415 | 0.10758 | −0.13533 | 0.90417 |
| 1416 | 0.12767 | −0.17275 | 0.90433 |
| 1417 | 0.08175 | −0.10400 | 0.90483 |
| 1418 | 0.08900 | 0.54617 | 0.90558 |
| 1419 | 0.04892 | −0.07658 | 0.90608 |
| 1420 | 0.14858 | −0.21867 | 0.90650 |
| 1421 | 0.08825 | 0.54842 | 0.90725 |
| 1422 | 0.12642 | −0.17525 | 0.90767 |
| 1423 | 0.10492 | −0.13800 | 0.90817 |
| 1424 | 0.08742 | 0.55067 | 0.90892 |
| 1425 | 0.14900 | −0.22075 | 0.90908 |
| 1426 | 0.25717 | 0.21842 | 0.90942 |
| 1427 | 0.10192 | 0.49308 | 0.90958 |
| 1428 | 0.07800 | −0.10642 | 0.90975 |
| 1429 | 0.00758 | −0.04575 | 0.91042 |
| 1430 | 0.08650 | 0.55283 | 0.91058 |
| 1431 | 0.12533 | −0.17758 | 0.91117 |
| 1432 | 0.10250 | 0.49533 | 0.91167 |
| 1433 | 0.14958 | −0.22275 | 0.91175 |
| 1434 | 0.08550 | 0.55500 | 0.91225 |
| 1435 | 0.04425 | −0.07767 | 0.91233 |
| 1436 | 0.10250 | −0.14050 | 0.91242 |
| 1437 | 0.13483 | 0.32800 | 0.91258 |
| 1438 | 0.10300 | 0.49758 | 0.91383 |
| 1439 | 0.08442 | 0.55708 | 0.91392 |
| 1440 | 0.13983 | 0.33058 | 0.91408 |
| 1441 | 0.15025 | −0.22467 | 0.91433 |
| 1442 | 0.12442 | −0.17992 | 0.91483 |
| 1443 | 0.07450 | −0.10850 | 0.91500 |
| 1444 | 0.08325 | 0.55917 | 0.91558 |

TABLE I-continued

Non-Dimensionalized (X Y Z/Span)

| N | X | Y | Z |
|---|---|---|---|
| 1445 | 0.10350 | 0.49983 | 0.91600 |
| 1446 | 0.14483 | 0.33308 | 0.91608 |
| 1447 | 0.10033 | −0.14283 | 0.91683 |
| 1448 | 0.26275 | 0.21608 | 0.91692 |
| 1449 | 0.15100 | −0.22658 | 0.91708 |
| 1450 | 0.08208 | 0.56117 | 0.91725 |
| 1451 | 0.00300 | −0.04317 | 0.91767 |
| 1452 | 0.10375 | 0.50208 | 0.91825 |
| 1453 | 0.12367 | −0.18208 | 0.91850 |
| 1454 | 0.14983 | 0.33550 | 0.91850 |
| 1455 | 0.08075 | 0.56317 | 0.91883 |
| 1456 | 0.04008 | −0.07825 | 0.91900 |
| 1457 | 0.15183 | −0.22833 | 0.91975 |
| 1458 | 0.10400 | 0.50433 | 0.92050 |
| 1459 | 0.07133 | −0.11033 | 0.92058 |
| 1460 | 0.15475 | 0.33792 | 0.92142 |
| 1461 | 0.09842 | −0.14508 | 0.92150 |
| 1462 | 0.11367 | 0.45683 | 0.92217 |
| 1463 | 0.12317 | −0.18417 | 0.92233 |
| 1464 | 0.15283 | −0.23008 | 0.92242 |
| 1465 | 0.10417 | 0.50658 | 0.92275 |
| 1466 | 0.12517 | 0.40717 | 0.92383 |
| 1467 | 0.26725 | 0.21325 | 0.92450 |
| 1468 | 0.15958 | 0.34017 | 0.92467 |
| 1469 | 0.11508 | 0.45900 | 0.92475 |
| 1470 | −0.00092 | −0.04000 | 0.92500 |
| 1471 | 0.10417 | 0.50875 | 0.92508 |
| 1472 | 0.03642 | −0.07833 | 0.92583 |
| 1473 | 0.12275 | −0.18617 | 0.92625 |
| 1474 | 0.09667 | −0.14708 | 0.92633 |
| 1475 | 0.06850 | −0.11192 | 0.92642 |
| 1476 | 0.12792 | 0.40933 | 0.92658 |
| 1477 | 0.10408 | 0.51100 | 0.92742 |
| 1478 | 0.11642 | 0.46108 | 0.92742 |
| 1479 | 0.16425 | 0.34233 | 0.92842 |
| 1480 | 0.13067 | 0.41142 | 0.92950 |
| 1481 | 0.10392 | 0.51308 | 0.92983 |
| 1482 | 0.11758 | 0.46325 | 0.93017 |
| 1483 | 0.12258 | −0.18800 | 0.93017 |
| 1484 | 0.09525 | −0.14883 | 0.93133 |
| 1485 | 0.27083 | 0.21000 | 0.93200 |
| 1486 | 0.10367 | 0.51525 | 0.93225 |
| 1487 | 0.06600 | −0.11308 | 0.93242 |
| 1488 | 0.13325 | 0.41350 | 0.93258 |
| 1489 | 0.16867 | 0.34433 | 0.93258 |
| 1490 | 0.03317 | −0.07792 | 0.93300 |
| 1491 | 0.11867 | 0.46533 | 0.93300 |
| 1492 | 0.12258 | −0.18975 | 0.93417 |
| 1493 | 0.10325 | 0.51733 | 0.93467 |
| 1494 | 0.11958 | 0.46742 | 0.93592 |
| 1495 | 0.13567 | 0.41550 | 0.93592 |
| 1496 | 0.09408 | −0.15050 | 0.93642 |
| 1497 | 0.10275 | 0.51933 | 0.93708 |
| 1498 | 0.17292 | 0.34608 | 0.93708 |
| 1499 | 0.12283 | −0.19133 | 0.93825 |
| 1500 | 0.06392 | −0.11400 | 0.93875 |
| 1501 | 0.12042 | 0.46942 | 0.93892 |
| 1502 | 0.27350 | 0.20642 | 0.93917 |
| 1503 | 0.13800 | 0.41750 | 0.93933 |
| 1504 | 0.10217 | 0.52133 | 0.93950 |
| 1505 | 0.03050 | −0.07700 | 0.94033 |
| 1506 | 0.09325 | −0.15183 | 0.94167 |
| 1507 | 0.12117 | 0.47142 | 0.94192 |
| 1508 | 0.10150 | 0.52325 | 0.94200 |
| 1509 | 0.17683 | 0.34775 | 0.94200 |
| 1510 | 0.12317 | −0.19283 | 0.94233 |
| 1511 | 0.14008 | 0.41942 | 0.94300 |
| 1512 | 0.10075 | 0.52517 | 0.94442 |
| 1513 | 0.12175 | 0.47342 | 0.94508 |
| 1514 | 0.06225 | −0.11458 | 0.94517 |
| 1515 | 0.27533 | 0.20267 | 0.94600 |
| 1516 | 0.12375 | −0.19417 | 0.94650 |
| 1517 | 0.09992 | 0.52700 | 0.94683 |
| 1518 | 0.14208 | 0.42125 | 0.94683 |
| 1519 | 0.09258 | −0.15308 | 0.94700 |
| 1520 | 0.18042 | 0.34917 | 0.94725 |

TABLE I-continued

Non-Dimensionalized (X Y Z/Span)

| N | X | Y | Z |
|---|---|---|---|
| 1521 | 0.02833 | −0.07558 | 0.94767 |
| 1522 | 0.12217 | 0.47533 | 0.94825 |
| 1523 | 0.09892 | 0.52883 | 0.94933 |
| 1524 | 0.14383 | 0.42308 | 0.95075 |
| 1525 | 0.12242 | 0.47725 | 0.95150 |
| 1526 | 0.06092 | −0.11475 | 0.95167 |
| 1527 | 0.09792 | 0.53058 | 0.95175 |
| 1528 | 0.09233 | −0.15408 | 0.95233 |
| 1529 | 0.18375 | 0.35033 | 0.95267 |
| 1530 | 0.09675 | 0.53225 | 0.95408 |
| 1531 | 0.12258 | 0.47908 | 0.95475 |
| 1532 | 0.14542 | 0.42475 | 0.95483 |
| 1533 | 0.09225 | −0.15483 | 0.95783 |
| 1534 | 0.12258 | 0.48083 | 0.95808 |
| 1535 | 0.06000 | −0.11467 | 0.95825 |
| 1536 | 0.18658 | 0.35133 | 0.95842 |
| 1537 | 0.14675 | 0.42633 | 0.95900 |
| 1538 | 0.12250 | 0.48250 | 0.96133 |
| 1539 | 0.14792 | 0.42792 | 0.96333 |
| 1540 | 0.18908 | 0.35208 | 0.96425 |
| 1541 | 0.12225 | 0.48417 | 0.96467 |
| 1542 | 0.14883 | 0.42933 | 0.96767 |
| 1543 | 0.12183 | 0.48567 | 0.96808 |
| 1544 | 0.19117 | 0.35258 | 0.97025 |
| 1545 | 0.12133 | 0.48717 | 0.97142 |
| 1546 | 0.14950 | 0.43058 | 0.97208 |
| 1547 | 0.12067 | 0.48858 | 0.97467 |
| 1548 | 0.19283 | 0.35283 | 0.97625 |
| 1549 | 0.15000 | 0.43183 | 0.97658 |
| 1550 | 0.11992 | 0.48992 | 0.97800 |
| 1551 | 0.15025 | 0.43292 | 0.98100 |
| 1552 | 0.11900 | 0.49117 | 0.98125 |
| 1553 | 0.19408 | 0.35292 | 0.98225 |
| 1554 | 0.15033 | 0.43383 | 0.98550 |
| 1555 | 0.19492 | 0.35275 | 0.98825 |
| 1556 | 0.15025 | 0.43475 | 0.98992 |
| 1557 | 0.19542 | 0.35242 | 0.99417 |
| 1558 | 0.14983 | 0.43542 | 0.99433 |
| 1559 | 0.14933 | 0.43608 | 0.99875 |
| 1560 | 0.19550 | 0.35183 | 1.00000 |

TABLE II

Non-Dimensionalized (X Y Z/Span)

| N | X | Y | Z |
|---|---|---|---|
| 1 | 0.00000 | 0.00000 | 0.00000 |
| 2 | 0.00004 | −0.00857 | 0.00000 |
| 3 | 0.00077 | 0.00857 | 0.00000 |
| 4 | 0.00081 | −0.01714 | 0.00000 |
| 5 | 0.00147 | 0.01713 | 0.00000 |
| 6 | 0.00156 | −0.02570 | 0.00000 |
| 7 | 0.00352 | 0.02544 | 0.00000 |
| 8 | 0.00369 | −0.03398 | 0.00000 |
| 9 | 0.00836 | 0.03246 | 0.00000 |
| 10 | 0.00872 | −0.04088 | 0.00000 |
| 11 | 0.01553 | 0.03706 | 0.00000 |
| 12 | 0.01599 | −0.04533 | 0.00000 |
| 13 | 0.02392 | 0.03876 | 0.00000 |
| 14 | 0.02441 | −0.04687 | 0.00000 |
| 15 | 0.03251 | 0.03874 | 0.00000 |
| 16 | 0.03300 | −0.04683 | 0.00000 |
| 17 | 0.04111 | 0.03874 | 0.00000 |
| 18 | 0.04159 | −0.04683 | 0.00000 |
| 19 | 0.04970 | 0.03874 | 0.00000 |
| 20 | 0.05020 | −0.04683 | 0.00000 |
| 21 | 0.05830 | 0.03874 | 0.00000 |
| 22 | 0.05879 | −0.04683 | 0.00000 |
| 23 | 0.06690 | 0.03874 | 0.00000 |
| 24 | 0.06738 | −0.04683 | 0.00000 |
| 25 | 0.07549 | 0.03874 | 0.00000 |
| 26 | 0.07598 | −0.04683 | 0.00000 |

TABLE II-continued

Non-Dimensionalized (X Y Z/Span)

| N | X | Y | Z |
|---|---|---|---|
| 27 | 0.08408 | 0.03874 | 0.00000 |
| 28 | 0.08458 | −0.04683 | 0.00000 |
| 29 | 0.09268 | 0.03874 | 0.00000 |
| 30 | 0.09317 | −0.04683 | 0.00000 |
| 31 | 0.10128 | 0.03874 | 0.00000 |
| 32 | 0.10177 | −0.04683 | 0.00000 |
| 33 | 0.10987 | 0.03874 | 0.00000 |
| 34 | 0.11036 | −0.04683 | 0.00000 |
| 35 | 0.11847 | 0.03874 | 0.00000 |
| 36 | 0.11895 | −0.04683 | 0.00000 |
| 37 | 0.12706 | 0.03874 | 0.00000 |
| 38 | 0.12756 | −0.04683 | 0.00000 |
| 39 | 0.13566 | 0.03874 | 0.00000 |
| 40 | 0.13615 | −0.04683 | 0.00000 |
| 41 | 0.14426 | 0.03874 | 0.00000 |
| 42 | 0.14474 | −0.04683 | 0.00000 |
| 43 | 0.15285 | 0.03874 | 0.00000 |
| 44 | 0.15334 | −0.04683 | 0.00000 |
| 45 | 0.16144 | 0.03874 | 0.00000 |
| 46 | 0.16194 | −0.04683 | 0.00000 |
| 47 | 0.17005 | 0.03874 | 0.00000 |
| 48 | 0.17053 | −0.04683 | 0.00000 |
| 49 | 0.17864 | 0.03874 | 0.00000 |
| 50 | 0.17913 | −0.04683 | 0.00000 |
| 51 | 0.18723 | 0.03874 | 0.00000 |
| 52 | 0.18772 | −0.04683 | 0.00000 |
| 53 | 0.19583 | 0.03874 | 0.00000 |
| 54 | 0.19632 | −0.04683 | 0.00000 |
| 55 | 0.20443 | 0.03874 | 0.00000 |
| 56 | 0.20492 | −0.04683 | 0.00000 |
| 57 | 0.21302 | 0.03874 | 0.00000 |
| 58 | 0.21351 | −0.04683 | 0.00000 |
| 59 | 0.22162 | 0.03874 | 0.00000 |
| 60 | 0.22211 | −0.04683 | 0.00000 |
| 61 | 0.23021 | 0.03874 | 0.00000 |
| 62 | 0.23070 | −0.04683 | 0.00000 |
| 63 | 0.23880 | 0.03874 | 0.00000 |
| 64 | 0.23930 | −0.04683 | 0.00000 |
| 65 | 0.24741 | 0.03874 | 0.00000 |
| 66 | 0.24790 | −0.04683 | 0.00000 |
| 67 | 0.25600 | 0.03874 | 0.00000 |
| 68 | 0.25649 | −0.04683 | 0.00000 |
| 69 | 0.26460 | 0.03874 | 0.00000 |
| 70 | 0.26508 | −0.04683 | 0.00000 |
| 71 | 0.27319 | 0.03874 | 0.00000 |
| 72 | 0.27369 | −0.04683 | 0.00000 |
| 73 | 0.28179 | 0.03874 | 0.00000 |
| 74 | 0.28228 | −0.04683 | 0.00000 |
| 75 | 0.29039 | 0.03874 | 0.00000 |
| 76 | 0.29087 | −0.04683 | 0.00000 |
| 77 | 0.29898 | 0.03874 | 0.00000 |
| 78 | 0.29947 | −0.04683 | 0.00000 |
| 79 | 0.30757 | 0.03874 | 0.00000 |
| 80 | 0.30807 | −0.04683 | 0.00000 |
| 81 | 0.31617 | 0.03874 | 0.00000 |
| 82 | 0.31666 | −0.04683 | 0.00000 |
| 83 | 0.32477 | 0.03874 | 0.00000 |
| 84 | 0.32526 | −0.04683 | 0.00000 |
| 85 | 0.33336 | 0.03874 | 0.00000 |
| 86 | 0.33385 | −0.04683 | 0.00000 |
| 87 | 0.34196 | 0.03875 | 0.00000 |
| 88 | 0.34245 | −0.04683 | 0.00000 |
| 89 | 0.35038 | 0.03725 | 0.00000 |
| 90 | 0.35083 | −0.04518 | 0.00000 |
| 91 | 0.35764 | 0.03279 | 0.00000 |
| 92 | 0.35800 | −0.04055 | 0.00000 |
| 93 | 0.36267 | 0.02589 | 0.00000 |
| 94 | 0.36284 | −0.03353 | 0.00000 |
| 95 | 0.36481 | 0.01761 | 0.00000 |
| 96 | 0.36489 | −0.02522 | 0.00000 |
| 97 | 0.36556 | 0.00905 | 0.00000 |
| 98 | 0.36559 | −0.01665 | 0.00000 |
| 99 | 0.36632 | 0.00048 | 0.00000 |
| 100 | 0.36636 | −0.00809 | 0.00000 |
| 1 | −0.00021 | −0.00508 | 0.02777 |
| 2 | 0.00030 | 0.00325 | 0.02777 |
| 3 | 0.00047 | −0.01340 | 0.02777 |
| 4 | 0.00111 | 0.01156 | 0.02777 |
| 5 | 0.00154 | −0.02167 | 0.02777 |
| 6 | 0.00365 | 0.01948 | 0.02777 |
| 7 | 0.00465 | −0.02938 | 0.02777 |
| 8 | 0.00855 | 0.02619 | 0.02777 |
| 9 | 0.01009 | −0.03565 | 0.02777 |
| 10 | 0.01543 | 0.03082 | 0.02777 |
| 11 | 0.01737 | −0.03962 | 0.02777 |
| 12 | 0.02353 | 0.03254 | 0.02777 |
| 13 | 0.02560 | −0.04066 | 0.02777 |
| 14 | 0.03188 | 0.03254 | 0.02777 |
| 15 | 0.03395 | −0.04063 | 0.02777 |
| 16 | 0.04023 | 0.03254 | 0.02777 |
| 17 | 0.04230 | −0.04063 | 0.02777 |
| 18 | 0.04858 | 0.03254 | 0.02777 |
| 19 | 0.05064 | −0.04063 | 0.02777 |
| 20 | 0.05693 | 0.03254 | 0.02777 |
| 21 | 0.05899 | −0.04063 | 0.02777 |
| 22 | 0.06528 | 0.03254 | 0.02777 |
| 23 | 0.06735 | −0.04063 | 0.02777 |
| 24 | 0.07362 | 0.03254 | 0.02777 |
| 25 | 0.07569 | −0.04063 | 0.02777 |
| 26 | 0.08197 | 0.03254 | 0.02777 |
| 27 | 0.08404 | −0.04063 | 0.02777 |
| 28 | 0.09032 | 0.03254 | 0.02777 |
| 29 | 0.09239 | −0.04063 | 0.02777 |
| 30 | 0.09866 | 0.03254 | 0.02777 |
| 31 | 0.10073 | −0.04063 | 0.02777 |
| 32 | 0.10701 | 0.03254 | 0.02777 |
| 33 | 0.10908 | −0.04063 | 0.02777 |
| 34 | 0.11537 | 0.03254 | 0.02777 |
| 35 | 0.11743 | −0.04063 | 0.02777 |
| 36 | 0.12371 | 0.03254 | 0.02777 |
| 37 | 0.12578 | −0.04063 | 0.02777 |
| 38 | 0.13206 | 0.03254 | 0.02777 |
| 39 | 0.13413 | −0.04063 | 0.02777 |
| 40 | 0.14041 | 0.03254 | 0.02777 |
| 41 | 0.14248 | −0.04063 | 0.02777 |
| 42 | 0.14875 | 0.03254 | 0.02777 |
| 43 | 0.15082 | −0.04063 | 0.02777 |
| 44 | 0.15710 | 0.03254 | 0.02777 |
| 45 | 0.15917 | −0.04063 | 0.02777 |
| 46 | 0.16545 | 0.03254 | 0.02777 |
| 47 | 0.16752 | −0.04063 | 0.02777 |
| 48 | 0.17380 | 0.03254 | 0.02777 |
| 49 | 0.17586 | −0.04063 | 0.02777 |
| 50 | 0.18215 | 0.03254 | 0.02777 |
| 51 | 0.18421 | −0.04063 | 0.02777 |
| 52 | 0.19050 | 0.03254 | 0.02777 |
| 53 | 0.19257 | −0.04063 | 0.02777 |
| 54 | 0.19884 | 0.03254 | 0.02777 |
| 55 | 0.20091 | −0.04063 | 0.02777 |
| 56 | 0.20719 | 0.03254 | 0.02777 |
| 57 | 0.20926 | −0.04063 | 0.02777 |
| 58 | 0.21554 | 0.03254 | 0.02777 |
| 59 | 0.21761 | −0.04063 | 0.02777 |
| 60 | 0.22388 | 0.03254 | 0.02777 |
| 61 | 0.22595 | −0.04063 | 0.02777 |
| 62 | 0.23224 | 0.03254 | 0.02777 |
| 63 | 0.23430 | −0.04063 | 0.02777 |
| 64 | 0.24059 | 0.03254 | 0.02777 |
| 65 | 0.24265 | −0.04063 | 0.02777 |
| 66 | 0.24893 | 0.03254 | 0.02777 |
| 67 | 0.25100 | −0.04063 | 0.02777 |
| 68 | 0.25728 | 0.03254 | 0.02777 |
| 69 | 0.25935 | −0.04063 | 0.02777 |
| 70 | 0.26563 | 0.03254 | 0.02777 |
| 71 | 0.26770 | −0.04063 | 0.02777 |
| 72 | 0.27397 | 0.03254 | 0.02777 |
| 73 | 0.27604 | −0.04063 | 0.02777 |
| 74 | 0.28232 | 0.03254 | 0.02777 |
| 75 | 0.28439 | −0.04063 | 0.02777 |
| 76 | 0.29067 | 0.03254 | 0.02777 |
| 77 | 0.29274 | −0.04063 | 0.02777 |
| 78 | 0.29902 | 0.03254 | 0.02777 |

TABLE II-continued

Non-Dimensionalized (X Y Z/Span)

| N | X | Y | Z |
|---|---|---|---|
| 79 | 0.30108 | −0.04063 | 0.02777 |
| 80 | 0.30737 | 0.03254 | 0.02777 |
| 81 | 0.30943 | −0.04063 | 0.02777 |
| 82 | 0.31572 | 0.03254 | 0.02777 |
| 83 | 0.31779 | −0.04063 | 0.02777 |
| 84 | 0.32406 | 0.03254 | 0.02777 |
| 85 | 0.32613 | −0.04063 | 0.02777 |
| 86 | 0.33241 | 0.03254 | 0.02777 |
| 87 | 0.33448 | −0.04063 | 0.02777 |
| 88 | 0.34076 | 0.03254 | 0.02777 |
| 89 | 0.34283 | −0.04063 | 0.02777 |
| 90 | 0.34900 | 0.03153 | 0.02777 |
| 91 | 0.35093 | −0.03891 | 0.02777 |
| 92 | 0.35627 | 0.02756 | 0.02777 |
| 93 | 0.35781 | −0.03428 | 0.02777 |
| 94 | 0.36172 | 0.02128 | 0.02777 |
| 95 | 0.36271 | −0.02757 | 0.02777 |
| 96 | 0.36485 | 0.01358 | 0.02777 |
| 97 | 0.36525 | −0.01965 | 0.02777 |
| 98 | 0.36590 | 0.00530 | 0.02777 |
| 99 | 0.36606 | −0.01134 | 0.02777 |
| 100 | 0.36659 | −0.00302 | 0.02777 |
| 1 | −0.00020 | −0.00524 | 0.05556 |
| 2 | 0.00032 | 0.00270 | 0.05556 |
| 3 | 0.00084 | −0.01313 | 0.05556 |
| 4 | 0.00290 | 0.01021 | 0.05556 |
| 5 | 0.00415 | −0.02034 | 0.05556 |
| 6 | 0.00786 | 0.01640 | 0.05556 |
| 7 | 0.00974 | −0.02595 | 0.05556 |
| 8 | 0.01468 | 0.02042 | 0.05556 |
| 9 | 0.01695 | −0.02922 | 0.05556 |
| 10 | 0.02248 | 0.02191 | 0.05556 |
| 11 | 0.02487 | −0.03005 | 0.05556 |
| 12 | 0.03045 | 0.02190 | 0.05556 |
| 13 | 0.03284 | −0.02999 | 0.05556 |
| 14 | 0.03843 | 0.02189 | 0.05556 |
| 15 | 0.04082 | −0.02999 | 0.05556 |
| 16 | 0.04640 | 0.02189 | 0.05556 |
| 17 | 0.04879 | −0.02999 | 0.05556 |
| 18 | 0.05438 | 0.02189 | 0.05556 |
| 19 | 0.05677 | −0.02999 | 0.05556 |
| 20 | 0.06235 | 0.02189 | 0.05556 |
| 21 | 0.06474 | −0.02999 | 0.05556 |
| 22 | 0.07033 | 0.02189 | 0.05556 |
| 23 | 0.07272 | −0.02999 | 0.05556 |
| 24 | 0.07830 | 0.02189 | 0.05556 |
| 25 | 0.08069 | −0.02999 | 0.05556 |
| 26 | 0.08628 | 0.02189 | 0.05556 |
| 27 | 0.08867 | −0.02999 | 0.05556 |
| 28 | 0.09425 | 0.02189 | 0.05556 |
| 29 | 0.09664 | −0.02999 | 0.05556 |
| 30 | 0.10223 | 0.02189 | 0.05556 |
| 31 | 0.10462 | −0.02999 | 0.05556 |
| 32 | 0.11021 | 0.02189 | 0.05556 |
| 33 | 0.11260 | −0.02999 | 0.05556 |
| 34 | 0.11819 | 0.02189 | 0.05556 |
| 35 | 0.12057 | −0.02999 | 0.05556 |
| 36 | 0.12616 | 0.02189 | 0.05556 |
| 37 | 0.12855 | −0.02999 | 0.05556 |
| 38 | 0.13414 | 0.02189 | 0.05556 |
| 39 | 0.13653 | −0.02999 | 0.05556 |
| 40 | 0.14211 | 0.02189 | 0.05556 |
| 41 | 0.14450 | −0.02999 | 0.05556 |
| 42 | 0.15009 | 0.02189 | 0.05556 |
| 43 | 0.15248 | −0.02999 | 0.05556 |
| 44 | 0.15806 | 0.02189 | 0.05556 |
| 45 | 0.16045 | −0.02999 | 0.05556 |
| 46 | 0.16604 | 0.02189 | 0.05556 |
| 47 | 0.16843 | −0.02999 | 0.05556 |
| 48 | 0.17401 | 0.02189 | 0.05556 |
| 49 | 0.17640 | −0.02999 | 0.05556 |
| 50 | 0.18199 | 0.02189 | 0.05556 |
| 51 | 0.18438 | −0.02999 | 0.05556 |
| 52 | 0.18996 | 0.02189 | 0.05556 |
| 53 | 0.19235 | −0.02999 | 0.05556 |
| 54 | 0.19794 | 0.02189 | 0.05556 |
| 55 | 0.20033 | −0.02999 | 0.05556 |
| 56 | 0.20591 | 0.02189 | 0.05556 |
| 57 | 0.20830 | −0.02999 | 0.05556 |
| 58 | 0.21389 | 0.02189 | 0.05556 |
| 59 | 0.21628 | −0.02999 | 0.05556 |
| 60 | 0.22186 | 0.02189 | 0.05556 |
| 61 | 0.22425 | −0.02999 | 0.05556 |
| 62 | 0.22984 | 0.02189 | 0.05556 |
| 63 | 0.23224 | −0.02999 | 0.05556 |
| 64 | 0.23782 | 0.02189 | 0.05556 |
| 65 | 0.24021 | −0.02999 | 0.05556 |
| 66 | 0.24580 | 0.02189 | 0.05556 |
| 67 | 0.24819 | −0.02999 | 0.05556 |
| 68 | 0.25377 | 0.02189 | 0.05556 |
| 69 | 0.25616 | −0.02999 | 0.05556 |
| 70 | 0.26175 | 0.02189 | 0.05556 |
| 71 | 0.26414 | −0.02999 | 0.05556 |
| 72 | 0.26972 | 0.02189 | 0.05556 |
| 73 | 0.27211 | −0.02999 | 0.05556 |
| 74 | 0.27770 | 0.02189 | 0.05556 |
| 75 | 0.28009 | −0.02999 | 0.05556 |
| 76 | 0.28567 | 0.02189 | 0.05556 |
| 77 | 0.28806 | −0.02999 | 0.05556 |
| 78 | 0.29365 | 0.02189 | 0.05556 |
| 79 | 0.29604 | −0.02999 | 0.05556 |
| 80 | 0.30162 | 0.02189 | 0.05556 |
| 81 | 0.30401 | −0.02999 | 0.05556 |
| 82 | 0.30960 | 0.02189 | 0.05556 |
| 83 | 0.31199 | −0.02999 | 0.05556 |
| 84 | 0.31757 | 0.02189 | 0.05556 |
| 85 | 0.31996 | −0.02999 | 0.05556 |
| 86 | 0.32555 | 0.02189 | 0.05556 |
| 87 | 0.32794 | −0.02999 | 0.05556 |
| 88 | 0.33352 | 0.02189 | 0.05556 |
| 89 | 0.33591 | −0.02999 | 0.05556 |
| 90 | 0.34150 | 0.02190 | 0.05556 |
| 91 | 0.34389 | −0.02999 | 0.05556 |
| 92 | 0.34941 | 0.02118 | 0.05556 |
| 93 | 0.35169 | −0.02854 | 0.05556 |
| 94 | 0.35662 | 0.01786 | 0.05556 |
| 95 | 0.35850 | −0.02449 | 0.05556 |
| 96 | 0.36222 | 0.01224 | 0.05556 |
| 97 | 0.36346 | −0.01830 | 0.05556 |
| 98 | 0.36556 | 0.00504 | 0.05556 |
| 99 | 0.36603 | −0.01079 | 0.05556 |
| 100 | 0.36659 | −0.00286 | 0.05556 |
| 1 | −0.00021 | −0.00516 | 0.08333 |
| 2 | 0.00033 | 0.00278 | 0.08333 |
| 3 | 0.00080 | −0.01307 | 0.08333 |
| 4 | 0.00288 | 0.01029 | 0.08333 |
| 5 | 0.00406 | −0.02030 | 0.08333 |
| 6 | 0.00787 | 0.01646 | 0.08333 |
| 7 | 0.00964 | −0.02594 | 0.08333 |
| 8 | 0.01469 | 0.02054 | 0.08333 |
| 9 | 0.01682 | −0.02931 | 0.08333 |
| 10 | 0.02248 | 0.02200 | 0.08333 |
| 11 | 0.02473 | −0.03010 | 0.08333 |
| 12 | 0.03046 | 0.02199 | 0.08333 |
| 13 | 0.03271 | −0.03008 | 0.08333 |
| 14 | 0.03844 | 0.02198 | 0.08333 |
| 15 | 0.04069 | −0.03008 | 0.08333 |
| 16 | 0.04642 | 0.02198 | 0.08333 |
| 17 | 0.04867 | −0.03008 | 0.08333 |
| 18 | 0.05440 | 0.02198 | 0.08333 |
| 19 | 0.05664 | −0.03008 | 0.08333 |
| 20 | 0.06238 | 0.02198 | 0.08333 |
| 21 | 0.06462 | −0.03008 | 0.08333 |
| 22 | 0.07036 | 0.02198 | 0.08333 |
| 23 | 0.07260 | −0.03008 | 0.08333 |
| 24 | 0.07834 | 0.02198 | 0.08333 |
| 25 | 0.08058 | −0.03008 | 0.08333 |
| 26 | 0.08631 | 0.02198 | 0.08333 |
| 27 | 0.08856 | −0.03008 | 0.08333 |
| 28 | 0.09430 | 0.02198 | 0.08333 |
| 29 | 0.09654 | −0.03008 | 0.08333 |
| 30 | 0.10227 | 0.02198 | 0.08333 |

TABLE II-continued

Non-Dimensionalized (X Y Z/Span)

| N | X | Y | Z |
|---|---|---|---|
| 31 | 0.10452 | −0.03008 | 0.08333 |
| 32 | 0.11025 | 0.02198 | 0.08333 |
| 33 | 0.11249 | −0.03008 | 0.08333 |
| 34 | 0.11823 | 0.02198 | 0.08333 |
| 35 | 0.12048 | −0.03008 | 0.08333 |
| 36 | 0.12620 | 0.02198 | 0.08333 |
| 37 | 0.12845 | −0.03008 | 0.08333 |
| 38 | 0.13419 | 0.02198 | 0.08333 |
| 39 | 0.13644 | −0.03008 | 0.08333 |
| 40 | 0.14216 | 0.02198 | 0.08333 |
| 41 | 0.14441 | −0.03008 | 0.08333 |
| 42 | 0.15015 | 0.02198 | 0.08333 |
| 43 | 0.15239 | −0.03008 | 0.08333 |
| 44 | 0.15812 | 0.02198 | 0.08333 |
| 45 | 0.16037 | −0.03008 | 0.08333 |
| 46 | 0.16610 | 0.02198 | 0.08333 |
| 47 | 0.16834 | −0.03008 | 0.08333 |
| 48 | 0.17408 | 0.02198 | 0.08333 |
| 49 | 0.17633 | −0.03008 | 0.08333 |
| 50 | 0.18206 | 0.02198 | 0.08333 |
| 51 | 0.18430 | −0.03008 | 0.08333 |
| 52 | 0.19004 | 0.02198 | 0.08333 |
| 53 | 0.19228 | −0.03008 | 0.08333 |
| 54 | 0.19802 | 0.02198 | 0.08333 |
| 55 | 0.20026 | −0.03008 | 0.08333 |
| 56 | 0.20599 | 0.02198 | 0.08333 |
| 57 | 0.20824 | −0.03008 | 0.08333 |
| 58 | 0.21398 | 0.02198 | 0.08333 |
| 59 | 0.21622 | −0.03008 | 0.08333 |
| 60 | 0.22195 | 0.02198 | 0.08333 |
| 61 | 0.22420 | −0.03008 | 0.08333 |
| 62 | 0.22993 | 0.02198 | 0.08333 |
| 63 | 0.23218 | −0.03008 | 0.08333 |
| 64 | 0.23791 | 0.02198 | 0.08333 |
| 65 | 0.24016 | −0.03008 | 0.08333 |
| 66 | 0.24589 | 0.02198 | 0.08333 |
| 67 | 0.24813 | −0.03008 | 0.08333 |
| 68 | 0.25387 | 0.02198 | 0.08333 |
| 69 | 0.25612 | −0.03008 | 0.08333 |
| 70 | 0.26184 | 0.02198 | 0.08333 |
| 71 | 0.26409 | −0.03008 | 0.08333 |
| 72 | 0.26983 | 0.02198 | 0.08333 |
| 73 | 0.27207 | −0.03008 | 0.08333 |
| 74 | 0.27780 | 0.02198 | 0.08333 |
| 75 | 0.28005 | −0.03008 | 0.08333 |
| 76 | 0.28579 | 0.02198 | 0.08333 |
| 77 | 0.28802 | −0.03008 | 0.08333 |
| 78 | 0.29376 | 0.02198 | 0.08333 |
| 79 | 0.29601 | −0.03008 | 0.08333 |
| 80 | 0.30174 | 0.02198 | 0.08333 |
| 81 | 0.30398 | −0.03008 | 0.08333 |
| 82 | 0.30972 | 0.02198 | 0.08333 |
| 83 | 0.31197 | −0.03008 | 0.08333 |
| 84 | 0.31770 | 0.02198 | 0.08333 |
| 85 | 0.31994 | −0.03008 | 0.08333 |
| 86 | 0.32568 | 0.02198 | 0.08333 |
| 87 | 0.32792 | −0.03008 | 0.08333 |
| 88 | 0.33366 | 0.02198 | 0.08333 |
| 89 | 0.33590 | −0.03008 | 0.08333 |
| 90 | 0.34163 | 0.02199 | 0.08333 |
| 91 | 0.34388 | −0.03008 | 0.08333 |
| 92 | 0.34954 | 0.02122 | 0.08333 |
| 93 | 0.35168 | −0.02863 | 0.08333 |
| 94 | 0.35673 | 0.01786 | 0.08333 |
| 95 | 0.35849 | −0.02457 | 0.08333 |
| 96 | 0.36229 | 0.01220 | 0.08333 |
| 97 | 0.36345 | −0.01838 | 0.08333 |
| 98 | 0.36558 | 0.00498 | 0.08333 |
| 99 | 0.36602 | −0.01088 | 0.08333 |
| 100 | 0.36659 | −0.00293 | 0.08333 |
| 1 | −0.00209 | −0.00499 | 0.11111 |
| 2 | −0.00156 | 0.00340 | 0.11111 |
| 3 | −0.00141 | −0.01338 | 0.11111 |
| 4 | −0.00080 | 0.01179 | 0.11111 |
| 5 | −0.00054 | −0.02175 | 0.11111 |
| 6 | 0.00128 | 0.01991 | 0.11111 |
| 7 | 0.00209 | −0.02970 | 0.11111 |
| 8 | 0.00592 | 0.02688 | 0.11111 |
| 9 | 0.00729 | −0.03627 | 0.11111 |
| 10 | 0.01283 | 0.03155 | 0.11111 |
| 11 | 0.01461 | −0.04027 | 0.11111 |
| 12 | 0.02105 | 0.03310 | 0.11111 |
| 13 | 0.02294 | −0.04121 | 0.11111 |
| 14 | 0.02947 | 0.03307 | 0.11111 |
| 15 | 0.03135 | −0.04116 | 0.11111 |
| 16 | 0.03788 | 0.03307 | 0.11111 |
| 17 | 0.03977 | −0.04116 | 0.11111 |
| 18 | 0.04630 | 0.03307 | 0.11111 |
| 19 | 0.04818 | −0.04116 | 0.11111 |
| 20 | 0.05472 | 0.03307 | 0.11111 |
| 21 | 0.05660 | −0.04116 | 0.11111 |
| 22 | 0.06313 | 0.03307 | 0.11111 |
| 23 | 0.06502 | −0.04116 | 0.11111 |
| 24 | 0.07154 | 0.03307 | 0.11111 |
| 25 | 0.07343 | −0.04116 | 0.11111 |
| 26 | 0.07997 | 0.03307 | 0.11111 |
| 27 | 0.08185 | −0.04116 | 0.11111 |
| 28 | 0.08838 | 0.03307 | 0.11111 |
| 29 | 0.09027 | −0.04116 | 0.11111 |
| 30 | 0.09679 | 0.03307 | 0.11111 |
| 31 | 0.09868 | −0.04116 | 0.11111 |
| 32 | 0.10522 | 0.03307 | 0.11111 |
| 33 | 0.10710 | −0.04116 | 0.11111 |
| 34 | 0.11363 | 0.03307 | 0.11111 |
| 35 | 0.11552 | −0.04116 | 0.11111 |
| 36 | 0.12204 | 0.03307 | 0.11111 |
| 37 | 0.12393 | −0.04116 | 0.11111 |
| 38 | 0.13046 | 0.03307 | 0.11111 |
| 39 | 0.13235 | −0.04116 | 0.11111 |
| 40 | 0.13888 | 0.03307 | 0.11111 |
| 41 | 0.14076 | −0.04116 | 0.11111 |
| 42 | 0.14729 | 0.03307 | 0.11111 |
| 43 | 0.14918 | −0.04116 | 0.11111 |
| 44 | 0.15571 | 0.03307 | 0.11111 |
| 45 | 0.15760 | −0.04116 | 0.11111 |
| 46 | 0.16412 | 0.03307 | 0.11111 |
| 47 | 0.16601 | −0.04116 | 0.11111 |
| 48 | 0.17254 | 0.03307 | 0.11111 |
| 49 | 0.17442 | −0.04116 | 0.11111 |
| 50 | 0.18096 | 0.03307 | 0.11111 |
| 51 | 0.18285 | −0.04116 | 0.11111 |
| 52 | 0.18937 | 0.03307 | 0.11111 |
| 53 | 0.19126 | −0.04116 | 0.11111 |
| 54 | 0.19778 | 0.03307 | 0.11111 |
| 55 | 0.19967 | −0.04116 | 0.11111 |
| 56 | 0.20621 | 0.03307 | 0.11111 |
| 57 | 0.20810 | −0.04116 | 0.11111 |
| 58 | 0.21462 | 0.03307 | 0.11111 |
| 59 | 0.21651 | −0.04116 | 0.11111 |
| 60 | 0.22303 | 0.03307 | 0.11111 |
| 61 | 0.22492 | −0.04116 | 0.11111 |
| 62 | 0.23146 | 0.03307 | 0.11111 |
| 63 | 0.23334 | −0.04116 | 0.11111 |
| 64 | 0.23987 | 0.03307 | 0.11111 |
| 65 | 0.24176 | −0.04116 | 0.11111 |
| 66 | 0.24828 | 0.03307 | 0.11111 |
| 67 | 0.25017 | −0.04116 | 0.11111 |
| 68 | 0.25670 | 0.03307 | 0.11111 |
| 69 | 0.25859 | −0.04116 | 0.11111 |
| 70 | 0.26512 | 0.03307 | 0.11111 |
| 71 | 0.26700 | −0.04116 | 0.11111 |
| 72 | 0.27353 | 0.03307 | 0.11111 |
| 73 | 0.27542 | −0.04116 | 0.11111 |
| 74 | 0.28195 | 0.03307 | 0.11111 |
| 75 | 0.28384 | −0.04116 | 0.11111 |
| 76 | 0.29036 | 0.03307 | 0.11111 |
| 77 | 0.29225 | −0.04116 | 0.11111 |
| 78 | 0.29878 | 0.03307 | 0.11111 |
| 79 | 0.30067 | −0.04116 | 0.11111 |
| 80 | 0.30720 | 0.03307 | 0.11111 |
| 81 | 0.30909 | −0.04116 | 0.11111 |
| 82 | 0.31561 | 0.03307 | 0.11111 |

TABLE II-continued

Non-Dimensionalized (X Y Z/Span)

| N | X | Y | Z |
|---|---|---|---|
| 83 | 0.31750 | −0.04116 | 0.11111 |
| 84 | 0.32403 | 0.03307 | 0.11111 |
| 85 | 0.32591 | −0.04116 | 0.11111 |
| 86 | 0.33245 | 0.03307 | 0.11111 |
| 87 | 0.33434 | −0.04116 | 0.11111 |
| 88 | 0.34086 | 0.03308 | 0.11111 |
| 89 | 0.34275 | −0.04116 | 0.11111 |
| 90 | 0.34916 | 0.03199 | 0.11111 |
| 91 | 0.35091 | −0.03941 | 0.11111 |
| 92 | 0.35643 | 0.02785 | 0.11111 |
| 93 | 0.35780 | −0.03468 | 0.11111 |
| 94 | 0.36179 | 0.02143 | 0.11111 |
| 95 | 0.36268 | −0.02786 | 0.11111 |
| 96 | 0.36487 | 0.01362 | 0.11111 |
| 97 | 0.36522 | −0.01987 | 0.11111 |
| 98 | 0.36592 | 0.00528 | 0.11111 |
| 99 | 0.36606 | −0.01149 | 0.11111 |
| 100 | 0.36660 | −0.00311 | 0.11111 |
| 1 | −0.00644 | −0.00824 | 0.13889 |
| 2 | −0.00641 | 0.00052 | 0.13889 |
| 3 | −0.00567 | −0.01700 | 0.13889 |
| 4 | −0.00562 | 0.00927 | 0.13889 |
| 5 | −0.00491 | 0.01803 | 0.13889 |
| 6 | −0.00491 | −0.02575 | 0.13889 |
| 7 | −0.00321 | −0.03433 | 0.13889 |
| 8 | −0.00303 | 0.02657 | 0.13889 |
| 9 | 0.00150 | −0.04167 | 0.13889 |
| 10 | 0.00176 | 0.03384 | 0.13889 |
| 11 | 0.00869 | −0.04660 | 0.13889 |
| 12 | 0.00903 | 0.03865 | 0.13889 |
| 13 | 0.01722 | −0.04849 | 0.13889 |
| 14 | 0.01759 | 0.04042 | 0.13889 |
| 15 | 0.02601 | −0.04850 | 0.13889 |
| 16 | 0.02638 | 0.04041 | 0.13889 |
| 17 | 0.03479 | −0.04849 | 0.13889 |
| 18 | 0.03516 | 0.04040 | 0.13889 |
| 19 | 0.04358 | −0.04849 | 0.13889 |
| 20 | 0.04395 | 0.04040 | 0.13889 |
| 21 | 0.05236 | −0.04849 | 0.13889 |
| 22 | 0.05274 | 0.04040 | 0.13889 |
| 23 | 0.06115 | −0.04849 | 0.13889 |
| 24 | 0.06152 | 0.04040 | 0.13889 |
| 25 | 0.06994 | −0.04849 | 0.13889 |
| 26 | 0.07031 | 0.04040 | 0.13889 |
| 27 | 0.07872 | −0.04849 | 0.13889 |
| 28 | 0.07909 | 0.04040 | 0.13889 |
| 29 | 0.08751 | −0.04849 | 0.13889 |
| 30 | 0.08788 | 0.04040 | 0.13889 |
| 31 | 0.09629 | −0.04849 | 0.13889 |
| 32 | 0.09666 | 0.04040 | 0.13889 |
| 33 | 0.10508 | −0.04849 | 0.13889 |
| 34 | 0.10545 | 0.04040 | 0.13889 |
| 35 | 0.11386 | −0.04849 | 0.13889 |
| 36 | 0.11424 | 0.04040 | 0.13889 |
| 37 | 0.12265 | −0.04849 | 0.13889 |
| 38 | 0.12302 | 0.04040 | 0.13889 |
| 39 | 0.13144 | −0.04849 | 0.13889 |
| 40 | 0.13181 | 0.04040 | 0.13889 |
| 41 | 0.14022 | −0.04849 | 0.13889 |
| 42 | 0.14059 | 0.04040 | 0.13889 |
| 43 | 0.14901 | −0.04849 | 0.13889 |
| 44 | 0.14938 | 0.04040 | 0.13889 |
| 45 | 0.15779 | −0.04849 | 0.13889 |
| 46 | 0.15817 | 0.04040 | 0.13889 |
| 47 | 0.16658 | −0.04849 | 0.13889 |
| 48 | 0.16695 | 0.04040 | 0.13889 |
| 49 | 0.17537 | −0.04849 | 0.13889 |
| 50 | 0.17574 | 0.04040 | 0.13889 |
| 51 | 0.18415 | −0.04849 | 0.13889 |
| 52 | 0.18452 | 0.04040 | 0.13889 |
| 53 | 0.19294 | −0.04849 | 0.13889 |
| 54 | 0.19331 | 0.04040 | 0.13889 |
| 55 | 0.20172 | −0.04849 | 0.13889 |
| 56 | 0.20210 | 0.04040 | 0.13889 |
| 57 | 0.21051 | −0.04849 | 0.13889 |
| 58 | 0.21088 | 0.04040 | 0.13889 |
| 59 | 0.21930 | −0.04849 | 0.13889 |
| 60 | 0.21967 | 0.04040 | 0.13889 |
| 61 | 0.22808 | −0.04849 | 0.13889 |
| 62 | 0.22845 | 0.04040 | 0.13889 |
| 63 | 0.23687 | −0.04849 | 0.13889 |
| 64 | 0.23724 | 0.04040 | 0.13889 |
| 65 | 0.24565 | −0.04849 | 0.13889 |
| 66 | 0.24602 | 0.04040 | 0.13889 |
| 67 | 0.25444 | −0.04849 | 0.13889 |
| 68 | 0.25481 | 0.04040 | 0.13889 |
| 69 | 0.26322 | −0.04849 | 0.13889 |
| 70 | 0.26360 | 0.04040 | 0.13889 |
| 71 | 0.27201 | −0.04849 | 0.13889 |
| 72 | 0.27238 | 0.04040 | 0.13889 |
| 73 | 0.28080 | −0.04849 | 0.13889 |
| 74 | 0.28117 | 0.04040 | 0.13889 |
| 75 | 0.28958 | −0.04849 | 0.13889 |
| 76 | 0.28995 | 0.04040 | 0.13889 |
| 77 | 0.29837 | −0.04849 | 0.13889 |
| 78 | 0.29874 | 0.04040 | 0.13889 |
| 79 | 0.30715 | −0.04849 | 0.13889 |
| 80 | 0.30753 | 0.04040 | 0.13889 |
| 81 | 0.31594 | −0.04849 | 0.13889 |
| 82 | 0.31631 | 0.04040 | 0.13889 |
| 83 | 0.32473 | −0.04849 | 0.13889 |
| 84 | 0.32510 | 0.04040 | 0.13889 |
| 85 | 0.33351 | −0.04849 | 0.13889 |
| 86 | 0.33388 | 0.04040 | 0.13889 |
| 87 | 0.34230 | −0.04849 | 0.13889 |
| 88 | 0.34267 | 0.04039 | 0.13889 |
| 89 | 0.35086 | −0.04677 | 0.13889 |
| 90 | 0.35120 | 0.03852 | 0.13889 |
| 91 | 0.35812 | −0.04193 | 0.13889 |
| 92 | 0.35838 | 0.03357 | 0.13889 |
| 93 | 0.36291 | −0.03467 | 0.13889 |
| 94 | 0.36309 | 0.02623 | 0.13889 |
| 95 | 0.36482 | −0.02612 | 0.13889 |
| 96 | 0.36482 | 0.01766 | 0.13889 |
| 97 | 0.36553 | −0.01736 | 0.13889 |
| 98 | 0.36557 | 0.00890 | 0.13889 |
| 99 | 0.36632 | −0.00861 | 0.13889 |
| 100 | 0.36635 | 0.00015 | 0.13889 |
| 1 | −0.01110 | −0.00029 | 0.16666 |
| 2 | −0.01097 | −0.00918 | 0.16666 |
| 3 | −0.01030 | 0.00860 | 0.16666 |
| 4 | −0.01019 | −0.01808 | 0.16666 |
| 5 | −0.00954 | 0.01750 | 0.16666 |
| 6 | −0.00941 | −0.02697 | 0.16666 |
| 7 | −0.00784 | 0.02622 | 0.16666 |
| 8 | −0.00730 | −0.03558 | 0.16666 |
| 9 | −0.00303 | 0.03367 | 0.16666 |
| 10 | −0.00205 | −0.04273 | 0.16666 |
| 11 | 0.00426 | 0.03869 | 0.16666 |
| 12 | 0.00554 | −0.04729 | 0.16666 |
| 13 | 0.01293 | 0.04056 | 0.16666 |
| 14 | 0.01431 | −0.04869 | 0.16666 |
| 15 | 0.02186 | 0.04056 | 0.16666 |
| 16 | 0.02324 | −0.04866 | 0.16666 |
| 17 | 0.03078 | 0.04056 | 0.16666 |
| 18 | 0.03216 | −0.04866 | 0.16666 |
| 19 | 0.03971 | 0.04056 | 0.16666 |
| 20 | 0.04109 | −0.04866 | 0.16666 |
| 21 | 0.04863 | 0.04056 | 0.16666 |
| 22 | 0.05002 | −0.04866 | 0.16666 |
| 23 | 0.05756 | 0.04056 | 0.16666 |
| 24 | 0.05894 | −0.04866 | 0.16666 |
| 25 | 0.06649 | 0.04056 | 0.16666 |
| 26 | 0.06786 | −0.04866 | 0.16666 |
| 27 | 0.07541 | 0.04056 | 0.16666 |
| 28 | 0.07679 | −0.04866 | 0.16666 |
| 29 | 0.08433 | 0.04056 | 0.16666 |
| 30 | 0.08571 | −0.04866 | 0.16666 |
| 31 | 0.09326 | 0.04056 | 0.16666 |
| 32 | 0.09464 | −0.04866 | 0.16666 |
| 33 | 0.10218 | 0.04056 | 0.16666 |
| 34 | 0.10356 | −0.04866 | 0.16666 |

TABLE II-continued

Non-Dimensionalized (X Y Z/Span)

| N | X | Y | Z |
|---|---|---|---|
| 35 | 0.11111 | 0.04056 | 0.16666 |
| 36 | 0.11248 | −0.04866 | 0.16666 |
| 37 | 0.12003 | 0.04056 | 0.16666 |
| 38 | 0.12142 | −0.04866 | 0.16666 |
| 39 | 0.12895 | 0.04056 | 0.16666 |
| 40 | 0.13034 | −0.04866 | 0.16666 |
| 41 | 0.13784 | 0.03996 | 0.16666 |
| 42 | 0.13920 | −0.04781 | 0.16666 |
| 43 | 0.14655 | 0.03811 | 0.16666 |
| 44 | 0.14786 | −0.04568 | 0.16666 |
| 45 | 0.15518 | 0.03571 | 0.16666 |
| 46 | 0.15641 | −0.04308 | 0.16666 |
| 47 | 0.16384 | 0.03349 | 0.16666 |
| 48 | 0.16503 | −0.04080 | 0.16666 |
| 49 | 0.17264 | 0.03218 | 0.16666 |
| 50 | 0.17388 | −0.03963 | 0.16666 |
| 51 | 0.18152 | 0.03270 | 0.16666 |
| 52 | 0.18272 | −0.04056 | 0.16666 |
| 53 | 0.19016 | 0.03491 | 0.16666 |
| 54 | 0.19127 | −0.04310 | 0.16666 |
| 55 | 0.19871 | 0.03750 | 0.16666 |
| 56 | 0.19979 | −0.04581 | 0.16666 |
| 57 | 0.20740 | 0.03956 | 0.16666 |
| 58 | 0.20847 | −0.04783 | 0.16666 |
| 59 | 0.21625 | 0.04054 | 0.16666 |
| 60 | 0.21734 | −0.04865 | 0.16666 |
| 61 | 0.22517 | 0.04056 | 0.16666 |
| 62 | 0.22626 | −0.04866 | 0.16666 |
| 63 | 0.23410 | 0.04056 | 0.16666 |
| 64 | 0.23519 | −0.04866 | 0.16666 |
| 65 | 0.24302 | 0.04056 | 0.16666 |
| 66 | 0.24411 | −0.04866 | 0.16666 |
| 67 | 0.25194 | 0.04056 | 0.16666 |
| 68 | 0.25305 | −0.04866 | 0.16666 |
| 69 | 0.26087 | 0.04056 | 0.16666 |
| 70 | 0.26197 | −0.04866 | 0.16666 |
| 71 | 0.26979 | 0.04056 | 0.16666 |
| 72 | 0.27089 | −0.04866 | 0.16666 |
| 73 | 0.27873 | 0.04056 | 0.16666 |
| 74 | 0.27982 | −0.04866 | 0.16666 |
| 75 | 0.28765 | 0.04056 | 0.16666 |
| 76 | 0.28874 | −0.04866 | 0.16666 |
| 77 | 0.29657 | 0.04056 | 0.16666 |
| 78 | 0.29766 | −0.04866 | 0.16666 |
| 79 | 0.30550 | 0.04056 | 0.16666 |
| 80 | 0.30659 | −0.04866 | 0.16666 |
| 81 | 0.31442 | 0.04056 | 0.16666 |
| 82 | 0.31551 | −0.04866 | 0.16666 |
| 83 | 0.32334 | 0.04056 | 0.16666 |
| 84 | 0.32444 | −0.04866 | 0.16666 |
| 85 | 0.33227 | 0.04056 | 0.16666 |
| 86 | 0.33337 | −0.04866 | 0.16666 |
| 87 | 0.34119 | 0.04056 | 0.16666 |
| 88 | 0.34229 | −0.04866 | 0.16666 |
| 89 | 0.34995 | 0.03918 | 0.16666 |
| 90 | 0.35098 | −0.04687 | 0.16666 |
| 91 | 0.35752 | 0.03458 | 0.16666 |
| 92 | 0.35831 | −0.04191 | 0.16666 |
| 93 | 0.36267 | 0.02736 | 0.16666 |
| 94 | 0.36305 | −0.03445 | 0.16666 |
| 95 | 0.36472 | 0.01873 | 0.16666 |
| 96 | 0.36485 | −0.02573 | 0.16666 |
| 97 | 0.36549 | 0.00984 | 0.16666 |
| 98 | 0.36557 | −0.01685 | 0.16666 |
| 99 | 0.36628 | 0.00095 | 0.16666 |
| 100 | 0.36638 | −0.00795 | 0.16666 |
| 1 | −0.01583 | −0.00232 | 0.19445 |
| 2 | −0.01547 | −0.01122 | 0.19445 |
| 3 | −0.01506 | 0.00657 | 0.19445 |
| 4 | −0.01467 | −0.02011 | 0.19445 |
| 5 | −0.01432 | 0.01547 | 0.19445 |
| 6 | −0.01388 | −0.02901 | 0.19445 |
| 7 | −0.01266 | 0.02420 | 0.19445 |
| 8 | −0.01127 | −0.03748 | 0.19445 |
| 9 | −0.00806 | 0.03176 | 0.19445 |
| 10 | −0.00551 | −0.04420 | 0.19445 |
| 11 | −0.00085 | 0.03692 | 0.19445 |
| 12 | 0.00245 | −0.04805 | 0.19445 |
| 13 | 0.00778 | 0.03897 | 0.19445 |
| 14 | 0.01132 | −0.04887 | 0.19445 |
| 15 | 0.01670 | 0.03920 | 0.19445 |
| 16 | 0.02025 | −0.04871 | 0.19445 |
| 17 | 0.02563 | 0.03942 | 0.19445 |
| 18 | 0.02917 | −0.04861 | 0.19445 |
| 19 | 0.03455 | 0.03964 | 0.19445 |
| 20 | 0.03809 | −0.04852 | 0.19445 |
| 21 | 0.04347 | 0.03986 | 0.19445 |
| 22 | 0.04702 | −0.04843 | 0.19445 |
| 23 | 0.05240 | 0.04006 | 0.19445 |
| 24 | 0.05595 | −0.04834 | 0.19445 |
| 25 | 0.06132 | 0.04025 | 0.19445 |
| 26 | 0.06487 | −0.04825 | 0.19445 |
| 27 | 0.07025 | 0.04043 | 0.19445 |
| 28 | 0.07380 | −0.04817 | 0.19445 |
| 29 | 0.07917 | 0.04061 | 0.19445 |
| 30 | 0.08272 | −0.04809 | 0.19445 |
| 31 | 0.08809 | 0.04077 | 0.19445 |
| 32 | 0.09165 | −0.04801 | 0.19445 |
| 33 | 0.09702 | 0.04092 | 0.19445 |
| 34 | 0.10057 | −0.04795 | 0.19445 |
| 35 | 0.10594 | 0.04107 | 0.19445 |
| 36 | 0.10950 | −0.04790 | 0.19445 |
| 37 | 0.11486 | 0.04122 | 0.19445 |
| 38 | 0.11843 | −0.04784 | 0.19445 |
| 39 | 0.12380 | 0.04133 | 0.19445 |
| 40 | 0.12735 | −0.04781 | 0.19445 |
| 41 | 0.13272 | 0.04143 | 0.19445 |
| 42 | 0.13627 | −0.04777 | 0.19445 |
| 43 | 0.14164 | 0.04150 | 0.19445 |
| 44 | 0.14521 | −0.04775 | 0.19445 |
| 45 | 0.15057 | 0.04153 | 0.19445 |
| 46 | 0.15413 | −0.04773 | 0.19445 |
| 47 | 0.15949 | 0.04151 | 0.19445 |
| 48 | 0.16306 | −0.04773 | 0.19445 |
| 49 | 0.16842 | 0.04146 | 0.19445 |
| 50 | 0.17198 | −0.04774 | 0.19445 |
| 51 | 0.17735 | 0.04135 | 0.19445 |
| 52 | 0.18090 | −0.04776 | 0.19445 |
| 53 | 0.18627 | 0.04120 | 0.19445 |
| 54 | 0.18984 | −0.04779 | 0.19445 |
| 55 | 0.19520 | 0.04101 | 0.19445 |
| 56 | 0.19876 | −0.04782 | 0.19445 |
| 57 | 0.20412 | 0.04080 | 0.19445 |
| 58 | 0.20768 | −0.04787 | 0.19445 |
| 59 | 0.21304 | 0.04056 | 0.19445 |
| 60 | 0.21661 | −0.04793 | 0.19445 |
| 61 | 0.22196 | 0.04031 | 0.19445 |
| 62 | 0.22553 | −0.04801 | 0.19445 |
| 63 | 0.23088 | 0.04005 | 0.19445 |
| 64 | 0.23446 | −0.04811 | 0.19445 |
| 65 | 0.23981 | 0.03979 | 0.19445 |
| 66 | 0.24339 | −0.04823 | 0.19445 |
| 67 | 0.24873 | 0.03951 | 0.19445 |
| 68 | 0.25231 | −0.04836 | 0.19445 |
| 69 | 0.25765 | 0.03923 | 0.19445 |
| 70 | 0.26124 | −0.04851 | 0.19445 |
| 71 | 0.26657 | 0.03894 | 0.19445 |
| 72 | 0.27016 | −0.04867 | 0.19445 |
| 73 | 0.27549 | 0.03865 | 0.19445 |
| 74 | 0.27908 | −0.04885 | 0.19445 |
| 75 | 0.28441 | 0.03835 | 0.19445 |
| 76 | 0.28801 | −0.04903 | 0.19445 |
| 77 | 0.29333 | 0.03805 | 0.19445 |
| 78 | 0.29693 | −0.04923 | 0.19445 |
| 79 | 0.30226 | 0.03775 | 0.19445 |
| 80 | 0.30585 | −0.04943 | 0.19445 |
| 81 | 0.31117 | 0.03744 | 0.19445 |
| 82 | 0.31478 | −0.04962 | 0.19445 |
| 83 | 0.32010 | 0.03713 | 0.19445 |
| 84 | 0.32370 | −0.04984 | 0.19445 |
| 85 | 0.32902 | 0.03681 | 0.19445 |
| 86 | 0.33263 | −0.05005 | 0.19445 |

TABLE II-continued

Non-Dimensionalized (X Y Z/Span)

| N | X | Y | Z |
|---|---|---|---|
| 87 | 0.33793 | 0.03650 | 0.19445 |
| 88 | 0.34155 | −0.05028 | 0.19445 |
| 89 | 0.34680 | 0.03564 | 0.19445 |
| 90 | 0.35028 | −0.04871 | 0.19445 |
| 91 | 0.35481 | 0.03184 | 0.19445 |
| 92 | 0.35765 | −0.04380 | 0.19445 |
| 93 | 0.36075 | 0.02524 | 0.19445 |
| 94 | 0.36241 | −0.03632 | 0.19445 |
| 95 | 0.36366 | 0.01688 | 0.19445 |
| 96 | 0.36396 | −0.02757 | 0.19445 |
| 97 | 0.36451 | 0.00799 | 0.19445 |
| 98 | 0.36481 | −0.01868 | 0.19445 |
| 99 | 0.36529 | −0.00090 | 0.19445 |
| 100 | 0.36573 | −0.00979 | 0.19445 |
| 1 | −0.02045 | −0.00917 | 0.22222 |
| 2 | −0.02009 | −0.00031 | 0.22222 |
| 3 | −0.01969 | −0.01801 | 0.22222 |
| 4 | −0.01932 | 0.00854 | 0.22222 |
| 5 | −0.01893 | −0.02685 | 0.22222 |
| 6 | −0.01811 | 0.01731 | 0.22222 |
| 7 | −0.01770 | −0.03562 | 0.22222 |
| 8 | −0.01417 | 0.02519 | 0.22222 |
| 9 | −0.01336 | −0.04329 | 0.22222 |
| 10 | −0.00746 | 0.03090 | 0.22222 |
| 11 | −0.00618 | −0.04834 | 0.22222 |
| 12 | 0.00095 | 0.03357 | 0.22222 |
| 13 | 0.00250 | −0.04995 | 0.22222 |
| 14 | 0.00980 | 0.03419 | 0.22222 |
| 15 | 0.01136 | −0.04947 | 0.22222 |
| 16 | 0.01864 | 0.03502 | 0.22222 |
| 17 | 0.02022 | −0.04902 | 0.22222 |
| 18 | 0.02748 | 0.03587 | 0.22222 |
| 19 | 0.02909 | −0.04861 | 0.22222 |
| 20 | 0.03631 | 0.03675 | 0.22222 |
| 21 | 0.03796 | −0.04824 | 0.22222 |
| 22 | 0.04514 | 0.03765 | 0.22222 |
| 23 | 0.04683 | −0.04786 | 0.22222 |
| 24 | 0.05397 | 0.03851 | 0.22222 |
| 25 | 0.05570 | −0.04749 | 0.22222 |
| 26 | 0.06282 | 0.03933 | 0.22222 |
| 27 | 0.06457 | −0.04713 | 0.22222 |
| 28 | 0.07166 | 0.04010 | 0.22222 |
| 29 | 0.07344 | −0.04679 | 0.22222 |
| 30 | 0.08050 | 0.04083 | 0.22222 |
| 31 | 0.08231 | −0.04646 | 0.22222 |
| 32 | 0.08935 | 0.04152 | 0.22222 |
| 33 | 0.09118 | −0.04615 | 0.22222 |
| 34 | 0.09821 | 0.04218 | 0.22222 |
| 35 | 0.10005 | −0.04587 | 0.22222 |
| 36 | 0.10706 | 0.04280 | 0.22222 |
| 37 | 0.10892 | −0.04562 | 0.22222 |
| 38 | 0.11592 | 0.04340 | 0.22222 |
| 39 | 0.11780 | −0.04541 | 0.22222 |
| 40 | 0.12478 | 0.04397 | 0.22222 |
| 41 | 0.12667 | −0.04524 | 0.22222 |
| 42 | 0.13364 | 0.04444 | 0.22222 |
| 43 | 0.13555 | −0.04510 | 0.22222 |
| 44 | 0.14251 | 0.04479 | 0.22222 |
| 45 | 0.14442 | −0.04500 | 0.22222 |
| 46 | 0.15138 | 0.04495 | 0.22222 |
| 47 | 0.15330 | −0.04495 | 0.22222 |
| 48 | 0.16026 | 0.04490 | 0.22222 |
| 49 | 0.16218 | −0.04493 | 0.22222 |
| 50 | 0.16913 | 0.04465 | 0.22222 |
| 51 | 0.17105 | −0.04495 | 0.22222 |
| 52 | 0.17799 | 0.04421 | 0.22222 |
| 53 | 0.17993 | −0.04500 | 0.22222 |
| 54 | 0.18685 | 0.04361 | 0.22222 |
| 55 | 0.18881 | −0.04510 | 0.22222 |
| 56 | 0.19570 | 0.04287 | 0.22222 |
| 57 | 0.19769 | −0.04523 | 0.22222 |
| 58 | 0.20453 | 0.04201 | 0.22222 |
| 59 | 0.20656 | −0.04541 | 0.22222 |
| 60 | 0.21336 | 0.04106 | 0.22222 |
| 61 | 0.21543 | −0.04565 | 0.22222 |
| 62 | 0.22217 | 0.04002 | 0.22222 |
| 63 | 0.22430 | −0.04594 | 0.22222 |
| 64 | 0.23098 | 0.03893 | 0.22222 |
| 65 | 0.23317 | −0.04631 | 0.22222 |
| 66 | 0.23979 | 0.03779 | 0.22222 |
| 67 | 0.24204 | −0.04676 | 0.22222 |
| 68 | 0.24859 | 0.03661 | 0.22222 |
| 69 | 0.25090 | −0.04730 | 0.22222 |
| 70 | 0.25738 | 0.03539 | 0.22222 |
| 71 | 0.25975 | −0.04792 | 0.22222 |
| 72 | 0.26618 | 0.03416 | 0.22222 |
| 73 | 0.26860 | −0.04859 | 0.22222 |
| 74 | 0.27496 | 0.03290 | 0.22222 |
| 75 | 0.27745 | −0.04930 | 0.22222 |
| 76 | 0.28375 | 0.03162 | 0.22222 |
| 77 | 0.28630 | −0.05004 | 0.22222 |
| 78 | 0.29253 | 0.03033 | 0.22222 |
| 79 | 0.29514 | −0.05082 | 0.22222 |
| 80 | 0.30131 | 0.02900 | 0.22222 |
| 81 | 0.30398 | −0.05163 | 0.22222 |
| 82 | 0.31008 | 0.02766 | 0.22222 |
| 83 | 0.31282 | −0.05247 | 0.22222 |
| 84 | 0.31885 | 0.02630 | 0.22222 |
| 85 | 0.32165 | −0.05334 | 0.22222 |
| 86 | 0.32761 | 0.02491 | 0.22222 |
| 87 | 0.33048 | −0.05426 | 0.22222 |
| 88 | 0.33639 | 0.02350 | 0.22222 |
| 89 | 0.33930 | −0.05520 | 0.22222 |
| 90 | 0.34506 | 0.02168 | 0.22222 |
| 91 | 0.34807 | −0.05423 | 0.22222 |
| 92 | 0.35279 | 0.01744 | 0.22222 |
| 93 | 0.35547 | −0.04951 | 0.22222 |
| 94 | 0.35845 | 0.01066 | 0.22222 |
| 95 | 0.35982 | −0.04188 | 0.22222 |
| 96 | 0.36104 | 0.00224 | 0.22222 |
| 97 | 0.36116 | −0.03310 | 0.22222 |
| 98 | 0.36179 | −0.00661 | 0.22222 |
| 99 | 0.36222 | −0.02429 | 0.22222 |
| 100 | 0.36255 | −0.01546 | 0.22222 |
| 1 | −0.02512 | −0.00985 | 0.25000 |
| 2 | −0.02467 | −0.01866 | 0.25000 |
| 3 | −0.02438 | −0.00106 | 0.25000 |
| 4 | −0.02391 | −0.02745 | 0.25000 |
| 5 | −0.02360 | 0.00772 | 0.25000 |
| 6 | −0.02315 | −0.03625 | 0.25000 |
| 7 | −0.02064 | 0.01598 | 0.25000 |
| 8 | −0.02031 | −0.04452 | 0.25000 |
| 9 | −0.01468 | 0.02240 | 0.25000 |
| 10 | −0.01393 | −0.05044 | 0.25000 |
| 11 | −0.00665 | 0.02593 | 0.25000 |
| 12 | −0.00547 | −0.05263 | 0.25000 |
| 13 | 0.00214 | 0.02643 | 0.25000 |
| 14 | 0.00334 | −0.05195 | 0.25000 |
| 15 | 0.01090 | 0.02742 | 0.25000 |
| 16 | 0.01211 | −0.05099 | 0.25000 |
| 17 | 0.01954 | 0.02924 | 0.25000 |
| 18 | 0.02088 | −0.05000 | 0.25000 |
| 19 | 0.02816 | 0.03114 | 0.25000 |
| 20 | 0.02965 | −0.04906 | 0.25000 |
| 21 | 0.03677 | 0.03305 | 0.25000 |
| 22 | 0.03844 | −0.04817 | 0.25000 |
| 23 | 0.04540 | 0.03493 | 0.25000 |
| 24 | 0.04723 | −0.04738 | 0.25000 |
| 25 | 0.05359 | 0.03807 | 0.25000 |
| 26 | 0.05575 | −0.04509 | 0.25000 |
| 27 | 0.06175 | 0.04125 | 0.25000 |
| 28 | 0.06445 | −0.04380 | 0.25000 |
| 29 | 0.07052 | 0.04228 | 0.25000 |
| 30 | 0.07324 | −0.04306 | 0.25000 |
| 31 | 0.07928 | 0.04341 | 0.25000 |
| 32 | 0.08204 | −0.04233 | 0.25000 |
| 33 | 0.08803 | 0.04459 | 0.25000 |
| 34 | 0.09084 | −0.04164 | 0.25000 |
| 35 | 0.09677 | 0.04585 | 0.25000 |
| 36 | 0.09964 | −0.04099 | 0.25000 |
| 37 | 0.10550 | 0.04713 | 0.25000 |
| 38 | 0.10845 | −0.04041 | 0.25000 |

TABLE II-continued

Non-Dimensionalized (X Y Z/Span)

| N | X | Y | Z |
|---|---|---|---|
| 39 | 0.11426 | 0.04827 | 0.25000 |
| 40 | 0.11726 | −0.03998 | 0.25000 |
| 41 | 0.12303 | 0.04922 | 0.25000 |
| 42 | 0.12608 | −0.03984 | 0.25000 |
| 43 | 0.13183 | 0.04994 | 0.25000 |
| 44 | 0.13491 | −0.03996 | 0.25000 |
| 45 | 0.14064 | 0.05045 | 0.25000 |
| 46 | 0.14373 | −0.04022 | 0.25000 |
| 47 | 0.14946 | 0.05071 | 0.25000 |
| 48 | 0.15256 | −0.04049 | 0.25000 |
| 49 | 0.15828 | 0.05076 | 0.25000 |
| 50 | 0.16139 | −0.04066 | 0.25000 |
| 51 | 0.16711 | 0.05050 | 0.25000 |
| 52 | 0.17022 | −0.04071 | 0.25000 |
| 53 | 0.17590 | 0.04986 | 0.25000 |
| 54 | 0.17904 | −0.04076 | 0.25000 |
| 55 | 0.18466 | 0.04887 | 0.25000 |
| 56 | 0.18787 | −0.04090 | 0.25000 |
| 57 | 0.19338 | 0.04752 | 0.25000 |
| 58 | 0.19669 | −0.04114 | 0.25000 |
| 59 | 0.20206 | 0.04586 | 0.25000 |
| 60 | 0.20551 | −0.04147 | 0.25000 |
| 61 | 0.21068 | 0.04395 | 0.25000 |
| 62 | 0.21432 | −0.04193 | 0.25000 |
| 63 | 0.21926 | 0.04183 | 0.25000 |
| 64 | 0.22313 | −0.04253 | 0.25000 |
| 65 | 0.22779 | 0.03954 | 0.25000 |
| 66 | 0.23193 | −0.04329 | 0.25000 |
| 67 | 0.23627 | 0.03712 | 0.25000 |
| 68 | 0.24070 | −0.04421 | 0.25000 |
| 69 | 0.24473 | 0.03459 | 0.25000 |
| 70 | 0.24947 | −0.04532 | 0.25000 |
| 71 | 0.25316 | 0.03200 | 0.25000 |
| 72 | 0.25819 | −0.04663 | 0.25000 |
| 73 | 0.26158 | 0.02934 | 0.25000 |
| 74 | 0.26689 | −0.04809 | 0.25000 |
| 75 | 0.26998 | 0.02663 | 0.25000 |
| 76 | 0.27558 | −0.04964 | 0.25000 |
| 77 | 0.27836 | 0.02386 | 0.25000 |
| 78 | 0.28427 | −0.05124 | 0.25000 |
| 79 | 0.28672 | 0.02103 | 0.25000 |
| 80 | 0.29294 | −0.05290 | 0.25000 |
| 81 | 0.29505 | 0.01811 | 0.25000 |
| 82 | 0.30159 | −0.05464 | 0.25000 |
| 83 | 0.30336 | 0.01513 | 0.25000 |
| 84 | 0.31022 | −0.05647 | 0.25000 |
| 85 | 0.31165 | 0.01208 | 0.25000 |
| 86 | 0.31883 | −0.05840 | 0.25000 |
| 87 | 0.31991 | 0.00898 | 0.25000 |
| 88 | 0.32743 | −0.06042 | 0.25000 |
| 89 | 0.32815 | 0.00582 | 0.25000 |
| 90 | 0.33601 | −0.06248 | 0.25000 |
| 91 | 0.33638 | 0.00260 | 0.25000 |
| 92 | 0.34438 | −0.00109 | 0.25000 |
| 93 | 0.34475 | −0.06237 | 0.25000 |
| 94 | 0.35111 | −0.00674 | 0.25000 |
| 95 | 0.35201 | −0.05759 | 0.25000 |
| 96 | 0.35518 | −0.01447 | 0.25000 |
| 97 | 0.35520 | −0.04950 | 0.25000 |
| 98 | 0.35639 | −0.02321 | 0.25000 |
| 99 | 0.35667 | −0.04079 | 0.25000 |
| 100 | 0.35714 | −0.03201 | 0.25000 |
| 1 | −0.02976 | −0.01909 | 0.27778 |
| 2 | −0.02930 | −0.02792 | 0.27778 |
| 3 | −0.02906 | −0.01028 | 0.27778 |
| 4 | −0.02857 | −0.03673 | 0.27778 |
| 5 | −0.02839 | −0.00145 | 0.27778 |
| 6 | −0.02739 | −0.04548 | 0.27778 |
| 7 | −0.02648 | 0.00713 | 0.27778 |
| 8 | −0.02248 | −0.05268 | 0.27778 |
| 9 | −0.02137 | 0.01426 | 0.27778 |
| 10 | −0.01445 | −0.05606 | 0.27778 |
| 11 | −0.01371 | 0.01854 | 0.27778 |
| 12 | −0.00561 | −0.05577 | 0.27778 |
| 13 | −0.00497 | 0.01921 | 0.27778 |
| 14 | 0.00318 | −0.05481 | 0.27778 |
| 15 | 0.00387 | 0.01881 | 0.27778 |
| 16 | 0.01195 | −0.05364 | 0.27778 |
| 17 | 0.01264 | 0.01991 | 0.27778 |
| 18 | 0.02068 | −0.05221 | 0.27778 |
| 19 | 0.02104 | 0.02260 | 0.27778 |
| 20 | 0.02927 | 0.02587 | 0.27778 |
| 21 | 0.02937 | −0.05056 | 0.27778 |
| 22 | 0.03749 | 0.02913 | 0.27778 |
| 23 | 0.03806 | −0.04892 | 0.27778 |
| 24 | 0.04572 | 0.03240 | 0.27778 |
| 25 | 0.04677 | −0.04740 | 0.27778 |
| 26 | 0.05398 | 0.03559 | 0.27778 |
| 27 | 0.05522 | −0.04490 | 0.27778 |
| 28 | 0.06248 | 0.03796 | 0.27778 |
| 29 | 0.06377 | −0.04281 | 0.27778 |
| 30 | 0.07111 | 0.03992 | 0.27778 |
| 31 | 0.07252 | −0.04150 | 0.27778 |
| 32 | 0.07971 | 0.04201 | 0.27778 |
| 33 | 0.08127 | −0.04024 | 0.27778 |
| 34 | 0.08828 | 0.04419 | 0.27778 |
| 35 | 0.09004 | −0.03903 | 0.27778 |
| 36 | 0.09683 | 0.04646 | 0.27778 |
| 37 | 0.09881 | −0.03789 | 0.27778 |
| 38 | 0.10537 | 0.04879 | 0.27778 |
| 39 | 0.10760 | −0.03688 | 0.27778 |
| 40 | 0.11394 | 0.05097 | 0.27778 |
| 41 | 0.11640 | −0.03604 | 0.27778 |
| 42 | 0.12258 | 0.05287 | 0.27778 |
| 43 | 0.12522 | −0.03539 | 0.27778 |
| 44 | 0.13129 | 0.05443 | 0.27778 |
| 45 | 0.13405 | −0.03492 | 0.27778 |
| 46 | 0.14005 | 0.05564 | 0.27778 |
| 47 | 0.14290 | −0.03462 | 0.27778 |
| 48 | 0.14886 | 0.05647 | 0.27778 |
| 49 | 0.15174 | −0.03449 | 0.27778 |
| 50 | 0.15768 | 0.05689 | 0.27778 |
| 51 | 0.16059 | −0.03451 | 0.27778 |
| 52 | 0.16653 | 0.05689 | 0.27778 |
| 53 | 0.16944 | −0.03468 | 0.27778 |
| 54 | 0.17536 | 0.05644 | 0.27778 |
| 55 | 0.17827 | −0.03500 | 0.27778 |
| 56 | 0.18416 | 0.05552 | 0.27778 |
| 57 | 0.18711 | −0.03543 | 0.27778 |
| 58 | 0.19289 | 0.05410 | 0.27778 |
| 59 | 0.19594 | −0.03598 | 0.27778 |
| 60 | 0.20152 | 0.05215 | 0.27778 |
| 61 | 0.20476 | −0.03664 | 0.27778 |
| 62 | 0.21000 | 0.04965 | 0.27778 |
| 63 | 0.21357 | −0.03738 | 0.27778 |
| 64 | 0.21832 | 0.04664 | 0.27778 |
| 65 | 0.22238 | −0.03826 | 0.27778 |
| 66 | 0.22646 | 0.04321 | 0.27778 |
| 67 | 0.23115 | −0.03939 | 0.27778 |
| 68 | 0.23447 | 0.03946 | 0.27778 |
| 69 | 0.23989 | −0.04080 | 0.27778 |
| 70 | 0.24239 | 0.03553 | 0.27778 |
| 71 | 0.24855 | −0.04253 | 0.27778 |
| 72 | 0.25023 | 0.03142 | 0.27778 |
| 73 | 0.25715 | −0.04462 | 0.27778 |
| 74 | 0.25800 | 0.02718 | 0.27778 |
| 75 | 0.26567 | −0.04699 | 0.27778 |
| 76 | 0.26573 | 0.02288 | 0.27778 |
| 77 | 0.27342 | 0.01850 | 0.27778 |
| 78 | 0.27413 | −0.04956 | 0.27778 |
| 79 | 0.28104 | 0.01402 | 0.27778 |
| 80 | 0.28257 | −0.05223 | 0.27778 |
| 81 | 0.28860 | 0.00942 | 0.27778 |
| 82 | 0.29097 | −0.05501 | 0.27778 |
| 83 | 0.29608 | 0.00470 | 0.27778 |
| 84 | 0.29932 | −0.05793 | 0.27778 |
| 85 | 0.30348 | −0.00013 | 0.27778 |
| 86 | 0.30761 | −0.06100 | 0.27778 |
| 87 | 0.31081 | −0.00508 | 0.27778 |
| 88 | 0.31585 | −0.06421 | 0.27778 |
| 89 | 0.31807 | −0.01013 | 0.27778 |
| 90 | 0.32404 | −0.06755 | 0.27778 |

TABLE II-continued

Non-Dimensionalized (X Y Z/Span)

| N | X | Y | Z |
|---|---|---|---|
| 91 | 0.32527 | −0.01529 | 0.27778 |
| 92 | 0.33219 | −0.07101 | 0.27778 |
| 93 | 0.33239 | −0.02053 | 0.27778 |
| 94 | 0.33944 | −0.02589 | 0.27778 |
| 95 | 0.34083 | −0.07176 | 0.27778 |
| 96 | 0.34574 | −0.03208 | 0.27778 |
| 97 | 0.34739 | −0.06628 | 0.27778 |
| 98 | 0.34911 | −0.04012 | 0.27778 |
| 99 | 0.34961 | −0.05771 | 0.27778 |
| 100 | 0.35004 | −0.04893 | 0.27778 |
| 1 | −0.03288 | −0.03174 | 0.30556 |
| 2 | −0.03277 | −0.02276 | 0.30556 |
| 3 | −0.03249 | −0.01378 | 0.30556 |
| 4 | −0.03217 | −0.00481 | 0.30556 |
| 5 | −0.03178 | −0.04065 | 0.30556 |
| 6 | −0.03027 | −0.04951 | 0.30556 |
| 7 | −0.03025 | 0.00392 | 0.30556 |
| 8 | −0.02500 | −0.05660 | 0.30556 |
| 9 | −0.02487 | 0.01097 | 0.30556 |
| 10 | −0.01684 | 0.01478 | 0.30556 |
| 11 | −0.01656 | −0.05916 | 0.30556 |
| 12 | −0.00793 | 0.01462 | 0.30556 |
| 13 | −0.00759 | −0.05869 | 0.30556 |
| 14 | 0.00090 | 0.01289 | 0.30556 |
| 15 | 0.00137 | −0.05796 | 0.30556 |
| 16 | 0.00985 | 0.01264 | 0.30556 |
| 17 | 0.01028 | −0.05691 | 0.30556 |
| 18 | 0.01862 | 0.01445 | 0.30556 |
| 19 | 0.01915 | −0.05545 | 0.30556 |
| 20 | 0.02664 | 0.01843 | 0.30556 |
| 21 | 0.02791 | −0.05350 | 0.30556 |
| 22 | 0.03426 | 0.02316 | 0.30556 |
| 23 | 0.03657 | −0.05113 | 0.30556 |
| 24 | 0.04193 | 0.02786 | 0.30556 |
| 25 | 0.04521 | −0.04867 | 0.30556 |
| 26 | 0.04961 | 0.03249 | 0.30556 |
| 27 | 0.05376 | −0.04599 | 0.30556 |
| 28 | 0.05786 | 0.03598 | 0.30556 |
| 29 | 0.06204 | −0.04257 | 0.30556 |
| 30 | 0.06646 | 0.03868 | 0.30556 |
| 31 | 0.07081 | −0.04065 | 0.30556 |
| 32 | 0.07498 | 0.04150 | 0.30556 |
| 33 | 0.07959 | −0.03876 | 0.30556 |
| 34 | 0.08347 | 0.04443 | 0.30556 |
| 35 | 0.08839 | −0.03693 | 0.30556 |
| 36 | 0.09193 | 0.04741 | 0.30556 |
| 37 | 0.09720 | −0.03520 | 0.30556 |
| 38 | 0.10038 | 0.05046 | 0.30556 |
| 39 | 0.10604 | −0.03361 | 0.30556 |
| 40 | 0.10888 | 0.05327 | 0.30556 |
| 41 | 0.11491 | −0.03217 | 0.30556 |
| 42 | 0.11788 | 0.05370 | 0.30556 |
| 43 | 0.12381 | −0.03093 | 0.30556 |
| 44 | 0.12647 | 0.05617 | 0.30556 |
| 45 | 0.13273 | −0.02990 | 0.30556 |
| 46 | 0.13506 | 0.05882 | 0.30556 |
| 47 | 0.14167 | −0.02910 | 0.30556 |
| 48 | 0.14374 | 0.06112 | 0.30556 |
| 49 | 0.15064 | −0.02851 | 0.30556 |
| 50 | 0.15253 | 0.06295 | 0.30556 |
| 51 | 0.15961 | −0.02816 | 0.30556 |
| 52 | 0.16143 | 0.06418 | 0.30556 |
| 53 | 0.16859 | −0.02809 | 0.30556 |
| 54 | 0.17039 | 0.06462 | 0.30556 |
| 55 | 0.17756 | −0.02829 | 0.30556 |
| 56 | 0.17935 | 0.06428 | 0.30556 |
| 57 | 0.18652 | −0.02878 | 0.30556 |
| 58 | 0.18827 | 0.06317 | 0.30556 |
| 59 | 0.19547 | −0.02952 | 0.30556 |
| 60 | 0.19706 | 0.06131 | 0.30556 |
| 61 | 0.20440 | −0.03053 | 0.30556 |
| 62 | 0.20567 | 0.05878 | 0.30556 |
| 63 | 0.21330 | −0.03178 | 0.30556 |
| 64 | 0.21406 | 0.05558 | 0.30556 |
| 65 | 0.22217 | −0.03326 | 0.30556 |
| 66 | 0.22219 | 0.05178 | 0.30556 |
| 67 | 0.23005 | 0.04743 | 0.30556 |
| 68 | 0.23099 | −0.03494 | 0.30556 |
| 69 | 0.23763 | 0.04261 | 0.30556 |
| 70 | 0.23976 | −0.03689 | 0.30556 |
| 71 | 0.24497 | 0.03743 | 0.30556 |
| 72 | 0.24842 | −0.03928 | 0.30556 |
| 73 | 0.25212 | 0.03201 | 0.30556 |
| 74 | 0.25691 | −0.04218 | 0.30556 |
| 75 | 0.25917 | 0.02642 | 0.30556 |
| 76 | 0.26525 | −0.04551 | 0.30556 |
| 77 | 0.26613 | 0.02074 | 0.30556 |
| 78 | 0.27301 | 0.01497 | 0.30556 |
| 79 | 0.27347 | −0.04913 | 0.30556 |
| 80 | 0.27980 | 0.00908 | 0.30556 |
| 81 | 0.28160 | −0.05296 | 0.30556 |
| 82 | 0.28646 | 0.00306 | 0.30556 |
| 83 | 0.28968 | −0.05690 | 0.30556 |
| 84 | 0.29299 | −0.00310 | 0.30556 |
| 85 | 0.29768 | −0.06097 | 0.30556 |
| 86 | 0.29939 | −0.00940 | 0.30556 |
| 87 | 0.30557 | −0.06527 | 0.30556 |
| 88 | 0.30566 | −0.01582 | 0.30556 |
| 89 | 0.31182 | −0.02237 | 0.30556 |
| 90 | 0.31330 | −0.06983 | 0.30556 |
| 91 | 0.31785 | −0.02902 | 0.30556 |
| 92 | 0.32090 | −0.07462 | 0.30556 |
| 93 | 0.32377 | −0.03578 | 0.30556 |
| 94 | 0.32840 | −0.07956 | 0.30556 |
| 95 | 0.32959 | −0.04262 | 0.30556 |
| 96 | 0.33532 | −0.04954 | 0.30556 |
| 97 | 0.33698 | −0.08094 | 0.30556 |
| 98 | 0.34090 | −0.05658 | 0.30556 |
| 99 | 0.34212 | −0.07404 | 0.30556 |
| 100 | 0.34298 | −0.06521 | 0.30556 |
| 1 | −0.03177 | −0.04166 | 0.33333 |
| 2 | −0.03143 | −0.03254 | 0.33333 |
| 3 | −0.03092 | −0.02344 | 0.33333 |
| 4 | −0.03042 | −0.05065 | 0.33333 |
| 5 | −0.03038 | −0.01434 | 0.33333 |
| 6 | −0.02982 | −0.00524 | 0.33333 |
| 7 | −0.02752 | 0.00354 | 0.33333 |
| 8 | −0.02519 | −0.05788 | 0.33333 |
| 9 | −0.02159 | 0.01027 | 0.33333 |
| 10 | −0.01651 | −0.06027 | 0.33333 |
| 11 | −0.01303 | 0.01314 | 0.33333 |
| 12 | −0.00740 | −0.06054 | 0.33333 |
| 13 | −0.00406 | 0.01181 | 0.33333 |
| 14 | 0.00170 | −0.06013 | 0.33333 |
| 15 | 0.00485 | 0.00987 | 0.33333 |
| 16 | 0.01078 | −0.05924 | 0.33333 |
| 17 | 0.01397 | 0.00934 | 0.33333 |
| 18 | 0.01979 | −0.05788 | 0.33333 |
| 19 | 0.02277 | 0.01138 | 0.33333 |
| 20 | 0.02869 | −0.05588 | 0.33333 |
| 21 | 0.03049 | 0.01616 | 0.33333 |
| 22 | 0.03740 | −0.05319 | 0.33333 |
| 23 | 0.03749 | 0.02200 | 0.33333 |
| 24 | 0.04457 | 0.02776 | 0.33333 |
| 25 | 0.04592 | −0.04996 | 0.33333 |
| 26 | 0.05173 | 0.03340 | 0.33333 |
| 27 | 0.05437 | −0.04656 | 0.33333 |
| 28 | 0.05978 | 0.03763 | 0.33333 |
| 29 | 0.06238 | −0.04222 | 0.33333 |
| 30 | 0.06819 | 0.04116 | 0.33333 |
| 31 | 0.07111 | −0.03962 | 0.33333 |
| 32 | 0.07656 | 0.04474 | 0.33333 |
| 33 | 0.07989 | −0.03715 | 0.33333 |
| 34 | 0.08494 | 0.04834 | 0.33333 |
| 35 | 0.08868 | −0.03475 | 0.33333 |
| 36 | 0.09332 | 0.05195 | 0.33333 |
| 37 | 0.09750 | −0.03244 | 0.33333 |
| 38 | 0.10168 | 0.05557 | 0.33333 |
| 39 | 0.10636 | −0.03030 | 0.33333 |
| 40 | 0.11018 | 0.05876 | 0.33333 |
| 41 | 0.11528 | −0.02837 | 0.33333 |
| 42 | 0.11924 | 0.05914 | 0.33333 |

TABLE II-continued

Non-Dimensionalized (X Y Z/Span)

| N | X | Y | Z |
|---|---|---|---|
| 43 | 0.12424 | −0.02670 | 0.33333 |
| 44 | 0.12768 | 0.06258 | 0.33333 |
| 45 | 0.13325 | −0.02532 | 0.33333 |
| 46 | 0.13622 | 0.06578 | 0.33333 |
| 47 | 0.14230 | −0.02423 | 0.33333 |
| 48 | 0.14489 | 0.06862 | 0.33333 |
| 49 | 0.15138 | −0.02343 | 0.33333 |
| 50 | 0.15370 | 0.07093 | 0.33333 |
| 51 | 0.16049 | −0.02292 | 0.33333 |
| 52 | 0.16267 | 0.07255 | 0.33333 |
| 53 | 0.16960 | −0.02272 | 0.33333 |
| 54 | 0.17176 | 0.07332 | 0.33333 |
| 55 | 0.17872 | −0.02280 | 0.33333 |
| 56 | 0.18086 | 0.07308 | 0.33333 |
| 57 | 0.18782 | −0.02315 | 0.33333 |
| 58 | 0.18986 | 0.07176 | 0.33333 |
| 59 | 0.19692 | −0.02378 | 0.33333 |
| 60 | 0.19867 | 0.06941 | 0.33333 |
| 61 | 0.20599 | −0.02470 | 0.33333 |
| 62 | 0.20720 | 0.06619 | 0.33333 |
| 63 | 0.21503 | −0.02590 | 0.33333 |
| 64 | 0.21541 | 0.06222 | 0.33333 |
| 65 | 0.22327 | 0.05760 | 0.33333 |
| 66 | 0.22402 | −0.02741 | 0.33333 |
| 67 | 0.23122 | 0.05317 | 0.33333 |
| 68 | 0.23265 | −0.03032 | 0.33333 |
| 69 | 0.23906 | 0.04852 | 0.33333 |
| 70 | 0.24117 | −0.03354 | 0.33333 |
| 71 | 0.24599 | 0.04261 | 0.33333 |
| 72 | 0.24977 | −0.03653 | 0.33333 |
| 73 | 0.25265 | 0.03638 | 0.33333 |
| 74 | 0.25813 | −0.04017 | 0.33333 |
| 75 | 0.25911 | 0.02996 | 0.33333 |
| 76 | 0.26543 | 0.02338 | 0.33333 |
| 77 | 0.26623 | −0.04435 | 0.33333 |
| 78 | 0.27163 | 0.01669 | 0.33333 |
| 79 | 0.27411 | −0.04893 | 0.33333 |
| 80 | 0.27772 | 0.00991 | 0.33333 |
| 81 | 0.28187 | −0.05374 | 0.33333 |
| 82 | 0.28369 | 0.00302 | 0.33333 |
| 83 | 0.28950 | −0.00400 | 0.33333 |
| 84 | 0.28953 | −0.05869 | 0.33333 |
| 85 | 0.29516 | −0.01114 | 0.33333 |
| 86 | 0.29706 | −0.06384 | 0.33333 |
| 87 | 0.30065 | −0.01842 | 0.33333 |
| 88 | 0.30439 | −0.06924 | 0.33333 |
| 89 | 0.30597 | −0.02581 | 0.33333 |
| 90 | 0.31115 | −0.03331 | 0.33333 |
| 91 | 0.31149 | −0.07494 | 0.33333 |
| 92 | 0.31619 | −0.04092 | 0.33333 |
| 93 | 0.31842 | −0.08087 | 0.33333 |
| 94 | 0.32110 | −0.04861 | 0.33333 |
| 95 | 0.32522 | −0.08695 | 0.33333 |
| 96 | 0.32587 | −0.05638 | 0.33333 |
| 97 | 0.33052 | −0.06422 | 0.33333 |
| 98 | 0.33366 | −0.08845 | 0.33333 |
| 99 | 0.33514 | −0.07207 | 0.33333 |
| 100 | 0.33763 | −0.08056 | 0.33333 |
| 1 | 0.03092 | −0.02723 | 0.36111 |
| 2 | 0.03152 | −0.01927 | 0.36111 |
| 3 | 0.03210 | −0.01131 | 0.36111 |
| 4 | 0.03269 | −0.00335 | 0.36111 |
| 5 | 0.03328 | 0.00461 | 0.36111 |
| 6 | 0.03347 | −0.03462 | 0.36111 |
| 7 | 0.03386 | 0.01257 | 0.36111 |
| 8 | 0.03684 | 0.01979 | 0.36111 |
| 9 | 0.03721 | −0.04167 | 0.36111 |
| 10 | 0.04102 | −0.04867 | 0.36111 |
| 11 | 0.04252 | 0.02540 | 0.36111 |
| 12 | 0.04825 | −0.04964 | 0.36111 |
| 13 | 0.04831 | 0.03090 | 0.36111 |
| 14 | 0.05425 | 0.03621 | 0.36111 |
| 15 | 0.05544 | −0.04618 | 0.36111 |
| 16 | 0.06100 | 0.04045 | 0.36111 |
| 17 | 0.06222 | −0.04194 | 0.36111 |
| 18 | 0.06804 | 0.04421 | 0.36111 |
| 19 | 0.06958 | −0.03895 | 0.36111 |
| 20 | 0.07507 | 0.04798 | 0.36111 |
| 21 | 0.07714 | −0.03636 | 0.36111 |
| 22 | 0.08215 | 0.05167 | 0.36111 |
| 23 | 0.08471 | −0.03386 | 0.36111 |
| 24 | 0.08927 | 0.05529 | 0.36111 |
| 25 | 0.09232 | −0.03143 | 0.36111 |
| 26 | 0.09640 | 0.05885 | 0.36111 |
| 27 | 0.09996 | −0.02914 | 0.36111 |
| 28 | 0.10356 | 0.06238 | 0.36111 |
| 29 | 0.10765 | −0.02700 | 0.36111 |
| 30 | 0.11083 | 0.06558 | 0.36111 |
| 31 | 0.11539 | −0.02506 | 0.36111 |
| 32 | 0.11879 | 0.06645 | 0.36111 |
| 33 | 0.12318 | −0.02333 | 0.36111 |
| 34 | 0.12615 | 0.06940 | 0.36111 |
| 35 | 0.13102 | −0.02184 | 0.36111 |
| 36 | 0.13349 | 0.07253 | 0.36111 |
| 37 | 0.13891 | −0.02062 | 0.36111 |
| 38 | 0.14096 | 0.07536 | 0.36111 |
| 39 | 0.14683 | −0.01967 | 0.36111 |
| 40 | 0.14855 | 0.07781 | 0.36111 |
| 41 | 0.15478 | −0.01900 | 0.36111 |
| 42 | 0.15629 | 0.07976 | 0.36111 |
| 43 | 0.16275 | −0.01860 | 0.36111 |
| 44 | 0.16415 | 0.08111 | 0.36111 |
| 45 | 0.17073 | −0.01846 | 0.36111 |
| 46 | 0.17210 | 0.08179 | 0.36111 |
| 47 | 0.17871 | −0.01857 | 0.36111 |
| 48 | 0.18007 | 0.08169 | 0.36111 |
| 49 | 0.18668 | −0.01895 | 0.36111 |
| 50 | 0.18799 | 0.08073 | 0.36111 |
| 51 | 0.19463 | −0.01958 | 0.36111 |
| 52 | 0.19576 | 0.07895 | 0.36111 |
| 53 | 0.20256 | −0.02047 | 0.36111 |
| 54 | 0.20332 | 0.07639 | 0.36111 |
| 55 | 0.21047 | −0.02161 | 0.36111 |
| 56 | 0.21063 | 0.07319 | 0.36111 |
| 57 | 0.21765 | 0.06940 | 0.36111 |
| 58 | 0.21833 | −0.02299 | 0.36111 |
| 59 | 0.22439 | 0.06513 | 0.36111 |
| 60 | 0.22614 | −0.02462 | 0.36111 |
| 61 | 0.23095 | 0.06060 | 0.36111 |
| 62 | 0.23369 | −0.02709 | 0.36111 |
| 63 | 0.23778 | 0.05644 | 0.36111 |
| 64 | 0.24097 | −0.03038 | 0.36111 |
| 65 | 0.24392 | 0.05139 | 0.36111 |
| 66 | 0.24841 | −0.03326 | 0.36111 |
| 67 | 0.24956 | 0.04576 | 0.36111 |
| 68 | 0.25501 | 0.03992 | 0.36111 |
| 69 | 0.25562 | −0.03665 | 0.36111 |
| 70 | 0.26029 | 0.03393 | 0.36111 |
| 71 | 0.26260 | −0.04053 | 0.36111 |
| 72 | 0.26542 | 0.02782 | 0.36111 |
| 73 | 0.26933 | −0.04482 | 0.36111 |
| 74 | 0.27045 | 0.02162 | 0.36111 |
| 75 | 0.27539 | 0.01535 | 0.36111 |
| 76 | 0.27586 | −0.04940 | 0.36111 |
| 77 | 0.28023 | 0.00900 | 0.36111 |
| 78 | 0.28227 | −0.05416 | 0.36111 |
| 79 | 0.28496 | 0.00259 | 0.36111 |
| 80 | 0.28858 | −0.05907 | 0.36111 |
| 81 | 0.28958 | −0.00393 | 0.36111 |
| 82 | 0.29407 | −0.01053 | 0.36111 |
| 83 | 0.29475 | −0.06412 | 0.36111 |
| 84 | 0.29843 | −0.01721 | 0.36111 |
| 85 | 0.30076 | −0.06937 | 0.36111 |
| 86 | 0.30264 | −0.02398 | 0.36111 |
| 87 | 0.30657 | −0.07482 | 0.36111 |
| 88 | 0.30674 | −0.03084 | 0.36111 |
| 89 | 0.31071 | −0.03775 | 0.36111 |
| 90 | 0.31222 | −0.08047 | 0.36111 |
| 91 | 0.31457 | −0.04474 | 0.36111 |
| 92 | 0.31771 | −0.08625 | 0.36111 |
| 93 | 0.31832 | −0.05179 | 0.36111 |
| 94 | 0.32197 | −0.05889 | 0.36111 |

TABLE II-continued

Non-Dimensionalized (X Y Z/Span)

| N | X | Y | Z |
|---|---|---|---|
| 95 | 0.32311 | −0.09213 | 0.36111 |
| 96 | 0.32551 | −0.06603 | 0.36111 |
| 97 | 0.32897 | −0.07323 | 0.36111 |
| 98 | 0.33033 | −0.09410 | 0.36111 |
| 99 | 0.33235 | −0.08046 | 0.36111 |
| 100 | 0.33473 | −0.08796 | 0.36111 |
| 1 | 0.00684 | −0.03833 | 0.38889 |
| 2 | 0.00849 | −0.02998 | 0.38889 |
| 3 | 0.00861 | −0.04653 | 0.38889 |
| 4 | 0.01148 | −0.02197 | 0.38889 |
| 5 | 0.01422 | −0.05291 | 0.38889 |
| 6 | 0.01499 | −0.01420 | 0.38889 |
| 7 | 0.01880 | −0.00655 | 0.38889 |
| 8 | 0.02201 | −0.05611 | 0.38889 |
| 9 | 0.02296 | 0.00090 | 0.38889 |
| 10 | 0.02751 | 0.00812 | 0.38889 |
| 11 | 0.03040 | −0.05498 | 0.38889 |
| 12 | 0.03247 | 0.01506 | 0.38889 |
| 13 | 0.03785 | 0.02169 | 0.38889 |
| 14 | 0.03838 | −0.05196 | 0.38889 |
| 15 | 0.04359 | 0.02800 | 0.38889 |
| 16 | 0.04625 | −0.04866 | 0.38889 |
| 17 | 0.04952 | 0.03415 | 0.38889 |
| 18 | 0.05390 | −0.04490 | 0.38889 |
| 19 | 0.05566 | 0.04005 | 0.38889 |
| 20 | 0.06158 | −0.04116 | 0.38889 |
| 21 | 0.06265 | 0.04495 | 0.38889 |
| 22 | 0.06942 | −0.03778 | 0.38889 |
| 23 | 0.06982 | 0.04960 | 0.38889 |
| 24 | 0.07698 | 0.05424 | 0.38889 |
| 25 | 0.07739 | −0.03472 | 0.38889 |
| 26 | 0.08427 | 0.05868 | 0.38889 |
| 27 | 0.08543 | −0.03184 | 0.38889 |
| 28 | 0.09166 | 0.06294 | 0.38889 |
| 29 | 0.09350 | −0.02907 | 0.38889 |
| 30 | 0.09914 | 0.06707 | 0.38889 |
| 31 | 0.10163 | −0.02647 | 0.38889 |
| 32 | 0.10667 | 0.07110 | 0.38889 |
| 33 | 0.10982 | −0.02408 | 0.38889 |
| 34 | 0.11438 | 0.07472 | 0.38889 |
| 35 | 0.11809 | −0.02196 | 0.38889 |
| 36 | 0.12231 | 0.07788 | 0.38889 |
| 37 | 0.12644 | −0.02017 | 0.38889 |
| 38 | 0.13013 | 0.08132 | 0.38889 |
| 39 | 0.13485 | −0.01873 | 0.38889 |
| 40 | 0.13809 | 0.08440 | 0.38889 |
| 41 | 0.14331 | −0.01764 | 0.38889 |
| 42 | 0.14622 | 0.08700 | 0.38889 |
| 43 | 0.15181 | −0.01687 | 0.38889 |
| 44 | 0.15451 | 0.08901 | 0.38889 |
| 45 | 0.16033 | −0.01642 | 0.38889 |
| 46 | 0.16294 | 0.09031 | 0.38889 |
| 47 | 0.16887 | −0.01630 | 0.38889 |
| 48 | 0.17146 | 0.09084 | 0.38889 |
| 49 | 0.17740 | −0.01651 | 0.38889 |
| 50 | 0.17998 | 0.09050 | 0.38889 |
| 51 | 0.18592 | −0.01703 | 0.38889 |
| 52 | 0.18842 | 0.08925 | 0.38889 |
| 53 | 0.19442 | −0.01788 | 0.38889 |
| 54 | 0.19668 | 0.08712 | 0.38889 |
| 55 | 0.20288 | −0.01905 | 0.38889 |
| 56 | 0.20468 | 0.08415 | 0.38889 |
| 57 | 0.21128 | −0.02052 | 0.38889 |
| 58 | 0.21239 | 0.08049 | 0.38889 |
| 59 | 0.21963 | −0.02231 | 0.38889 |
| 60 | 0.21979 | 0.07624 | 0.38889 |
| 61 | 0.22687 | 0.07148 | 0.38889 |
| 62 | 0.22790 | −0.02440 | 0.38889 |
| 63 | 0.23364 | 0.06627 | 0.38889 |
| 64 | 0.23607 | −0.02687 | 0.38889 |
| 65 | 0.24008 | 0.06067 | 0.38889 |
| 66 | 0.24409 | −0.02981 | 0.38889 |
| 67 | 0.24621 | 0.05473 | 0.38889 |
| 68 | 0.25186 | −0.03331 | 0.38889 |
| 69 | 0.25206 | 0.04853 | 0.38889 |
| 70 | 0.25768 | 0.04210 | 0.38889 |
| 71 | 0.25937 | −0.03737 | 0.38889 |
| 72 | 0.26312 | 0.03552 | 0.38889 |
| 73 | 0.26660 | −0.04191 | 0.38889 |
| 74 | 0.26841 | 0.02882 | 0.38889 |
| 75 | 0.27353 | −0.04688 | 0.38889 |
| 76 | 0.27359 | 0.02203 | 0.38889 |
| 77 | 0.27864 | 0.01515 | 0.38889 |
| 78 | 0.28025 | −0.05216 | 0.38889 |
| 79 | 0.28359 | 0.00819 | 0.38889 |
| 80 | 0.28681 | −0.05762 | 0.38889 |
| 81 | 0.28841 | 0.00115 | 0.38889 |
| 82 | 0.29311 | −0.00598 | 0.38889 |
| 83 | 0.29320 | −0.06328 | 0.38889 |
| 84 | 0.29765 | −0.01321 | 0.38889 |
| 85 | 0.29941 | −0.06914 | 0.38889 |
| 86 | 0.30200 | −0.02054 | 0.38889 |
| 87 | 0.30542 | −0.07519 | 0.38889 |
| 88 | 0.30618 | −0.02799 | 0.38889 |
| 89 | 0.31020 | −0.03552 | 0.38889 |
| 90 | 0.31124 | −0.08143 | 0.38889 |
| 91 | 0.31410 | −0.04312 | 0.38889 |
| 92 | 0.31691 | −0.08782 | 0.38889 |
| 93 | 0.31788 | −0.05077 | 0.38889 |
| 94 | 0.32155 | −0.05847 | 0.38889 |
| 95 | 0.32247 | −0.09430 | 0.38889 |
| 96 | 0.32513 | −0.06622 | 0.38889 |
| 97 | 0.32863 | −0.07400 | 0.38889 |
| 98 | 0.33016 | −0.09637 | 0.38889 |
| 99 | 0.33203 | −0.08184 | 0.38889 |
| 100 | 0.33483 | −0.08986 | 0.38889 |
| 1 | 0.00761 | −0.03207 | 0.41666 |
| 2 | 0.00783 | −0.04065 | 0.41666 |
| 3 | 0.00946 | −0.02362 | 0.41666 |
| 4 | 0.01218 | −0.04804 | 0.41666 |
| 5 | 0.01238 | −0.01546 | 0.41666 |
| 6 | 0.01593 | −0.00756 | 0.41666 |
| 7 | 0.01937 | −0.05272 | 0.41666 |
| 8 | 0.02000 | 0.00007 | 0.41666 |
| 9 | 0.02452 | 0.00746 | 0.41666 |
| 10 | 0.02792 | −0.05293 | 0.41666 |
| 11 | 0.02941 | 0.01460 | 0.41666 |
| 12 | 0.03463 | 0.02151 | 0.41666 |
| 13 | 0.03617 | −0.05036 | 0.41666 |
| 14 | 0.04012 | 0.02821 | 0.41666 |
| 15 | 0.04400 | −0.04667 | 0.41666 |
| 16 | 0.04584 | 0.03472 | 0.41666 |
| 17 | 0.05165 | −0.04260 | 0.41666 |
| 18 | 0.05179 | 0.04100 | 0.41666 |
| 19 | 0.05806 | 0.04696 | 0.41666 |
| 20 | 0.05933 | −0.03860 | 0.41666 |
| 21 | 0.06498 | 0.05216 | 0.41666 |
| 22 | 0.06715 | −0.03489 | 0.41666 |
| 23 | 0.07192 | 0.05736 | 0.41666 |
| 24 | 0.07513 | −0.03153 | 0.41666 |
| 25 | 0.07895 | 0.06240 | 0.41666 |
| 26 | 0.08322 | −0.02845 | 0.41666 |
| 27 | 0.08618 | 0.06718 | 0.41666 |
| 28 | 0.09138 | −0.02554 | 0.41666 |
| 29 | 0.09355 | 0.07170 | 0.41666 |
| 30 | 0.09960 | −0.02282 | 0.41666 |
| 31 | 0.10104 | 0.07606 | 0.41666 |
| 32 | 0.10790 | −0.02035 | 0.41666 |
| 33 | 0.10863 | 0.08023 | 0.41666 |
| 34 | 0.11629 | −0.01820 | 0.41666 |
| 35 | 0.11639 | 0.08409 | 0.41666 |
| 36 | 0.12428 | 0.08765 | 0.41666 |
| 37 | 0.12476 | −0.01642 | 0.41666 |
| 38 | 0.13233 | 0.09083 | 0.41666 |
| 39 | 0.13331 | −0.01504 | 0.41666 |
| 40 | 0.14055 | 0.09355 | 0.41666 |
| 41 | 0.14191 | −0.01403 | 0.41666 |
| 42 | 0.14894 | 0.09567 | 0.41666 |
| 43 | 0.15054 | −0.01339 | 0.41666 |
| 44 | 0.15749 | 0.09705 | 0.41666 |
| 45 | 0.15920 | −0.01309 | 0.41666 |
| 46 | 0.16613 | 0.09765 | 0.41666 |

TABLE II-continued

Non-Dimensionalized (X Y Z/Span)

| N | X | Y | Z |
|---|---|---|---|
| 47 | 0.16786 | −0.01313 | 0.41666 |
| 48 | 0.17478 | 0.09743 | 0.41666 |
| 49 | 0.17651 | −0.01350 | 0.41666 |
| 50 | 0.18336 | 0.09635 | 0.41666 |
| 51 | 0.18514 | −0.01421 | 0.41666 |
| 52 | 0.19179 | 0.09438 | 0.41666 |
| 53 | 0.19373 | −0.01528 | 0.41666 |
| 54 | 0.19999 | 0.09159 | 0.41666 |
| 55 | 0.20228 | −0.01668 | 0.41666 |
| 56 | 0.20791 | 0.08809 | 0.41666 |
| 57 | 0.21076 | −0.01840 | 0.41666 |
| 58 | 0.21552 | 0.08398 | 0.41666 |
| 59 | 0.21918 | −0.02044 | 0.41666 |
| 60 | 0.22282 | 0.07932 | 0.41666 |
| 61 | 0.22751 | −0.02282 | 0.41666 |
| 62 | 0.22980 | 0.07420 | 0.41666 |
| 63 | 0.23573 | −0.02554 | 0.41666 |
| 64 | 0.23647 | 0.06867 | 0.41666 |
| 65 | 0.24281 | 0.06278 | 0.41666 |
| 66 | 0.24379 | −0.02868 | 0.41666 |
| 67 | 0.24887 | 0.05660 | 0.41666 |
| 68 | 0.25164 | −0.03234 | 0.41666 |
| 69 | 0.25466 | 0.05017 | 0.41666 |
| 70 | 0.25923 | −0.03650 | 0.41666 |
| 71 | 0.26024 | 0.04354 | 0.41666 |
| 72 | 0.26565 | 0.03677 | 0.41666 |
| 73 | 0.26654 | −0.04114 | 0.41666 |
| 74 | 0.27093 | 0.02990 | 0.41666 |
| 75 | 0.27356 | −0.04620 | 0.41666 |
| 76 | 0.27609 | 0.02295 | 0.41666 |
| 77 | 0.28033 | −0.05162 | 0.41666 |
| 78 | 0.28114 | 0.01591 | 0.41666 |
| 79 | 0.28607 | 0.00880 | 0.41666 |
| 80 | 0.28688 | −0.05728 | 0.41666 |
| 81 | 0.29088 | 0.00159 | 0.41666 |
| 82 | 0.29323 | −0.06316 | 0.41666 |
| 83 | 0.29554 | −0.00570 | 0.41666 |
| 84 | 0.29941 | −0.06923 | 0.41666 |
| 85 | 0.30004 | −0.01310 | 0.41666 |
| 86 | 0.30432 | −0.02062 | 0.41666 |
| 87 | 0.30540 | −0.07548 | 0.41666 |
| 88 | 0.30844 | −0.02824 | 0.41666 |
| 89 | 0.31123 | −0.08189 | 0.41666 |
| 90 | 0.31239 | −0.03595 | 0.41666 |
| 91 | 0.31621 | −0.04372 | 0.41666 |
| 92 | 0.31692 | −0.08842 | 0.41666 |
| 93 | 0.31993 | −0.05154 | 0.41666 |
| 94 | 0.32250 | −0.09503 | 0.41666 |
| 95 | 0.32352 | −0.05941 | 0.41666 |
| 96 | 0.32704 | −0.06733 | 0.41666 |
| 97 | 0.33027 | −0.09754 | 0.41666 |
| 98 | 0.33046 | −0.07528 | 0.41666 |
| 99 | 0.33377 | −0.08329 | 0.41666 |
| 100 | 0.33589 | −0.09155 | 0.41666 |
| 1 | 0.00806 | −0.03447 | 0.44445 |
| 2 | 0.00857 | −0.02573 | 0.44445 |
| 3 | 0.01048 | −0.01715 | 0.44445 |
| 4 | 0.01074 | −0.04272 | 0.44445 |
| 5 | 0.01327 | −0.00880 | 0.44445 |
| 6 | 0.01670 | −0.00072 | 0.44445 |
| 7 | 0.01705 | −0.04873 | 0.44445 |
| 8 | 0.02069 | 0.00711 | 0.44445 |
| 9 | 0.02518 | 0.01466 | 0.44445 |
| 10 | 0.02549 | −0.05055 | 0.44445 |
| 11 | 0.03007 | 0.02195 | 0.44445 |
| 12 | 0.03398 | −0.04837 | 0.44445 |
| 13 | 0.03530 | 0.02901 | 0.44445 |
| 14 | 0.04082 | 0.03585 | 0.44445 |
| 15 | 0.04197 | −0.04476 | 0.44445 |
| 16 | 0.04660 | 0.04246 | 0.44445 |
| 17 | 0.04969 | −0.04053 | 0.44445 |
| 18 | 0.05266 | 0.04883 | 0.44445 |
| 19 | 0.05738 | −0.03628 | 0.44445 |
| 20 | 0.05901 | 0.05489 | 0.44445 |
| 21 | 0.06519 | −0.03225 | 0.44445 |
| 22 | 0.06564 | 0.06067 | 0.44445 |
| 23 | 0.07251 | 0.06615 | 0.44445 |
| 24 | 0.07316 | −0.02855 | 0.44445 |
| 25 | 0.07961 | 0.07132 | 0.44445 |
| 26 | 0.08128 | −0.02521 | 0.44445 |
| 27 | 0.08689 | 0.07622 | 0.44445 |
| 28 | 0.08951 | −0.02210 | 0.44445 |
| 29 | 0.09436 | 0.08087 | 0.44445 |
| 30 | 0.09781 | −0.01924 | 0.44445 |
| 31 | 0.10195 | 0.08528 | 0.44445 |
| 32 | 0.10622 | −0.01668 | 0.44445 |
| 33 | 0.10969 | 0.08944 | 0.44445 |
| 34 | 0.11472 | −0.01447 | 0.44445 |
| 35 | 0.11760 | 0.09326 | 0.44445 |
| 36 | 0.12332 | −0.01267 | 0.44445 |
| 37 | 0.12571 | 0.09664 | 0.44445 |
| 38 | 0.13200 | −0.01131 | 0.44445 |
| 39 | 0.13402 | 0.09951 | 0.44445 |
| 40 | 0.14074 | −0.01038 | 0.44445 |
| 41 | 0.14250 | 0.10178 | 0.44445 |
| 42 | 0.14950 | −0.00985 | 0.44445 |
| 43 | 0.15114 | 0.10336 | 0.44445 |
| 44 | 0.15829 | −0.00967 | 0.44445 |
| 45 | 0.15989 | 0.10416 | 0.44445 |
| 46 | 0.16707 | −0.00985 | 0.44445 |
| 47 | 0.16868 | 0.10413 | 0.44445 |
| 48 | 0.17585 | −0.01039 | 0.44445 |
| 49 | 0.17741 | 0.10329 | 0.44445 |
| 50 | 0.18458 | −0.01129 | 0.44445 |
| 51 | 0.18603 | 0.10160 | 0.44445 |
| 52 | 0.19328 | −0.01254 | 0.44445 |
| 53 | 0.19445 | 0.09908 | 0.44445 |
| 54 | 0.20192 | −0.01415 | 0.44445 |
| 55 | 0.20261 | 0.09583 | 0.44445 |
| 56 | 0.21047 | 0.09191 | 0.44445 |
| 57 | 0.21048 | −0.01611 | 0.44445 |
| 58 | 0.21802 | 0.08741 | 0.44445 |
| 59 | 0.21896 | −0.01841 | 0.44445 |
| 60 | 0.22524 | 0.08243 | 0.44445 |
| 61 | 0.22735 | −0.02104 | 0.44445 |
| 62 | 0.23215 | 0.07699 | 0.44445 |
| 63 | 0.23561 | −0.02403 | 0.44445 |
| 64 | 0.23874 | 0.07118 | 0.44445 |
| 65 | 0.24372 | −0.02742 | 0.44445 |
| 66 | 0.24502 | 0.06503 | 0.44445 |
| 67 | 0.25100 | 0.05860 | 0.44445 |
| 68 | 0.25160 | −0.03127 | 0.44445 |
| 69 | 0.25673 | 0.05195 | 0.44445 |
| 70 | 0.25926 | −0.03560 | 0.44445 |
| 71 | 0.26227 | 0.04512 | 0.44445 |
| 72 | 0.26663 | −0.04037 | 0.44445 |
| 73 | 0.26765 | 0.03817 | 0.44445 |
| 74 | 0.27292 | 0.03113 | 0.44445 |
| 75 | 0.27371 | −0.04557 | 0.44445 |
| 76 | 0.27806 | 0.02401 | 0.44445 |
| 77 | 0.28052 | −0.05113 | 0.44445 |
| 78 | 0.28309 | 0.01680 | 0.44445 |
| 79 | 0.28707 | −0.05698 | 0.44445 |
| 80 | 0.28801 | 0.00952 | 0.44445 |
| 81 | 0.29280 | 0.00216 | 0.44445 |
| 82 | 0.29339 | −0.06308 | 0.44445 |
| 83 | 0.29742 | −0.00532 | 0.44445 |
| 84 | 0.29952 | −0.06938 | 0.44445 |
| 85 | 0.30187 | −0.01289 | 0.44445 |
| 86 | 0.30548 | −0.07583 | 0.44445 |
| 87 | 0.30611 | −0.02058 | 0.44445 |
| 88 | 0.31017 | −0.02837 | 0.44445 |
| 89 | 0.31131 | −0.08241 | 0.44445 |
| 90 | 0.31407 | −0.03625 | 0.44445 |
| 91 | 0.31701 | −0.08910 | 0.44445 |
| 92 | 0.31783 | −0.04419 | 0.44445 |
| 93 | 0.32148 | −0.05218 | 0.44445 |
| 94 | 0.32261 | −0.09586 | 0.44445 |
| 95 | 0.32504 | −0.06022 | 0.44445 |
| 96 | 0.32848 | −0.06830 | 0.44445 |
| 97 | 0.33044 | −0.09868 | 0.44445 |
| 98 | 0.33186 | −0.07641 | 0.44445 |

TABLE II-continued

Non-Dimensionalized (X Y Z/Span)

| N | X | Y | Z |
|---|---|---|---|
| 99 | 0.33511 | −0.08457 | 0.44445 |
| 100 | 0.33665 | −0.09304 | 0.44445 |
| 1 | 0.00891 | −0.02885 | 0.47222 |
| 2 | 0.00960 | −0.01998 | 0.47222 |
| 3 | 0.01038 | −0.03757 | 0.47222 |
| 4 | 0.01139 | −0.01126 | 0.47222 |
| 5 | 0.01393 | −0.00273 | 0.47222 |
| 6 | 0.01567 | −0.04459 | 0.47222 |
| 7 | 0.01710 | 0.00559 | 0.47222 |
| 8 | 0.02085 | 0.01367 | 0.47222 |
| 9 | 0.02387 | −0.04776 | 0.47222 |
| 10 | 0.02511 | 0.02148 | 0.47222 |
| 11 | 0.02985 | 0.02902 | 0.47222 |
| 12 | 0.03256 | −0.04614 | 0.47222 |
| 13 | 0.03501 | 0.03628 | 0.47222 |
| 14 | 0.04054 | 0.04327 | 0.47222 |
| 15 | 0.04073 | −0.04261 | 0.47222 |
| 16 | 0.04639 | 0.04997 | 0.47222 |
| 17 | 0.04853 | −0.03832 | 0.47222 |
| 18 | 0.05254 | 0.05642 | 0.47222 |
| 19 | 0.05626 | −0.03386 | 0.47222 |
| 20 | 0.05896 | 0.06259 | 0.47222 |
| 21 | 0.06405 | −0.02956 | 0.47222 |
| 22 | 0.06562 | 0.06850 | 0.47222 |
| 23 | 0.07200 | −0.02555 | 0.47222 |
| 24 | 0.07251 | 0.07414 | 0.47222 |
| 25 | 0.07962 | 0.07950 | 0.47222 |
| 26 | 0.08012 | −0.02188 | 0.47222 |
| 27 | 0.08694 | 0.08458 | 0.47222 |
| 28 | 0.08838 | −0.01855 | 0.47222 |
| 29 | 0.09446 | 0.08935 | 0.47222 |
| 30 | 0.09676 | −0.01556 | 0.47222 |
| 31 | 0.10217 | 0.09379 | 0.47222 |
| 32 | 0.10527 | −0.01291 | 0.47222 |
| 33 | 0.11009 | 0.09787 | 0.47222 |
| 34 | 0.11389 | −0.01067 | 0.47222 |
| 35 | 0.11822 | 0.10150 | 0.47222 |
| 36 | 0.12261 | −0.00888 | 0.47222 |
| 37 | 0.12657 | 0.10460 | 0.47222 |
| 38 | 0.13141 | −0.00755 | 0.47222 |
| 39 | 0.13512 | 0.10710 | 0.47222 |
| 40 | 0.14028 | −0.00666 | 0.47222 |
| 41 | 0.14383 | 0.10893 | 0.47222 |
| 42 | 0.14916 | −0.00620 | 0.47222 |
| 43 | 0.15266 | 0.11003 | 0.47222 |
| 44 | 0.15807 | −0.00615 | 0.47222 |
| 45 | 0.16156 | 0.11033 | 0.47222 |
| 46 | 0.16697 | −0.00647 | 0.47222 |
| 47 | 0.17045 | 0.10981 | 0.47222 |
| 48 | 0.17585 | −0.00717 | 0.47222 |
| 49 | 0.17926 | 0.10848 | 0.47222 |
| 50 | 0.18469 | −0.00824 | 0.47222 |
| 51 | 0.18790 | 0.10635 | 0.47222 |
| 52 | 0.19348 | −0.00968 | 0.47222 |
| 53 | 0.19632 | 0.10344 | 0.47222 |
| 54 | 0.20220 | −0.01150 | 0.47222 |
| 55 | 0.20446 | 0.09985 | 0.47222 |
| 56 | 0.21083 | −0.01368 | 0.47222 |
| 57 | 0.21229 | 0.09561 | 0.47222 |
| 58 | 0.21936 | −0.01621 | 0.47222 |
| 59 | 0.21980 | 0.09082 | 0.47222 |
| 60 | 0.22697 | 0.08555 | 0.47222 |
| 61 | 0.22779 | −0.01910 | 0.47222 |
| 62 | 0.23381 | 0.07984 | 0.47222 |
| 63 | 0.23607 | −0.02236 | 0.47222 |
| 64 | 0.24032 | 0.07377 | 0.47222 |
| 65 | 0.24420 | −0.02601 | 0.47222 |
| 66 | 0.24652 | 0.06738 | 0.47222 |
| 67 | 0.25211 | −0.03011 | 0.47222 |
| 68 | 0.25245 | 0.06073 | 0.47222 |
| 69 | 0.25812 | 0.05387 | 0.47222 |
| 70 | 0.25977 | −0.03466 | 0.47222 |
| 71 | 0.26361 | 0.04686 | 0.47222 |
| 72 | 0.26715 | −0.03963 | 0.47222 |
| 73 | 0.26894 | 0.03972 | 0.47222 |
| 74 | 0.27417 | 0.03250 | 0.47222 |
| 75 | 0.27424 | −0.04501 | 0.47222 |
| 76 | 0.27928 | 0.02521 | 0.47222 |
| 77 | 0.28104 | −0.05076 | 0.47222 |
| 78 | 0.28428 | 0.01785 | 0.47222 |
| 79 | 0.28757 | −0.05682 | 0.47222 |
| 80 | 0.28917 | 0.01039 | 0.47222 |
| 81 | 0.29386 | −0.06312 | 0.47222 |
| 82 | 0.29392 | 0.00286 | 0.47222 |
| 83 | 0.29852 | −0.00476 | 0.47222 |
| 84 | 0.29995 | −0.06963 | 0.47222 |
| 85 | 0.30293 | −0.01250 | 0.47222 |
| 86 | 0.30586 | −0.07628 | 0.47222 |
| 87 | 0.30713 | −0.02034 | 0.47222 |
| 88 | 0.31114 | −0.02829 | 0.47222 |
| 89 | 0.31165 | −0.08304 | 0.47222 |
| 90 | 0.31501 | −0.03632 | 0.47222 |
| 91 | 0.31734 | −0.08990 | 0.47222 |
| 92 | 0.31874 | −0.04441 | 0.47222 |
| 93 | 0.32235 | −0.05255 | 0.47222 |
| 94 | 0.32294 | −0.09683 | 0.47222 |
| 95 | 0.32586 | −0.06074 | 0.47222 |
| 96 | 0.32926 | −0.06897 | 0.47222 |
| 97 | 0.33085 | −0.09978 | 0.47222 |
| 98 | 0.33256 | −0.07724 | 0.47222 |
| 99 | 0.33575 | −0.08556 | 0.47222 |
| 100 | 0.33721 | −0.09415 | 0.47222 |
| 1 | 0.01008 | −0.02468 | 0.50000 |
| 2 | 0.01074 | −0.01570 | 0.50000 |
| 3 | 0.01104 | −0.03360 | 0.50000 |
| 4 | 0.01235 | −0.00684 | 0.50000 |
| 5 | 0.01468 | 0.00185 | 0.50000 |
| 6 | 0.01555 | −0.04127 | 0.50000 |
| 7 | 0.01763 | 0.01036 | 0.50000 |
| 8 | 0.02119 | 0.01864 | 0.50000 |
| 9 | 0.02353 | −0.04515 | 0.50000 |
| 10 | 0.02530 | 0.02664 | 0.50000 |
| 11 | 0.02994 | 0.03435 | 0.50000 |
| 12 | 0.03236 | −0.04394 | 0.50000 |
| 13 | 0.03506 | 0.04176 | 0.50000 |
| 14 | 0.04060 | 0.04886 | 0.50000 |
| 15 | 0.04064 | −0.04043 | 0.50000 |
| 16 | 0.04651 | 0.05566 | 0.50000 |
| 17 | 0.04852 | −0.03609 | 0.50000 |
| 18 | 0.05270 | 0.06220 | 0.50000 |
| 19 | 0.05626 | −0.03147 | 0.50000 |
| 20 | 0.05913 | 0.06852 | 0.50000 |
| 21 | 0.06405 | −0.02695 | 0.50000 |
| 22 | 0.06575 | 0.07460 | 0.50000 |
| 23 | 0.07196 | −0.02265 | 0.50000 |
| 24 | 0.07259 | 0.08047 | 0.50000 |
| 25 | 0.07963 | 0.08608 | 0.50000 |
| 26 | 0.08006 | −0.01869 | 0.50000 |
| 27 | 0.08692 | 0.09138 | 0.50000 |
| 28 | 0.08833 | −0.01512 | 0.50000 |
| 29 | 0.09446 | 0.09631 | 0.50000 |
| 30 | 0.09675 | −0.01195 | 0.50000 |
| 31 | 0.10226 | 0.10079 | 0.50000 |
| 32 | 0.10533 | −0.00923 | 0.50000 |
| 33 | 0.11034 | 0.10479 | 0.50000 |
| 34 | 0.11405 | −0.00697 | 0.50000 |
| 35 | 0.11865 | 0.10823 | 0.50000 |
| 36 | 0.12288 | −0.00519 | 0.50000 |
| 37 | 0.12720 | 0.11108 | 0.50000 |
| 38 | 0.13179 | −0.00388 | 0.50000 |
| 39 | 0.13593 | 0.11327 | 0.50000 |
| 40 | 0.14076 | −0.00303 | 0.50000 |
| 41 | 0.14480 | 0.11476 | 0.50000 |
| 42 | 0.14975 | −0.00263 | 0.50000 |
| 43 | 0.15378 | 0.11550 | 0.50000 |
| 44 | 0.15876 | −0.00266 | 0.50000 |
| 45 | 0.16279 | 0.11544 | 0.50000 |
| 46 | 0.16775 | −0.00310 | 0.50000 |
| 47 | 0.17175 | 0.11457 | 0.50000 |
| 48 | 0.17671 | −0.00395 | 0.50000 |
| 49 | 0.18060 | 0.11290 | 0.50000 |
| 50 | 0.18564 | −0.00519 | 0.50000 |

TABLE II-continued

Non-Dimensionalized (X Y Z/Span)

| N | X | Y | Z |
|---|---|---|---|
| 51 | 0.18926 | 0.11048 | 0.50000 |
| 52 | 0.19449 | −0.00682 | 0.50000 |
| 53 | 0.19769 | 0.10731 | 0.50000 |
| 54 | 0.20327 | −0.00883 | 0.50000 |
| 55 | 0.20583 | 0.10346 | 0.50000 |
| 56 | 0.21195 | −0.01122 | 0.50000 |
| 57 | 0.21364 | 0.09899 | 0.50000 |
| 58 | 0.22053 | −0.01398 | 0.50000 |
| 59 | 0.22111 | 0.09396 | 0.50000 |
| 60 | 0.22823 | 0.08844 | 0.50000 |
| 61 | 0.22897 | −0.01712 | 0.50000 |
| 62 | 0.23499 | 0.08249 | 0.50000 |
| 63 | 0.23726 | −0.02065 | 0.50000 |
| 64 | 0.24143 | 0.07619 | 0.50000 |
| 65 | 0.24536 | −0.02458 | 0.50000 |
| 66 | 0.24754 | 0.06958 | 0.50000 |
| 67 | 0.25322 | −0.02896 | 0.50000 |
| 68 | 0.25339 | 0.06274 | 0.50000 |
| 69 | 0.25899 | 0.05569 | 0.50000 |
| 70 | 0.26083 | −0.03377 | 0.50000 |
| 71 | 0.26440 | 0.04849 | 0.50000 |
| 72 | 0.26816 | −0.03901 | 0.50000 |
| 73 | 0.26968 | 0.04118 | 0.50000 |
| 74 | 0.27484 | 0.03380 | 0.50000 |
| 75 | 0.27520 | −0.04462 | 0.50000 |
| 76 | 0.27990 | 0.02634 | 0.50000 |
| 77 | 0.28195 | −0.05059 | 0.50000 |
| 78 | 0.28484 | 0.01882 | 0.50000 |
| 79 | 0.28842 | −0.05685 | 0.50000 |
| 80 | 0.28967 | 0.01122 | 0.50000 |
| 81 | 0.29437 | 0.00354 | 0.50000 |
| 82 | 0.29465 | −0.06334 | 0.50000 |
| 83 | 0.29892 | −0.00423 | 0.50000 |
| 84 | 0.30068 | −0.07003 | 0.50000 |
| 85 | 0.30329 | −0.01211 | 0.50000 |
| 86 | 0.30655 | −0.07687 | 0.50000 |
| 87 | 0.30746 | −0.02009 | 0.50000 |
| 88 | 0.31145 | −0.02816 | 0.50000 |
| 89 | 0.31229 | −0.08381 | 0.50000 |
| 90 | 0.31529 | −0.03631 | 0.50000 |
| 91 | 0.31791 | −0.09084 | 0.50000 |
| 92 | 0.31899 | −0.04452 | 0.50000 |
| 93 | 0.32257 | −0.05278 | 0.50000 |
| 94 | 0.32345 | −0.09795 | 0.50000 |
| 95 | 0.32605 | −0.06110 | 0.50000 |
| 96 | 0.32941 | −0.06945 | 0.50000 |
| 97 | 0.33143 | −0.10089 | 0.50000 |
| 98 | 0.33267 | −0.07784 | 0.50000 |
| 99 | 0.33581 | −0.08628 | 0.50000 |
| 100 | 0.33759 | −0.09497 | 0.50000 |
| 1 | 0.01175 | −0.02277 | 0.52778 |
| 2 | 0.01242 | −0.01372 | 0.52778 |
| 3 | 0.01252 | −0.03179 | 0.52778 |
| 4 | 0.01396 | −0.00478 | 0.52778 |
| 5 | 0.01620 | 0.00401 | 0.52778 |
| 6 | 0.01670 | −0.03972 | 0.52778 |
| 7 | 0.01907 | 0.01262 | 0.52778 |
| 8 | 0.02254 | 0.02101 | 0.52778 |
| 9 | 0.02468 | −0.04372 | 0.52778 |
| 10 | 0.02657 | 0.02913 | 0.52778 |
| 11 | 0.03116 | 0.03696 | 0.52778 |
| 12 | 0.03357 | −0.04252 | 0.52778 |
| 13 | 0.03624 | 0.04448 | 0.52778 |
| 14 | 0.04177 | 0.05167 | 0.52778 |
| 15 | 0.04191 | −0.03894 | 0.52778 |
| 16 | 0.04767 | 0.05856 | 0.52778 |
| 17 | 0.04982 | −0.03450 | 0.52778 |
| 18 | 0.05386 | 0.06521 | 0.52778 |
| 19 | 0.05756 | −0.02974 | 0.52778 |
| 20 | 0.06023 | 0.07167 | 0.52778 |
| 21 | 0.06530 | −0.02502 | 0.52778 |
| 22 | 0.06680 | 0.07793 | 0.52778 |
| 23 | 0.07316 | −0.02046 | 0.52778 |
| 24 | 0.07356 | 0.08399 | 0.52778 |
| 25 | 0.08051 | 0.08982 | 0.52778 |
| 26 | 0.08119 | −0.01624 | 0.52778 |
| 27 | 0.08773 | 0.09533 | 0.52778 |
| 28 | 0.08943 | −0.01241 | 0.52778 |
| 29 | 0.09523 | 0.10044 | 0.52778 |
| 30 | 0.09786 | −0.00907 | 0.52778 |
| 31 | 0.10304 | 0.10505 | 0.52778 |
| 32 | 0.10648 | −0.00622 | 0.52778 |
| 33 | 0.11116 | 0.10910 | 0.52778 |
| 34 | 0.11524 | −0.00388 | 0.52778 |
| 35 | 0.11955 | 0.11255 | 0.52778 |
| 36 | 0.12413 | −0.00205 | 0.52778 |
| 37 | 0.12818 | 0.11535 | 0.52778 |
| 38 | 0.13311 | −0.00071 | 0.52778 |
| 39 | 0.13701 | 0.11746 | 0.52778 |
| 40 | 0.14214 | 0.00018 | 0.52778 |
| 41 | 0.14598 | 0.11883 | 0.52778 |
| 42 | 0.15120 | 0.00059 | 0.52778 |
| 43 | 0.15504 | 0.11943 | 0.52778 |
| 44 | 0.16028 | 0.00055 | 0.52778 |
| 45 | 0.16410 | 0.11921 | 0.52778 |
| 46 | 0.16934 | 0.00004 | 0.52778 |
| 47 | 0.17312 | 0.11817 | 0.52778 |
| 48 | 0.17836 | −0.00092 | 0.52778 |
| 49 | 0.18199 | 0.11632 | 0.52778 |
| 50 | 0.18734 | −0.00230 | 0.52778 |
| 51 | 0.19069 | 0.11370 | 0.52778 |
| 52 | 0.19623 | −0.00409 | 0.52778 |
| 53 | 0.19912 | 0.11034 | 0.52778 |
| 54 | 0.20503 | −0.00629 | 0.52778 |
| 55 | 0.20724 | 0.10631 | 0.52778 |
| 56 | 0.21373 | −0.00889 | 0.52778 |
| 57 | 0.21502 | 0.10164 | 0.52778 |
| 58 | 0.22230 | −0.01189 | 0.52778 |
| 59 | 0.22243 | 0.09641 | 0.52778 |
| 60 | 0.22948 | 0.09069 | 0.52778 |
| 61 | 0.23071 | −0.01529 | 0.52778 |
| 62 | 0.23616 | 0.08454 | 0.52778 |
| 63 | 0.23896 | −0.01908 | 0.52778 |
| 64 | 0.24249 | 0.07804 | 0.52778 |
| 65 | 0.24699 | −0.02330 | 0.52778 |
| 66 | 0.24852 | 0.07125 | 0.52778 |
| 67 | 0.25425 | 0.06423 | 0.52778 |
| 68 | 0.25477 | −0.02797 | 0.52778 |
| 69 | 0.25976 | 0.05702 | 0.52778 |
| 70 | 0.26227 | −0.03307 | 0.52778 |
| 71 | 0.26508 | 0.04966 | 0.52778 |
| 72 | 0.26949 | −0.03858 | 0.52778 |
| 73 | 0.27026 | 0.04220 | 0.52778 |
| 74 | 0.27532 | 0.03467 | 0.52778 |
| 75 | 0.27641 | −0.04445 | 0.52778 |
| 76 | 0.28030 | 0.02708 | 0.52778 |
| 77 | 0.28304 | −0.05064 | 0.52778 |
| 78 | 0.28517 | 0.01941 | 0.52778 |
| 79 | 0.28941 | −0.05711 | 0.52778 |
| 80 | 0.28992 | 0.01168 | 0.52778 |
| 81 | 0.29455 | 0.00388 | 0.52778 |
| 82 | 0.29557 | −0.06377 | 0.52778 |
| 83 | 0.29903 | −0.00401 | 0.52778 |
| 84 | 0.30152 | −0.07063 | 0.52778 |
| 85 | 0.30335 | −0.01199 | 0.52778 |
| 86 | 0.30731 | −0.07762 | 0.52778 |
| 87 | 0.30747 | −0.02008 | 0.52778 |
| 88 | 0.31142 | −0.02825 | 0.52778 |
| 89 | 0.31296 | −0.08472 | 0.52778 |
| 90 | 0.31522 | −0.03649 | 0.52778 |
| 91 | 0.31849 | −0.09191 | 0.52778 |
| 92 | 0.31889 | −0.04480 | 0.52778 |
| 93 | 0.32243 | −0.05315 | 0.52778 |
| 94 | 0.32394 | −0.09917 | 0.52778 |
| 95 | 0.32587 | −0.06155 | 0.52778 |
| 96 | 0.32920 | −0.06999 | 0.52778 |
| 97 | 0.33195 | −0.10205 | 0.52778 |
| 98 | 0.33242 | −0.07848 | 0.52778 |
| 99 | 0.33553 | −0.08701 | 0.52778 |
| 100 | 0.33773 | −0.09573 | 0.52778 |
| 1 | 0.01375 | −0.02248 | 0.55555 |
| 2 | 0.01446 | −0.03154 | 0.55555 |

TABLE II-continued

Non-Dimensionalized (X Y Z/Span)

| N | X | Y | Z |
|---|---|---|---|
| 3 | 0.01449 | −0.01339 | 0.55555 |
| 4 | 0.01607 | −0.00441 | 0.55555 |
| 5 | 0.01832 | 0.00442 | 0.55555 |
| 6 | 0.01876 | −0.03943 | 0.55555 |
| 7 | 0.02118 | 0.01308 | 0.55555 |
| 8 | 0.02462 | 0.02152 | 0.55555 |
| 9 | 0.02696 | −0.04303 | 0.55555 |
| 10 | 0.02863 | 0.02971 | 0.55555 |
| 11 | 0.03318 | 0.03761 | 0.55555 |
| 12 | 0.03588 | −0.04150 | 0.55555 |
| 13 | 0.03822 | 0.04520 | 0.55555 |
| 14 | 0.04371 | 0.05248 | 0.55555 |
| 15 | 0.04421 | −0.03781 | 0.55555 |
| 16 | 0.04957 | 0.05947 | 0.55555 |
| 17 | 0.05210 | −0.03325 | 0.55555 |
| 18 | 0.05571 | 0.06621 | 0.55555 |
| 19 | 0.05980 | −0.02835 | 0.55555 |
| 20 | 0.06204 | 0.07278 | 0.55555 |
| 21 | 0.06748 | −0.02343 | 0.55555 |
| 22 | 0.06854 | 0.07917 | 0.55555 |
| 23 | 0.07522 | 0.08536 | 0.55555 |
| 24 | 0.07525 | −0.01866 | 0.55555 |
| 25 | 0.08211 | 0.09134 | 0.55555 |
| 26 | 0.08320 | −0.01420 | 0.55555 |
| 27 | 0.08925 | 0.09702 | 0.55555 |
| 28 | 0.09138 | −0.01017 | 0.55555 |
| 29 | 0.09669 | 0.10230 | 0.55555 |
| 30 | 0.09978 | −0.00665 | 0.55555 |
| 31 | 0.10444 | 0.10708 | 0.55555 |
| 32 | 0.10840 | −0.00367 | 0.55555 |
| 33 | 0.11253 | 0.11129 | 0.55555 |
| 34 | 0.11718 | −0.00123 | 0.55555 |
| 35 | 0.12091 | 0.11488 | 0.55555 |
| 36 | 0.12610 | 0.00069 | 0.55555 |
| 37 | 0.12954 | 0.11781 | 0.55555 |
| 38 | 0.13510 | 0.00212 | 0.55555 |
| 39 | 0.13839 | 0.12000 | 0.55555 |
| 40 | 0.14417 | 0.00307 | 0.55555 |
| 41 | 0.14739 | 0.12143 | 0.55555 |
| 42 | 0.15328 | 0.00352 | 0.55555 |
| 43 | 0.15649 | 0.12206 | 0.55555 |
| 44 | 0.16239 | 0.00346 | 0.55555 |
| 45 | 0.16560 | 0.12181 | 0.55555 |
| 46 | 0.17150 | 0.00292 | 0.55555 |
| 47 | 0.17464 | 0.12070 | 0.55555 |
| 48 | 0.18055 | 0.00188 | 0.55555 |
| 49 | 0.18354 | 0.11876 | 0.55555 |
| 50 | 0.18955 | 0.00038 | 0.55555 |
| 51 | 0.19224 | 0.11602 | 0.55555 |
| 52 | 0.19846 | −0.00157 | 0.55555 |
| 53 | 0.20066 | 0.11252 | 0.55555 |
| 54 | 0.20725 | −0.00396 | 0.55555 |
| 55 | 0.20875 | 0.10833 | 0.55555 |
| 56 | 0.21593 | −0.00678 | 0.55555 |
| 57 | 0.21648 | 0.10350 | 0.55555 |
| 58 | 0.22383 | 0.09811 | 0.55555 |
| 59 | 0.22445 | −0.01002 | 0.55555 |
| 60 | 0.23079 | 0.09222 | 0.55555 |
| 61 | 0.23280 | −0.01368 | 0.55555 |
| 62 | 0.23738 | 0.08592 | 0.55555 |
| 63 | 0.24095 | −0.01775 | 0.55555 |
| 64 | 0.24361 | 0.07926 | 0.55555 |
| 65 | 0.24888 | −0.02225 | 0.55555 |
| 66 | 0.24953 | 0.07231 | 0.55555 |
| 67 | 0.25516 | 0.06515 | 0.55555 |
| 68 | 0.25653 | −0.02721 | 0.55555 |
| 69 | 0.26055 | 0.05780 | 0.55555 |
| 70 | 0.26388 | −0.03260 | 0.55555 |
| 71 | 0.26576 | 0.05031 | 0.55555 |
| 72 | 0.27082 | 0.04273 | 0.55555 |
| 73 | 0.27094 | −0.03838 | 0.55555 |
| 74 | 0.27579 | 0.03508 | 0.55555 |
| 75 | 0.27770 | −0.04450 | 0.55555 |
| 76 | 0.28066 | 0.02737 | 0.55555 |
| 77 | 0.28417 | −0.05093 | 0.55555 |
| 78 | 0.28544 | 0.01960 | 0.55555 |
| 79 | 0.29010 | 0.01177 | 0.55555 |
| 80 | 0.29041 | −0.05756 | 0.55555 |
| 81 | 0.29465 | 0.00386 | 0.55555 |
| 82 | 0.29645 | −0.06439 | 0.55555 |
| 83 | 0.29905 | −0.00412 | 0.55555 |
| 84 | 0.30230 | −0.07137 | 0.55555 |
| 85 | 0.30329 | −0.01219 | 0.55555 |
| 86 | 0.30736 | −0.02035 | 0.55555 |
| 87 | 0.30799 | −0.07850 | 0.55555 |
| 88 | 0.31124 | −0.02860 | 0.55555 |
| 89 | 0.31354 | −0.08574 | 0.55555 |
| 90 | 0.31498 | −0.03692 | 0.55555 |
| 91 | 0.31859 | −0.04529 | 0.55555 |
| 92 | 0.31898 | −0.09307 | 0.55555 |
| 93 | 0.32210 | −0.05370 | 0.55555 |
| 94 | 0.32430 | −0.10047 | 0.55555 |
| 95 | 0.32549 | −0.06217 | 0.55555 |
| 96 | 0.32879 | −0.07067 | 0.55555 |
| 97 | 0.33196 | −0.07922 | 0.55555 |
| 98 | 0.33234 | −0.10325 | 0.55555 |
| 99 | 0.33504 | −0.08781 | 0.55555 |
| 100 | 0.33758 | −0.09652 | 0.55555 |
| 1 | 0.01570 | −0.02238 | 0.58334 |
| 2 | 0.01648 | −0.01327 | 0.58334 |
| 3 | 0.01652 | −0.03144 | 0.58334 |
| 4 | 0.01814 | −0.00428 | 0.58334 |
| 5 | 0.02045 | 0.00457 | 0.58334 |
| 6 | 0.02126 | −0.03907 | 0.58334 |
| 7 | 0.02333 | 0.01325 | 0.58334 |
| 8 | 0.02677 | 0.02171 | 0.58334 |
| 9 | 0.02975 | −0.04198 | 0.58334 |
| 10 | 0.03075 | 0.02993 | 0.58334 |
| 11 | 0.03526 | 0.03788 | 0.58334 |
| 12 | 0.03864 | −0.04006 | 0.58334 |
| 13 | 0.04025 | 0.04553 | 0.58334 |
| 14 | 0.04568 | 0.05288 | 0.58334 |
| 15 | 0.04693 | −0.03623 | 0.58334 |
| 16 | 0.05149 | 0.05994 | 0.58334 |
| 17 | 0.05479 | −0.03156 | 0.58334 |
| 18 | 0.05758 | 0.06675 | 0.58334 |
| 19 | 0.06243 | −0.02654 | 0.58334 |
| 20 | 0.06386 | 0.07340 | 0.58334 |
| 21 | 0.07004 | −0.02147 | 0.58334 |
| 22 | 0.07033 | 0.07985 | 0.58334 |
| 23 | 0.07699 | 0.08611 | 0.58334 |
| 24 | 0.07772 | −0.01651 | 0.58334 |
| 25 | 0.08385 | 0.09216 | 0.58334 |
| 26 | 0.08559 | −0.01186 | 0.58334 |
| 27 | 0.09096 | 0.09791 | 0.58334 |
| 28 | 0.09370 | −0.00767 | 0.58334 |
| 29 | 0.09835 | 0.10329 | 0.58334 |
| 30 | 0.10209 | −0.00404 | 0.58334 |
| 31 | 0.10606 | 0.10820 | 0.58334 |
| 32 | 0.11070 | −0.00098 | 0.58334 |
| 33 | 0.11409 | 0.11256 | 0.58334 |
| 34 | 0.11949 | 0.00152 | 0.58334 |
| 35 | 0.12242 | 0.11631 | 0.58334 |
| 36 | 0.12842 | 0.00348 | 0.58334 |
| 37 | 0.13104 | 0.11936 | 0.58334 |
| 38 | 0.13745 | 0.00495 | 0.58334 |
| 39 | 0.13988 | 0.12166 | 0.58334 |
| 40 | 0.14653 | 0.00592 | 0.58334 |
| 41 | 0.14890 | 0.12316 | 0.58334 |
| 42 | 0.15566 | 0.00636 | 0.58334 |
| 43 | 0.15801 | 0.12382 | 0.58334 |
| 44 | 0.16480 | 0.00626 | 0.58334 |
| 45 | 0.16714 | 0.12357 | 0.58334 |
| 46 | 0.17392 | 0.00563 | 0.58334 |
| 47 | 0.17620 | 0.12242 | 0.58334 |
| 48 | 0.18299 | 0.00448 | 0.58334 |
| 49 | 0.18512 | 0.12040 | 0.58334 |
| 50 | 0.19197 | 0.00284 | 0.58334 |
| 51 | 0.19380 | 0.11756 | 0.58334 |
| 52 | 0.20087 | 0.00072 | 0.58334 |
| 53 | 0.20219 | 0.11393 | 0.58334 |
| 54 | 0.20963 | −0.00189 | 0.58334 |

TABLE II-continued

Non-Dimensionalized (X Y Z/Span)

| N | X | Y | Z |
|---|---|---|---|
| 55 | 0.21024 | 0.10961 | 0.58334 |
| 56 | 0.21791 | 0.10465 | 0.58334 |
| 57 | 0.21825 | −0.00494 | 0.58334 |
| 58 | 0.22519 | 0.09912 | 0.58334 |
| 59 | 0.22669 | −0.00843 | 0.58334 |
| 60 | 0.23207 | 0.09310 | 0.58334 |
| 61 | 0.23495 | −0.01235 | 0.58334 |
| 62 | 0.23855 | 0.08666 | 0.58334 |
| 63 | 0.24298 | −0.01670 | 0.58334 |
| 64 | 0.24469 | 0.07989 | 0.58334 |
| 65 | 0.25049 | 0.07282 | 0.58334 |
| 66 | 0.25077 | −0.02149 | 0.58334 |
| 67 | 0.25601 | 0.06555 | 0.58334 |
| 68 | 0.25826 | −0.02673 | 0.58334 |
| 69 | 0.26130 | 0.05809 | 0.58334 |
| 70 | 0.26543 | −0.03239 | 0.58334 |
| 71 | 0.26639 | 0.05050 | 0.58334 |
| 72 | 0.27135 | 0.04281 | 0.58334 |
| 73 | 0.27230 | −0.03843 | 0.58334 |
| 74 | 0.27622 | 0.03507 | 0.58334 |
| 75 | 0.27886 | −0.04479 | 0.58334 |
| 76 | 0.28100 | 0.02728 | 0.58334 |
| 77 | 0.28516 | −0.05141 | 0.58334 |
| 78 | 0.28569 | 0.01943 | 0.58334 |
| 79 | 0.29027 | 0.01152 | 0.58334 |
| 80 | 0.29127 | −0.05822 | 0.58334 |
| 81 | 0.29473 | 0.00354 | 0.58334 |
| 82 | 0.29721 | −0.06516 | 0.58334 |
| 83 | 0.29905 | −0.00451 | 0.58334 |
| 84 | 0.30297 | −0.07226 | 0.58334 |
| 85 | 0.30321 | −0.01265 | 0.58334 |
| 86 | 0.30720 | −0.02087 | 0.58334 |
| 87 | 0.30857 | −0.07948 | 0.58334 |
| 88 | 0.31101 | −0.02918 | 0.58334 |
| 89 | 0.31401 | −0.08683 | 0.58334 |
| 90 | 0.31467 | −0.03756 | 0.58334 |
| 91 | 0.31822 | −0.04598 | 0.58334 |
| 92 | 0.31931 | −0.09428 | 0.58334 |
| 93 | 0.32165 | −0.05446 | 0.58334 |
| 94 | 0.32450 | −0.10180 | 0.58334 |
| 95 | 0.32500 | −0.06296 | 0.58334 |
| 96 | 0.32824 | −0.07151 | 0.58334 |
| 97 | 0.33140 | −0.08008 | 0.58334 |
| 98 | 0.33253 | −0.10446 | 0.58334 |
| 99 | 0.33445 | −0.08870 | 0.58334 |
| 100 | 0.33723 | −0.09740 | 0.58334 |
| 1 | 0.01753 | −0.02174 | 0.61111 |
| 2 | 0.01830 | −0.01264 | 0.61111 |
| 3 | 0.01860 | −0.03079 | 0.61111 |
| 4 | 0.01999 | −0.00364 | 0.61111 |
| 5 | 0.02232 | 0.00522 | 0.61111 |
| 6 | 0.02393 | −0.03797 | 0.61111 |
| 7 | 0.02521 | 0.01390 | 0.61111 |
| 8 | 0.02864 | 0.02237 | 0.61111 |
| 9 | 0.03260 | 0.03061 | 0.61111 |
| 10 | 0.03268 | −0.04005 | 0.61111 |
| 11 | 0.03706 | 0.03859 | 0.61111 |
| 12 | 0.04151 | −0.03780 | 0.61111 |
| 13 | 0.04201 | 0.04628 | 0.61111 |
| 14 | 0.04739 | 0.05368 | 0.61111 |
| 15 | 0.04976 | −0.03387 | 0.61111 |
| 16 | 0.05315 | 0.06079 | 0.61111 |
| 17 | 0.05758 | −0.02912 | 0.61111 |
| 18 | 0.05920 | 0.06766 | 0.61111 |
| 19 | 0.06518 | −0.02401 | 0.61111 |
| 20 | 0.06547 | 0.07432 | 0.61111 |
| 21 | 0.07194 | 0.08079 | 0.61111 |
| 22 | 0.07270 | −0.01881 | 0.61111 |
| 23 | 0.07861 | 0.08705 | 0.61111 |
| 24 | 0.08030 | −0.01370 | 0.61111 |
| 25 | 0.08548 | 0.09309 | 0.61111 |
| 26 | 0.08809 | −0.00891 | 0.61111 |
| 27 | 0.09260 | 0.09884 | 0.61111 |
| 28 | 0.09617 | −0.00463 | 0.61111 |
| 29 | 0.09999 | 0.10423 | 0.61111 |
| 30 | 0.10454 | −0.00095 | 0.61111 |
| 31 | 0.10768 | 0.10917 | 0.61111 |
| 32 | 0.11316 | 0.00211 | 0.61111 |
| 33 | 0.11569 | 0.11360 | 0.61111 |
| 34 | 0.12197 | 0.00459 | 0.61111 |
| 35 | 0.12399 | 0.11742 | 0.61111 |
| 36 | 0.13091 | 0.00652 | 0.61111 |
| 37 | 0.13259 | 0.12055 | 0.61111 |
| 38 | 0.13995 | 0.00794 | 0.61111 |
| 39 | 0.14143 | 0.12289 | 0.61111 |
| 40 | 0.14905 | 0.00884 | 0.61111 |
| 41 | 0.15045 | 0.12440 | 0.61111 |
| 42 | 0.15819 | 0.00919 | 0.61111 |
| 43 | 0.15957 | 0.12503 | 0.61111 |
| 44 | 0.16733 | 0.00899 | 0.61111 |
| 45 | 0.16871 | 0.12473 | 0.61111 |
| 46 | 0.17645 | 0.00822 | 0.61111 |
| 47 | 0.17778 | 0.12350 | 0.61111 |
| 48 | 0.18550 | 0.00690 | 0.61111 |
| 49 | 0.18668 | 0.12138 | 0.61111 |
| 50 | 0.19447 | 0.00507 | 0.61111 |
| 51 | 0.19533 | 0.11843 | 0.61111 |
| 52 | 0.20332 | 0.00273 | 0.61111 |
| 53 | 0.20367 | 0.11469 | 0.61111 |
| 54 | 0.21168 | 0.11025 | 0.61111 |
| 55 | 0.21201 | −0.00011 | 0.61111 |
| 56 | 0.21927 | 0.10516 | 0.61111 |
| 57 | 0.22055 | −0.00340 | 0.61111 |
| 58 | 0.22647 | 0.09951 | 0.61111 |
| 59 | 0.22889 | −0.00716 | 0.61111 |
| 60 | 0.23326 | 0.09338 | 0.61111 |
| 61 | 0.23701 | −0.01135 | 0.61111 |
| 62 | 0.23965 | 0.08683 | 0.61111 |
| 63 | 0.24492 | −0.01597 | 0.61111 |
| 64 | 0.24567 | 0.07995 | 0.61111 |
| 65 | 0.25137 | 0.07280 | 0.61111 |
| 66 | 0.25254 | −0.02103 | 0.61111 |
| 67 | 0.25679 | 0.06543 | 0.61111 |
| 68 | 0.25983 | −0.02653 | 0.61111 |
| 69 | 0.26198 | 0.05789 | 0.61111 |
| 70 | 0.26680 | −0.03246 | 0.61111 |
| 71 | 0.26697 | 0.05023 | 0.61111 |
| 72 | 0.27183 | 0.04248 | 0.61111 |
| 73 | 0.27346 | −0.03873 | 0.61111 |
| 74 | 0.27661 | 0.03467 | 0.61111 |
| 75 | 0.27983 | −0.04531 | 0.61111 |
| 76 | 0.28132 | 0.02682 | 0.61111 |
| 77 | 0.28593 | 0.01892 | 0.61111 |
| 78 | 0.28596 | −0.05210 | 0.61111 |
| 79 | 0.29044 | 0.01096 | 0.61111 |
| 80 | 0.29194 | −0.05902 | 0.61111 |
| 81 | 0.29483 | 0.00294 | 0.61111 |
| 82 | 0.29777 | −0.06607 | 0.61111 |
| 83 | 0.29908 | −0.00517 | 0.61111 |
| 84 | 0.30316 | −0.01335 | 0.61111 |
| 85 | 0.30346 | −0.07323 | 0.61111 |
| 86 | 0.30706 | −0.02163 | 0.61111 |
| 87 | 0.30897 | −0.08054 | 0.61111 |
| 88 | 0.31078 | −0.02998 | 0.61111 |
| 89 | 0.31430 | −0.08797 | 0.61111 |
| 90 | 0.31435 | −0.03841 | 0.61111 |
| 91 | 0.31780 | −0.04688 | 0.61111 |
| 92 | 0.31948 | −0.09551 | 0.61111 |
| 93 | 0.32117 | −0.05540 | 0.61111 |
| 94 | 0.32445 | −0.06393 | 0.61111 |
| 95 | 0.32453 | −0.10314 | 0.61111 |
| 96 | 0.32765 | −0.07250 | 0.61111 |
| 97 | 0.33077 | −0.08110 | 0.61111 |
| 98 | 0.33254 | −0.10571 | 0.61111 |
| 99 | 0.33383 | −0.08973 | 0.61111 |
| 100 | 0.33672 | −0.09841 | 0.61111 |
| 1 | 0.01940 | −0.02083 | 0.63889 |
| 2 | 0.02010 | −0.01173 | 0.63889 |
| 3 | 0.02081 | −0.02980 | 0.63889 |
| 4 | 0.02179 | −0.00273 | 0.63889 |
| 5 | 0.02412 | 0.00612 | 0.63889 |
| 6 | 0.02686 | −0.03635 | 0.63889 |

TABLE II-continued

Non-Dimensionalized (X Y Z/Span)

| N | X | Y | Z |
|---|---|---|---|
| 7 | 0.02701 | 0.01480 | 0.63889 |
| 8 | 0.03043 | 0.02327 | 0.63889 |
| 9 | 0.03438 | 0.03152 | 0.63889 |
| 10 | 0.03579 | −0.03749 | 0.63889 |
| 11 | 0.03882 | 0.03951 | 0.63889 |
| 12 | 0.04372 | 0.04722 | 0.63889 |
| 13 | 0.04456 | −0.03494 | 0.63889 |
| 14 | 0.04907 | 0.05464 | 0.63889 |
| 15 | 0.05276 | −0.03092 | 0.63889 |
| 16 | 0.05479 | 0.06178 | 0.63889 |
| 17 | 0.06055 | −0.02613 | 0.63889 |
| 18 | 0.06081 | 0.06866 | 0.63889 |
| 19 | 0.06708 | 0.07532 | 0.63889 |
| 20 | 0.06809 | −0.02095 | 0.63889 |
| 21 | 0.07356 | 0.08176 | 0.63889 |
| 22 | 0.07554 | −0.01565 | 0.63889 |
| 23 | 0.08025 | 0.08799 | 0.63889 |
| 24 | 0.08304 | −0.01042 | 0.63889 |
| 25 | 0.08716 | 0.09399 | 0.63889 |
| 26 | 0.09077 | −0.00552 | 0.63889 |
| 27 | 0.09430 | 0.09970 | 0.63889 |
| 28 | 0.09882 | −0.00120 | 0.63889 |
| 29 | 0.10172 | 0.10505 | 0.63889 |
| 30 | 0.10719 | 0.00247 | 0.63889 |
| 31 | 0.10940 | 0.11000 | 0.63889 |
| 32 | 0.11582 | 0.00548 | 0.63889 |
| 33 | 0.11740 | 0.11444 | 0.63889 |
| 34 | 0.12465 | 0.00787 | 0.63889 |
| 35 | 0.12569 | 0.11830 | 0.63889 |
| 36 | 0.13361 | 0.00969 | 0.63889 |
| 37 | 0.13427 | 0.12145 | 0.63889 |
| 38 | 0.14266 | 0.01101 | 0.63889 |
| 39 | 0.14310 | 0.12377 | 0.63889 |
| 40 | 0.15177 | 0.01179 | 0.63889 |
| 41 | 0.15214 | 0.12523 | 0.63889 |
| 42 | 0.16091 | 0.01199 | 0.63889 |
| 43 | 0.16126 | 0.12578 | 0.63889 |
| 44 | 0.17005 | 0.01162 | 0.63889 |
| 45 | 0.17039 | 0.12538 | 0.63889 |
| 46 | 0.17914 | 0.01066 | 0.63889 |
| 47 | 0.17943 | 0.12405 | 0.63889 |
| 48 | 0.18815 | 0.00914 | 0.63889 |
| 49 | 0.18830 | 0.12183 | 0.63889 |
| 50 | 0.19691 | 0.11876 | 0.63889 |
| 51 | 0.19706 | 0.00708 | 0.63889 |
| 52 | 0.20520 | 0.11493 | 0.63889 |
| 53 | 0.20583 | 0.00450 | 0.63889 |
| 54 | 0.21314 | 0.11038 | 0.63889 |
| 55 | 0.21444 | 0.00142 | 0.63889 |
| 56 | 0.22067 | 0.10520 | 0.63889 |
| 57 | 0.22287 | −0.00213 | 0.63889 |
| 58 | 0.22777 | 0.09944 | 0.63889 |
| 59 | 0.23108 | −0.00614 | 0.63889 |
| 60 | 0.23445 | 0.09320 | 0.63889 |
| 61 | 0.23907 | −0.01060 | 0.63889 |
| 62 | 0.24074 | 0.08655 | 0.63889 |
| 63 | 0.24664 | 0.07957 | 0.63889 |
| 64 | 0.24680 | −0.01548 | 0.63889 |
| 65 | 0.25222 | 0.07233 | 0.63889 |
| 66 | 0.25423 | −0.02082 | 0.63889 |
| 67 | 0.25752 | 0.06488 | 0.63889 |
| 68 | 0.26130 | −0.02660 | 0.63889 |
| 69 | 0.26260 | 0.05728 | 0.63889 |
| 70 | 0.26750 | 0.04956 | 0.63889 |
| 71 | 0.26805 | −0.03278 | 0.63889 |
| 72 | 0.27227 | 0.04176 | 0.63889 |
| 73 | 0.27448 | −0.03928 | 0.63889 |
| 74 | 0.27694 | 0.03389 | 0.63889 |
| 75 | 0.28064 | −0.04603 | 0.63889 |
| 76 | 0.28156 | 0.02599 | 0.63889 |
| 77 | 0.28611 | 0.01806 | 0.63889 |
| 78 | 0.28660 | −0.05297 | 0.63889 |
| 79 | 0.29058 | 0.01008 | 0.63889 |
| 80 | 0.29246 | −0.06000 | 0.63889 |
| 81 | 0.29492 | 0.00204 | 0.63889 |
| 82 | 0.29820 | −0.06711 | 0.63889 |
| 83 | 0.29911 | −0.00610 | 0.63889 |
| 84 | 0.30311 | −0.01431 | 0.63889 |
| 85 | 0.30381 | −0.07434 | 0.63889 |
| 86 | 0.30691 | −0.02263 | 0.63889 |
| 87 | 0.30923 | −0.08169 | 0.63889 |
| 88 | 0.31054 | −0.03102 | 0.63889 |
| 89 | 0.31401 | −0.03949 | 0.63889 |
| 90 | 0.31446 | −0.08919 | 0.63889 |
| 91 | 0.31737 | −0.04799 | 0.63889 |
| 92 | 0.31950 | −0.09682 | 0.63889 |
| 93 | 0.32066 | −0.05652 | 0.63889 |
| 94 | 0.32387 | −0.06509 | 0.63889 |
| 95 | 0.32443 | −0.10454 | 0.63889 |
| 96 | 0.32703 | −0.07366 | 0.63889 |
| 97 | 0.33014 | −0.08227 | 0.63889 |
| 98 | 0.33239 | −0.10703 | 0.63889 |
| 99 | 0.33317 | −0.09089 | 0.63889 |
| 100 | 0.33612 | −0.09956 | 0.63889 |
| 1 | 0.02135 | −0.01970 | 0.66667 |
| 2 | 0.02199 | −0.01061 | 0.66667 |
| 3 | 0.02319 | −0.02856 | 0.66667 |
| 4 | 0.02366 | −0.00162 | 0.66667 |
| 5 | 0.02599 | 0.00721 | 0.66667 |
| 6 | 0.02887 | 0.01588 | 0.66667 |
| 7 | 0.03002 | −0.03422 | 0.66667 |
| 8 | 0.03229 | 0.02435 | 0.66667 |
| 9 | 0.03623 | 0.03258 | 0.66667 |
| 10 | 0.03905 | −0.03448 | 0.66667 |
| 11 | 0.04065 | 0.04056 | 0.66667 |
| 12 | 0.04554 | 0.04827 | 0.66667 |
| 13 | 0.04775 | −0.03173 | 0.66667 |
| 14 | 0.05087 | 0.05569 | 0.66667 |
| 15 | 0.05592 | −0.02767 | 0.66667 |
| 16 | 0.05656 | 0.06283 | 0.66667 |
| 17 | 0.06257 | 0.06969 | 0.66667 |
| 18 | 0.06368 | −0.02284 | 0.66667 |
| 19 | 0.06885 | 0.07633 | 0.66667 |
| 20 | 0.07117 | −0.01762 | 0.66667 |
| 21 | 0.07535 | 0.08274 | 0.66667 |
| 22 | 0.07853 | −0.01223 | 0.66667 |
| 23 | 0.08206 | 0.08893 | 0.66667 |
| 24 | 0.08595 | −0.00691 | 0.66667 |
| 25 | 0.08900 | 0.09487 | 0.66667 |
| 26 | 0.09362 | −0.00195 | 0.66667 |
| 27 | 0.09617 | 0.10053 | 0.66667 |
| 28 | 0.10166 | 0.00236 | 0.66667 |
| 29 | 0.10359 | 0.10584 | 0.66667 |
| 30 | 0.11005 | 0.00598 | 0.66667 |
| 31 | 0.11128 | 0.11076 | 0.66667 |
| 32 | 0.11870 | 0.00889 | 0.66667 |
| 33 | 0.11926 | 0.11519 | 0.66667 |
| 34 | 0.12754 | 0.11904 | 0.66667 |
| 35 | 0.12754 | 0.01114 | 0.66667 |
| 36 | 0.13611 | 0.12217 | 0.66667 |
| 37 | 0.13652 | 0.01284 | 0.66667 |
| 38 | 0.14495 | 0.12444 | 0.66667 |
| 39 | 0.14557 | 0.01402 | 0.66667 |
| 40 | 0.15397 | 0.12580 | 0.66667 |
| 41 | 0.15468 | 0.01463 | 0.66667 |
| 42 | 0.16309 | 0.12622 | 0.66667 |
| 43 | 0.16381 | 0.01465 | 0.66667 |
| 44 | 0.17220 | 0.12569 | 0.66667 |
| 45 | 0.17292 | 0.01408 | 0.66667 |
| 46 | 0.18122 | 0.12424 | 0.66667 |
| 47 | 0.18197 | 0.01290 | 0.66667 |
| 48 | 0.19003 | 0.12190 | 0.66667 |
| 49 | 0.19093 | 0.01115 | 0.66667 |
| 50 | 0.19860 | 0.11873 | 0.66667 |
| 51 | 0.19976 | 0.00885 | 0.66667 |
| 52 | 0.20683 | 0.11480 | 0.66667 |
| 53 | 0.20844 | 0.00603 | 0.66667 |
| 54 | 0.21470 | 0.11017 | 0.66667 |
| 55 | 0.21695 | 0.00270 | 0.66667 |
| 56 | 0.22216 | 0.10490 | 0.66667 |
| 57 | 0.22524 | −0.00111 | 0.66667 |
| 58 | 0.22916 | 0.09906 | 0.66667 |

TABLE II-continued

Non-Dimensionalized (X Y Z/Span)

| N | X | Y | Z |
|---|---|---|---|
| 59 | 0.23332 | −0.00538 | 0.66667 |
| 60 | 0.23573 | 0.09271 | 0.66667 |
| 61 | 0.24113 | −0.01011 | 0.66667 |
| 62 | 0.24187 | 0.08596 | 0.66667 |
| 63 | 0.24764 | 0.07887 | 0.66667 |
| 64 | 0.24866 | −0.01526 | 0.66667 |
| 65 | 0.25307 | 0.07153 | 0.66667 |
| 66 | 0.25587 | −0.02086 | 0.66667 |
| 67 | 0.25824 | 0.06401 | 0.66667 |
| 68 | 0.26273 | −0.02689 | 0.66667 |
| 69 | 0.26320 | 0.05634 | 0.66667 |
| 70 | 0.26798 | 0.04858 | 0.66667 |
| 71 | 0.26923 | −0.03330 | 0.66667 |
| 72 | 0.27265 | 0.04072 | 0.66667 |
| 73 | 0.27540 | −0.04002 | 0.66667 |
| 74 | 0.27723 | 0.03281 | 0.66667 |
| 75 | 0.28135 | −0.04696 | 0.66667 |
| 76 | 0.28176 | 0.02489 | 0.66667 |
| 77 | 0.28623 | 0.01693 | 0.66667 |
| 78 | 0.28715 | −0.05401 | 0.66667 |
| 79 | 0.29065 | 0.00893 | 0.66667 |
| 80 | 0.29288 | −0.06112 | 0.66667 |
| 81 | 0.29493 | 0.00088 | 0.66667 |
| 82 | 0.29853 | −0.06829 | 0.66667 |
| 83 | 0.29906 | −0.00727 | 0.66667 |
| 84 | 0.30298 | −0.01551 | 0.66667 |
| 85 | 0.30406 | −0.07556 | 0.66667 |
| 86 | 0.30670 | −0.02385 | 0.66667 |
| 87 | 0.30938 | −0.08297 | 0.66667 |
| 88 | 0.31022 | −0.03228 | 0.66667 |
| 89 | 0.31361 | −0.04076 | 0.66667 |
| 90 | 0.31449 | −0.09054 | 0.66667 |
| 91 | 0.31688 | −0.04928 | 0.66667 |
| 92 | 0.31941 | −0.09823 | 0.66667 |
| 93 | 0.32010 | −0.05783 | 0.66667 |
| 94 | 0.32326 | −0.06640 | 0.66667 |
| 95 | 0.32419 | −0.10600 | 0.66667 |
| 96 | 0.32638 | −0.07498 | 0.66667 |
| 97 | 0.32946 | −0.08357 | 0.66667 |
| 98 | 0.33212 | −0.10844 | 0.66667 |
| 99 | 0.33248 | −0.09218 | 0.66667 |
| 100 | 0.33544 | −0.10083 | 0.66667 |
| 1 | 0.02323 | −0.01760 | 0.69444 |
| 2 | 0.02382 | −0.00852 | 0.69444 |
| 3 | 0.02542 | −0.02634 | 0.69444 |
| 4 | 0.02547 | 0.00044 | 0.69444 |
| 5 | 0.02782 | 0.00926 | 0.69444 |
| 6 | 0.03072 | 0.01789 | 0.69444 |
| 7 | 0.03279 | −0.03121 | 0.69444 |
| 8 | 0.03415 | 0.02633 | 0.69444 |
| 9 | 0.03808 | 0.03454 | 0.69444 |
| 10 | 0.04183 | −0.03102 | 0.69444 |
| 11 | 0.04250 | 0.04250 | 0.69444 |
| 12 | 0.04737 | 0.05019 | 0.69444 |
| 13 | 0.05050 | −0.02827 | 0.69444 |
| 14 | 0.05265 | 0.05762 | 0.69444 |
| 15 | 0.05830 | 0.06476 | 0.69444 |
| 16 | 0.05867 | −0.02427 | 0.69444 |
| 17 | 0.06428 | 0.07162 | 0.69444 |
| 18 | 0.06645 | −0.01950 | 0.69444 |
| 19 | 0.07056 | 0.07823 | 0.69444 |
| 20 | 0.07395 | −0.01435 | 0.69444 |
| 21 | 0.07707 | 0.08460 | 0.69444 |
| 22 | 0.08131 | −0.00897 | 0.69444 |
| 23 | 0.08381 | 0.09072 | 0.69444 |
| 24 | 0.08872 | −0.00366 | 0.69444 |
| 25 | 0.09080 | 0.09659 | 0.69444 |
| 26 | 0.09637 | 0.00126 | 0.69444 |
| 27 | 0.09801 | 0.10215 | 0.69444 |
| 28 | 0.10443 | 0.00552 | 0.69444 |
| 29 | 0.10548 | 0.10735 | 0.69444 |
| 30 | 0.11282 | 0.00905 | 0.69444 |
| 31 | 0.11322 | 0.11217 | 0.69444 |
| 32 | 0.12123 | 0.11649 | 0.69444 |
| 33 | 0.12149 | 0.01185 | 0.69444 |
| 34 | 0.12953 | 0.12023 | 0.69444 |
| 35 | 0.13035 | 0.01397 | 0.69444 |
| 36 | 0.13814 | 0.12323 | 0.69444 |
| 37 | 0.13933 | 0.01551 | 0.69444 |
| 38 | 0.14699 | 0.12536 | 0.69444 |
| 39 | 0.14838 | 0.01652 | 0.69444 |
| 40 | 0.15601 | 0.12655 | 0.69444 |
| 41 | 0.15747 | 0.01696 | 0.69444 |
| 42 | 0.16512 | 0.12677 | 0.69444 |
| 43 | 0.16658 | 0.01679 | 0.69444 |
| 44 | 0.17420 | 0.12605 | 0.69444 |
| 45 | 0.17566 | 0.01601 | 0.69444 |
| 46 | 0.18315 | 0.12441 | 0.69444 |
| 47 | 0.18465 | 0.01462 | 0.69444 |
| 48 | 0.19190 | 0.12187 | 0.69444 |
| 49 | 0.19355 | 0.01265 | 0.69444 |
| 50 | 0.20037 | 0.11854 | 0.69444 |
| 51 | 0.20230 | 0.01012 | 0.69444 |
| 52 | 0.20852 | 0.11446 | 0.69444 |
| 53 | 0.21088 | 0.00706 | 0.69444 |
| 54 | 0.21628 | 0.10971 | 0.69444 |
| 55 | 0.21927 | 0.00350 | 0.69444 |
| 56 | 0.22363 | 0.10432 | 0.69444 |
| 57 | 0.22743 | −0.00055 | 0.69444 |
| 58 | 0.23053 | 0.09838 | 0.69444 |
| 59 | 0.23534 | −0.00506 | 0.69444 |
| 60 | 0.23696 | 0.09194 | 0.69444 |
| 61 | 0.24298 | −0.01002 | 0.69444 |
| 62 | 0.24298 | 0.08509 | 0.69444 |
| 63 | 0.24861 | 0.07793 | 0.69444 |
| 64 | 0.25032 | −0.01542 | 0.69444 |
| 65 | 0.25391 | 0.07052 | 0.69444 |
| 66 | 0.25731 | −0.02125 | 0.69444 |
| 67 | 0.25895 | 0.06294 | 0.69444 |
| 68 | 0.26380 | 0.05523 | 0.69444 |
| 69 | 0.26395 | −0.02749 | 0.69444 |
| 70 | 0.26847 | 0.04740 | 0.69444 |
| 71 | 0.27023 | −0.03408 | 0.69444 |
| 72 | 0.27302 | 0.03952 | 0.69444 |
| 73 | 0.27620 | −0.04097 | 0.69444 |
| 74 | 0.27750 | 0.03158 | 0.69444 |
| 75 | 0.28193 | 0.02361 | 0.69444 |
| 76 | 0.28197 | −0.04802 | 0.69444 |
| 77 | 0.28631 | 0.01562 | 0.69444 |
| 78 | 0.28762 | −0.05516 | 0.69444 |
| 79 | 0.29062 | 0.00760 | 0.69444 |
| 80 | 0.29323 | −0.06235 | 0.69444 |
| 81 | 0.29482 | −0.00048 | 0.69444 |
| 82 | 0.29877 | −0.06957 | 0.69444 |
| 83 | 0.29886 | −0.00866 | 0.69444 |
| 84 | 0.30270 | −0.01692 | 0.69444 |
| 85 | 0.30419 | −0.07690 | 0.69444 |
| 86 | 0.30633 | −0.02527 | 0.69444 |
| 87 | 0.30941 | −0.08436 | 0.69444 |
| 88 | 0.30978 | −0.03370 | 0.69444 |
| 89 | 0.31309 | −0.04218 | 0.69444 |
| 90 | 0.31439 | −0.09198 | 0.69444 |
| 91 | 0.31630 | −0.05071 | 0.69444 |
| 92 | 0.31919 | −0.09973 | 0.69444 |
| 93 | 0.31946 | −0.05925 | 0.69444 |
| 94 | 0.32257 | −0.06782 | 0.69444 |
| 95 | 0.32385 | −0.10755 | 0.69444 |
| 96 | 0.32566 | −0.07639 | 0.69444 |
| 97 | 0.32872 | −0.08497 | 0.69444 |
| 98 | 0.33173 | −0.09357 | 0.69444 |
| 99 | 0.33175 | −0.10990 | 0.69444 |
| 100 | 0.33467 | −0.10219 | 0.69444 |
| 1 | 0.02497 | −0.01410 | 0.72222 |
| 2 | 0.02554 | −0.00505 | 0.72222 |
| 3 | 0.02719 | 0.00388 | 0.72222 |
| 4 | 0.02725 | −0.02278 | 0.72222 |
| 5 | 0.02956 | 0.01267 | 0.72222 |
| 6 | 0.03247 | 0.02127 | 0.72222 |
| 7 | 0.03478 | −0.02734 | 0.72222 |
| 8 | 0.03592 | 0.02967 | 0.72222 |
| 9 | 0.03985 | 0.03785 | 0.72222 |
| 10 | 0.04380 | −0.02708 | 0.72222 |

TABLE II-continued

Non-Dimensionalized (X Y Z/Span)

| N | X | Y | Z |
|---|---|---|---|
| 11 | 0.04426 | 0.04578 | 0.72222 |
| 12 | 0.04910 | 0.05346 | 0.72222 |
| 13 | 0.05250 | −0.02452 | 0.72222 |
| 14 | 0.05435 | 0.06087 | 0.72222 |
| 15 | 0.05996 | 0.06802 | 0.72222 |
| 16 | 0.06074 | −0.02070 | 0.72222 |
| 17 | 0.06590 | 0.07488 | 0.72222 |
| 18 | 0.06862 | −0.01615 | 0.72222 |
| 19 | 0.07216 | 0.08147 | 0.72222 |
| 20 | 0.07622 | −0.01119 | 0.72222 |
| 21 | 0.07868 | 0.08780 | 0.72222 |
| 22 | 0.08366 | −0.00600 | 0.72222 |
| 23 | 0.08546 | 0.09383 | 0.72222 |
| 24 | 0.09115 | −0.00083 | 0.72222 |
| 25 | 0.09250 | 0.09957 | 0.72222 |
| 26 | 0.09886 | 0.00395 | 0.72222 |
| 27 | 0.09980 | 0.10497 | 0.72222 |
| 28 | 0.10694 | 0.00809 | 0.72222 |
| 29 | 0.10736 | 0.11000 | 0.72222 |
| 30 | 0.11520 | 0.11458 | 0.72222 |
| 31 | 0.11536 | 0.01150 | 0.72222 |
| 32 | 0.12332 | 0.11866 | 0.72222 |
| 33 | 0.12403 | 0.01418 | 0.72222 |
| 34 | 0.13171 | 0.12213 | 0.72222 |
| 35 | 0.13289 | 0.01616 | 0.72222 |
| 36 | 0.14037 | 0.12485 | 0.72222 |
| 37 | 0.14187 | 0.01755 | 0.72222 |
| 38 | 0.14926 | 0.12671 | 0.72222 |
| 39 | 0.15091 | 0.01839 | 0.72222 |
| 40 | 0.15829 | 0.12762 | 0.72222 |
| 41 | 0.15998 | 0.01864 | 0.72222 |
| 42 | 0.16737 | 0.12757 | 0.72222 |
| 43 | 0.16906 | 0.01827 | 0.72222 |
| 44 | 0.17639 | 0.12657 | 0.72222 |
| 45 | 0.17808 | 0.01727 | 0.72222 |
| 46 | 0.18526 | 0.12465 | 0.72222 |
| 47 | 0.18703 | 0.01568 | 0.72222 |
| 48 | 0.19390 | 0.12185 | 0.72222 |
| 49 | 0.19584 | 0.01350 | 0.72222 |
| 50 | 0.20224 | 0.11826 | 0.72222 |
| 51 | 0.20450 | 0.01076 | 0.72222 |
| 52 | 0.21023 | 0.11395 | 0.72222 |
| 53 | 0.21297 | 0.00749 | 0.72222 |
| 54 | 0.21784 | 0.10899 | 0.72222 |
| 55 | 0.22123 | 0.00371 | 0.72222 |
| 56 | 0.22503 | 0.10344 | 0.72222 |
| 57 | 0.22925 | −0.00055 | 0.72222 |
| 58 | 0.23177 | 0.09737 | 0.72222 |
| 59 | 0.23701 | −0.00527 | 0.72222 |
| 60 | 0.23808 | 0.09084 | 0.72222 |
| 61 | 0.24398 | 0.08393 | 0.72222 |
| 62 | 0.24447 | −0.01045 | 0.72222 |
| 63 | 0.24951 | 0.07673 | 0.72222 |
| 64 | 0.25162 | −0.01605 | 0.72222 |
| 65 | 0.25472 | 0.06929 | 0.72222 |
| 66 | 0.25842 | −0.02205 | 0.72222 |
| 67 | 0.25967 | 0.06167 | 0.72222 |
| 68 | 0.26441 | 0.05393 | 0.72222 |
| 69 | 0.26489 | −0.02844 | 0.72222 |
| 70 | 0.26899 | 0.04609 | 0.72222 |
| 71 | 0.27100 | −0.03515 | 0.72222 |
| 72 | 0.27344 | 0.03817 | 0.72222 |
| 73 | 0.27683 | −0.04211 | 0.72222 |
| 74 | 0.27780 | 0.03020 | 0.72222 |
| 75 | 0.28212 | 0.02220 | 0.72222 |
| 76 | 0.28247 | −0.04924 | 0.72222 |
| 77 | 0.28638 | 0.01418 | 0.72222 |
| 78 | 0.28802 | −0.05643 | 0.72222 |
| 79 | 0.29055 | 0.00610 | 0.72222 |
| 80 | 0.29350 | −0.06367 | 0.72222 |
| 81 | 0.29459 | −0.00202 | 0.72222 |
| 82 | 0.29849 | −0.01022 | 0.72222 |
| 83 | 0.29893 | −0.07096 | 0.72222 |
| 84 | 0.30219 | −0.01851 | 0.72222 |
| 85 | 0.30422 | −0.07834 | 0.72222 |
| 86 | 0.30575 | −0.02687 | 0.72222 |
| 87 | 0.30915 | −0.03529 | 0.72222 |
| 88 | 0.30931 | −0.08586 | 0.72222 |
| 89 | 0.31242 | −0.04376 | 0.72222 |
| 90 | 0.31417 | −0.09353 | 0.72222 |
| 91 | 0.31560 | −0.05227 | 0.72222 |
| 92 | 0.31873 | −0.06080 | 0.72222 |
| 93 | 0.31885 | −0.10130 | 0.72222 |
| 94 | 0.32182 | −0.06934 | 0.72222 |
| 95 | 0.32342 | −0.10916 | 0.72222 |
| 96 | 0.32489 | −0.07789 | 0.72222 |
| 97 | 0.32793 | −0.08645 | 0.72222 |
| 98 | 0.33092 | −0.09503 | 0.72222 |
| 99 | 0.33127 | −0.11142 | 0.72222 |
| 100 | 0.33383 | −0.10363 | 0.72222 |
| 1 | 0.02664 | −0.00939 | 0.75000 |
| 2 | 0.02717 | −0.00038 | 0.75000 |
| 3 | 0.02880 | −0.01806 | 0.75000 |
| 4 | 0.02886 | 0.00852 | 0.75000 |
| 5 | 0.03127 | 0.01725 | 0.75000 |
| 6 | 0.03423 | 0.02580 | 0.75000 |
| 7 | 0.03630 | −0.02262 | 0.75000 |
| 8 | 0.03769 | 0.03416 | 0.75000 |
| 9 | 0.04164 | 0.04229 | 0.75000 |
| 10 | 0.04529 | −0.02251 | 0.75000 |
| 11 | 0.04604 | 0.05019 | 0.75000 |
| 12 | 0.05087 | 0.05783 | 0.75000 |
| 13 | 0.05402 | −0.02022 | 0.75000 |
| 14 | 0.05609 | 0.06522 | 0.75000 |
| 15 | 0.06166 | 0.07235 | 0.75000 |
| 16 | 0.06234 | −0.01668 | 0.75000 |
| 17 | 0.06758 | 0.07920 | 0.75000 |
| 18 | 0.07034 | −0.01242 | 0.75000 |
| 19 | 0.07381 | 0.08575 | 0.75000 |
| 20 | 0.07810 | −0.00778 | 0.75000 |
| 21 | 0.08035 | 0.09200 | 0.75000 |
| 22 | 0.08571 | −0.00288 | 0.75000 |
| 23 | 0.08719 | 0.09791 | 0.75000 |
| 24 | 0.09334 | 0.00199 | 0.75000 |
| 25 | 0.09431 | 0.10349 | 0.75000 |
| 26 | 0.10116 | 0.00653 | 0.75000 |
| 27 | 0.10172 | 0.10867 | 0.75000 |
| 28 | 0.10931 | 0.01045 | 0.75000 |
| 29 | 0.10942 | 0.11341 | 0.75000 |
| 30 | 0.11741 | 0.11768 | 0.75000 |
| 31 | 0.11775 | 0.01369 | 0.75000 |
| 32 | 0.12565 | 0.12140 | 0.75000 |
| 33 | 0.12644 | 0.01619 | 0.75000 |
| 34 | 0.13415 | 0.12448 | 0.75000 |
| 35 | 0.13530 | 0.01800 | 0.75000 |
| 36 | 0.14290 | 0.12680 | 0.75000 |
| 37 | 0.14427 | 0.01921 | 0.75000 |
| 38 | 0.15181 | 0.12825 | 0.75000 |
| 39 | 0.15329 | 0.01983 | 0.75000 |
| 40 | 0.16084 | 0.12879 | 0.75000 |
| 41 | 0.16233 | 0.01987 | 0.75000 |
| 42 | 0.16988 | 0.12839 | 0.75000 |
| 43 | 0.17135 | 0.01927 | 0.75000 |
| 44 | 0.17882 | 0.12705 | 0.75000 |
| 45 | 0.18032 | 0.01806 | 0.75000 |
| 46 | 0.18757 | 0.12477 | 0.75000 |
| 47 | 0.18918 | 0.01625 | 0.75000 |
| 48 | 0.19605 | 0.12164 | 0.75000 |
| 49 | 0.19790 | 0.01385 | 0.75000 |
| 50 | 0.20420 | 0.11773 | 0.75000 |
| 51 | 0.20645 | 0.01089 | 0.75000 |
| 52 | 0.21200 | 0.11314 | 0.75000 |
| 53 | 0.21480 | 0.00741 | 0.75000 |
| 54 | 0.21939 | 0.10793 | 0.75000 |
| 55 | 0.22292 | 0.00343 | 0.75000 |
| 56 | 0.22638 | 0.10218 | 0.75000 |
| 57 | 0.23079 | −0.00105 | 0.75000 |
| 58 | 0.23293 | 0.09597 | 0.75000 |
| 59 | 0.23837 | −0.00596 | 0.75000 |
| 60 | 0.23909 | 0.08934 | 0.75000 |
| 61 | 0.24488 | 0.08238 | 0.75000 |
| 62 | 0.24566 | −0.01131 | 0.75000 |

TABLE II-continued

Non-Dimensionalized (X Y Z/Span)

| N | X | Y | Z |
|---|---|---|---|
| 63 | 0.25032 | 0.07515 | 0.75000 |
| 64 | 0.25263 | −0.01708 | 0.75000 |
| 65 | 0.25546 | 0.06771 | 0.75000 |
| 66 | 0.25928 | −0.02322 | 0.75000 |
| 67 | 0.26036 | 0.06010 | 0.75000 |
| 68 | 0.26503 | 0.05236 | 0.75000 |
| 69 | 0.26559 | −0.02970 | 0.75000 |
| 70 | 0.26953 | 0.04452 | 0.75000 |
| 71 | 0.27159 | −0.03647 | 0.75000 |
| 72 | 0.27388 | 0.03659 | 0.75000 |
| 73 | 0.27732 | −0.04346 | 0.75000 |
| 74 | 0.27813 | 0.02860 | 0.75000 |
| 75 | 0.28230 | 0.02056 | 0.75000 |
| 76 | 0.28287 | −0.05061 | 0.75000 |
| 77 | 0.28639 | 0.01249 | 0.75000 |
| 78 | 0.28833 | −0.05782 | 0.75000 |
| 79 | 0.29040 | 0.00438 | 0.75000 |
| 80 | 0.29370 | −0.06511 | 0.75000 |
| 81 | 0.29428 | −0.00379 | 0.75000 |
| 82 | 0.29804 | −0.01201 | 0.75000 |
| 83 | 0.29898 | −0.07245 | 0.75000 |
| 84 | 0.30165 | −0.02031 | 0.75000 |
| 85 | 0.30413 | −0.07989 | 0.75000 |
| 86 | 0.30511 | −0.02866 | 0.75000 |
| 87 | 0.30845 | −0.03707 | 0.75000 |
| 88 | 0.30908 | −0.08746 | 0.75000 |
| 89 | 0.31169 | −0.04551 | 0.75000 |
| 90 | 0.31382 | −0.09515 | 0.75000 |
| 91 | 0.31485 | −0.05400 | 0.75000 |
| 92 | 0.31796 | −0.06249 | 0.75000 |
| 93 | 0.31840 | −0.10296 | 0.75000 |
| 94 | 0.32104 | −0.07100 | 0.75000 |
| 95 | 0.32289 | −0.11082 | 0.75000 |
| 96 | 0.32410 | −0.07952 | 0.75000 |
| 97 | 0.32710 | −0.08805 | 0.75000 |
| 98 | 0.33008 | −0.09659 | 0.75000 |
| 99 | 0.33068 | −0.11299 | 0.75000 |
| 100 | 0.33298 | −0.10516 | 0.75000 |
| 1 | 0.02829 | −0.00375 | 0.77778 |
| 2 | 0.02887 | 0.00521 | 0.77778 |
| 3 | 0.03034 | −0.01241 | 0.77778 |
| 4 | 0.03059 | 0.01404 | 0.77778 |
| 5 | 0.03303 | 0.02273 | 0.77778 |
| 6 | 0.03600 | 0.03122 | 0.77778 |
| 7 | 0.03772 | −0.01703 | 0.77778 |
| 8 | 0.03949 | 0.03951 | 0.77778 |
| 9 | 0.04346 | 0.04758 | 0.77778 |
| 10 | 0.04667 | −0.01712 | 0.77778 |
| 11 | 0.04787 | 0.05542 | 0.77778 |
| 12 | 0.05269 | 0.06301 | 0.77778 |
| 13 | 0.05541 | −0.01507 | 0.77778 |
| 14 | 0.05790 | 0.07035 | 0.77778 |
| 15 | 0.06347 | 0.07742 | 0.77778 |
| 16 | 0.06380 | −0.01184 | 0.77778 |
| 17 | 0.06938 | 0.08422 | 0.77778 |
| 18 | 0.07193 | −0.00792 | 0.77778 |
| 19 | 0.07562 | 0.09069 | 0.77778 |
| 20 | 0.07984 | −0.00365 | 0.77778 |
| 21 | 0.08221 | 0.09682 | 0.77778 |
| 22 | 0.08765 | 0.00084 | 0.77778 |
| 23 | 0.08913 | 0.10257 | 0.77778 |
| 24 | 0.09546 | 0.00531 | 0.77778 |
| 25 | 0.09637 | 0.10792 | 0.77778 |
| 26 | 0.10344 | 0.00945 | 0.77778 |
| 27 | 0.10392 | 0.11281 | 0.77778 |
| 28 | 0.11169 | 0.01306 | 0.77778 |
| 29 | 0.11177 | 0.11723 | 0.77778 |
| 30 | 0.11989 | 0.12109 | 0.77778 |
| 31 | 0.12018 | 0.01601 | 0.77778 |
| 32 | 0.12828 | 0.12434 | 0.77778 |
| 33 | 0.12890 | 0.01826 | 0.77778 |
| 34 | 0.13689 | 0.12694 | 0.77778 |
| 35 | 0.13776 | 0.01982 | 0.77778 |
| 36 | 0.14571 | 0.12876 | 0.77778 |
| 37 | 0.14670 | 0.02078 | 0.77778 |
| 38 | 0.15465 | 0.12972 | 0.77778 |
| 39 | 0.15570 | 0.02116 | 0.77778 |
| 40 | 0.16365 | 0.12979 | 0.77778 |
| 41 | 0.16469 | 0.02093 | 0.77778 |
| 42 | 0.17261 | 0.12895 | 0.77778 |
| 43 | 0.17364 | 0.02007 | 0.77778 |
| 44 | 0.18142 | 0.12720 | 0.77778 |
| 45 | 0.18252 | 0.01859 | 0.77778 |
| 46 | 0.19001 | 0.12452 | 0.77778 |
| 47 | 0.19128 | 0.01651 | 0.77778 |
| 48 | 0.19829 | 0.12101 | 0.77778 |
| 49 | 0.19988 | 0.01386 | 0.77778 |
| 50 | 0.20622 | 0.11676 | 0.77778 |
| 51 | 0.20828 | 0.01066 | 0.77778 |
| 52 | 0.21377 | 0.11186 | 0.77778 |
| 53 | 0.21648 | 0.00695 | 0.77778 |
| 54 | 0.22091 | 0.10639 | 0.77778 |
| 55 | 0.22443 | 0.00273 | 0.77778 |
| 56 | 0.22766 | 0.10044 | 0.77778 |
| 57 | 0.23212 | −0.00194 | 0.77778 |
| 58 | 0.23402 | 0.09408 | 0.77778 |
| 59 | 0.23953 | −0.00705 | 0.77778 |
| 60 | 0.24001 | 0.08737 | 0.77778 |
| 61 | 0.24568 | 0.08037 | 0.77778 |
| 62 | 0.24664 | −0.01257 | 0.77778 |
| 63 | 0.25104 | 0.07314 | 0.77778 |
| 64 | 0.25344 | −0.01847 | 0.77778 |
| 65 | 0.25612 | 0.06571 | 0.77778 |
| 66 | 0.25993 | −0.02470 | 0.77778 |
| 67 | 0.26097 | 0.05813 | 0.77778 |
| 68 | 0.26559 | 0.05041 | 0.77778 |
| 69 | 0.26610 | −0.03124 | 0.77778 |
| 70 | 0.27003 | 0.04259 | 0.77778 |
| 71 | 0.27199 | −0.03803 | 0.77778 |
| 72 | 0.27431 | 0.03467 | 0.77778 |
| 73 | 0.27768 | −0.04501 | 0.77778 |
| 74 | 0.27845 | 0.02667 | 0.77778 |
| 75 | 0.28248 | 0.01862 | 0.77778 |
| 76 | 0.28318 | −0.05215 | 0.77778 |
| 77 | 0.28640 | 0.01052 | 0.77778 |
| 78 | 0.28855 | −0.05937 | 0.77778 |
| 79 | 0.29023 | 0.00237 | 0.77778 |
| 80 | 0.29380 | −0.06668 | 0.77778 |
| 81 | 0.29394 | −0.00583 | 0.77778 |
| 82 | 0.29755 | −0.01407 | 0.77778 |
| 83 | 0.29893 | −0.07408 | 0.77778 |
| 84 | 0.30105 | −0.02236 | 0.77778 |
| 85 | 0.30392 | −0.08157 | 0.77778 |
| 86 | 0.30442 | −0.03070 | 0.77778 |
| 87 | 0.30772 | −0.03908 | 0.77778 |
| 88 | 0.30874 | −0.08917 | 0.77778 |
| 89 | 0.31093 | −0.04748 | 0.77778 |
| 90 | 0.31336 | −0.09688 | 0.77778 |
| 91 | 0.31409 | −0.05592 | 0.77778 |
| 92 | 0.31720 | −0.06436 | 0.77778 |
| 93 | 0.31786 | −0.10468 | 0.77778 |
| 94 | 0.32028 | −0.07281 | 0.77778 |
| 95 | 0.32226 | −0.11253 | 0.77778 |
| 96 | 0.32332 | −0.08129 | 0.77778 |
| 97 | 0.32632 | −0.08978 | 0.77778 |
| 98 | 0.32925 | −0.09828 | 0.77778 |
| 99 | 0.33001 | −0.11466 | 0.77778 |
| 100 | 0.33212 | −0.10681 | 0.77778 |
| 1 | 0.03005 | 0.00240 | 0.80555 |
| 2 | 0.03058 | 0.01130 | 0.80555 |
| 3 | 0.03212 | −0.00620 | 0.80555 |
| 4 | 0.03229 | 0.02009 | 0.80555 |
| 5 | 0.03471 | 0.02871 | 0.80555 |
| 6 | 0.03769 | 0.03715 | 0.80555 |
| 7 | 0.03951 | −0.01070 | 0.80555 |
| 8 | 0.04118 | 0.04537 | 0.80555 |
| 9 | 0.04515 | 0.05338 | 0.80555 |
| 10 | 0.04841 | −0.01076 | 0.80555 |
| 11 | 0.04957 | 0.06114 | 0.80555 |
| 12 | 0.05440 | 0.06866 | 0.80555 |
| 13 | 0.05713 | −0.00887 | 0.80555 |
| 14 | 0.05963 | 0.07592 | 0.80555 |

TABLE II-continued

Non-Dimensionalized (X Y Z/Span)

| N | X | Y | Z |
|---|---|---|---|
| 15 | 0.06522 | 0.08290 | 0.80555 |
| 16 | 0.06555 | −0.00588 | 0.80555 |
| 17 | 0.07117 | 0.08958 | 0.80555 |
| 18 | 0.07377 | −0.00230 | 0.80555 |
| 19 | 0.07747 | 0.09592 | 0.80555 |
| 20 | 0.08183 | 0.00156 | 0.80555 |
| 21 | 0.08415 | 0.10187 | 0.80555 |
| 22 | 0.08981 | 0.00559 | 0.80555 |
| 23 | 0.09117 | 0.10739 | 0.80555 |
| 24 | 0.09782 | 0.00956 | 0.80555 |
| 25 | 0.09855 | 0.11245 | 0.80555 |
| 26 | 0.10599 | 0.01322 | 0.80555 |
| 27 | 0.10624 | 0.11700 | 0.80555 |
| 28 | 0.11424 | 0.12100 | 0.80555 |
| 29 | 0.11435 | 0.01638 | 0.80555 |
| 30 | 0.12251 | 0.12438 | 0.80555 |
| 31 | 0.12292 | 0.01892 | 0.80555 |
| 32 | 0.13102 | 0.12712 | 0.80555 |
| 33 | 0.13166 | 0.02079 | 0.80555 |
| 34 | 0.13973 | 0.12915 | 0.80555 |
| 35 | 0.14052 | 0.02200 | 0.80555 |
| 36 | 0.14858 | 0.13038 | 0.80555 |
| 37 | 0.14943 | 0.02263 | 0.80555 |
| 38 | 0.15751 | 0.13077 | 0.80555 |
| 39 | 0.15837 | 0.02267 | 0.80555 |
| 40 | 0.16643 | 0.13030 | 0.80555 |
| 41 | 0.16730 | 0.02211 | 0.80555 |
| 42 | 0.17526 | 0.12893 | 0.80555 |
| 43 | 0.17616 | 0.02093 | 0.80555 |
| 44 | 0.18392 | 0.12669 | 0.80555 |
| 45 | 0.18491 | 0.01913 | 0.80555 |
| 46 | 0.19230 | 0.12358 | 0.80555 |
| 47 | 0.19353 | 0.01672 | 0.80555 |
| 48 | 0.20034 | 0.11969 | 0.80555 |
| 49 | 0.20196 | 0.01375 | 0.80555 |
| 50 | 0.20802 | 0.11512 | 0.80555 |
| 51 | 0.21019 | 0.01025 | 0.80555 |
| 52 | 0.21531 | 0.10993 | 0.80555 |
| 53 | 0.21818 | 0.00625 | 0.80555 |
| 54 | 0.22220 | 0.10424 | 0.80555 |
| 55 | 0.22593 | 0.00179 | 0.80555 |
| 56 | 0.22872 | 0.09811 | 0.80555 |
| 57 | 0.23341 | −0.00311 | 0.80555 |
| 58 | 0.23488 | 0.09164 | 0.80555 |
| 59 | 0.24061 | −0.00840 | 0.80555 |
| 60 | 0.24071 | 0.08486 | 0.80555 |
| 61 | 0.24625 | 0.07784 | 0.80555 |
| 62 | 0.24752 | −0.01408 | 0.80555 |
| 63 | 0.25152 | 0.07061 | 0.80555 |
| 64 | 0.25414 | −0.02009 | 0.80555 |
| 65 | 0.25655 | 0.06321 | 0.80555 |
| 66 | 0.26047 | −0.02641 | 0.80555 |
| 67 | 0.26133 | 0.05566 | 0.80555 |
| 68 | 0.26591 | 0.04798 | 0.80555 |
| 69 | 0.26652 | −0.03298 | 0.80555 |
| 70 | 0.27029 | 0.04020 | 0.80555 |
| 71 | 0.27233 | −0.03978 | 0.80555 |
| 72 | 0.27451 | 0.03231 | 0.80555 |
| 73 | 0.27793 | −0.04675 | 0.80555 |
| 74 | 0.27856 | 0.02434 | 0.80555 |
| 75 | 0.28248 | 0.01629 | 0.80555 |
| 76 | 0.28335 | −0.05387 | 0.80555 |
| 77 | 0.28626 | 0.00819 | 0.80555 |
| 78 | 0.28862 | −0.06109 | 0.80555 |
| 79 | 0.28994 | 0.00004 | 0.80555 |
| 80 | 0.29351 | −0.00815 | 0.80555 |
| 81 | 0.29375 | −0.06841 | 0.80555 |
| 82 | 0.29699 | −0.01639 | 0.80555 |
| 83 | 0.29874 | −0.07584 | 0.80555 |
| 84 | 0.30039 | −0.02467 | 0.80555 |
| 85 | 0.30357 | −0.08336 | 0.80555 |
| 86 | 0.30371 | −0.03297 | 0.80555 |
| 87 | 0.30696 | −0.04130 | 0.80555 |
| 88 | 0.30825 | −0.09098 | 0.80555 |
| 89 | 0.31015 | −0.04965 | 0.80555 |
| 90 | 0.31278 | −0.09869 | 0.80555 |
| 91 | 0.31330 | −0.05802 | 0.80555 |
| 92 | 0.31641 | −0.06641 | 0.80555 |
| 93 | 0.31720 | −0.10647 | 0.80555 |
| 94 | 0.31947 | −0.07480 | 0.80555 |
| 95 | 0.32154 | −0.11428 | 0.80555 |
| 96 | 0.32249 | −0.08321 | 0.80555 |
| 97 | 0.32547 | −0.09165 | 0.80555 |
| 98 | 0.32839 | −0.10010 | 0.80555 |
| 99 | 0.32922 | −0.11639 | 0.80555 |
| 100 | 0.33126 | −0.10857 | 0.80555 |
| 1 | 0.03195 | 0.00866 | 0.83333 |
| 2 | 0.03236 | 0.01750 | 0.83333 |
| 3 | 0.03394 | 0.02623 | 0.83333 |
| 4 | 0.03435 | 0.00023 | 0.83333 |
| 5 | 0.03628 | 0.03481 | 0.83333 |
| 6 | 0.03918 | 0.04320 | 0.83333 |
| 7 | 0.04205 | −0.00363 | 0.83333 |
| 8 | 0.04261 | 0.05138 | 0.83333 |
| 9 | 0.04655 | 0.05933 | 0.83333 |
| 10 | 0.05089 | −0.00342 | 0.83333 |
| 11 | 0.05096 | 0.06702 | 0.83333 |
| 12 | 0.05581 | 0.07445 | 0.83333 |
| 13 | 0.05955 | −0.00152 | 0.83333 |
| 14 | 0.06107 | 0.08159 | 0.83333 |
| 15 | 0.06672 | 0.08844 | 0.83333 |
| 16 | 0.06796 | 0.00131 | 0.83333 |
| 17 | 0.07274 | 0.09496 | 0.83333 |
| 18 | 0.07622 | 0.00458 | 0.83333 |
| 19 | 0.07915 | 0.10109 | 0.83333 |
| 20 | 0.08439 | 0.00805 | 0.83333 |
| 21 | 0.08594 | 0.10679 | 0.83333 |
| 22 | 0.09252 | 0.01160 | 0.83333 |
| 23 | 0.09311 | 0.11203 | 0.83333 |
| 24 | 0.10062 | 0.11675 | 0.83333 |
| 25 | 0.10071 | 0.01502 | 0.83333 |
| 26 | 0.10846 | 0.12091 | 0.83333 |
| 27 | 0.10903 | 0.01812 | 0.83333 |
| 28 | 0.11660 | 0.12444 | 0.83333 |
| 29 | 0.11751 | 0.02071 | 0.83333 |
| 30 | 0.12500 | 0.12731 | 0.83333 |
| 31 | 0.12615 | 0.02273 | 0.83333 |
| 32 | 0.13360 | 0.12947 | 0.83333 |
| 33 | 0.13492 | 0.02409 | 0.83333 |
| 34 | 0.14236 | 0.13087 | 0.83333 |
| 35 | 0.14377 | 0.02483 | 0.83333 |
| 36 | 0.15121 | 0.13146 | 0.83333 |
| 37 | 0.15264 | 0.02500 | 0.83333 |
| 38 | 0.16008 | 0.13119 | 0.83333 |
| 39 | 0.16150 | 0.02461 | 0.83333 |
| 40 | 0.16888 | 0.13007 | 0.83333 |
| 41 | 0.17032 | 0.02365 | 0.83333 |
| 42 | 0.17754 | 0.12812 | 0.83333 |
| 43 | 0.17905 | 0.02206 | 0.83333 |
| 44 | 0.18596 | 0.12535 | 0.83333 |
| 45 | 0.18764 | 0.01986 | 0.83333 |
| 46 | 0.19410 | 0.12180 | 0.83333 |
| 47 | 0.19607 | 0.01705 | 0.83333 |
| 48 | 0.20188 | 0.11755 | 0.83333 |
| 49 | 0.20427 | 0.01369 | 0.83333 |
| 50 | 0.20930 | 0.11269 | 0.83333 |
| 51 | 0.21226 | 0.00982 | 0.83333 |
| 52 | 0.21635 | 0.10730 | 0.83333 |
| 53 | 0.22001 | 0.00550 | 0.83333 |
| 54 | 0.22302 | 0.10145 | 0.83333 |
| 55 | 0.22751 | 0.00075 | 0.83333 |
| 56 | 0.22934 | 0.09522 | 0.83333 |
| 57 | 0.23474 | −0.00439 | 0.83333 |
| 58 | 0.23534 | 0.08868 | 0.83333 |
| 59 | 0.24104 | 0.08188 | 0.83333 |
| 60 | 0.24170 | −0.00988 | 0.83333 |
| 61 | 0.24647 | 0.07485 | 0.83333 |
| 62 | 0.24840 | −0.01571 | 0.83333 |
| 63 | 0.25163 | 0.06764 | 0.83333 |
| 64 | 0.25482 | −0.02184 | 0.83333 |
| 65 | 0.25657 | 0.06026 | 0.83333 |
| 66 | 0.26097 | −0.02824 | 0.83333 |

TABLE II-continued

Non-Dimensionalized (X Y Z/Span)

| N | X | Y | Z |
|---|---|---|---|
| 67 | 0.26129 | 0.05275 | 0.83333 |
| 68 | 0.26580 | 0.04510 | 0.83333 |
| 69 | 0.26687 | −0.03485 | 0.83333 |
| 70 | 0.27012 | 0.03736 | 0.83333 |
| 71 | 0.27257 | −0.04167 | 0.83333 |
| 72 | 0.27428 | 0.02952 | 0.83333 |
| 73 | 0.27805 | −0.04864 | 0.83333 |
| 74 | 0.27827 | 0.02159 | 0.83333 |
| 75 | 0.28212 | 0.01359 | 0.83333 |
| 76 | 0.28336 | −0.05575 | 0.83333 |
| 77 | 0.28583 | 0.00553 | 0.83333 |
| 78 | 0.28852 | −0.06298 | 0.83333 |
| 79 | 0.28943 | −0.00259 | 0.83333 |
| 80 | 0.29293 | −0.01074 | 0.83333 |
| 81 | 0.29352 | −0.07031 | 0.83333 |
| 82 | 0.29634 | −0.01893 | 0.83333 |
| 83 | 0.29838 | −0.07774 | 0.83333 |
| 84 | 0.29968 | −0.02716 | 0.83333 |
| 85 | 0.30295 | −0.03541 | 0.83333 |
| 86 | 0.30308 | −0.08526 | 0.83333 |
| 87 | 0.30617 | −0.04368 | 0.83333 |
| 88 | 0.30764 | −0.09288 | 0.83333 |
| 89 | 0.30934 | −0.05197 | 0.83333 |
| 90 | 0.31207 | −0.10057 | 0.83333 |
| 91 | 0.31246 | −0.06027 | 0.83333 |
| 92 | 0.31555 | −0.06859 | 0.83333 |
| 93 | 0.31640 | −0.10831 | 0.83333 |
| 94 | 0.31859 | −0.07693 | 0.83333 |
| 95 | 0.32068 | −0.11609 | 0.83333 |
| 96 | 0.32161 | −0.08527 | 0.83333 |
| 97 | 0.32457 | −0.09364 | 0.83333 |
| 98 | 0.32748 | −0.10203 | 0.83333 |
| 99 | 0.32830 | −0.11819 | 0.83333 |
| 100 | 0.33033 | −0.11043 | 0.83333 |
| 1 | 0.03399 | 0.01489 | 0.86111 |
| 2 | 0.03410 | 0.02368 | 0.86111 |
| 3 | 0.03550 | 0.03237 | 0.86111 |
| 4 | 0.03709 | 0.00686 | 0.86111 |
| 5 | 0.03772 | 0.04092 | 0.86111 |
| 6 | 0.04052 | 0.04927 | 0.86111 |
| 7 | 0.04388 | 0.05741 | 0.86111 |
| 8 | 0.04524 | 0.00403 | 0.86111 |
| 9 | 0.04776 | 0.06530 | 0.86111 |
| 10 | 0.05215 | 0.07294 | 0.86111 |
| 11 | 0.05401 | 0.00466 | 0.86111 |
| 12 | 0.05701 | 0.08028 | 0.86111 |
| 13 | 0.06231 | 0.08730 | 0.86111 |
| 14 | 0.06257 | 0.00664 | 0.86111 |
| 15 | 0.06805 | 0.09398 | 0.86111 |
| 16 | 0.07096 | 0.00935 | 0.86111 |
| 17 | 0.07419 | 0.10030 | 0.86111 |
| 18 | 0.07925 | 0.01233 | 0.86111 |
| 19 | 0.08074 | 0.10619 | 0.86111 |
| 20 | 0.08750 | 0.01541 | 0.86111 |
| 21 | 0.08767 | 0.11162 | 0.86111 |
| 22 | 0.09498 | 0.11652 | 0.86111 |
| 23 | 0.09576 | 0.01847 | 0.86111 |
| 24 | 0.10264 | 0.12087 | 0.86111 |
| 25 | 0.10410 | 0.02133 | 0.86111 |
| 26 | 0.11061 | 0.12459 | 0.86111 |
| 27 | 0.11255 | 0.02381 | 0.86111 |
| 28 | 0.11887 | 0.12765 | 0.86111 |
| 29 | 0.12112 | 0.02579 | 0.86111 |
| 30 | 0.12736 | 0.12997 | 0.86111 |
| 31 | 0.12981 | 0.02718 | 0.86111 |
| 32 | 0.13602 | 0.13153 | 0.86111 |
| 33 | 0.13858 | 0.02794 | 0.86111 |
| 34 | 0.14480 | 0.13227 | 0.86111 |
| 35 | 0.14739 | 0.02812 | 0.86111 |
| 36 | 0.15360 | 0.13218 | 0.86111 |
| 37 | 0.15619 | 0.02777 | 0.86111 |
| 38 | 0.16236 | 0.13124 | 0.86111 |
| 39 | 0.16495 | 0.02690 | 0.86111 |
| 40 | 0.17098 | 0.12944 | 0.86111 |
| 41 | 0.17364 | 0.02546 | 0.86111 |
| 42 | 0.17939 | 0.12686 | 0.86111 |
| 43 | 0.18220 | 0.02341 | 0.86111 |
| 44 | 0.18754 | 0.12354 | 0.86111 |
| 45 | 0.19060 | 0.02075 | 0.86111 |
| 46 | 0.19540 | 0.11956 | 0.86111 |
| 47 | 0.19878 | 0.01750 | 0.86111 |
| 48 | 0.20292 | 0.11498 | 0.86111 |
| 49 | 0.20673 | 0.01370 | 0.86111 |
| 50 | 0.21009 | 0.10988 | 0.86111 |
| 51 | 0.21442 | 0.00943 | 0.86111 |
| 52 | 0.21692 | 0.10431 | 0.86111 |
| 53 | 0.22189 | 0.00476 | 0.86111 |
| 54 | 0.22341 | 0.09836 | 0.86111 |
| 55 | 0.22911 | −0.00029 | 0.86111 |
| 56 | 0.22958 | 0.09208 | 0.86111 |
| 57 | 0.23544 | 0.08551 | 0.86111 |
| 58 | 0.23607 | −0.00567 | 0.86111 |
| 59 | 0.24102 | 0.07869 | 0.86111 |
| 60 | 0.24279 | −0.01137 | 0.86111 |
| 61 | 0.24633 | 0.07168 | 0.86111 |
| 62 | 0.24925 | −0.01736 | 0.86111 |
| 63 | 0.25141 | 0.06447 | 0.86111 |
| 64 | 0.25545 | −0.02360 | 0.86111 |
| 65 | 0.25625 | 0.05711 | 0.86111 |
| 66 | 0.26089 | 0.04962 | 0.86111 |
| 67 | 0.26141 | −0.03008 | 0.86111 |
| 68 | 0.26533 | 0.04202 | 0.86111 |
| 69 | 0.26716 | −0.03676 | 0.86111 |
| 70 | 0.26960 | 0.03432 | 0.86111 |
| 71 | 0.27270 | −0.04360 | 0.86111 |
| 72 | 0.27369 | 0.02653 | 0.86111 |
| 73 | 0.27764 | 0.01865 | 0.86111 |
| 74 | 0.27805 | −0.05060 | 0.86111 |
| 75 | 0.28146 | 0.01071 | 0.86111 |
| 76 | 0.28324 | −0.05771 | 0.86111 |
| 77 | 0.28514 | 0.00271 | 0.86111 |
| 78 | 0.28827 | −0.06496 | 0.86111 |
| 79 | 0.28871 | −0.00533 | 0.86111 |
| 80 | 0.29220 | −0.01343 | 0.86111 |
| 81 | 0.29314 | −0.07229 | 0.86111 |
| 82 | 0.29559 | −0.02155 | 0.86111 |
| 83 | 0.29788 | −0.07971 | 0.86111 |
| 84 | 0.29890 | −0.02972 | 0.86111 |
| 85 | 0.30214 | −0.03790 | 0.86111 |
| 86 | 0.30246 | −0.08722 | 0.86111 |
| 87 | 0.30534 | −0.04611 | 0.86111 |
| 88 | 0.30692 | −0.09482 | 0.86111 |
| 89 | 0.30847 | −0.05434 | 0.86111 |
| 90 | 0.31126 | −0.10249 | 0.86111 |
| 91 | 0.31157 | −0.06258 | 0.86111 |
| 92 | 0.31463 | −0.07084 | 0.86111 |
| 93 | 0.31553 | −0.11019 | 0.86111 |
| 94 | 0.31765 | −0.07912 | 0.86111 |
| 95 | 0.31975 | −0.11792 | 0.86111 |
| 96 | 0.32064 | −0.08739 | 0.86111 |
| 97 | 0.32359 | −0.09569 | 0.86111 |
| 98 | 0.32649 | −0.10401 | 0.86111 |
| 99 | 0.32731 | −0.12003 | 0.86111 |
| 100 | 0.32934 | −0.11235 | 0.86111 |
| 1 | 0.03576 | 0.03007 | 0.88889 |
| 2 | 0.03599 | 0.02135 | 0.88889 |
| 3 | 0.03695 | 0.03871 | 0.88889 |
| 4 | 0.03908 | 0.04721 | 0.88889 |
| 5 | 0.04032 | 0.01413 | 0.88889 |
| 6 | 0.04182 | 0.05552 | 0.88889 |
| 7 | 0.04514 | 0.06360 | 0.88889 |
| 8 | 0.04882 | 0.01248 | 0.88889 |
| 9 | 0.04901 | 0.07144 | 0.88889 |
| 10 | 0.05342 | 0.07898 | 0.88889 |
| 11 | 0.05750 | 0.01344 | 0.88889 |
| 12 | 0.05833 | 0.08621 | 0.88889 |
| 13 | 0.06372 | 0.09309 | 0.88889 |
| 14 | 0.06600 | 0.01544 | 0.88889 |
| 15 | 0.06956 | 0.09959 | 0.88889 |
| 16 | 0.07438 | 0.01796 | 0.88889 |
| 17 | 0.07584 | 0.10567 | 0.88889 |
| 18 | 0.08253 | 0.11129 | 0.88889 |

TABLE II-continued

Non-Dimensionalized (X Y Z/Span)

| N | X | Y | Z |
|---|---|---|---|
| 19 | 0.08271 | 0.02061 | 0.88889 |
| 20 | 0.08962 | 0.11640 | 0.88889 |
| 21 | 0.09105 | 0.02327 | 0.88889 |
| 22 | 0.09709 | 0.12096 | 0.88889 |
| 23 | 0.09942 | 0.02580 | 0.88889 |
| 24 | 0.10489 | 0.12489 | 0.88889 |
| 25 | 0.10786 | 0.02806 | 0.88889 |
| 26 | 0.11300 | 0.12815 | 0.88889 |
| 27 | 0.11640 | 0.02990 | 0.88889 |
| 28 | 0.12137 | 0.13067 | 0.88889 |
| 29 | 0.12504 | 0.03123 | 0.88889 |
| 30 | 0.12994 | 0.13243 | 0.88889 |
| 31 | 0.13375 | 0.03196 | 0.88889 |
| 32 | 0.13862 | 0.13337 | 0.88889 |
| 33 | 0.14250 | 0.03208 | 0.88889 |
| 34 | 0.14736 | 0.13346 | 0.88889 |
| 35 | 0.15123 | 0.03165 | 0.88889 |
| 36 | 0.15607 | 0.13270 | 0.88889 |
| 37 | 0.15992 | 0.03073 | 0.88889 |
| 38 | 0.16466 | 0.13110 | 0.88889 |
| 39 | 0.16855 | 0.02930 | 0.88889 |
| 40 | 0.17305 | 0.12868 | 0.88889 |
| 41 | 0.17706 | 0.02734 | 0.88889 |
| 42 | 0.18120 | 0.12550 | 0.88889 |
| 43 | 0.18542 | 0.02478 | 0.88889 |
| 44 | 0.18906 | 0.12167 | 0.88889 |
| 45 | 0.19358 | 0.02163 | 0.88889 |
| 46 | 0.19662 | 0.11728 | 0.88889 |
| 47 | 0.20149 | 0.01792 | 0.88889 |
| 48 | 0.20385 | 0.11239 | 0.88889 |
| 49 | 0.20914 | 0.01370 | 0.88889 |
| 50 | 0.21077 | 0.10704 | 0.88889 |
| 51 | 0.21655 | 0.00906 | 0.88889 |
| 52 | 0.21738 | 0.10130 | 0.88889 |
| 53 | 0.22368 | 0.09524 | 0.88889 |
| 54 | 0.22371 | 0.00404 | 0.88889 |
| 55 | 0.22969 | 0.08890 | 0.88889 |
| 56 | 0.23064 | −0.00130 | 0.88889 |
| 57 | 0.23542 | 0.08230 | 0.88889 |
| 58 | 0.23733 | −0.00693 | 0.88889 |
| 59 | 0.24089 | 0.07548 | 0.88889 |
| 60 | 0.24377 | −0.01284 | 0.88889 |
| 61 | 0.24610 | 0.06846 | 0.88889 |
| 62 | 0.24998 | −0.01898 | 0.88889 |
| 63 | 0.25109 | 0.06127 | 0.88889 |
| 64 | 0.25585 | 0.05394 | 0.88889 |
| 65 | 0.25597 | −0.02536 | 0.88889 |
| 66 | 0.26041 | 0.04648 | 0.88889 |
| 67 | 0.26175 | −0.03193 | 0.88889 |
| 68 | 0.26479 | 0.03891 | 0.88889 |
| 69 | 0.26730 | −0.03867 | 0.88889 |
| 70 | 0.26900 | 0.03126 | 0.88889 |
| 71 | 0.27269 | −0.04556 | 0.88889 |
| 72 | 0.27306 | 0.02351 | 0.88889 |
| 73 | 0.27697 | 0.01569 | 0.88889 |
| 74 | 0.27790 | −0.05258 | 0.88889 |
| 75 | 0.28075 | 0.00781 | 0.88889 |
| 76 | 0.28295 | −0.05972 | 0.88889 |
| 77 | 0.28441 | −0.00013 | 0.88889 |
| 78 | 0.28785 | −0.06695 | 0.88889 |
| 79 | 0.28797 | −0.00813 | 0.88889 |
| 80 | 0.29143 | −0.01616 | 0.88889 |
| 81 | 0.29263 | −0.07428 | 0.88889 |
| 82 | 0.29481 | −0.02422 | 0.88889 |
| 83 | 0.29725 | −0.08170 | 0.88889 |
| 84 | 0.29810 | −0.03231 | 0.88889 |
| 85 | 0.30133 | −0.04044 | 0.88889 |
| 86 | 0.30176 | −0.08919 | 0.88889 |
| 87 | 0.30450 | −0.04858 | 0.88889 |
| 88 | 0.30613 | −0.09677 | 0.88889 |
| 89 | 0.30762 | −0.05676 | 0.88889 |
| 90 | 0.31040 | −0.10439 | 0.88889 |
| 91 | 0.31069 | −0.06495 | 0.88889 |
| 92 | 0.31371 | −0.07315 | 0.88889 |
| 93 | 0.31460 | −0.11205 | 0.88889 |
| 94 | 0.31672 | −0.08135 | 0.88889 |
| 95 | 0.31876 | −0.11974 | 0.88889 |
| 96 | 0.31970 | −0.08958 | 0.88889 |
| 97 | 0.32264 | −0.09780 | 0.88889 |
| 98 | 0.32554 | −0.10606 | 0.88889 |
| 99 | 0.32626 | −0.12191 | 0.88889 |
| 100 | 0.32837 | −0.11433 | 0.88889 |
| 1 | 0.03710 | 0.03714 | 0.91667 |
| 2 | 0.03800 | 0.02857 | 0.91667 |
| 3 | 0.03814 | 0.04573 | 0.91667 |
| 4 | 0.04025 | 0.05415 | 0.91667 |
| 5 | 0.04304 | 0.06237 | 0.91667 |
| 6 | 0.04414 | 0.02303 | 0.91667 |
| 7 | 0.04645 | 0.07034 | 0.91667 |
| 8 | 0.05044 | 0.07804 | 0.91667 |
| 9 | 0.05276 | 0.02239 | 0.91667 |
| 10 | 0.05497 | 0.08543 | 0.91667 |
| 11 | 0.06002 | 0.09247 | 0.91667 |
| 12 | 0.06136 | 0.02349 | 0.91667 |
| 13 | 0.06558 | 0.09913 | 0.91667 |
| 14 | 0.06983 | 0.02530 | 0.91667 |
| 15 | 0.07161 | 0.10537 | 0.91667 |
| 16 | 0.07807 | 0.11115 | 0.91667 |
| 17 | 0.07825 | 0.02744 | 0.91667 |
| 18 | 0.08495 | 0.11641 | 0.91667 |
| 19 | 0.08664 | 0.02961 | 0.91667 |
| 20 | 0.09224 | 0.12112 | 0.91667 |
| 21 | 0.09506 | 0.03171 | 0.91667 |
| 22 | 0.09988 | 0.12521 | 0.91667 |
| 23 | 0.10352 | 0.03361 | 0.91667 |
| 24 | 0.10785 | 0.12862 | 0.91667 |
| 25 | 0.11205 | 0.03517 | 0.91667 |
| 26 | 0.11610 | 0.13130 | 0.91667 |
| 27 | 0.12066 | 0.03628 | 0.91667 |
| 28 | 0.12455 | 0.13321 | 0.91667 |
| 29 | 0.12931 | 0.03685 | 0.91667 |
| 30 | 0.13315 | 0.13432 | 0.91667 |
| 31 | 0.13798 | 0.03682 | 0.91667 |
| 32 | 0.14182 | 0.13460 | 0.91667 |
| 33 | 0.14663 | 0.03623 | 0.91667 |
| 34 | 0.15047 | 0.13404 | 0.91667 |
| 35 | 0.15523 | 0.03512 | 0.91667 |
| 36 | 0.15903 | 0.13263 | 0.91667 |
| 37 | 0.16376 | 0.03354 | 0.91667 |
| 38 | 0.16741 | 0.13042 | 0.91667 |
| 39 | 0.17218 | 0.03149 | 0.91667 |
| 40 | 0.17555 | 0.12744 | 0.91667 |
| 41 | 0.18046 | 0.02891 | 0.91667 |
| 42 | 0.18340 | 0.12376 | 0.91667 |
| 43 | 0.18856 | 0.02580 | 0.91667 |
| 44 | 0.19095 | 0.11950 | 0.91667 |
| 45 | 0.19642 | 0.02214 | 0.91667 |
| 46 | 0.19820 | 0.11474 | 0.91667 |
| 47 | 0.20402 | 0.01798 | 0.91667 |
| 48 | 0.20514 | 0.10955 | 0.91667 |
| 49 | 0.21136 | 0.01336 | 0.91667 |
| 50 | 0.21179 | 0.10398 | 0.91667 |
| 51 | 0.21816 | 0.09808 | 0.91667 |
| 52 | 0.21846 | 0.00837 | 0.91667 |
| 53 | 0.22425 | 0.09191 | 0.91667 |
| 54 | 0.22531 | 0.00305 | 0.91667 |
| 55 | 0.23009 | 0.08550 | 0.91667 |
| 56 | 0.23193 | −0.00254 | 0.91667 |
| 57 | 0.23566 | 0.07886 | 0.91667 |
| 58 | 0.23833 | −0.00840 | 0.91667 |
| 59 | 0.24099 | 0.07202 | 0.91667 |
| 60 | 0.24451 | −0.01448 | 0.91667 |
| 61 | 0.24609 | 0.06500 | 0.91667 |
| 62 | 0.25048 | −0.02078 | 0.91667 |
| 63 | 0.25097 | 0.05783 | 0.91667 |
| 64 | 0.25565 | 0.05053 | 0.91667 |
| 65 | 0.25623 | −0.02727 | 0.91667 |
| 66 | 0.26014 | 0.04311 | 0.91667 |
| 67 | 0.26179 | −0.03392 | 0.91667 |
| 68 | 0.26446 | 0.03559 | 0.91667 |
| 69 | 0.26717 | −0.04073 | 0.91667 |
| 70 | 0.26863 | 0.02798 | 0.91667 |

TABLE II-continued

Non-Dimensionalized (X Y Z/Span)

| N | X | Y | Z |
|---|---|---|---|
| 71 | 0.27239 | −0.04765 | 0.91667 |
| 72 | 0.27264 | 0.02030 | 0.91667 |
| 73 | 0.27651 | 0.01254 | 0.91667 |
| 74 | 0.27745 | −0.05470 | 0.91667 |
| 75 | 0.28026 | 0.00472 | 0.91667 |
| 76 | 0.28237 | −0.06184 | 0.91667 |
| 77 | 0.28391 | −0.00316 | 0.91667 |
| 78 | 0.28717 | −0.06907 | 0.91667 |
| 79 | 0.28743 | −0.01108 | 0.91667 |
| 80 | 0.29087 | −0.01905 | 0.91667 |
| 81 | 0.29184 | −0.07638 | 0.91667 |
| 82 | 0.29422 | −0.02704 | 0.91667 |
| 83 | 0.29640 | −0.08375 | 0.91667 |
| 84 | 0.29749 | −0.03508 | 0.91667 |
| 85 | 0.30070 | −0.04313 | 0.91667 |
| 86 | 0.30083 | −0.09121 | 0.91667 |
| 87 | 0.30385 | −0.05122 | 0.91667 |
| 88 | 0.30515 | −0.09873 | 0.91667 |
| 89 | 0.30695 | −0.05932 | 0.91667 |
| 90 | 0.30937 | −0.10630 | 0.91667 |
| 91 | 0.31000 | −0.06743 | 0.91667 |
| 92 | 0.31301 | −0.07557 | 0.91667 |
| 93 | 0.31354 | −0.11391 | 0.91667 |
| 94 | 0.31599 | −0.08372 | 0.91667 |
| 95 | 0.31768 | −0.12152 | 0.91667 |
| 96 | 0.31894 | −0.09187 | 0.91667 |
| 97 | 0.32186 | −0.10003 | 0.91667 |
| 98 | 0.32474 | −0.10821 | 0.91667 |
| 99 | 0.32511 | −0.12382 | 0.91667 |
| 100 | 0.32757 | −0.11641 | 0.91667 |
| 1 | 0.03818 | 0.04499 | 0.94444 |
| 2 | 0.03899 | 0.05353 | 0.94444 |
| 3 | 0.04053 | 0.03689 | 0.94444 |
| 4 | 0.04113 | 0.06187 | 0.94444 |
| 5 | 0.04408 | 0.06996 | 0.94444 |
| 6 | 0.04768 | 0.07777 | 0.94444 |
| 7 | 0.04826 | 0.03359 | 0.94444 |
| 8 | 0.05189 | 0.08526 | 0.94444 |
| 9 | 0.05666 | 0.09243 | 0.94444 |
| 10 | 0.05685 | 0.03340 | 0.94444 |
| 11 | 0.06196 | 0.09920 | 0.94444 |
| 12 | 0.06539 | 0.03433 | 0.94444 |
| 13 | 0.06775 | 0.10556 | 0.94444 |
| 14 | 0.07388 | 0.03576 | 0.94444 |
| 15 | 0.07400 | 0.11146 | 0.94444 |
| 16 | 0.08070 | 0.11686 | 0.94444 |
| 17 | 0.08234 | 0.03735 | 0.94444 |
| 18 | 0.08781 | 0.12170 | 0.94444 |
| 19 | 0.09080 | 0.03888 | 0.94444 |
| 20 | 0.09532 | 0.12590 | 0.94444 |
| 21 | 0.09930 | 0.04029 | 0.94444 |
| 22 | 0.10316 | 0.12943 | 0.94444 |
| 23 | 0.10782 | 0.04142 | 0.94444 |
| 24 | 0.11129 | 0.13221 | 0.94444 |
| 25 | 0.11640 | 0.04218 | 0.94444 |
| 26 | 0.11966 | 0.13421 | 0.94444 |
| 27 | 0.12499 | 0.04246 | 0.94444 |
| 28 | 0.12817 | 0.13541 | 0.94444 |
| 29 | 0.13359 | 0.04220 | 0.94444 |
| 30 | 0.13677 | 0.13579 | 0.94444 |
| 31 | 0.14216 | 0.04138 | 0.94444 |
| 32 | 0.14536 | 0.13535 | 0.94444 |
| 33 | 0.15065 | 0.04002 | 0.94444 |
| 34 | 0.15386 | 0.13410 | 0.94444 |
| 35 | 0.15905 | 0.03818 | 0.94444 |
| 36 | 0.16222 | 0.13207 | 0.94444 |
| 37 | 0.16735 | 0.03592 | 0.94444 |
| 38 | 0.17037 | 0.12930 | 0.94444 |
| 39 | 0.17551 | 0.03320 | 0.94444 |
| 40 | 0.17824 | 0.12583 | 0.94444 |
| 41 | 0.18350 | 0.03001 | 0.94444 |
| 42 | 0.18580 | 0.12173 | 0.94444 |
| 43 | 0.19129 | 0.02634 | 0.94444 |
| 44 | 0.19305 | 0.11710 | 0.94444 |
| 45 | 0.19882 | 0.02221 | 0.94444 |
| 46 | 0.20000 | 0.11203 | 0.94444 |
| 47 | 0.20611 | 0.01763 | 0.94444 |
| 48 | 0.20665 | 0.10659 | 0.94444 |
| 49 | 0.21304 | 0.10081 | 0.94444 |
| 50 | 0.21313 | 0.01267 | 0.94444 |
| 51 | 0.21915 | 0.09476 | 0.94444 |
| 52 | 0.21991 | 0.00737 | 0.94444 |
| 53 | 0.22503 | 0.08848 | 0.94444 |
| 54 | 0.22647 | 0.00179 | 0.94444 |
| 55 | 0.23068 | 0.08199 | 0.94444 |
| 56 | 0.23281 | −0.00402 | 0.94444 |
| 57 | 0.23609 | 0.07530 | 0.94444 |
| 58 | 0.23893 | −0.01006 | 0.94444 |
| 59 | 0.24128 | 0.06845 | 0.94444 |
| 60 | 0.24486 | −0.01630 | 0.94444 |
| 61 | 0.24625 | 0.06143 | 0.94444 |
| 62 | 0.25058 | −0.02272 | 0.94444 |
| 63 | 0.25103 | 0.05427 | 0.94444 |
| 64 | 0.25563 | 0.04699 | 0.94444 |
| 65 | 0.25612 | −0.02930 | 0.94444 |
| 66 | 0.26005 | 0.03962 | 0.94444 |
| 67 | 0.26149 | −0.03604 | 0.94444 |
| 68 | 0.26432 | 0.03214 | 0.94444 |
| 69 | 0.26670 | −0.04288 | 0.94444 |
| 70 | 0.26845 | 0.02460 | 0.94444 |
| 71 | 0.27175 | −0.04984 | 0.94444 |
| 72 | 0.27242 | 0.01697 | 0.94444 |
| 73 | 0.27627 | 0.00927 | 0.94444 |
| 74 | 0.27668 | −0.05689 | 0.94444 |
| 75 | 0.28000 | 0.00152 | 0.94444 |
| 76 | 0.28148 | −0.06402 | 0.94444 |
| 77 | 0.28361 | −0.00629 | 0.94444 |
| 78 | 0.28619 | −0.07124 | 0.94444 |
| 79 | 0.28711 | −0.01415 | 0.94444 |
| 80 | 0.29052 | −0.02205 | 0.94444 |
| 81 | 0.29079 | −0.07851 | 0.94444 |
| 82 | 0.29385 | −0.02998 | 0.94444 |
| 83 | 0.29530 | −0.08584 | 0.94444 |
| 84 | 0.29709 | −0.03795 | 0.94444 |
| 85 | 0.29971 | −0.09322 | 0.94444 |
| 86 | 0.30028 | −0.04594 | 0.94444 |
| 87 | 0.30340 | −0.05396 | 0.94444 |
| 88 | 0.30400 | −0.10068 | 0.94444 |
| 89 | 0.30649 | −0.06199 | 0.94444 |
| 90 | 0.30821 | −0.10819 | 0.94444 |
| 91 | 0.30953 | −0.07005 | 0.94444 |
| 92 | 0.31235 | −0.11572 | 0.94444 |
| 93 | 0.31253 | −0.07810 | 0.94444 |
| 94 | 0.31549 | −0.08619 | 0.94444 |
| 95 | 0.31647 | −0.12328 | 0.94444 |
| 96 | 0.31842 | −0.09428 | 0.94444 |
| 97 | 0.32130 | −0.10239 | 0.94444 |
| 98 | 0.32385 | −0.12578 | 0.94444 |
| 99 | 0.32415 | −0.11051 | 0.94444 |
| 100 | 0.32695 | −0.11864 | 0.94444 |
| 1 | 0.03928 | 0.05338 | 0.97222 |
| 2 | 0.03963 | 0.06189 | 0.97222 |
| 3 | 0.04176 | 0.07016 | 0.97222 |
| 4 | 0.04396 | 0.04669 | 0.97222 |
| 5 | 0.04487 | 0.07812 | 0.97222 |
| 6 | 0.04871 | 0.08576 | 0.97222 |
| 7 | 0.05227 | 0.04483 | 0.97222 |
| 8 | 0.05319 | 0.09304 | 0.97222 |
| 9 | 0.05826 | 0.09993 | 0.97222 |
| 10 | 0.06082 | 0.04466 | 0.97222 |
| 11 | 0.06385 | 0.10639 | 0.97222 |
| 12 | 0.06935 | 0.04523 | 0.97222 |
| 13 | 0.06992 | 0.11241 | 0.97222 |
| 14 | 0.07644 | 0.11794 | 0.97222 |
| 15 | 0.07785 | 0.04613 | 0.97222 |
| 16 | 0.08338 | 0.12295 | 0.97222 |
| 17 | 0.08636 | 0.04706 | 0.97222 |
| 18 | 0.09072 | 0.12731 | 0.97222 |
| 19 | 0.09487 | 0.04789 | 0.97222 |
| 20 | 0.09844 | 0.13098 | 0.97222 |
| 21 | 0.10340 | 0.04853 | 0.97222 |
| 22 | 0.10648 | 0.13388 | 0.97222 |

TABLE II-continued

Non-Dimensionalized (X Y Z/Span)

| N | X | Y | Z |
|---|---|---|---|
| 23 | 0.11194 | 0.04886 | 0.97222 |
| 24 | 0.11477 | 0.13600 | 0.97222 |
| 25 | 0.12049 | 0.04878 | 0.97222 |
| 26 | 0.12322 | 0.13728 | 0.97222 |
| 27 | 0.12902 | 0.04821 | 0.97222 |
| 28 | 0.13175 | 0.13772 | 0.97222 |
| 29 | 0.13750 | 0.04712 | 0.97222 |
| 30 | 0.14029 | 0.13735 | 0.97222 |
| 31 | 0.14590 | 0.04551 | 0.97222 |
| 32 | 0.14875 | 0.13617 | 0.97222 |
| 33 | 0.15418 | 0.04341 | 0.97222 |
| 34 | 0.15708 | 0.13422 | 0.97222 |
| 35 | 0.16235 | 0.04087 | 0.97222 |
| 36 | 0.16521 | 0.13158 | 0.97222 |
| 37 | 0.17039 | 0.03794 | 0.97222 |
| 38 | 0.17309 | 0.12825 | 0.97222 |
| 39 | 0.17825 | 0.03459 | 0.97222 |
| 40 | 0.18067 | 0.12432 | 0.97222 |
| 41 | 0.18593 | 0.03084 | 0.97222 |
| 42 | 0.18795 | 0.11984 | 0.97222 |
| 43 | 0.19340 | 0.02667 | 0.97222 |
| 44 | 0.19493 | 0.11489 | 0.97222 |
| 45 | 0.20063 | 0.02211 | 0.97222 |
| 46 | 0.20161 | 0.10955 | 0.97222 |
| 47 | 0.20761 | 0.01718 | 0.97222 |
| 48 | 0.20800 | 0.10386 | 0.97222 |
| 49 | 0.21412 | 0.09790 | 0.97222 |
| 50 | 0.21434 | 0.01190 | 0.97222 |
| 51 | 0.22000 | 0.09169 | 0.97222 |
| 52 | 0.22084 | 0.00635 | 0.97222 |
| 53 | 0.22567 | 0.08529 | 0.97222 |
| 54 | 0.22712 | 0.00054 | 0.97222 |
| 55 | 0.23115 | 0.07872 | 0.97222 |
| 56 | 0.23321 | −0.00547 | 0.97222 |
| 57 | 0.23642 | 0.07198 | 0.97222 |
| 58 | 0.23909 | −0.01167 | 0.97222 |
| 59 | 0.24148 | 0.06510 | 0.97222 |
| 60 | 0.24478 | −0.01804 | 0.97222 |
| 61 | 0.24635 | 0.05808 | 0.97222 |
| 62 | 0.25031 | −0.02458 | 0.97222 |
| 63 | 0.25104 | 0.05093 | 0.97222 |
| 64 | 0.25556 | 0.04367 | 0.97222 |
| 65 | 0.25566 | −0.03125 | 0.97222 |
| 66 | 0.25992 | 0.03631 | 0.97222 |
| 67 | 0.26085 | −0.03804 | 0.97222 |
| 68 | 0.26414 | 0.02887 | 0.97222 |
| 69 | 0.26590 | −0.04495 | 0.97222 |
| 70 | 0.26822 | 0.02135 | 0.97222 |
| 71 | 0.27081 | −0.05195 | 0.97222 |
| 72 | 0.27216 | 0.01377 | 0.97222 |
| 73 | 0.27562 | −0.05902 | 0.97222 |
| 74 | 0.27600 | 0.00612 | 0.97222 |
| 75 | 0.27971 | −0.00158 | 0.97222 |
| 76 | 0.28035 | −0.06615 | 0.97222 |
| 77 | 0.28331 | −0.00934 | 0.97222 |
| 78 | 0.28499 | −0.07332 | 0.97222 |
| 79 | 0.28681 | −0.01714 | 0.97222 |
| 80 | 0.28956 | −0.08056 | 0.97222 |
| 81 | 0.29022 | −0.02498 | 0.97222 |
| 82 | 0.29353 | −0.03287 | 0.97222 |
| 83 | 0.29405 | −0.08783 | 0.97222 |
| 84 | 0.29676 | −0.04078 | 0.97222 |
| 85 | 0.29843 | −0.09517 | 0.97222 |
| 86 | 0.29993 | −0.04873 | 0.97222 |
| 87 | 0.30273 | −0.10257 | 0.97222 |
| 88 | 0.30304 | −0.05669 | 0.97222 |
| 89 | 0.30611 | −0.06468 | 0.97222 |
| 90 | 0.30693 | −0.11001 | 0.97222 |
| 91 | 0.30913 | −0.07267 | 0.97222 |
| 92 | 0.31107 | −0.11750 | 0.97222 |
| 93 | 0.31212 | −0.08069 | 0.97222 |
| 94 | 0.31506 | −0.08872 | 0.97222 |
| 95 | 0.31519 | −0.12500 | 0.97222 |
| 96 | 0.31797 | −0.09676 | 0.97222 |
| 97 | 0.32084 | −0.10481 | 0.97222 |
| 98 | 0.32249 | −0.12776 | 0.97222 |
| 99 | 0.32366 | −0.11289 | 0.97222 |
| 100 | 0.32640 | −0.12100 | 0.97222 |
| 1 | 0.03973 | 0.06784 | 1.00000 |
| 2 | 0.04113 | 0.07625 | 1.00000 |
| 3 | 0.04239 | 0.06008 | 1.00000 |
| 4 | 0.04406 | 0.08428 | 1.00000 |
| 5 | 0.04790 | 0.09190 | 1.00000 |
| 6 | 0.05039 | 0.05741 | 1.00000 |
| 7 | 0.05251 | 0.09910 | 1.00000 |
| 8 | 0.05776 | 0.10589 | 1.00000 |
| 9 | 0.05886 | 0.05634 | 1.00000 |
| 10 | 0.06351 | 0.11223 | 1.00000 |
| 11 | 0.06743 | 0.05614 | 1.00000 |
| 12 | 0.06973 | 0.11810 | 1.00000 |
| 13 | 0.07592 | 0.05672 | 1.00000 |
| 14 | 0.07641 | 0.12345 | 1.00000 |
| 15 | 0.08353 | 0.12820 | 1.00000 |
| 16 | 0.08432 | 0.05833 | 1.00000 |
| 17 | 0.09104 | 0.13231 | 1.00000 |
| 18 | 0.09286 | 0.05857 | 1.00000 |
| 19 | 0.09891 | 0.13568 | 1.00000 |
| 20 | 0.10142 | 0.05851 | 1.00000 |
| 21 | 0.10704 | 0.13827 | 1.00000 |
| 22 | 0.10997 | 0.05818 | 1.00000 |
| 23 | 0.11539 | 0.13997 | 1.00000 |
| 24 | 0.11850 | 0.05754 | 1.00000 |
| 25 | 0.12389 | 0.14075 | 1.00000 |
| 26 | 0.12700 | 0.05652 | 1.00000 |
| 27 | 0.13243 | 0.14064 | 1.00000 |
| 28 | 0.13544 | 0.05511 | 1.00000 |
| 29 | 0.14095 | 0.13970 | 1.00000 |
| 30 | 0.14379 | 0.05327 | 1.00000 |
| 31 | 0.14934 | 0.13800 | 1.00000 |
| 32 | 0.15204 | 0.05100 | 1.00000 |
| 33 | 0.15756 | 0.13558 | 1.00000 |
| 34 | 0.16015 | 0.04827 | 1.00000 |
| 35 | 0.16553 | 0.13249 | 1.00000 |
| 36 | 0.16809 | 0.04510 | 1.00000 |
| 37 | 0.17325 | 0.12879 | 1.00000 |
| 38 | 0.17586 | 0.04153 | 1.00000 |
| 39 | 0.18065 | 0.12453 | 1.00000 |
| 40 | 0.18344 | 0.03756 | 1.00000 |
| 41 | 0.18774 | 0.11977 | 1.00000 |
| 42 | 0.19082 | 0.03323 | 1.00000 |
| 43 | 0.19452 | 0.11457 | 1.00000 |
| 44 | 0.19798 | 0.02855 | 1.00000 |
| 45 | 0.20102 | 0.10899 | 1.00000 |
| 46 | 0.20493 | 0.02355 | 1.00000 |
| 47 | 0.20724 | 0.10310 | 1.00000 |
| 48 | 0.21164 | 0.01825 | 1.00000 |
| 49 | 0.21324 | 0.09698 | 1.00000 |
| 50 | 0.21813 | 0.01267 | 1.00000 |
| 51 | 0.21901 | 0.09065 | 1.00000 |
| 52 | 0.22440 | 0.00686 | 1.00000 |
| 53 | 0.22456 | 0.08414 | 1.00000 |
| 54 | 0.22991 | 0.07747 | 1.00000 |
| 55 | 0.23046 | 0.00081 | 1.00000 |
| 56 | 0.23508 | 0.07066 | 1.00000 |
| 57 | 0.23633 | −0.00542 | 1.00000 |
| 58 | 0.24008 | 0.06372 | 1.00000 |
| 59 | 0.24201 | −0.01181 | 1.00000 |
| 60 | 0.24493 | 0.05667 | 1.00000 |
| 61 | 0.24752 | −0.01836 | 1.00000 |
| 62 | 0.24962 | 0.04952 | 1.00000 |
| 63 | 0.25288 | −0.02504 | 1.00000 |
| 64 | 0.25416 | 0.04227 | 1.00000 |
| 65 | 0.25808 | −0.03183 | 1.00000 |
| 66 | 0.25856 | 0.03493 | 1.00000 |
| 67 | 0.26282 | 0.02751 | 1.00000 |
| 68 | 0.26314 | −0.03872 | 1.00000 |
| 69 | 0.26695 | 0.02001 | 1.00000 |
| 70 | 0.26808 | −0.04571 | 1.00000 |
| 71 | 0.27095 | 0.01244 | 1.00000 |
| 72 | 0.27290 | −0.05278 | 1.00000 |
| 73 | 0.27482 | 0.00482 | 1.00000 |
| 74 | 0.27761 | −0.05992 | 1.00000 |

TABLE II-continued

Non-Dimensionalized (X Y Z/Span)

| N | X | Y | Z |
| --- | --- | --- | --- |
| 75 | 0.27858 | −0.00287 | 1.00000 |
| 76 | 0.28221 | −0.06714 | 1.00000 |
| 77 | 0.28222 | −0.01062 | 1.00000 |
| 78 | 0.28576 | −0.01841 | 1.00000 |
| 79 | 0.28673 | −0.07441 | 1.00000 |
| 80 | 0.28919 | −0.02624 | 1.00000 |
| 81 | 0.29118 | −0.08172 | 1.00000 |
| 82 | 0.29254 | −0.03412 | 1.00000 |
| 83 | 0.29429 | −0.08964 | 1.00000 |
| 84 | 0.29579 | −0.04203 | 1.00000 |
| 85 | 0.29732 | −0.09760 | 1.00000 |
| 86 | 0.29898 | −0.04997 | 1.00000 |
| 87 | 0.30163 | −0.10498 | 1.00000 |
| 88 | 0.30211 | −0.05794 | 1.00000 |
| 89 | 0.30520 | −0.06592 | 1.00000 |
| 90 | 0.30586 | −0.11242 | 1.00000 |
| 91 | 0.30824 | −0.07391 | 1.00000 |
| 92 | 0.31003 | −0.11989 | 1.00000 |
| 93 | 0.31124 | −0.08193 | 1.00000 |
| 94 | 0.31420 | −0.08996 | 1.00000 |
| 95 | 0.31429 | −0.12732 | 1.00000 |
| 96 | 0.31711 | −0.09800 | 1.00000 |
| 97 | 0.32001 | −0.10606 | 1.00000 |
| 98 | 0.32193 | −0.12927 | 1.00000 |
| 99 | 0.32286 | −0.11412 | 1.00000 |
| 100 | 0.32554 | −0.12225 | 1.00000 |

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine bucket core cooling circuit comprising:
   a rib extending from a base of the bucket substantially radially into a casing of an airfoil, the casing including opposed pressure and suction sidewalls of the airfoil;
   an outflow portion of a cooling passage extending substantially along a first side of the rib in a substantially chordwise plane in the casing;
   an inflow portion of the cooling passage extending substantially along a second side of the rib opposed to the first side of the rib and substantially in the chordwise plane;
   a turn connecting the outflow portion to the inflow portion proximate an end of the airfoil, the end including at least one of a tip or a root of the airfoil, the turn including a non-uniform contour and an inner wall that includes at least a portion of the rib, the non-uniform contour including a variable radius of curvature $R_i$ of the inner wall in a plane transverse to the chordwise plane, the radius of curvature $R_i$ of the inner wall on at least one of a pressure side of the turn or a suction side of the turn having a first radius value $R_{tlow}$ at a first end of the turn, gradually changing to a second radius value $R_{tmid}$ through first and second portions of the turn extending contiguously radially from the first end, remaining substantially constant in a third portion extending radially from the second portion, and having at least one other radius value in another portion of the turn,
   wherein the turn is substantially defined as part of a nominal profile substantially in accordance with non-dimensional Cartesian coordinate values of X, Y, and Z set forth in TABLE I, wherein the coordinate values are convertible to distances by multiplying the values by a desired height expressed in units of distance, and wherein X and Y values connected by smooth continuing arcs define turn profile sections at each distance Z along the turn, the profile sections at the Z distances being joined smoothly with one another to form the turn profile.

2. The turbine bucket core cooling circuit of claim 1, wherein the non-uniform contour includes a blend of a baseline contour and a bulb contour.

3. The turbine bucket core cooling circuit of claim 1, wherein the another portion of the turn includes a fourth portion extending contiguously radially from the third portion and at least partly around an end of the rib such that the first, second, third, and fourth portions are in substantially one half of the turn, and the at least one other radius value includes a third radius value $R_{tup}$ in the fourth portion.

4. The turbine bucket core cooling circuit of claim 3, wherein the radius of curvature has the third radius value $R_{tup}$ substantially throughout the fourth portion.

5. The turbine bucket core cooling circuit of claim 3, wherein each of the pressure side and the suction side of the turn includes respective first, second, third, and fourth, portions, the first end of one of the pressure side or the suction side being an entry of the turn and the first end of the other of the pressure side or the suction side being an exit of the turn, the fourth portions being joined and the radius of curvature $R_i$ in both fourth portions having the third radius value $R_{tup}$ at least where joined.

6. The turbine bucket of claim 5, wherein each of the pressure side and the suction side of the turn further includes baseline and end sections extending contiguously from the fourth portion to a second end of the turn, the first, second, and third portions of one of the pressure side or the suction side of the turn are in substantial alignment with the baseline portion of the other of the pressure side or the suction side of the turn and are spaced apart therefrom in a substantially circumferential direction,
   wherein the fourth portion of the one of the pressure side or the suction side of the turn is in substantial alignment with the baseline portion of the other of the pressure side or the suction side of the turn and is spaced apart therefrom in a substantially circumferential direction, and
   wherein at any point along a radius of the bucket the radius of curvature $R_i$ of the inner wall through the first, second, and third portions of the pressure side of the turn is substantially equal to the radius of curvature $R_i$ of the inner wall in the baseline portion of the suction side of the turn.

7. The turbine bucket cooling circuit of claim 6, wherein the third radius value $R_{tup}$ is from about 2.2 times the first radius value $R_{tlow}$ to about 2.8 times the first radius value $R_{tlow}$.

8. The turbine bucket cooling circuit of claim 1, wherein the second radius value $R_{tmid}$ is from about 1.3 times the first radius value $R_{tlow}$ to about 1.7 times the first radius value $R_{tlow}$.

9. A turbine bucket comprising:
a base;
an airfoil including:
- a root connected to the base;
- a tip radially opposed to the root; and
- a casing including opposed pressure and suction sidewalls extending chordwise between opposed leading and trailing edges and spanwise between the root and the tip;

a core including:
- a rib extending substantially radially from the base into the casing toward the tip of the airfoil; and
- a cooling passage having:
  - an outflow portion and an inflow portion on opposed sides of the rib, each of the outflow and inflow portions extending between the root and the tip of the airfoil;
  - an inlet on a base end of the outflow portion arranged for fluid communication with a coolant source; and
  - a turn proximate an end of the airfoil in fluid communication with and connecting the outflow portion and the inflow portion proximate the airfoil end, the turn being one of a tipturn of the airfoil or a root turn of the airfoil and the end being a respective one of the tip of the airfoil or the root of the airfoil, an inner wall of the turn including a non-uniform contour and bending around at least a portion of the rib, the non-uniform contour including a variable radius of curvature $R_i$ of the inner wall in a plane transverse to a chordwise plane, the radius of curvature $R_i$ of the inner wall on at least one of a pressure side of the turn or a suction side of the turn having a first radius value $R_{tlow}$ at a first end of the turn, gradually changing to a second radius value $R_{tmid}$ through first and second portions of the turn extending contiguously radially from the first end, remaining substantially constant in a third portion extending radially from the second portion, and having at least one other radius value in another portion of the turn,
  - wherein the turn includes a nominal profile substantially in accordance with non-dimensional Cartesian coordinate values of X, Y, and Z set forth in TABLE I, wherein the coordinate values are convertible to distances by multiplying the values by a desired height expressed in units of distance, and wherein X and Y values connected by smooth continuing arcs define turn sections at each distance Z along the turn, the turn sections at the Z distances being joined smoothly with one another to form the turn profile.

10. The turbine bucket of claim 9, wherein the second radius value $R_{tmid}$ is from about 1.3 times the first radius value $R_{tlow}$ to about 1.7 times the first radius value $R_{tlow}$.

11. The turbine bucket of claim 9, wherein the another portion of the turn includes a fourth portion extending contiguously radially from the third portion and at least partly around an end of the rib such that the first, second, third, and fourth portions are in substantially one half of the turn, and the at least one other radius value includes a third radius value $R_{tup}$ in substantially all of the fourth portion.

12. The turbine bucket of claim 11, wherein the third radius value $R_{tup}$ is from about 2.2 times the first radius value $R_{tlow}$ to about 2.8 times the first radius value $R_{tlow}$.

13. The turbine bucket of claim 11, wherein each of the pressure side and the suction side of the turn includes respective first, second, third, and fourth, portions, the first end of one of the pressure side or the suction side being an entry of the turn and the first end of the other of the pressure side or the suction side being an exit of the turn, the fourth portions being joined and the radius of curvature in both fourth portions having the third radius value $R_{tup}$ at least where joined.

14. The turbine bucket of claim 13, wherein each of the pressure side and the suction side of the turn further includes baseline and end sections extending contiguously from the fourth portion to a second end of the turn,
the first, second, and third portions of one of the pressure side or the suction side of the turn are in substantial alignment with the baseline portion of the other of the pressure side or the suction side of the turn and are spaced apart therefrom in a substantially circumferential direction,
the fourth portion of the one of the pressure side or the suction side of the turn is in substantial alignment with the baseline portion of the other of the pressure side or the suction side of the turn and is spaced apart therefrom in a substantially circumferential direction,
the first end of one of the pressure side or the suction side of the turn is the second end of the other of the pressure side or the suction side of the turn, and
wherein at any point along a radius of the bucket the radius of curvature $R_i$ of the inner wall through the first, second, and third portions of the pressure side of the turn is substantially equal to the radius of curvature $R_i$ of the inner wall in the baseline portion of the suction side of the turn.

15. The turbine bucket of claim 9, wherein the non-uniform contour includes a blend of a baseline contour and a bulb contour.

16. A gas turbine system comprising:
a compressor;
a combustion system in fluid communication with the compressor; and
a turbine in fluid communication with the combustion system and including a stage with a plurality of substantially identical buckets arranged substantially circumferentially about an axis of rotation of the turbine, each bucket including:
a base;
an airfoil including:
- a root connected to the base;
- a tip radially opposed to the root; and
- a casing including opposed pressure and suction sidewalls extending chordwise between opposed leading and trailing edges and spanwise between the root and the tip;

a core including:
- a rib extending substantially radially from the base into the casing toward the tip of the airfoil; and
- a cooling passage having:

an outflow portion and an inflow portion on opposed sides of the rib, each of the outflow and inflow portions extending between the root and the tip of the airfoil;

an inlet on a base end of the outflow portion arranged for fluid communication with a coolant source; and a turn proximate one of the tip or the root of the airfoil in fluid communication with and connecting the outflow portion and the inflow portion, the turn including a non-uniform contour having a blend of a bulb contour and a baseline contour, the turn further including an inner wall that bends around at least a portion of the rib, the non-uniform contour including a variable radius of curvature $R_i$ of the inner wall in a plane transverse to a chordwise plane, the radius of curvature of $R_i$ of the inner wall on at least one of a pressure side of the turn or a suction side of the turn having a first radius value $R_{tlow}$ at a first end of the turn, gradually changing to a second radius value $R_{tmid}$ through first and second portions of the turn extending contiguously radially from the first end, remaining substantially constant in a third portion extending radially from the second portion, and having at least one other radius value in another portion of the turn, wherein the turn is substantially defined as part of a nominal profile of the core substantially in accordance with non-dimensional Cartesian coordinate values of X, Y, and Z set forth in TABLE II in values convertible to distances by multiplying the values by a desired span expressed in units of distance, and wherein X and Y values connected by smooth continuing arcs define core profile sections at each distance Z along the core, the profile sections at the Z distances being joined smoothly with one another to form the core profile.

17. The turbine bucket of claim 16, wherein the another portion of the turn includes a fourth portion extending contiguously radially from the third portion and at least partly around an end of the rib such that the first, second, third, and fourth portions are in substantially one half of the turn, the at least one other radius value includes a third radius value $R_{tup}$ in substantially all of the fourth portion, each of the pressure side and the suction side of the turn includes respective first, second, third, and fourth, portions, the first end of one of the pressure side or the suction side being an entry of the turn and the first end of the other of the pressure side or the suction side being an exit of the turn, the fourth portions being joined and the radius of curvature in both fourth portions having the third radius value $R_{tup}$ at least where joined.

* * * * *